(12) United States Patent
Taniguchi et al.

(10) Patent No.: US 6,996,034 B1
(45) Date of Patent: Feb. 7, 2006

(54) DISK DEVICE HOLDING A PLURALITY OF DISKS AT ITS INNER DIAMETER

(75) Inventors: Kazutoshi Taniguchi, Tokyo (JP); Kei Shirahata, Tokyo (JP); Takashi Kuzuu, Tokyo (JP); Shoji Tatehata, Tokyo (JP); Eiji Sasaki, Tokyo (JP); Kiichiro Murotani, Tokyo (JP); Naohiko Obata, Tokyo (JP); Yuichiro Suzui, Tokyo (JP); Ryoto Adachi, Tokyo (JP); Tetsuro Nagami, Tokyo (JP); Takashi Matsuda, Tokyo (JP); Yasuyuki Nakanishi, Tokyo (JP); Masahiro Ieda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 566 days.

(21) Appl. No.: 10/130,499

(22) PCT Filed: Sep. 20, 2000

(86) PCT No.: PCT/JP00/06433

§ 371 (c)(1),
(2), (4) Date: May 20, 2002

(87) PCT Pub. No.: WO02/25659

PCT Pub. Date: Mar. 28, 2002

(51) Int. Cl.
*G11B 17/12* (2006.01)

(52) U.S. Cl. .............................. 369/30.52; 369/30.78; 369/30.85

(58) Field of Classification Search ............. 369/30.85, 369/30.52, 30.7; 720/601
See application file for complete search history.

(56) References Cited

U.S. PATENT DOCUMENTS

| 6,744,704 B1 * | 6/2004 | Funaya et al. ............ 369/30.85 |
| 6,785,897 B2 * | 8/2004 | Takizawa et al. ........... 720/601 |
| 6,817,022 B1 * | 11/2004 | Taniguchi et al. .......... 720/623 |

FOREIGN PATENT DOCUMENTS

| JP | 63-200354 A | 8/1988 |
| JP | 8-55412 A | 2/1996 |
| JP | 10-208361 A | 8/1998 |
| JP | 2000-132898 A | 5/2000 |

* cited by examiner

Primary Examiner—A M Psitos
(74) Attorney, Agent, or Firm—Birch, Stewart, Kolasch & Birch, LLP

(57) ABSTRACT

A disk device realizing reducing in size and number of parts, prevention of damage to disks, shortening operation time for plurality of operations, improved vibration resistance and less expensive manufacturing cost is provided. The disk device capable of storing a plurality of disks includes an operation setting means to actuate the disk holding means according to an operation mode of the disk, and an operation mode switching means to switch the operation mode of the operation setting means based on contents of disk operation.

3 Claims, 176 Drawing Sheets

4110

FIG.107
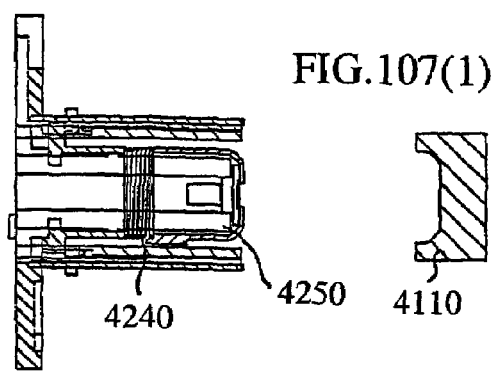
FIG.107(1)
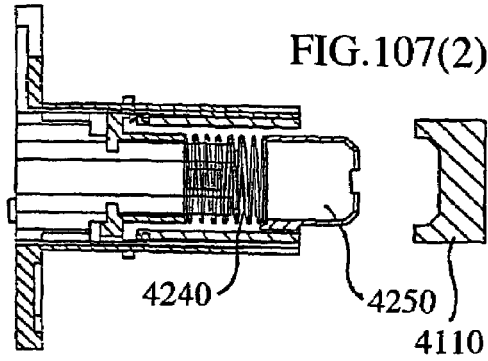
FIG.107(2)
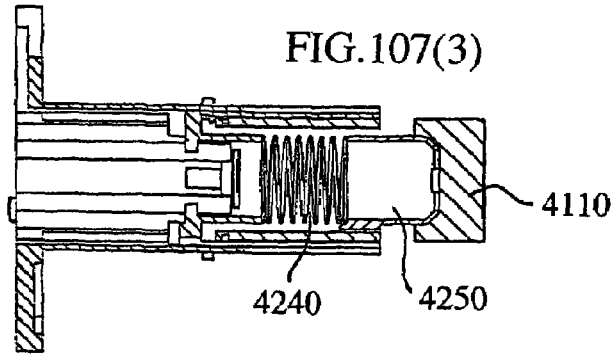
FIG.107(3)
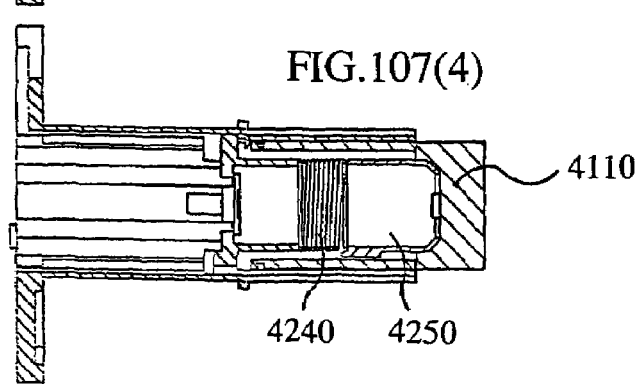
FIG.107(4)

FIG.110
FIG.110(1)
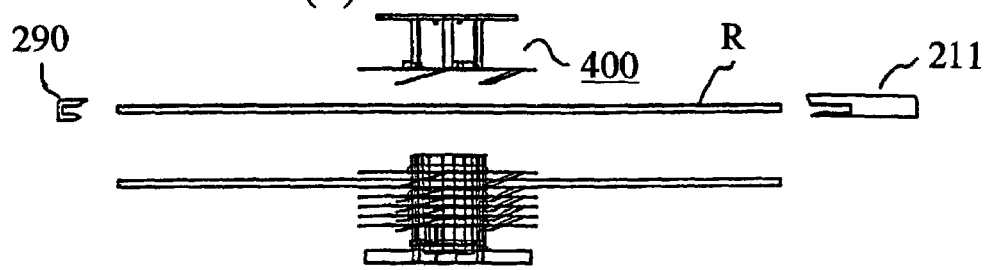
FIG.110(2)
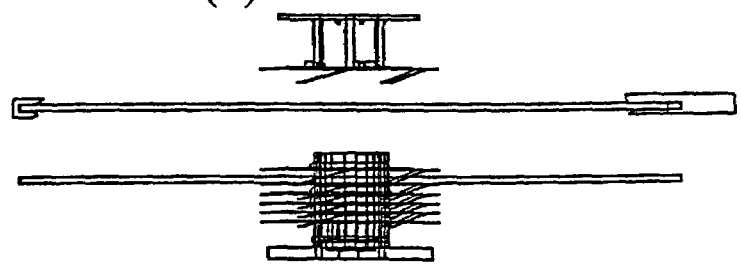
FIG.110(3)
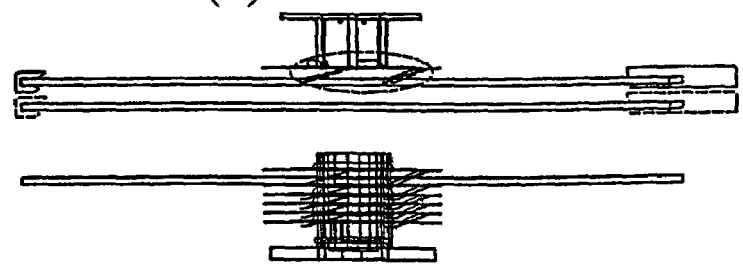
FIG.110(4)
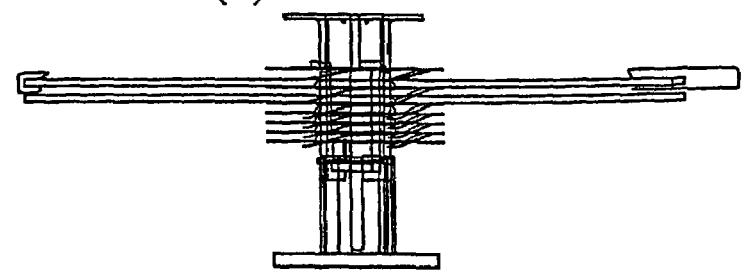

FIG.111
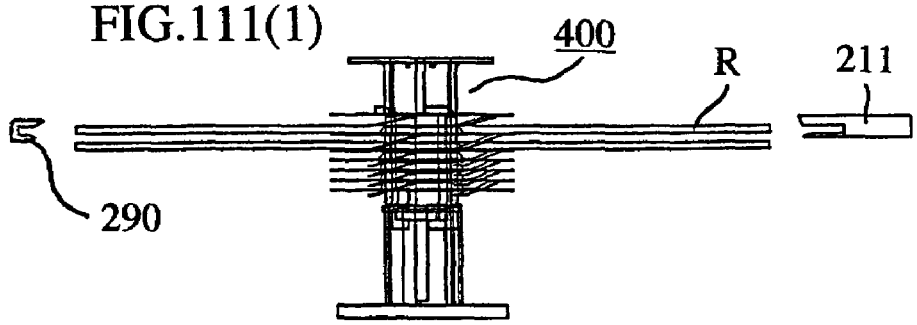
FIG.111(1)
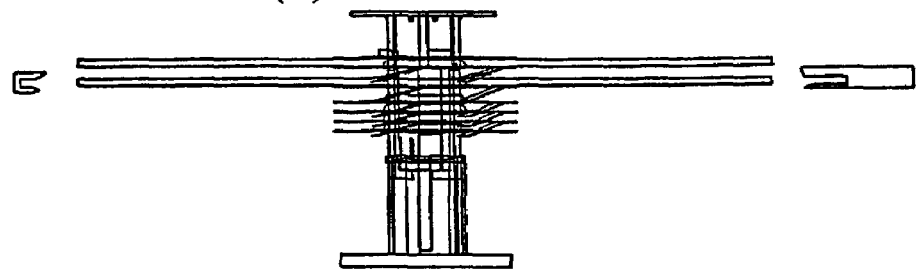
FIG.111(2)
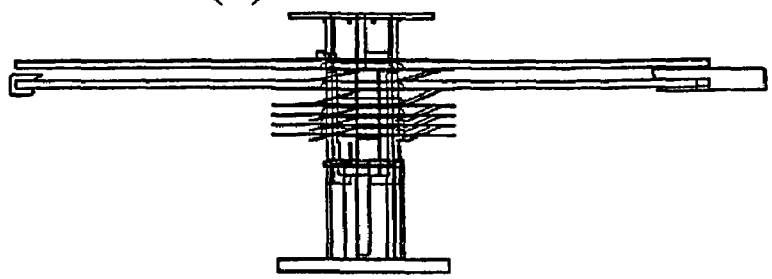
FIG.111(3)
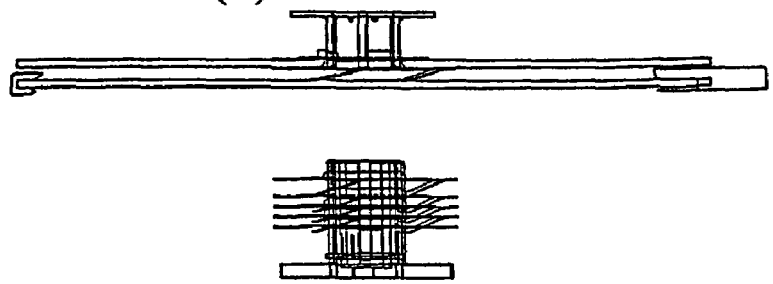
FIG.111(4)

FIG.112
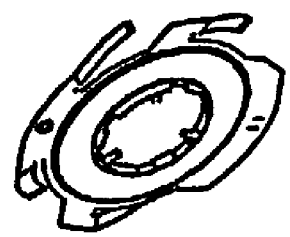
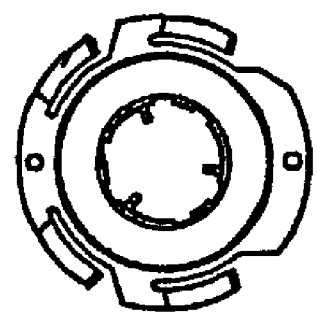

FIG.114
FIG.114(1)
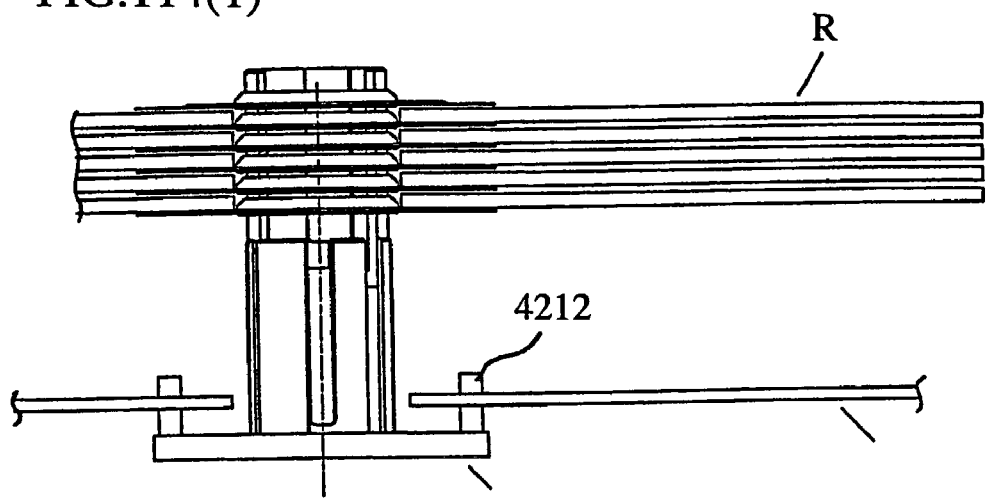
FIG.114(2)
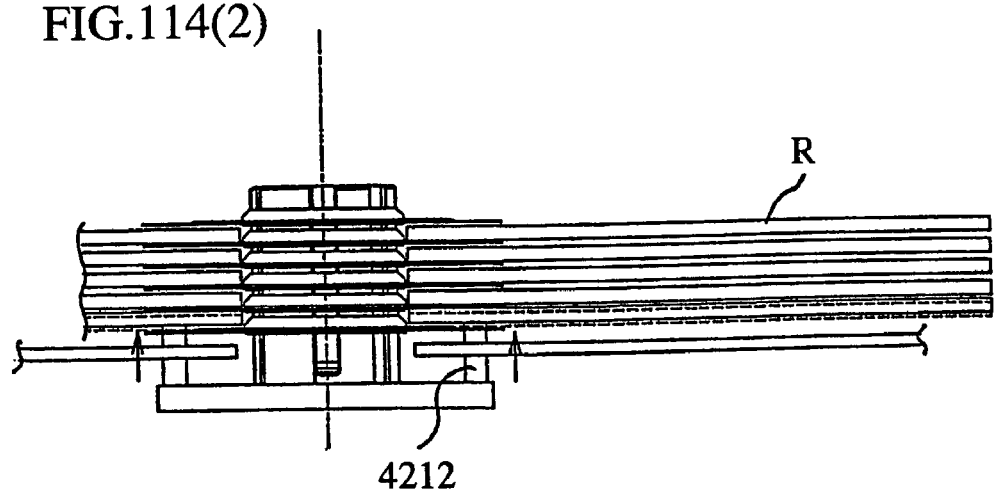

FIG.129
FIG.129(a)
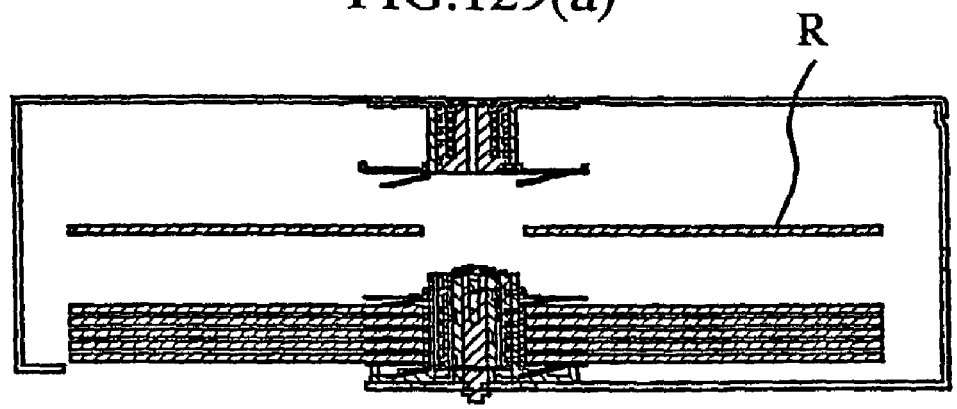
FIG.129(b)
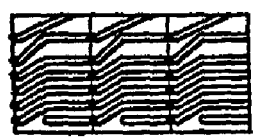 

FIG.130
FIG.130(a)
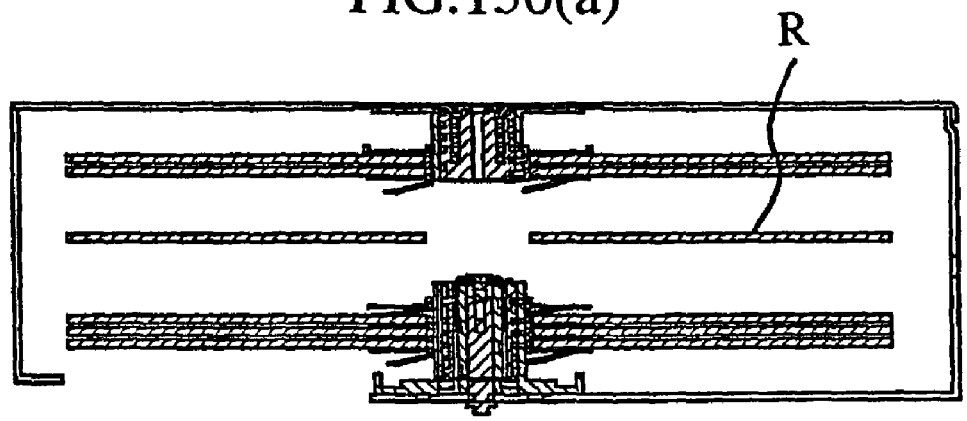
FIG.130(b)
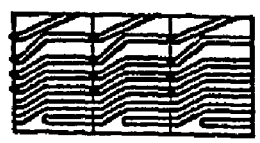 

FIG.131
FIG.131(a)
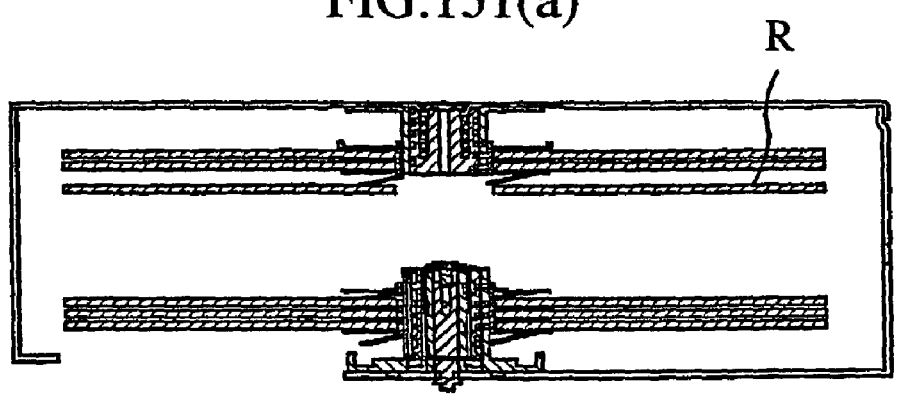
FIG.131(b)
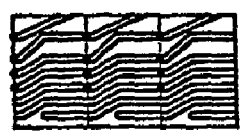 

FIG.132
FIG.132(a)
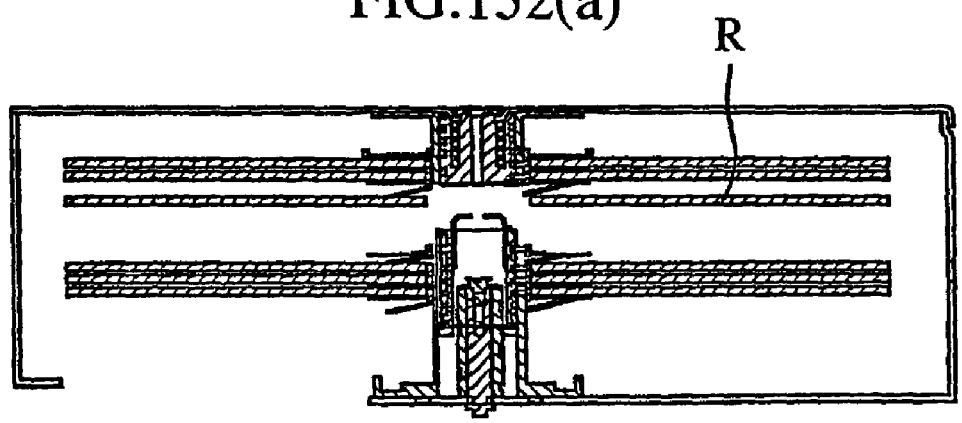
FIG.132(b)
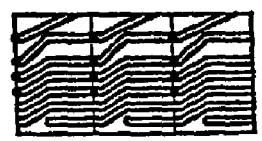
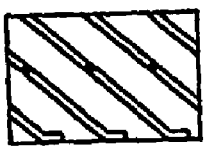

… FIG. 133

FIG.134
FIG.134(a)
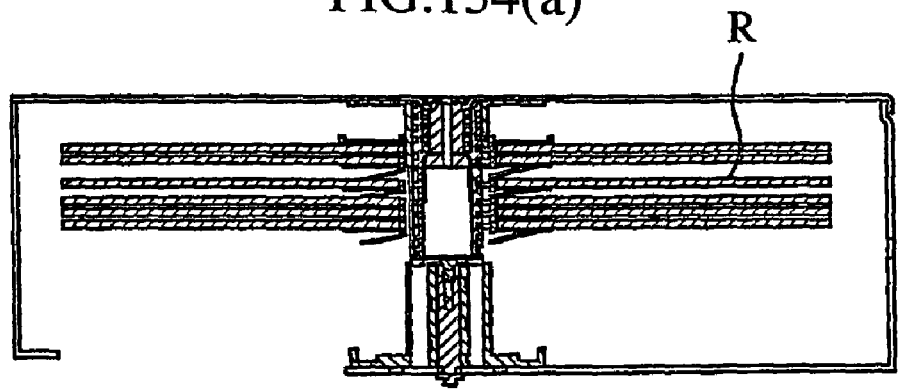
FIG.134(b)
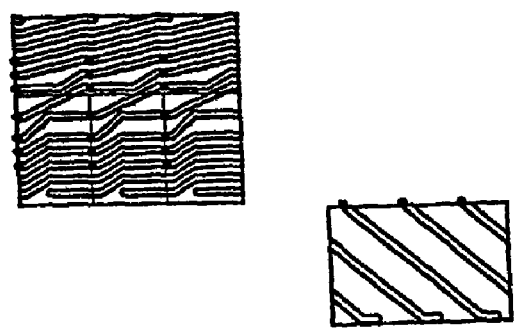

FIG.135
FIG.135(a)
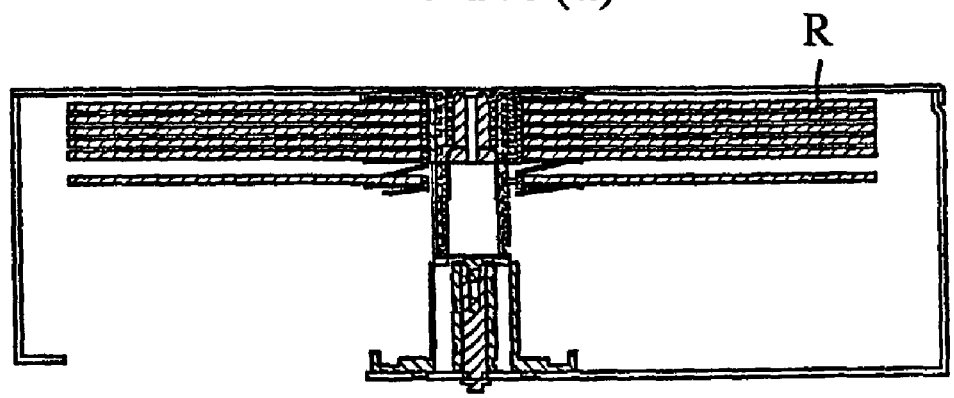
FIG.135(b)
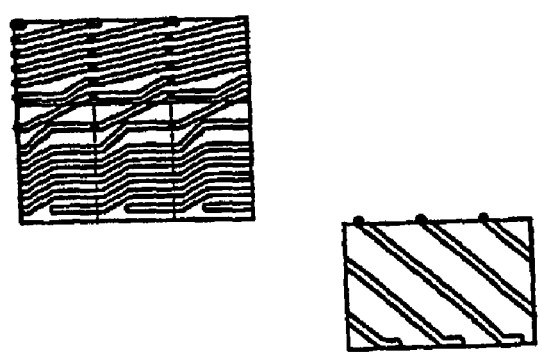

FIG.138
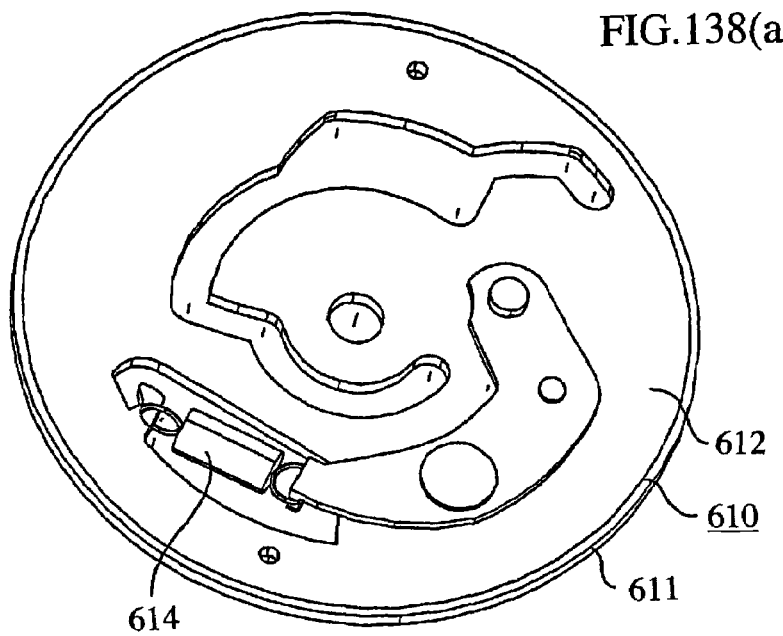
FIG.138(a)
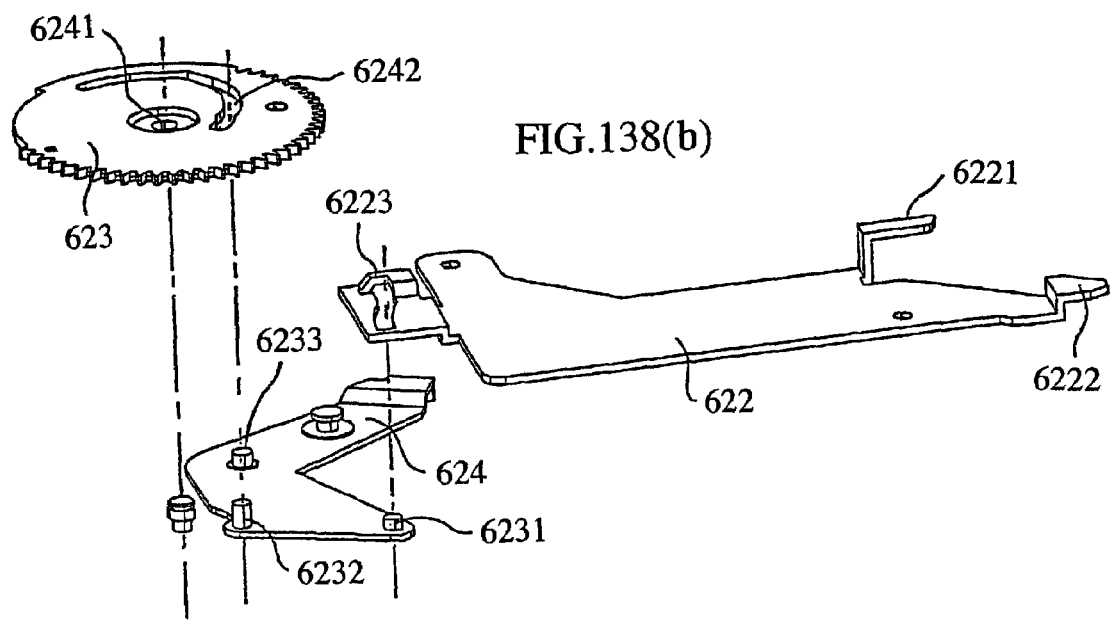
FIG.138(b)

FIG.139
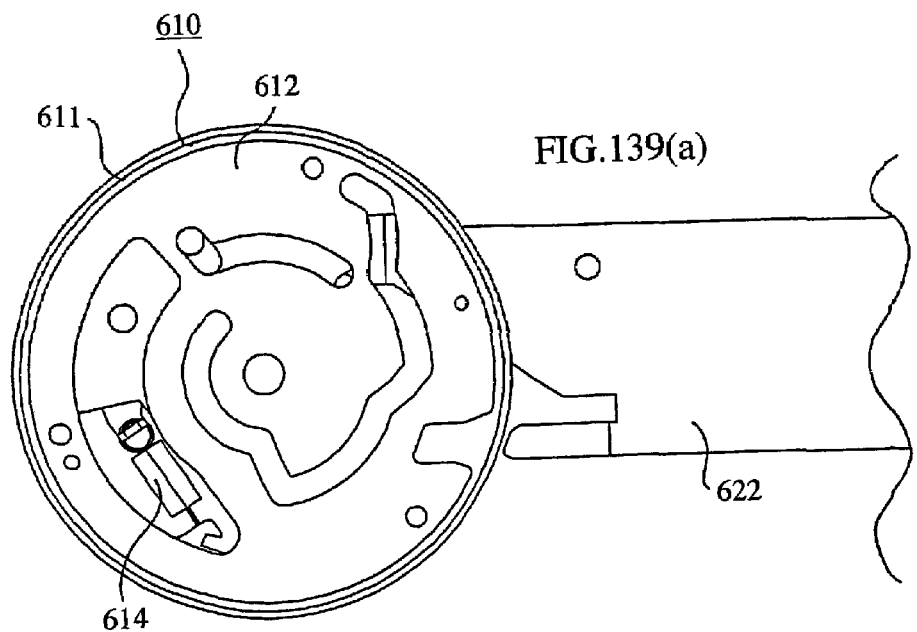
FIG.139(a)
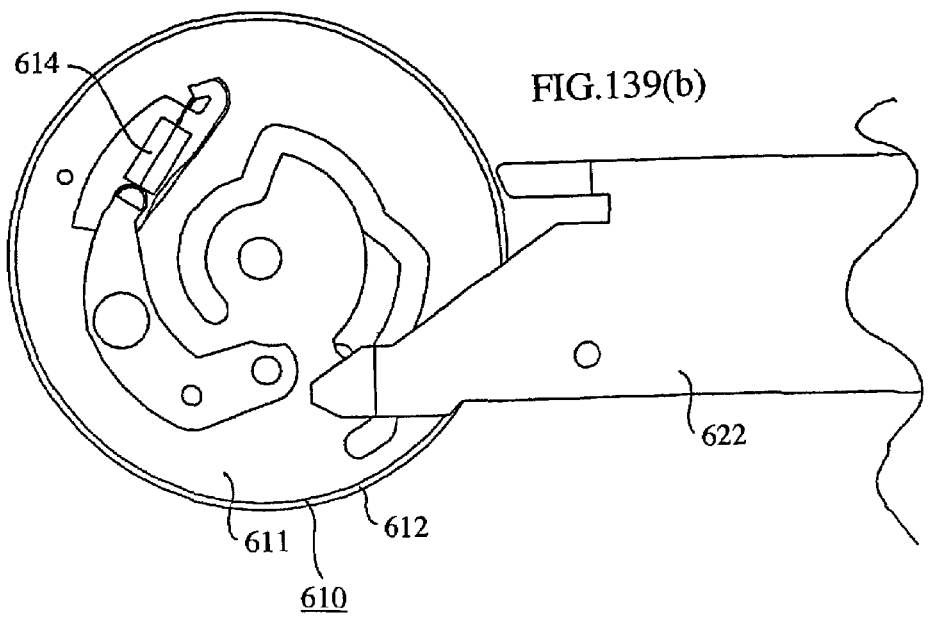
FIG.139(b)

FIG. 144
FIG.144(a)
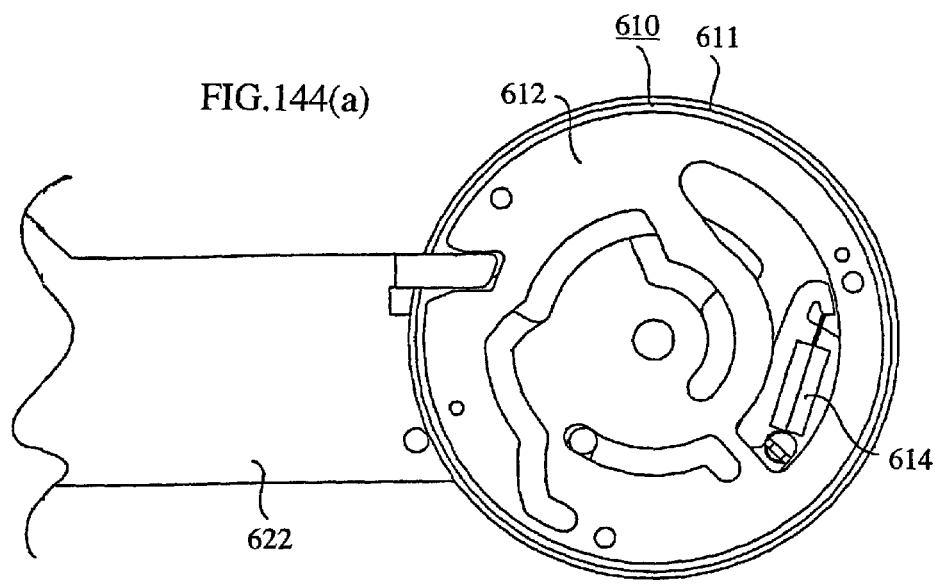
FIG.144(b)
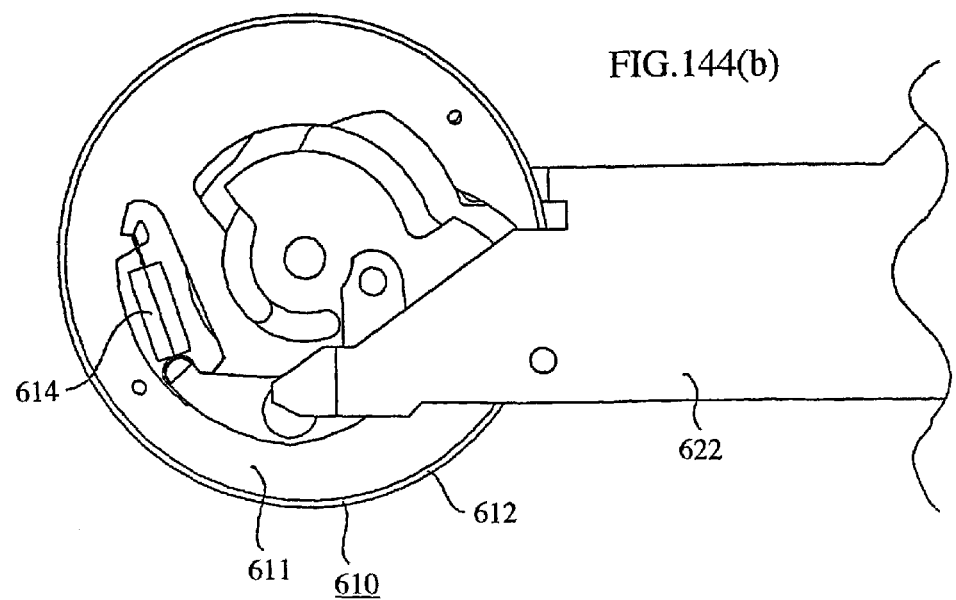

FIG.158

| | REPRESENTATIVE DIAGRAM | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| OPERATING MECHANISM | | 159 | 161 | 162 | 163 | 164 | 166 | 167 | 168 | 92 | 93 | 94 | 95 | 96 | 97 | 98 | 99 | 100 | 169 | 170 | 171 |
| 1 | DISK LOADING/UNLOADING MECHANISM (FIRST POSITION DELIMITING PORTION) | 4 | 3 | 8 | 9 | 9 | 9 | 9 | 9 | 13 | 13 | 13 | 13 | 13 | 13 | 13 | 13 | 13 | 13 | 13 | 13 |
| 2 | DISK LOADING/UNLOADING MECHANISM (SECOND POSITION DELIMITING PORTION AND LINK PORTION) | 15 | 19 | 19 | 20 | 21 | 21 | 21 | 21 | 22 23 28 29 | 26 | 26 | 26 | 26 | 26 | 26 | 26 | 26 | 26 | 26 | 26 |
| 3 | DISK LOADING/UNLOADING MECHANISM (THIRD POSITION DELIMITING PORTION) | 33 | 32 | 32 | 35 37 | 38 39 | 38 39 | 38 39 | 38 39 | 40 41 | 41 | 41 | 41 | 41 | 41 | 41 | 41 | 41 | 41 | 41 | 41 |
| 4 | ROLLER BASE MOVEMENT RESTRICTING MECHANISM | 43 | 43 | 43 | 43 | 43 | 43 | 45 | 45 | 46 | 46 | 46 | 46 | 46 | 46 | 46 | 46 | 46 | 46 | 46 | 46 |
| 5 | DISK HOLDING MECHANISM | 47,48 | 55 | 55 | 57 | 58 | 63 | | | | | | | | | | | | | | |
| | | | | | | | | | | | | | | | | | | | | | |
| 6 | DISK HOLDING MECHANISM (DISK DETECTING PORTION) | 75 | 73 | 73 | 79 | 79 | 79 | 59 61 | 59 61 | 59 61 | 59 61 | 59 61 | 66 | 66 | 66 | 67 | 67 | 67 | 68 | 67 | 63 |
| 7 | DISK HOLDING MECHANISM (AUXILIARY HOLDING PORTION) | 87 | 87 | 87 | 87 | 87 | 89 | 91 | 91 | 91 | 91 | 91 | 91 | 91 | 91 | 87 | 87 | 87 | 91 | 89 | 87 |
| 8 | DISK REPRODUCING MECHANISM (LOCKING MECHANISM) | 146 | 145 | 145 | 145 | 145 | 145 | 145 | 145 | 145 | 145 | 145 | 145 | 145 | 145 | 145 | 145 | 152 | 145 | 145 | 145 |
| 9 | OPERATION MODE SETTING MECHANISM IN DISK HOLDING MECHANISM (VERTICAL MOVEMENT) | 137 | 138 | 138 | 138 | 138 | 138 | 138 | 138 | 140 | 138 | 138 | 138 | 138 | 138 | 138 | 138 | 138 | 141 | 143 | 143 |
| 10 | OPERATION MODE SETTING MECHANISM IN DISK HOLDING MECHANISM (ROTATIONAL MOVEMENT) | 128 | 115 | 115 | 115 | 115 | 115 | 115 | 115 | 115 | 115 | 115 | 115 | 115 | 115 | 115 | 115 | 115 | 118 131 132 133 134 | 118 | 121 122 125 |
| 11 | DISK STORING MECHANISM | 113 | 130 | 130 | 130 | 130 | 130 | 130 | 130 | 130 | 130 | 130 | 130 | 130 | 130 | 130 | 130 | 130 | 130 | 135 | 135 |

FIG.165
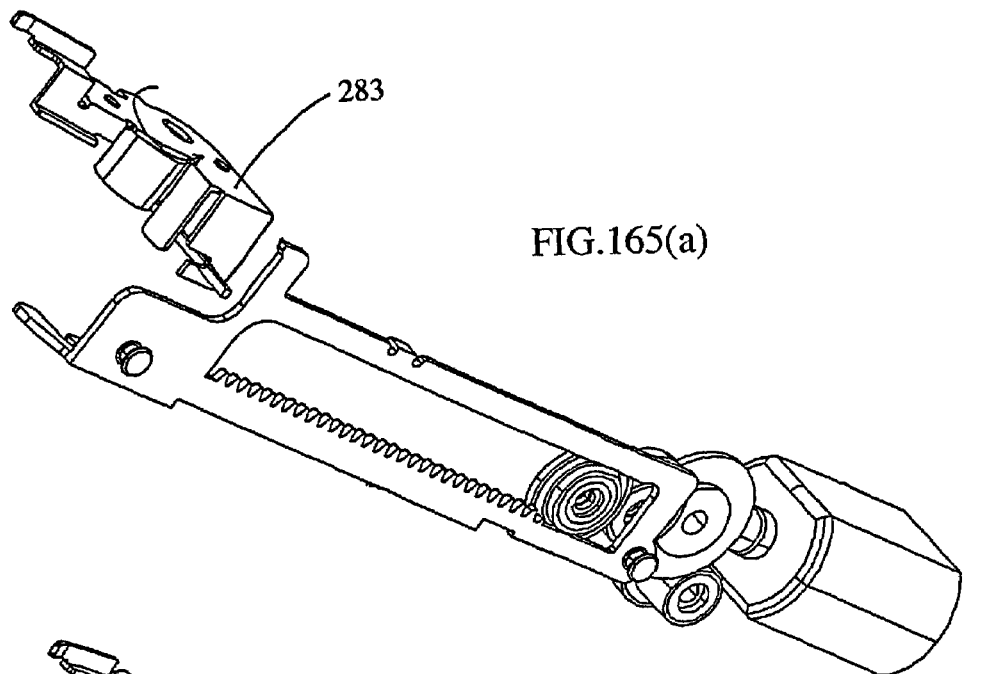
FIG.165(a)
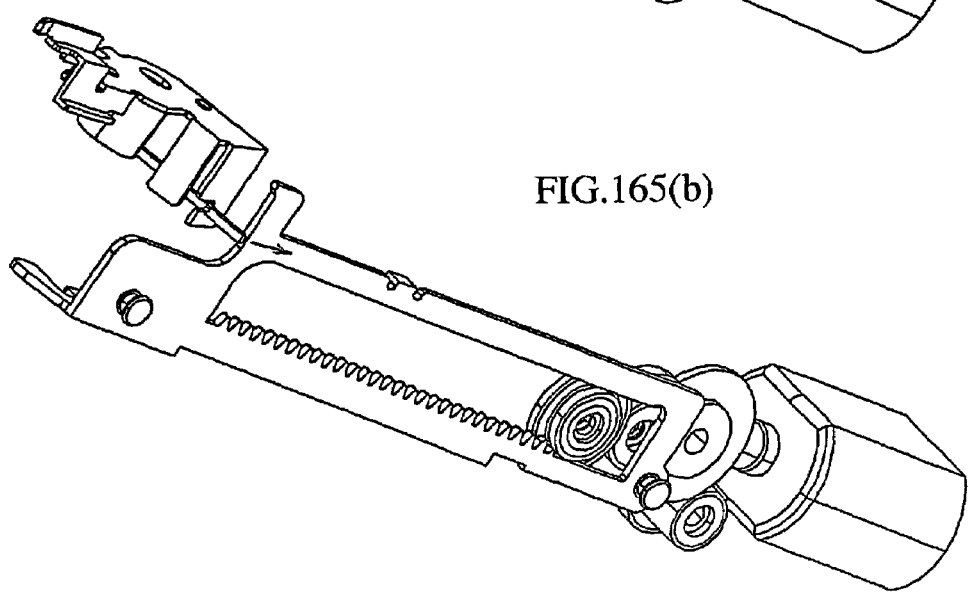
FIG.165(b)

DISK DEVICE HOLDING A PLURALITY OF DISKS AT ITS INNER DIAMETER

TECHNICAL FIELD

The present invention relates to a disk device and more particularly to a disk device which permits plurality of disks to be operated selectively without using a removable magazine.

BACKGROUND ART

FIG. 172 is a sectional side view of a conventional disk device which permits plurality of disks to be operated selectively and FIG. 173 is a sectional view of a principal portion thereof.

In FIGS. 172 and 173, the reference numeral 1 denotes a magazine in which disks for replacement are stored and 2 denotes a disk rotation driving section. The disk rotation driving section 2 is made up of a disk rotating motor 3, a disk clamping hub 13 mounted on a shaft of the motor 3, a disk clamper 4, a disk roller 6 for sending out a disk 8 delivered by an actuating lever 5 to the disk rotation driving section 2, the actuating lever 5 being mounted within the magazine 1 and driven by a driving means (not shown), a drive shaft 9 fixed to a housing 7 which supports the disk rotation driving section 2, a swash plate cam 10 which is operated in the directions of A in FIG. 172 by the driving means, and upper and lower guide plates 11.

In this conventional disk device, when calling any one of plurality of disks stored in the magazine 1, the drive shaft 9, the swash plate cam 10, and the upper and lower guide plates 11 are interlocked with one another, causing the disk rotation driving section 2 to move in an arrow B direction and allowing it to be located at a desired disk position within the magazine 1.

In such a conventional disk device, the disks stored in the magazine 1 and the disk rotating on the disk rotation driving section 2 are completely independent of each other in a plane area, thus it gives a rise to the problem that the length, i.e., size D, of the disk device increases.

In order to solve the aforementioned problem, there has been proposed, for example, such a disk device as is disclosed in Japanese Laid Open Patent Sho 63-200354 (1988). FIGS. 174 and 175 are sectional side views of a principal portion of this disk device and FIG. 176 is a sectional top view thereof.

In FIGS. 174, 175, and 176, reference numeral 19 denotes a magazine in which disks for replacement are stored, 21 denotes a disk rotating motor, 22 denotes a disk clamping hub mounted on a shaft of the motor 21, and 23 denotes a disk clamper.

Reference numeral 26 denotes a disk roller for sending out a disk 25 delivered by an actuating lever 24 to a disk rotation driving section, the actuating lever 24 being driven by driving means (not shown), and 27 denotes a driven roller opposed to the disk roller 26.

Indicated at 32 are a pair of swash plate cams adapted to engage a plurality of trays 31 accommodated within the magazine 19 and operate on the disk rotation driving section 20 so as to create a gap E during planar movement of the disk, the gap E being at least not smaller than the disk thickness and formed in a rotational axis direction of the disk 25 selected by a magazine moving means (not shown).

The disk rotation driving section 20 is made up of a disk rotating motor 21, a disk clamping hub 22, a disk clamper 23, an actuating lever 24, a disk 25, a disk roller 26, a driven roller 27, and the swash plate cam 32.

The operation of this disk device will be described below.

When calling any of plurality of disks 25 stored in the magazine 19, the magazine is moved in an arrow F direction in FIG. 174 by driving means and a desired disk position is established within the magazine.

Then, the actuating lever 24 in the magazine 19 operates, the disk 25 slides on a disk guide portion 35 formed within the magazine, and a front end of the disk 25 comes into engagement between the disk roller 26 and the driven roller 27 in the disk rotation driving section 20. Then, with rotational movement of the disk roller 26, the disk 25 is conveyed to the position of the disk clamper 23 and the disk clamping hub 22 mounted on the shaft of the disk rotating motor 21. Subsequently, the position where the disk 25 is to be clamped is confirmed by a disk detecting means (not shown), and the disk clamper, as well as the disk roller 26 and the driven roller 27, are moved toward the disk clamping hub 22 by driving means, whereby the disk 25 is clamped.

Simultaneously with the movement of the driven roller 27 toward the disk clamping hub 22, the pair of swash plate cams 32 provided in the disk rotation driving section 20 are moved to the magazine 19 side by driving means, causing trays 31 to tilt so that an appropriate gap E is formed as shown in FIG. 175.

A disk device (in-dash type disk device) provided in the interior thereof with a disk storing mechanism is proposed, for example, in Japanese Laid Open Patent Hei 10-208361 (1998). FIG. 177 is an entire structure diagram of this proposed disk device and FIG. 178 is a structure diagram showing the structure of an internal principal portion of the disk device.

In FIG. 177, reference numeral 1 denotes a front panel, which is attached to a bottom plate 2. On a front side of the front panel 1 are provided various operating units 3–6 and a display unit 7.

Reference numeral 8 denotes an outer case which covers a disk changer, 9 denotes an insulator provided on the bottom plate 2, 10 denotes a main tray projected from an opening 1a of the front panel 1, and 11 denotes a sub-tray capable of sliding in the direction of arrow P or Q while being guided by the main tray 10. Onto the sub-tray 11 is fed a disk 12 after replacement.

FIG. 178 shows a principal portion in the interior of the disk device. According to the structure illustrated in the same figure, a group of spacers supported by a disk holding means are driven by a vertical driving means, an arbitrary disk is selected out of a group of disks and is conveyed up to a recording/reproducing position by a horizontal conveyance means. Further, with a rise reset means, the disk is prevented from coming off from a spacer on both spindles. Likewise, with a disk pressing means, the disk is prevented from coming off from the spacer, and with a spacer anti-dislodgment means, the dislodgment of the spacer from a lower spindle is prevented.

In the conventional disk devices which are not the in-dash type, it is necessary to use a magazine case and hence it is impossible to load and unload disks selectively one by one; besides, an increase in size of the disk device results. Moreover, since a portable magazine case is used, it is technically difficult to disassemble each disk storing rack within the disk device, so when forming a gap between a disk to be reproduced and a disk opposed thereto and when the gap is to be made large because it is only one end that can be opened, there arises the necessity of forming a space within the disk device correspondingly to the size of gap, thus leading to an increase in size of the disk device.

Further, since a portable magazine case is used, it is extremely difficult to separate the disk storing racks from one another with each disk storing rack inclined within the disk device.

In the conventional in-dash type disk device, when a disk is to be held within the disk device, the disk is conveyed and held with only the rotational movement force of a roller serving as a disk conveying means until the disk reaches a disk holding section through a disk inlet. With this configuration, the disk is apt to become unstable during the conveyance thereof, and at the worst the disk comes into abutment against a component within the disk device and then it is damaged.

In the conventional in-dash type disk device, when a disk is to be supported, that is, when a spacer for supporting a disk is to be fixed, for example at the time of replacing a disk stored within the disk device or at the time of reproducing a disk, shaft portions provided at upper and lower positions of the disk device are coupled together, thereafter, pawl portions formed on an outer periphery of a disk holding means adapted to slide within the shaft portions are fixedly projected from holes formed in the shaft portions at predetermined positions. According to this structure, each time a disk is to be stowed or replaced and reproduced it is necessary to let the pawl portions project from the shaft portions or perform a stowing operation, thus it gives a rise to problem that much time is required for the operation.

Further, in the conventional type disk device, although spacers are disposed so that each is positioned between adjacent disks, they are not for holding disks, so disks become unstable, and when vibration or the like is imposed on the disk device, a disk tilts and comes into abutment against another disk, resulting in damage of the disk.

Additionally, for judging the contents of disk operation in the conventional disk device, it is necessary to provide a complicated switch mechanism, so that the assembling performance is deteriorated and the number of components of a link mechanism, etc. increases, thus leading to an increase of cost.

In view of the foregoing, the present invention has been made and it is an object of the invention to provide a disk device structured such that a plurality of disks are stored without using a removable magazine and each operated independently, that is, each disk is loaded and unloaded selectively or performs operation such as a reproducing operation, to thereby attain a reduction in size.

It is another object of the present invention to provide a disk device structured such that a disk storing position and a disk reproducing position are established at one and the same rotary shaft with respect to the direction of loading and unloading a disk, to thereby attain the saving of space.

It is a further object of the present invention to provide a disk device wherein at the time of loading or unloading a disk, a part of the disk is supported by a plurality of support portions, thereby making it possible to prevent damage of the disk.

It is a still further object of the present invention to provide a disk device capable of shortening the operation time by performing a plurality of operations at a time.

It is a still further object of the present invention to provide a disk device improved in vibration resistance and so suitable for a moving body apt to undergo vibrations, especially an automobile.

It is a still further object of the present invention to provide a less expensive disk device sharing components.

Further, by making it possible to set a plurality of operation modes in an existing structure, there can be attained multiple functions while reducing the number of components.

DISCLOSURE OF THE INVENTION

The disk device according to the present invention a disk device capable of storing a plurality of disks therein and it is characterized by including: a disk storing mechanism to store the plurality of disks loosely fitted and supported at its inner diameter; a disk holding means capable of changing its vertical position to hold outer peripheral portion of the disk located on the axis of the disk storing mechanism; an operation setting means to actuate the disk holding means according to an operation mode of the disk; an operation mode switching means to switch the operation mode of the operation setting means based on contents of disk operation. By these structure because it is possible to set a plurality of operation modes in a structure with existing components, a number of components and manufacturing cost for the device can be reduced.

Further the operation setting means is characterized to make the disk holding means keeping in a normal height to hold the disk and performs an operation stowing the disk holding means in a first operation mode, and to make the disk holding means keeping in a higher height the normal height to hold the disk and performs an operation stowing the disk holding means in a second operation mode. By these structure because the operation mode of disk holding means can be reduced when a disk is stored or the contained disks are changed, the working time can be shortened.

Moreover, the operation mode switching means is characterized to switch the operation mode set by the operation setting means from the first operation mode to the second operation mode when the operation setting means continues to set the first operation mode and the disk storing mechanism performs a stowing operation for a disk or performs a changing operation of a stowed disk. By this structure the structure of disk device can be simplified because the operation mode can be easily changed in predetermined operation modes.

BRIEF DESCRIPTION OF THE DRAWINGS

FIG. 107 is an operating state transition diagram explaining an operating state of the disk device shown in FIG. 101.

FIG. 110 is an operating state transition diagram explaining an operating state of a principal portion of the disk device shown in FIG. 1.

FIG. 111 is an operating state transition diagram explaining an operating state of the disk device shown in FIG. 110.

FIG. 112 is a detailed diagram of a principal portion of the disk device shown in FIG. 110.

FIG. 114 is an explanatory diagram of a principal portion of the disk device shown in FIG. 113.

FIG. 120 is a detailed diagram of a principal portion of the disk device shown in FIG. 118.

FIG. 121 is an operating state transition diagram explaining an operating state of the disk device shown in FIG. 117.

FIG. 122 is an operating state transition diagram explaining an operating state of the disk device shown in FIG. 117.

FIG. 123 is a detailed diagram of a principal portion of the disk device shown in FIG. 122.

FIG. 124 is a detailed diagram of a principal portion of the disk device shown in FIG. 122.

FIG. 125 is an operating state transition diagram explaining an operating state of the disk device shown in FIG. 117.

FIG. 126 is a detailed diagram of a principal portion of the disk device shown in FIG. 125.

FIG. 127 is a detailed diagram of a principal portion of the disk device shown in FIG. 125.

FIG. 128 is a detailed diagram of a principal portion of the disk device shown in FIG. 125.

FIG. 129 is a structure diagram of a principal portion of the disk device shown in FIG. 1.

FIG. 130 is an operating state transition diagram explaining an operating state of the disk device shown in FIG. 129.

FIG. 131 is an operating state transition diagram explaining an operating state of the disk device shown in FIG. 129.

FIG. 132 is an operating state transition diagram explaining an operating state of the disk device shown in FIG. 129.

Figure 133A:
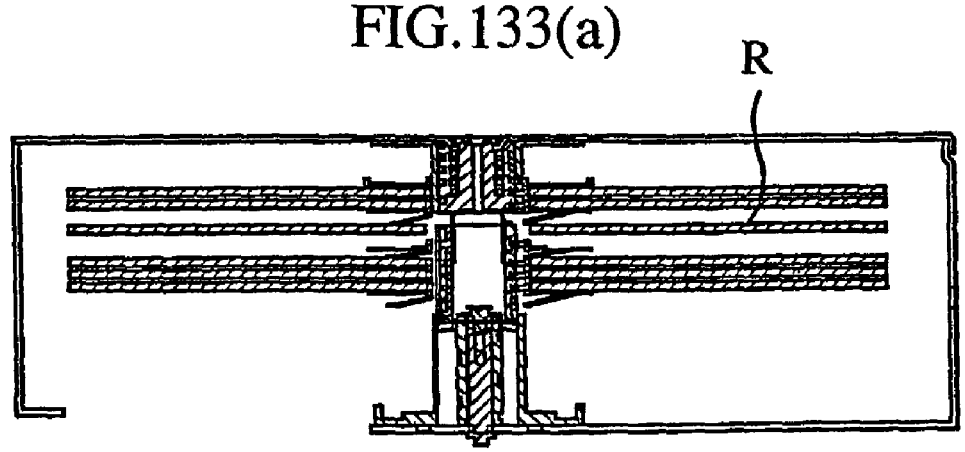
Figure 133B:
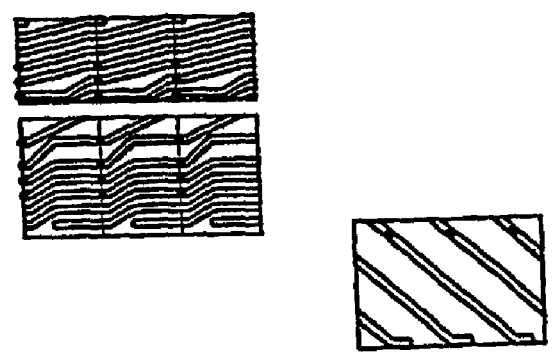

FIG. 133 is an operating state transition diagram explaining an operating state of the disk device shown in FIG. 129.

FIG. 134 is an operating state transition diagram explaining an operating state of the disk device shown in FIG. 129.

FIG. 135 is an operating state transition diagram explaining an operating state of the disk device shown in FIG. 129.

Figure 1:
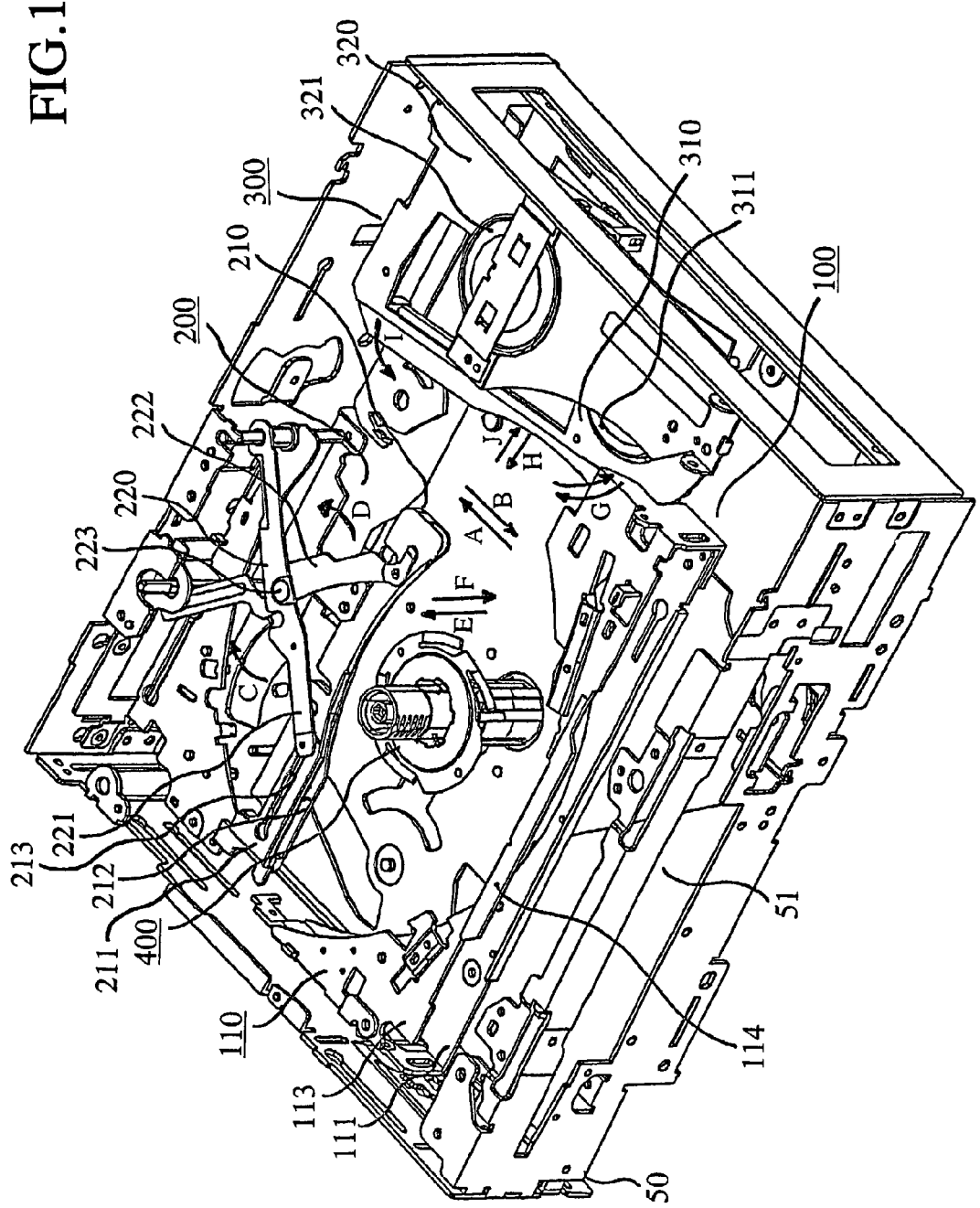
FIG. 1 is an entire structure diagram showing a schematic structure of the whole of a disk device according to a first embodiment of the present invention.
Figure 136:
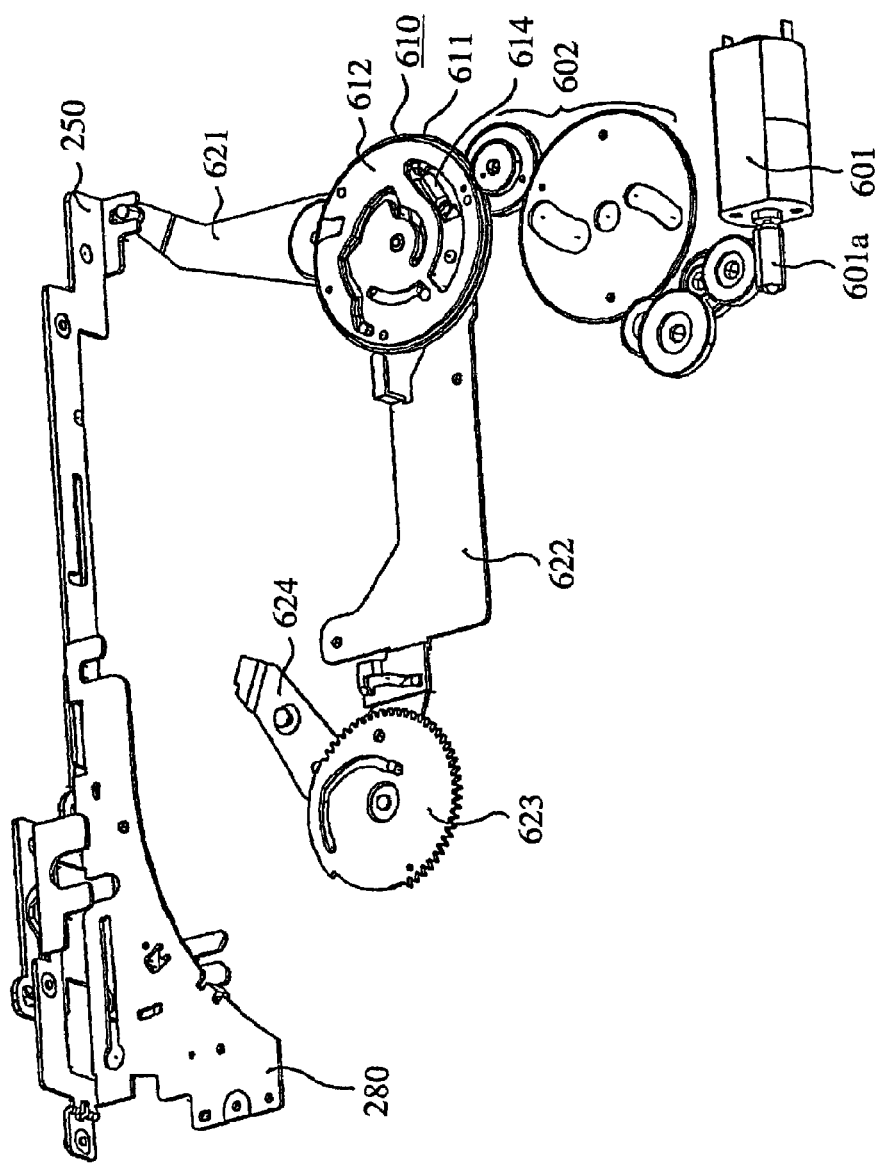

FIG. 136 is a structure diagram of a principal portion of the disk device shown in FIG. 1.

Figure 137:
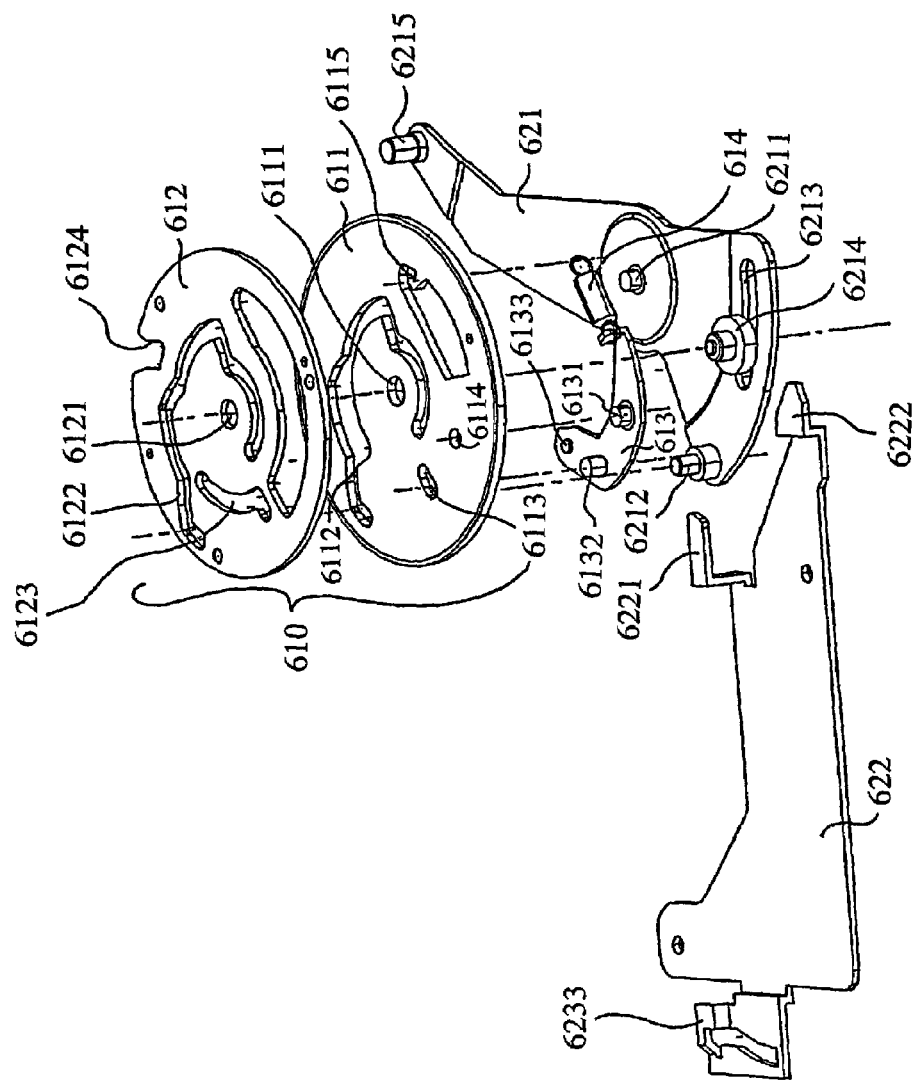

FIG. 137 is an explanatory diagram of a principal portion of the disk device shown in FIG. 136.

FIG. 138 is an explanatory diagram of a principal portion of the disk device shown in FIG. 136.

FIG. 139 is an explanatory diagram of a principal portion of the disk device shown in FIG. 136.

Figure 140:
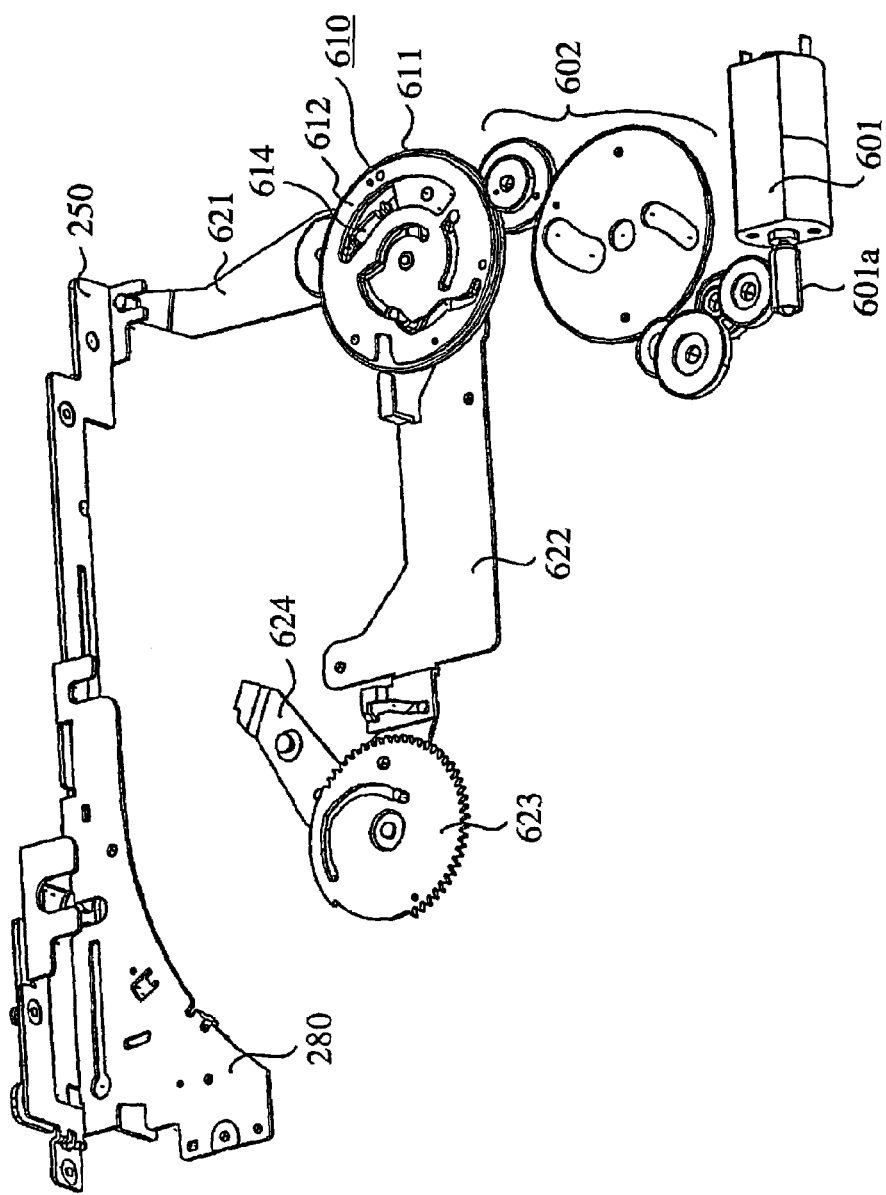

FIG. 140 is an operating state transition diagram explaining an operating state of the disk device shown in FIG. 136.

Figure 141:
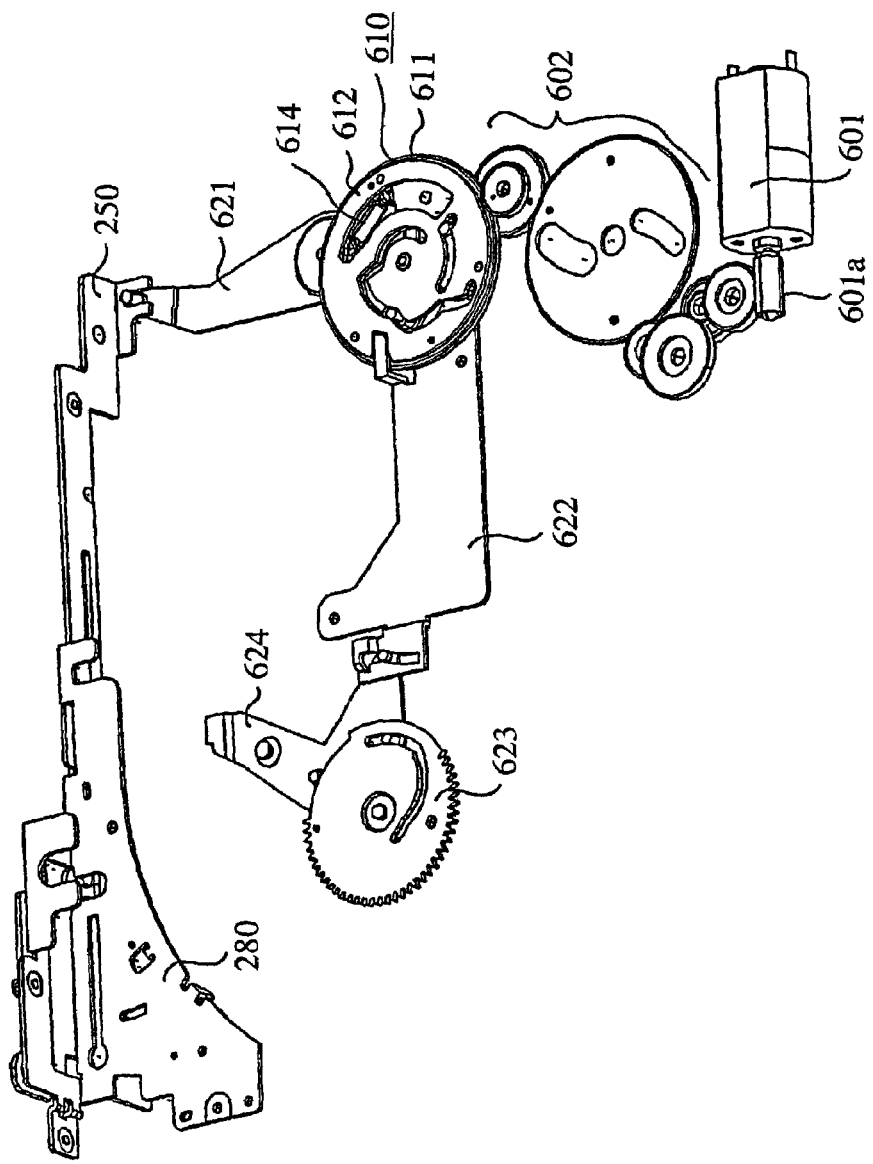

FIG. 141 is an operating state transition diagram explaining an operating state of the disk device shown in FIG. 136.

Figure 142:
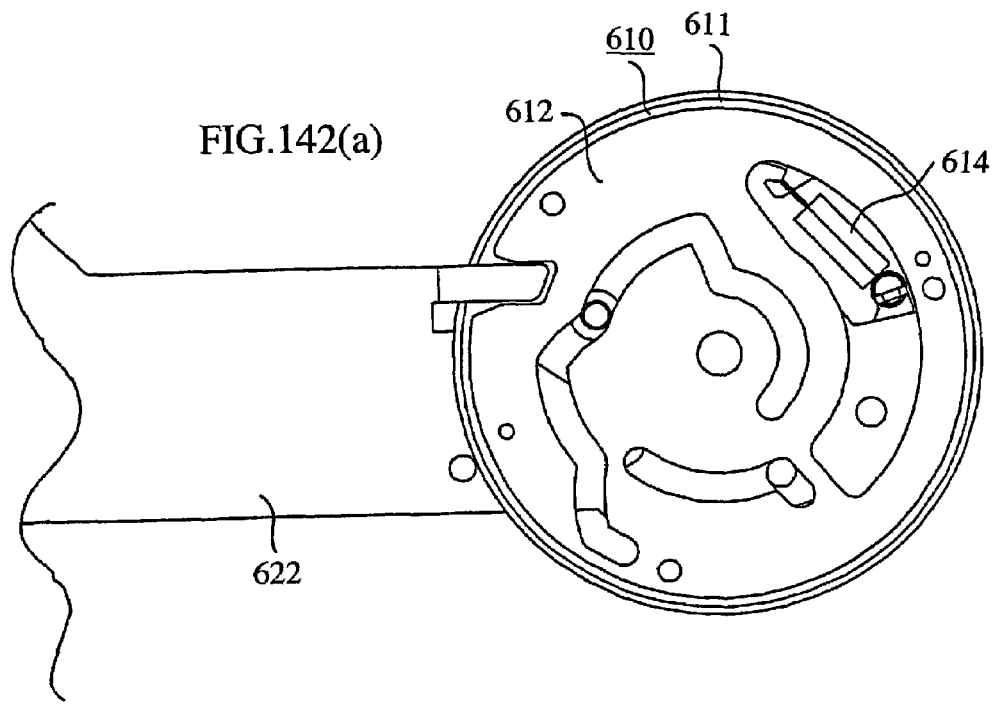

FIG. 142 is an explanatory diagram of a principal portion of the disk device shown in FIG. 141.

Figure 143:
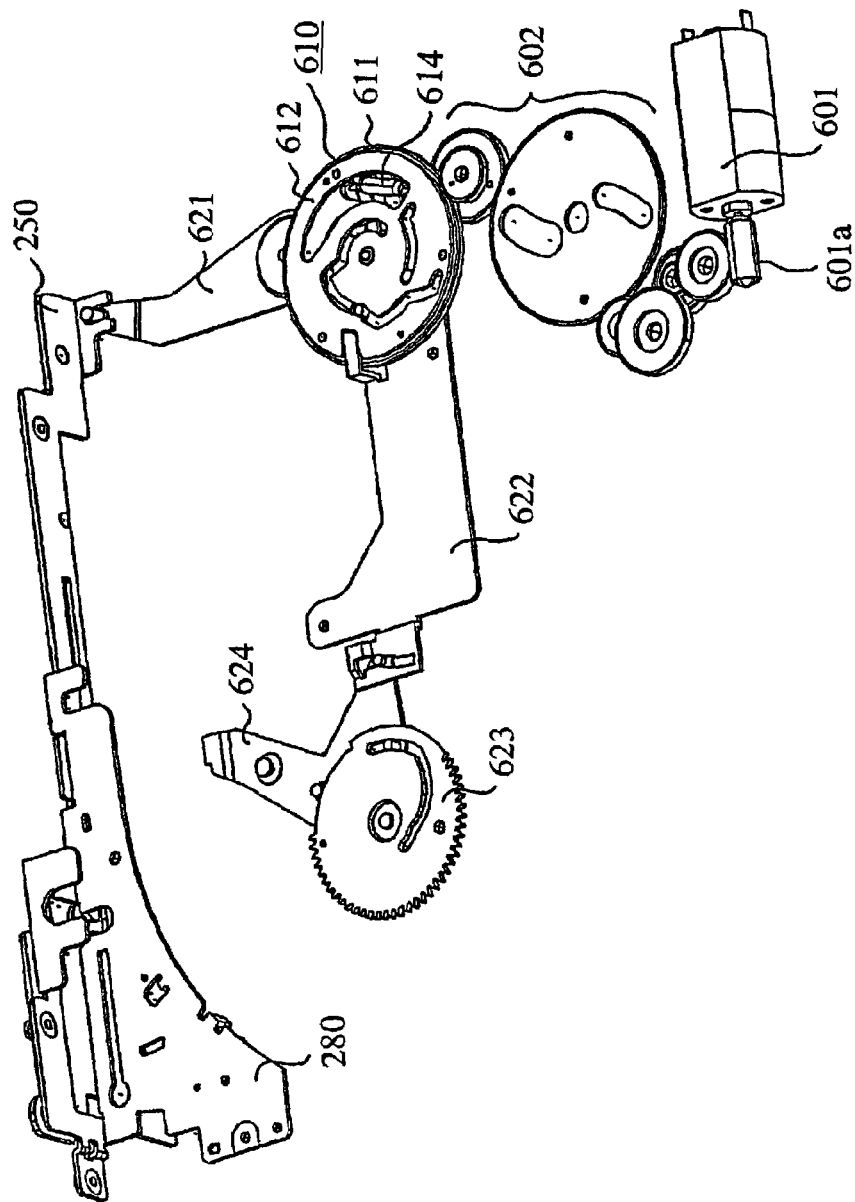

FIG. 143 is an operating state transition diagram explaining an operating state of the disk device shown in FIG. 136.

FIG. 144 is an explanatory diagram of a principal portion of the disk device shown in FIG. 143.

Figure 145:
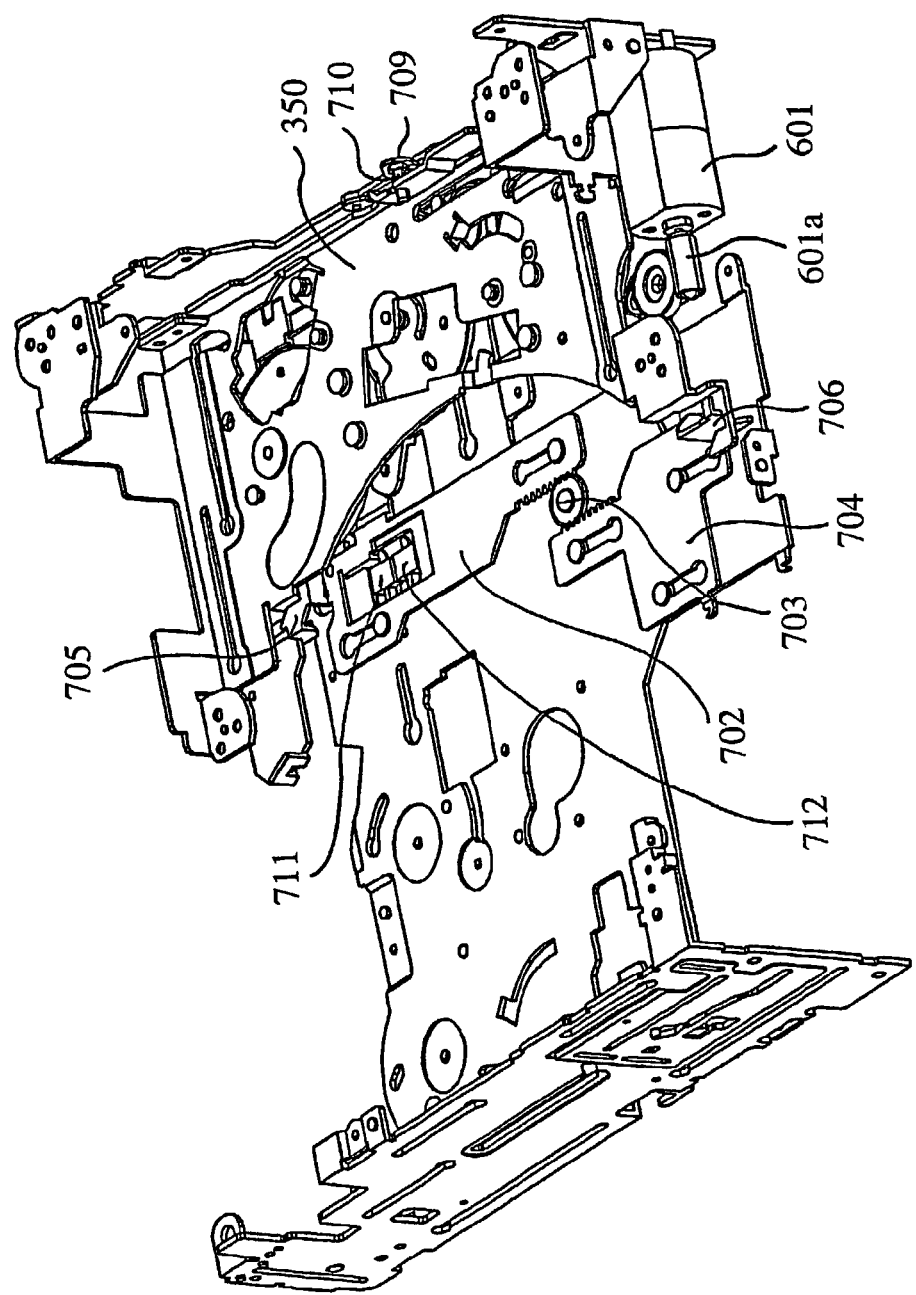

FIG. 145 is a structure diagram of a principal portion of the disk device shown in FIG. 1.

Figure 146:
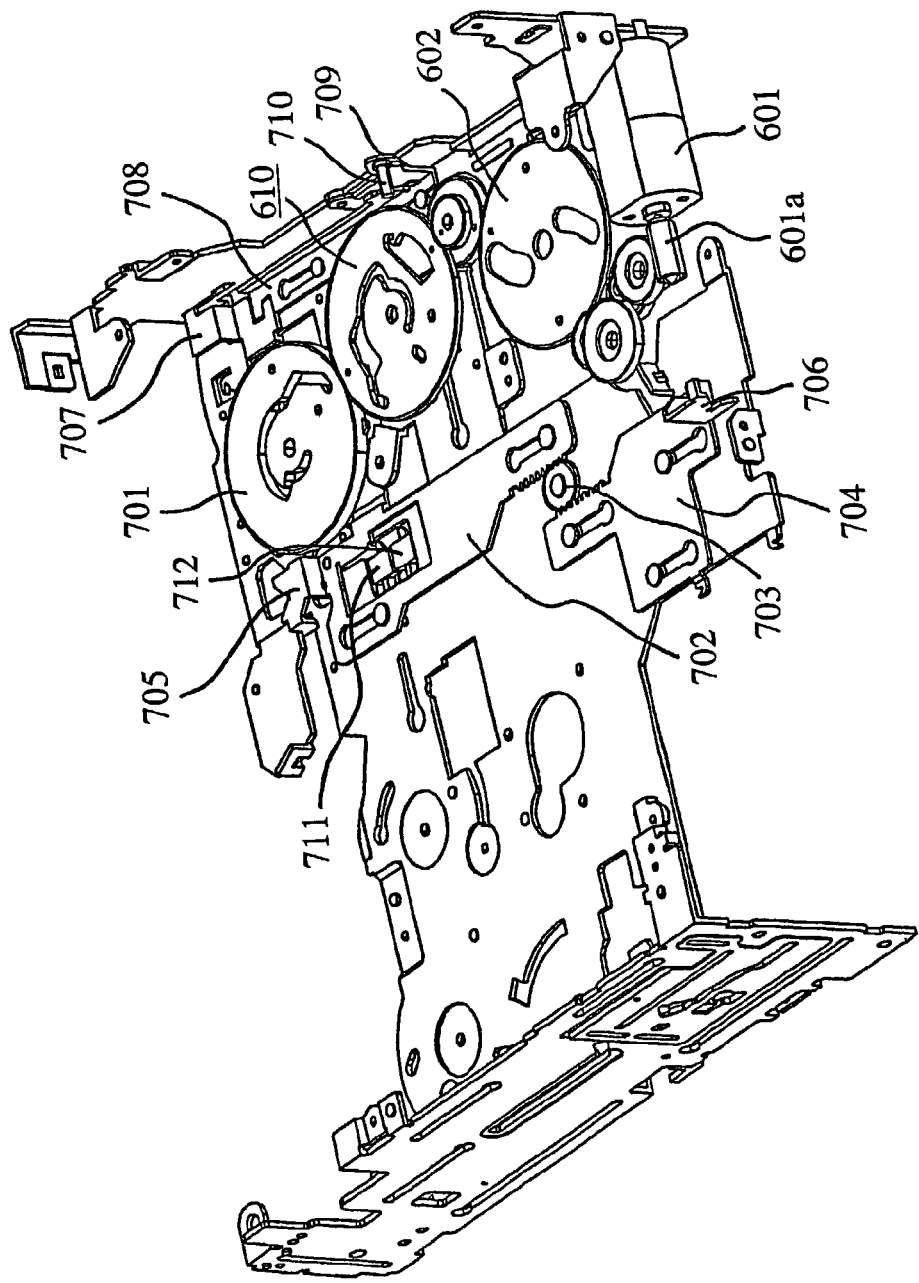

FIG. 146 is an operating state transition diagram explaining an operating state of the disk device shown in FIG. 145.

Figure 147:
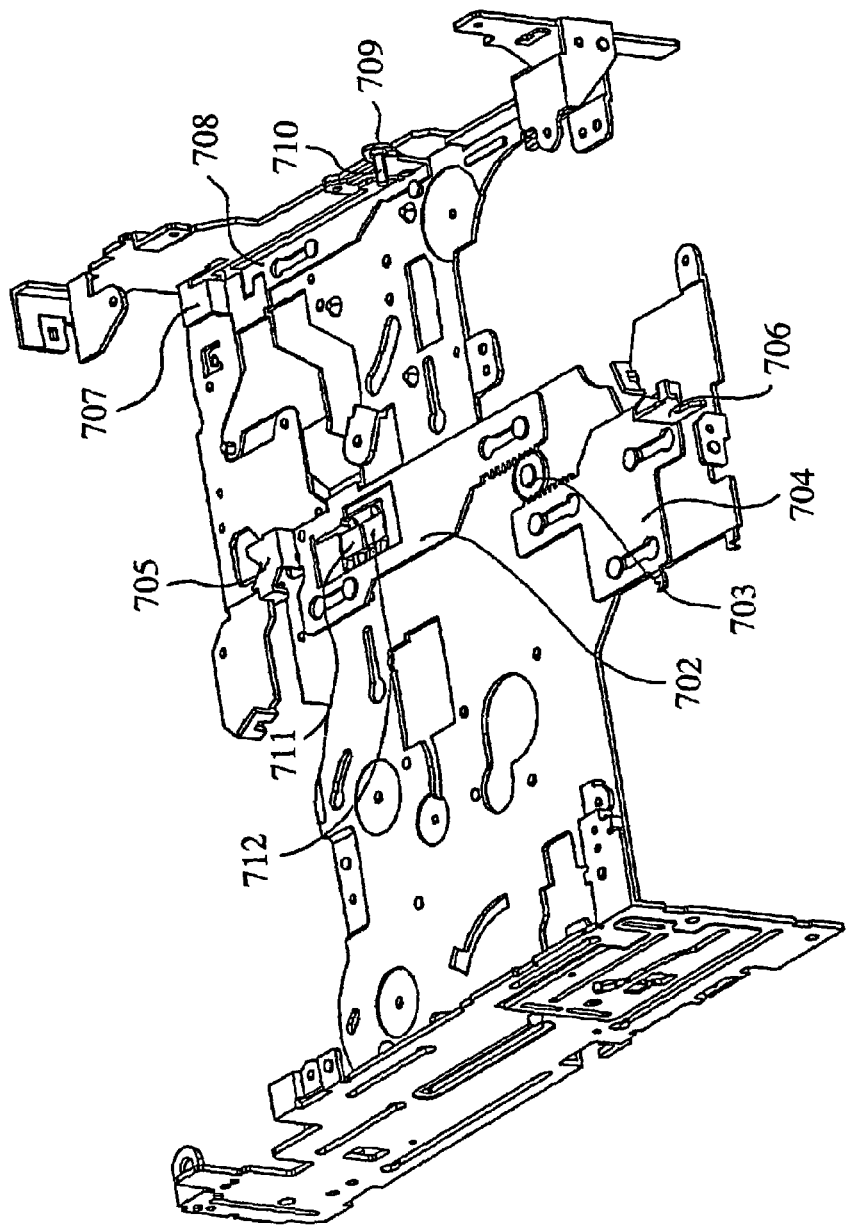

FIG. 147 is an operating state transition diagram explaining an operating state of the disk device shown in FIG. 145.

Figure 148:
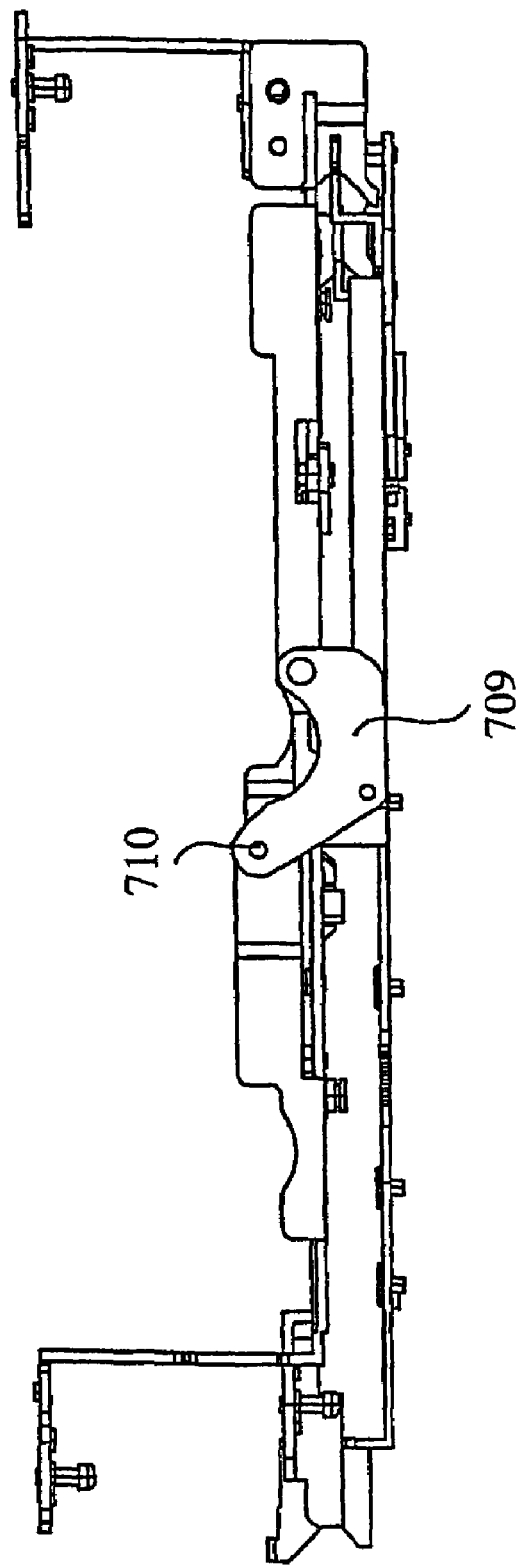

FIG. 148 is a detailed diagram of a principal portion of the disk device shown in FIG. 145.

Figure 149:
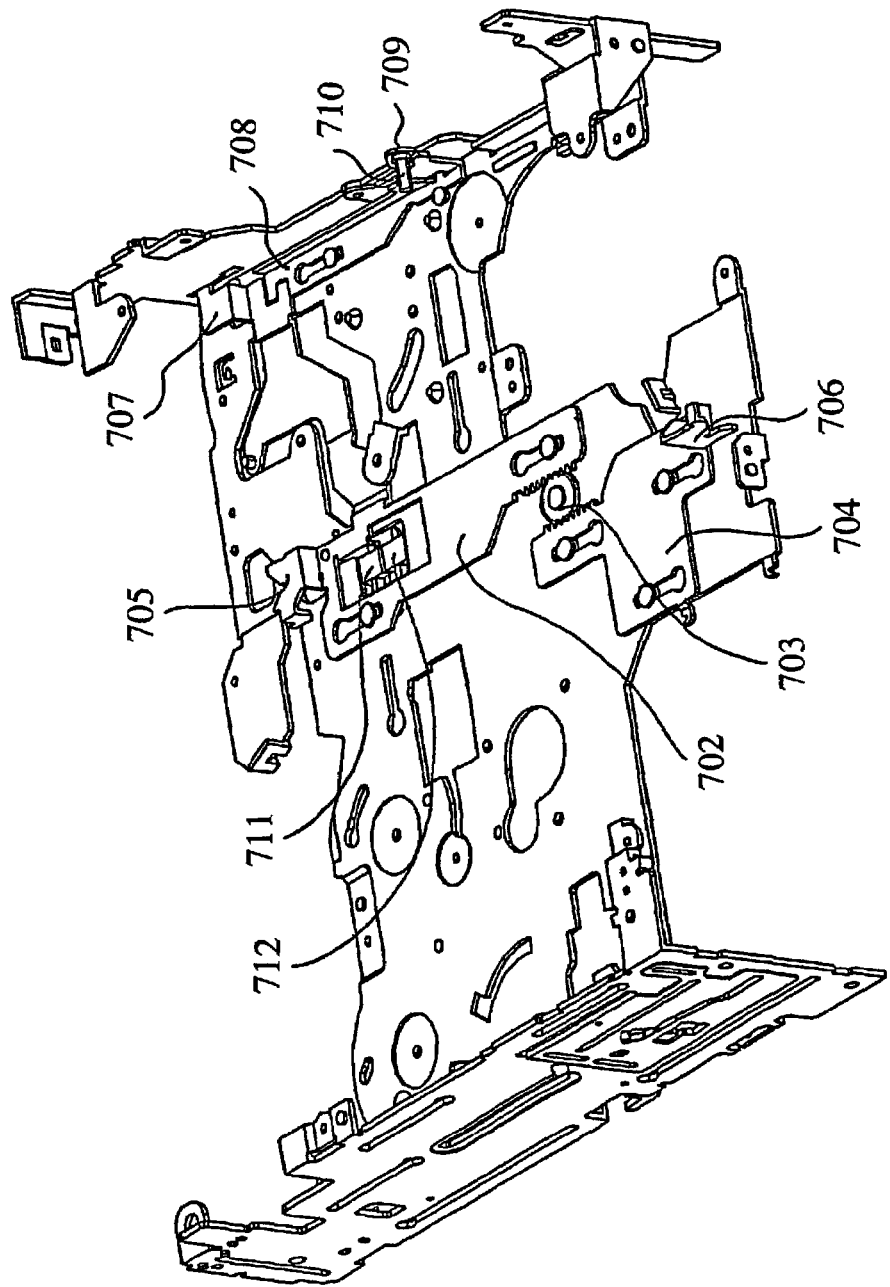

FIG. 149 is an operating state transition diagram explaining an operating state of the disk device shown in FIG. 145.

Figure 150:
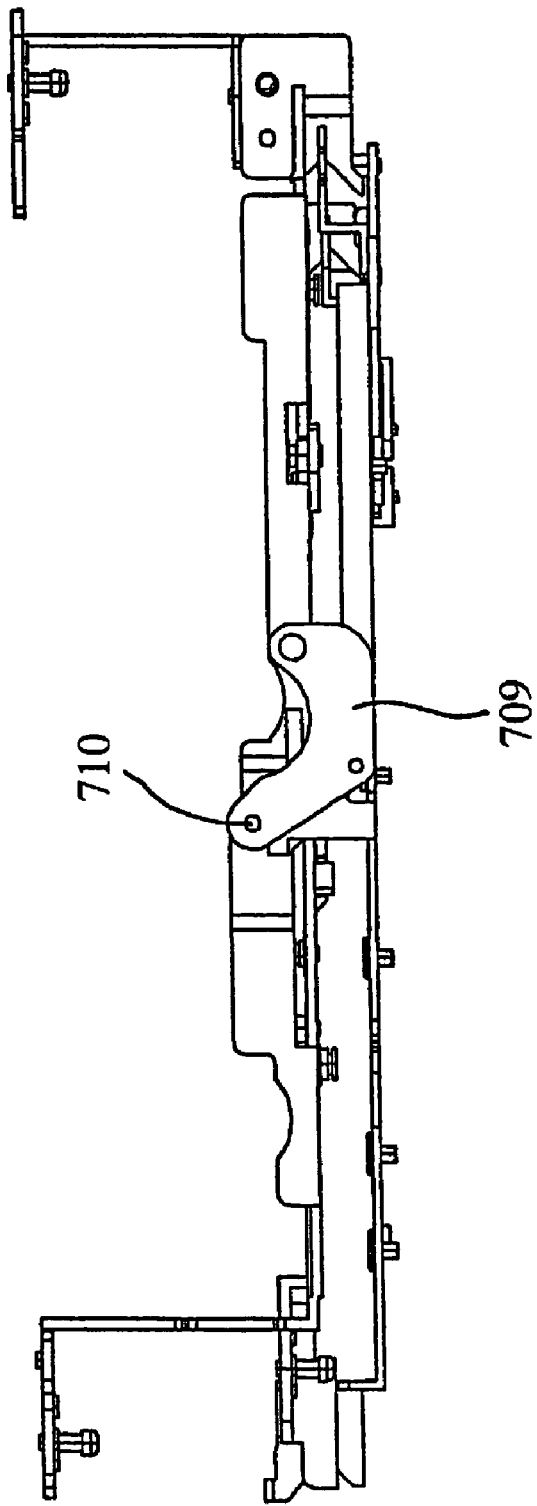

FIG. 150 is a detailed diagram of a principal portion of the disk device shown in FIG. 149.

Figure 151:
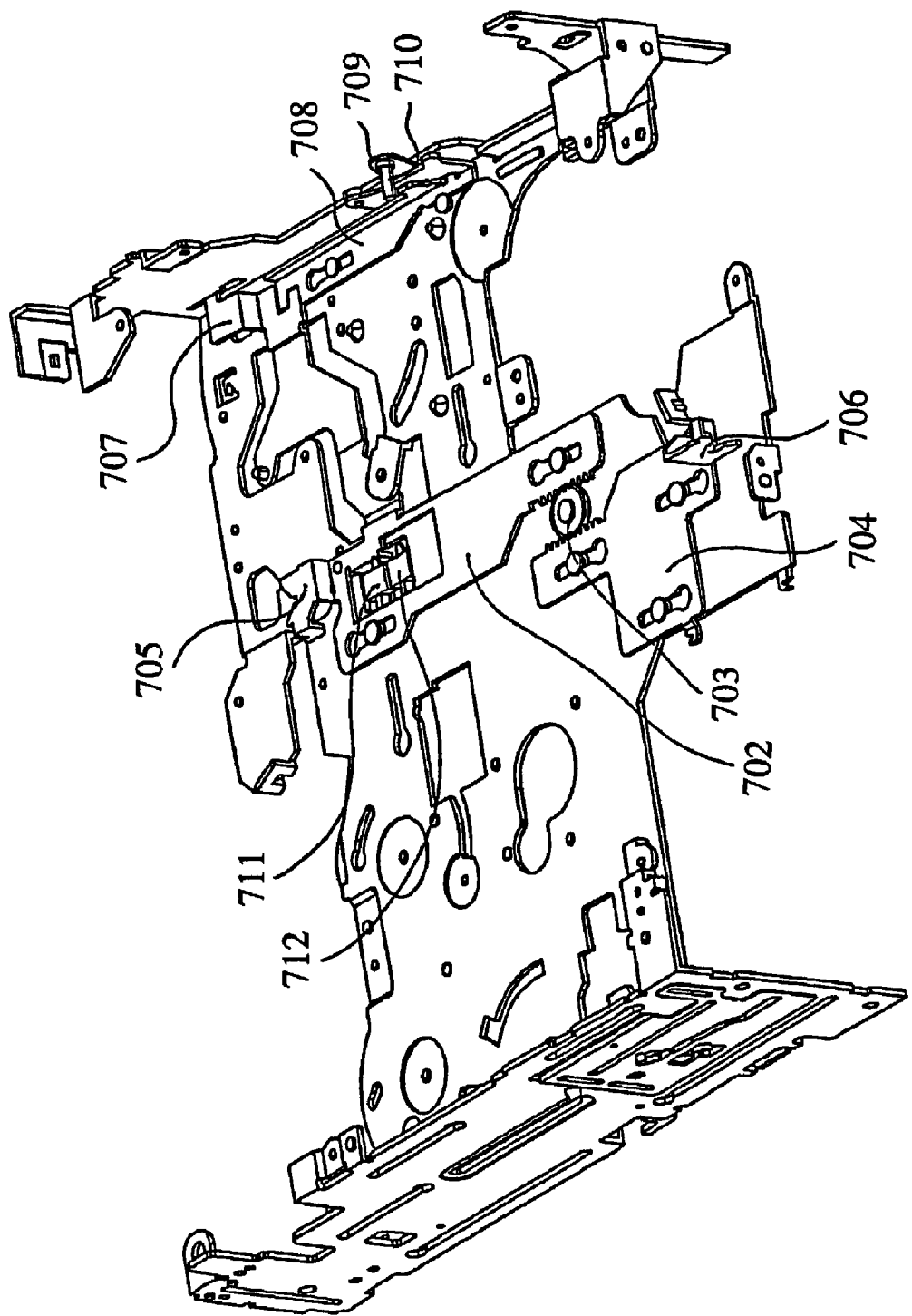

FIG. 151 is an operating state transition diagram explaining an operating state of the disk device shown in FIG. 145.

Figure 152:
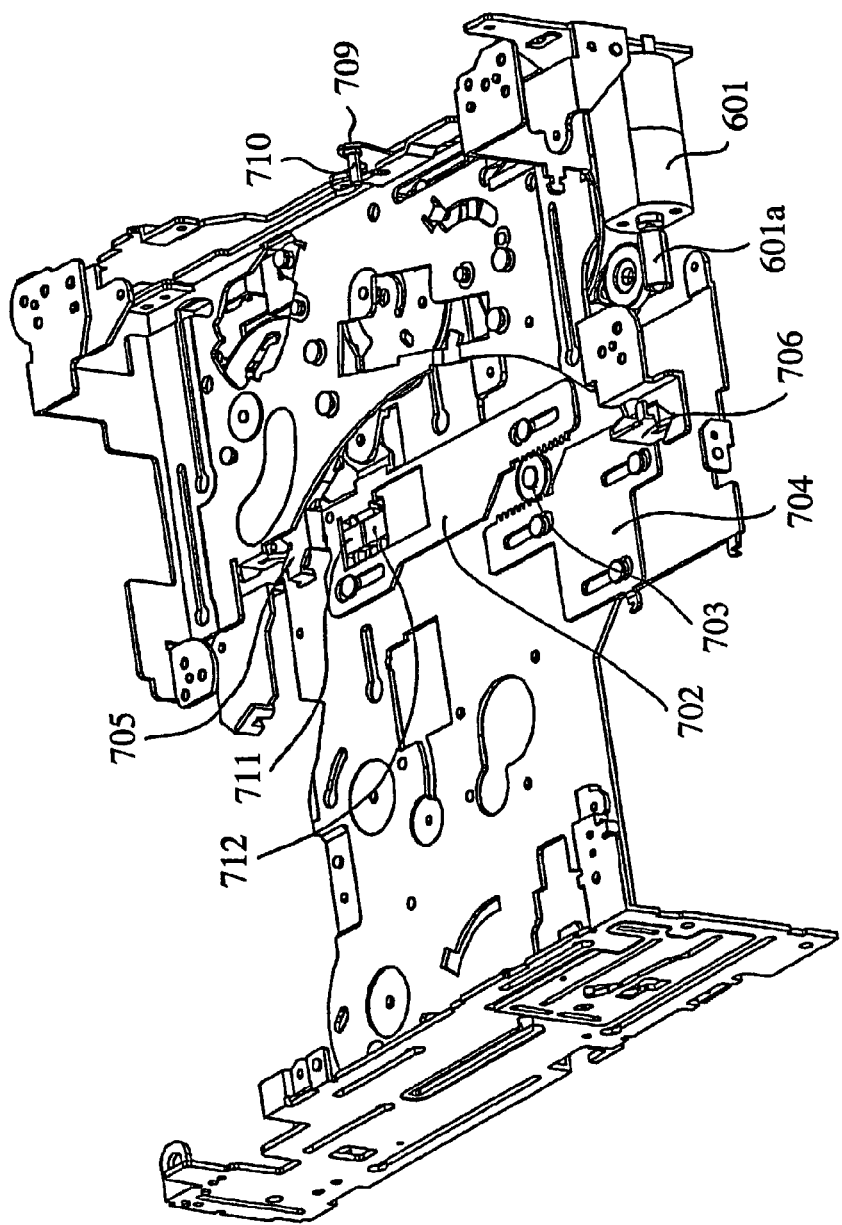

FIG. 152 is an operating state transition diagram explaining an operating state of the disk device shown in FIG. 145.

Figure 153:
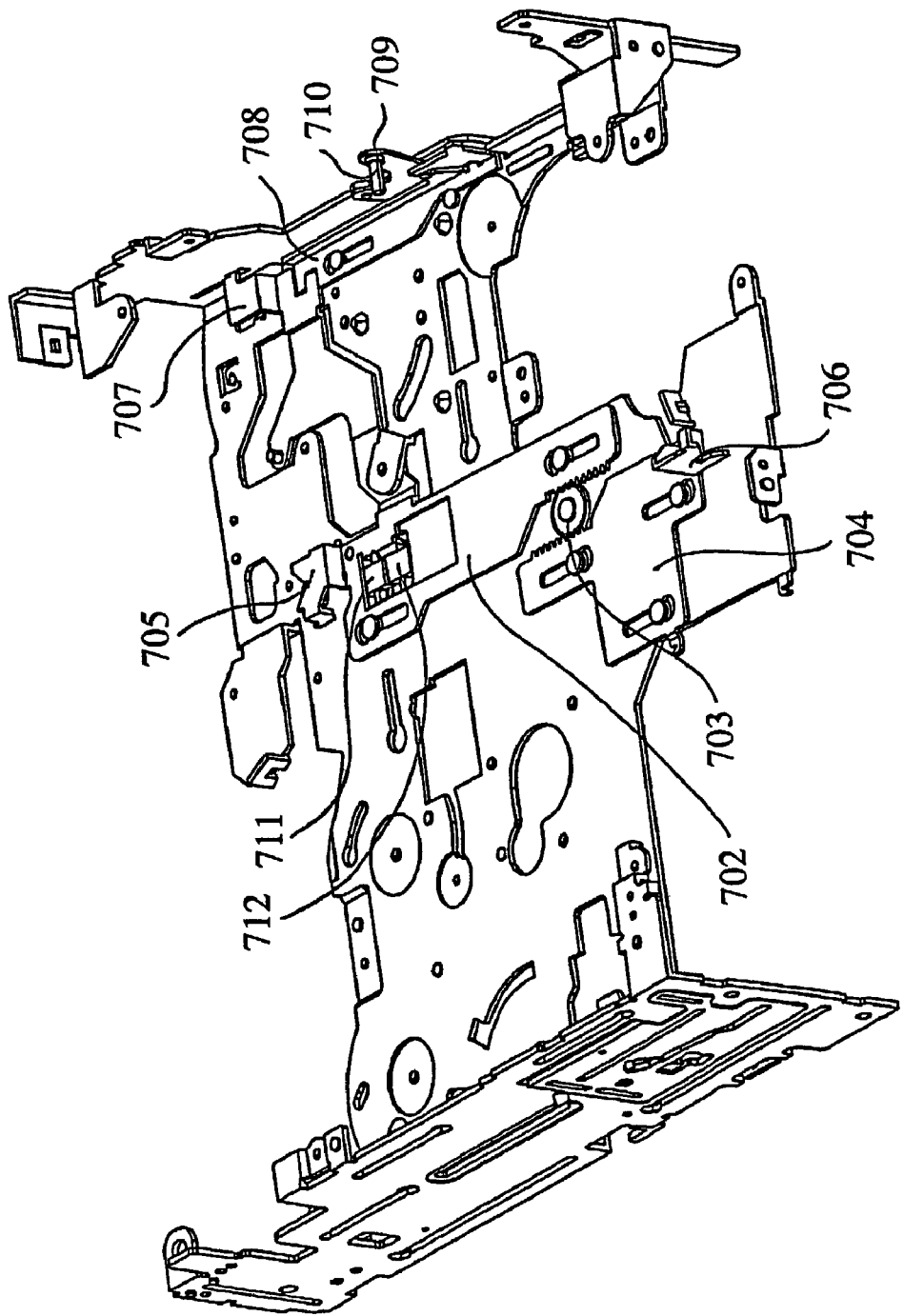

FIG. 153 is an operating state transition diagram explaining an operating state of the disk device shown in FIG. 145.

Figure 154:
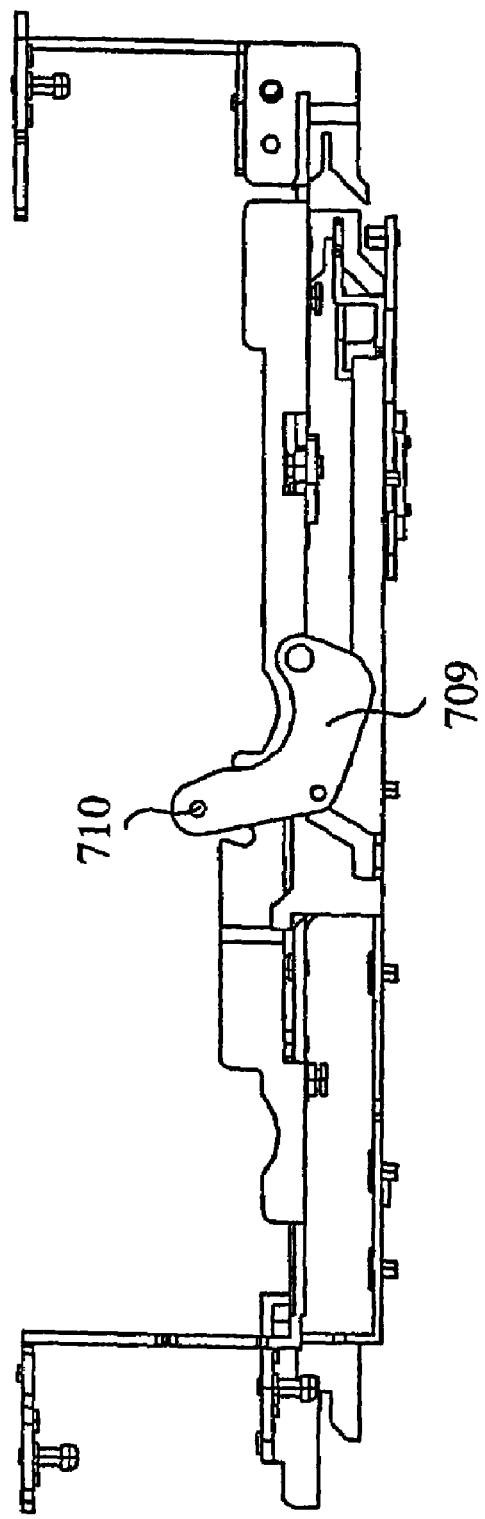

FIG. 154 is a detailed diagram of a principal portion of the disk device shown in FIG. 153.

Figure 155:
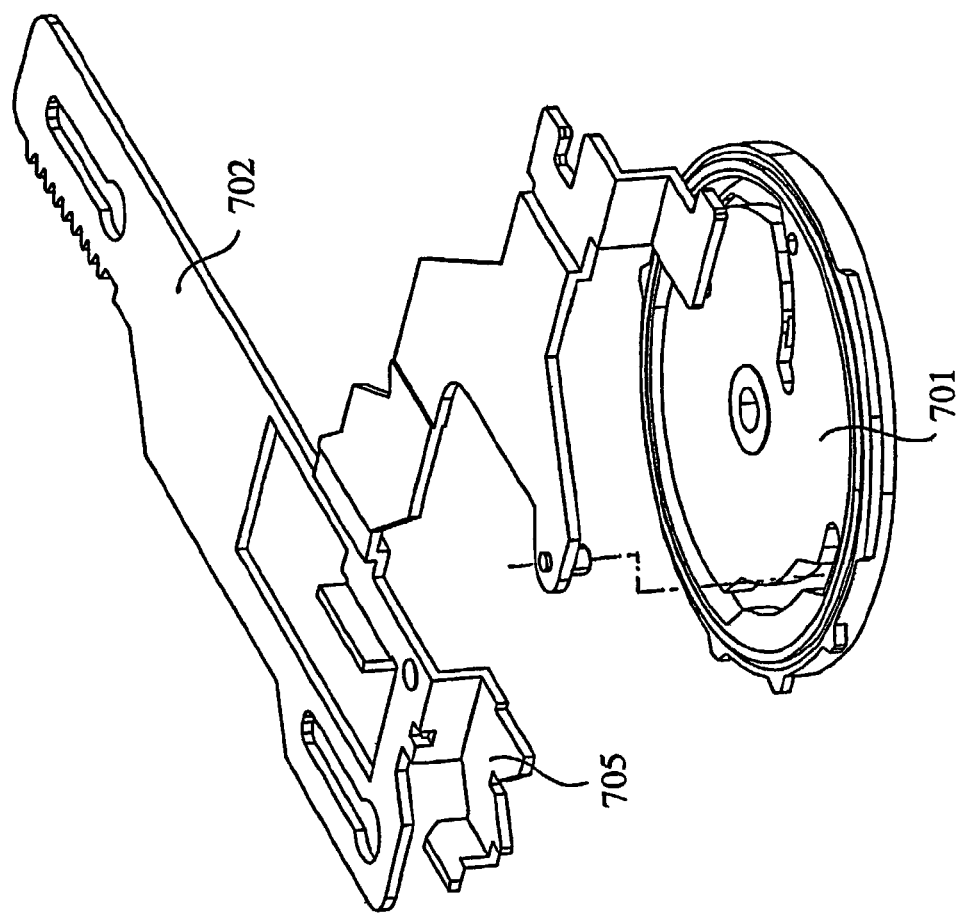

FIG. 155 is a detailed diagram of a principal portion of the disk device shown in FIG. 153.

Figure 156:
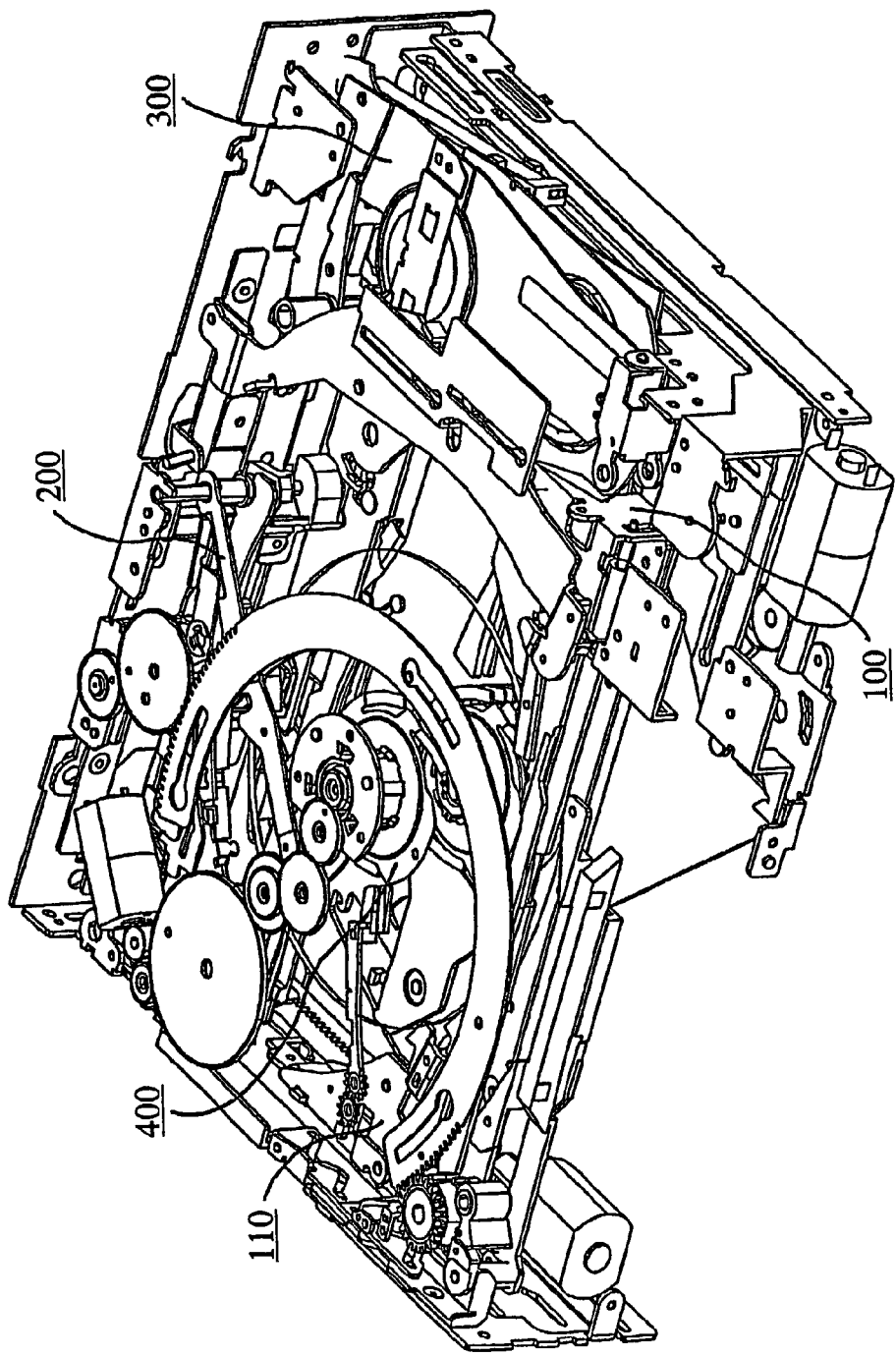

FIG. 156 is a detailed structure diagram of the disk device shown in FIG. 1.

Figure 157:
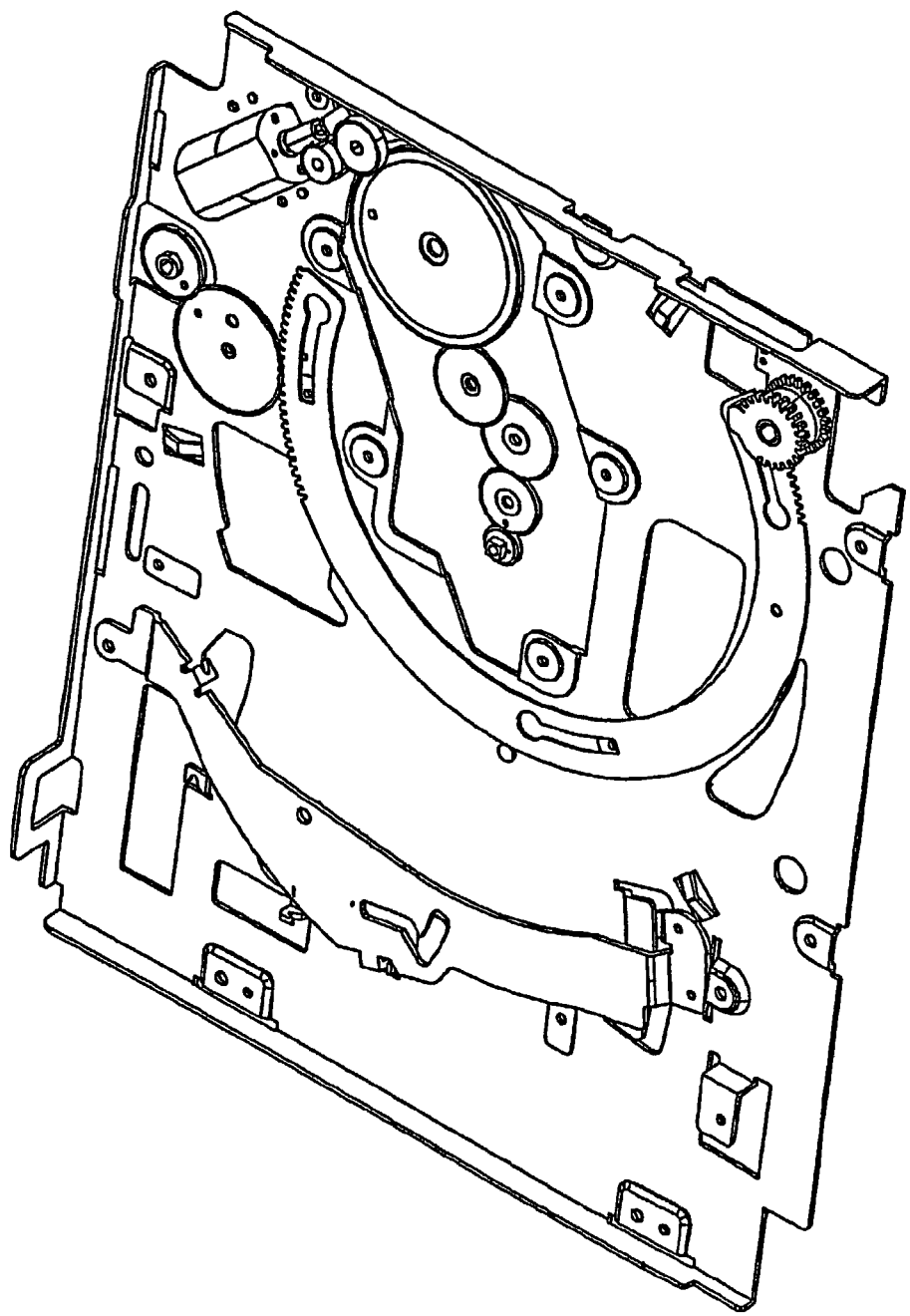

FIG. 157 is a detailed diagram of a principal portion of the disk device shown in FIG. 156.

FIG. 158 is an operating state transition diagram illustrating transition of an operating state of the disk device shown in FIG. 1.

Figure 159:
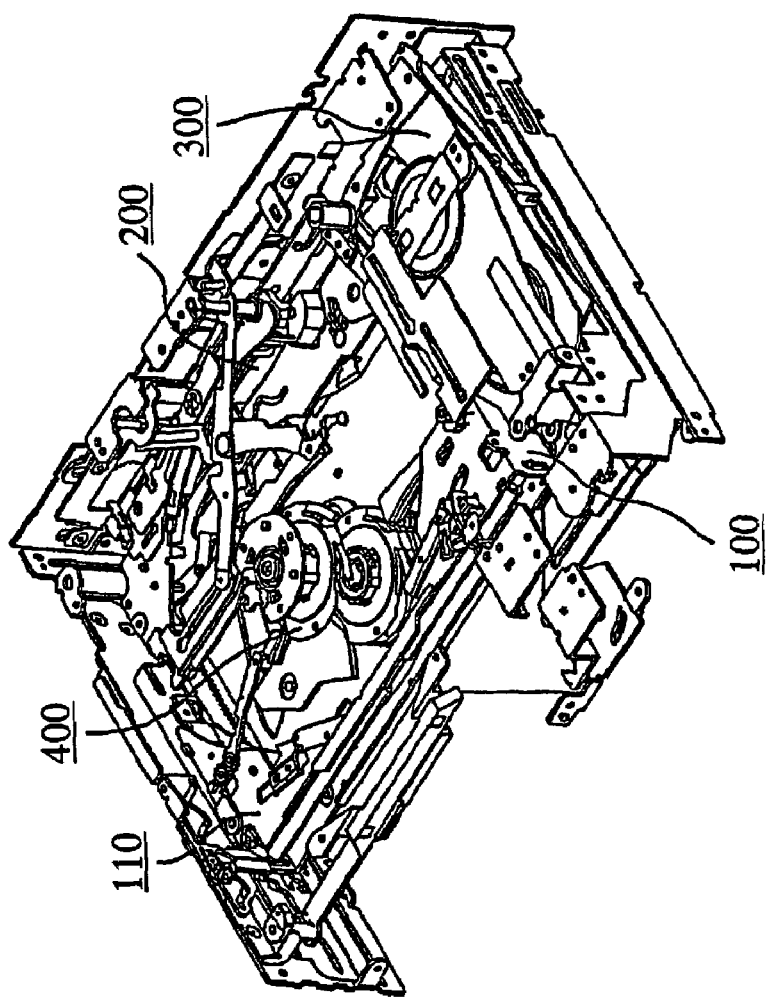

FIG. 159 is an operating state transition diagram explaining an operating state of the disk device shown in FIG. 1.

Figure 160:
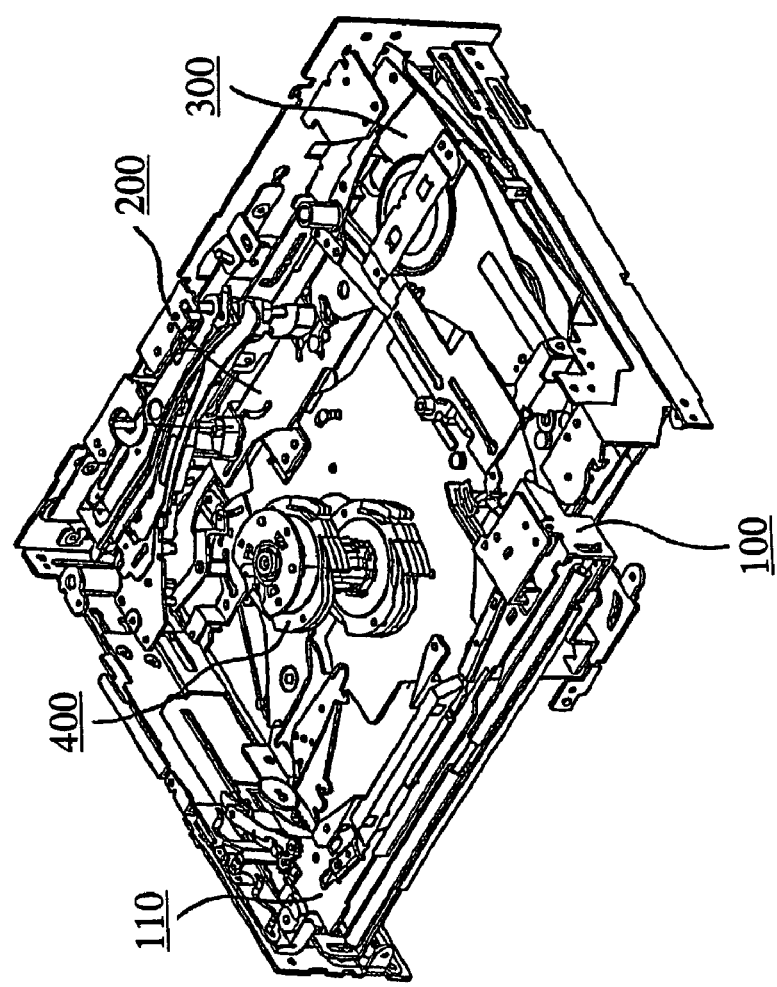

FIG. 160 is an operating state transition diagram explaining an operating state of the disk device shown in FIG. 1.

Figure 161:
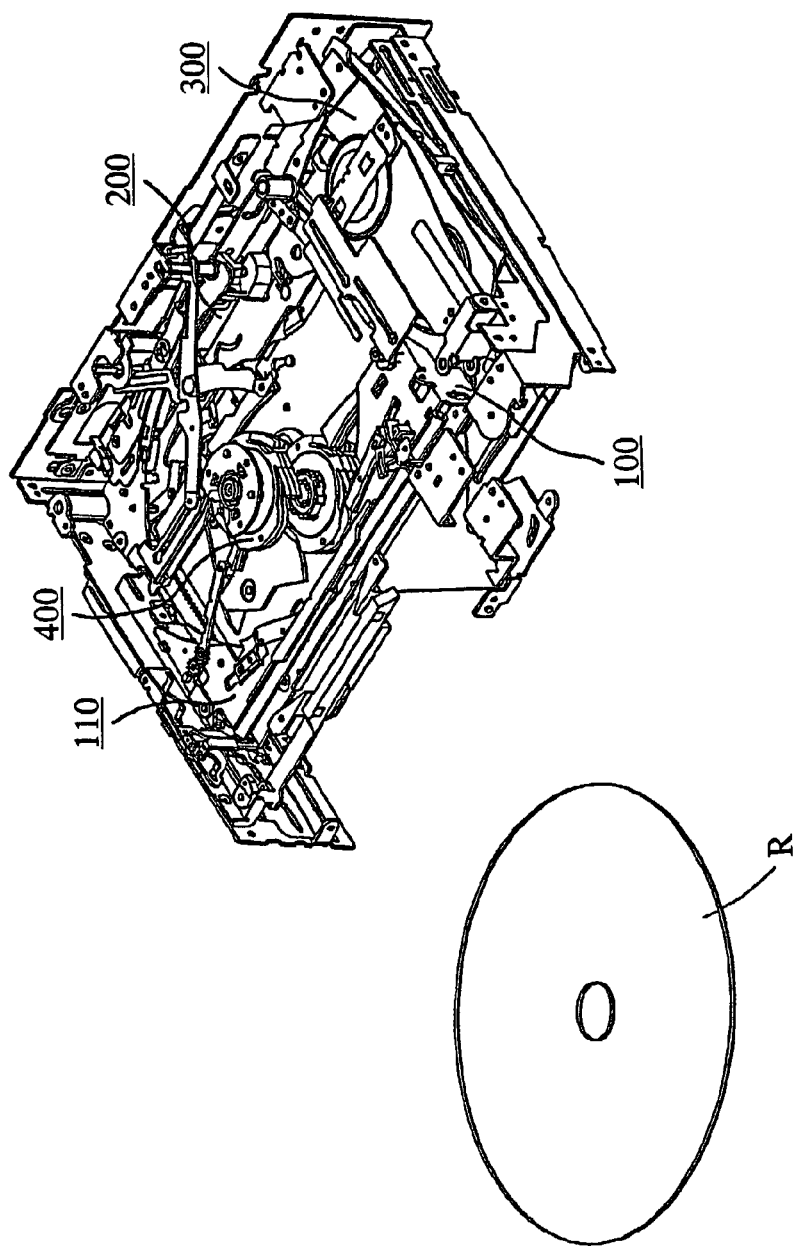

FIG. 161 is an operating state transition diagram explaining an operating state of the disk device shown in FIG. 1.

Figure 162:
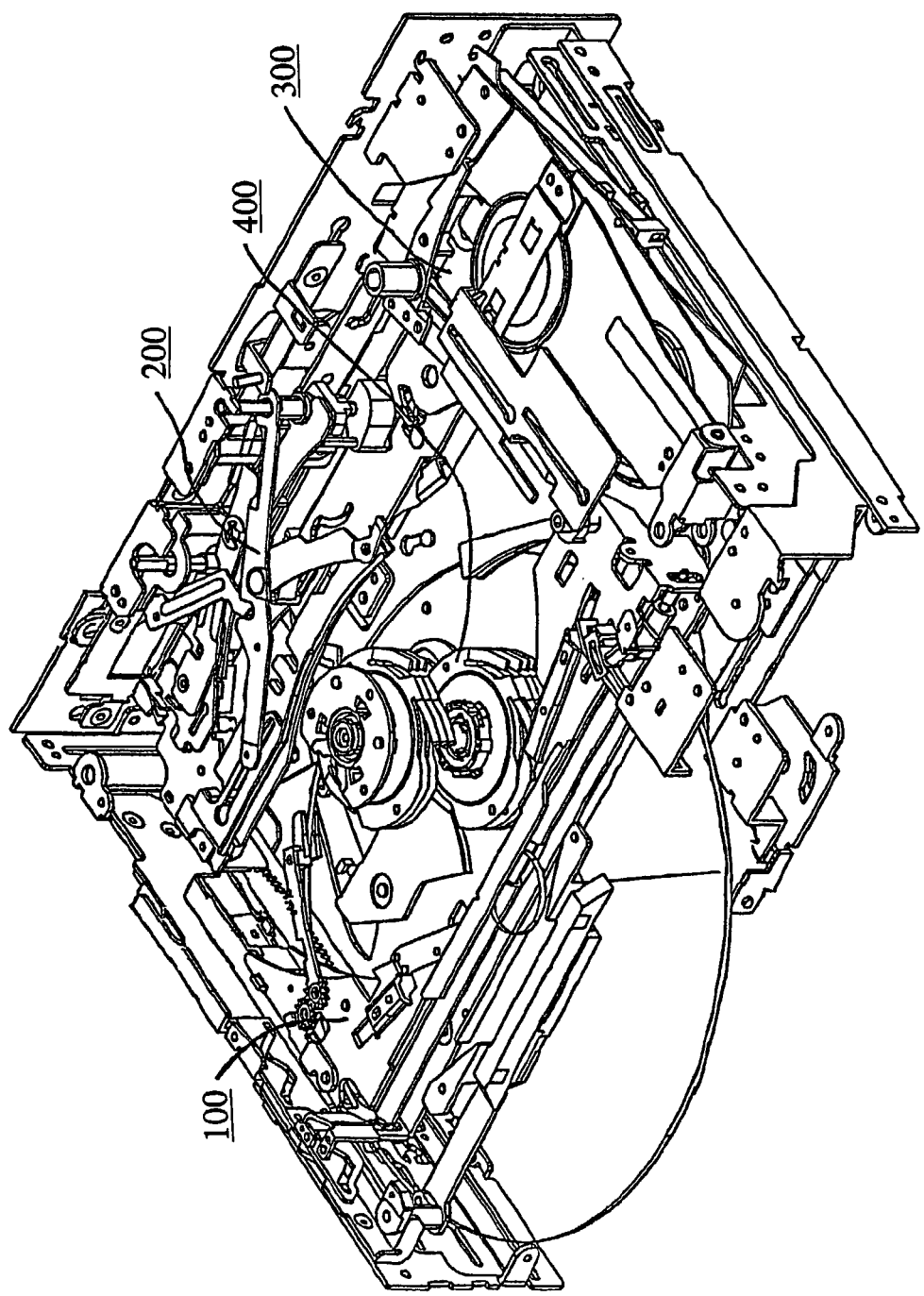

FIG. 162 is an operating state transition diagram explaining an operating state of the disk device shown in FIG. 1.

Figure 163:
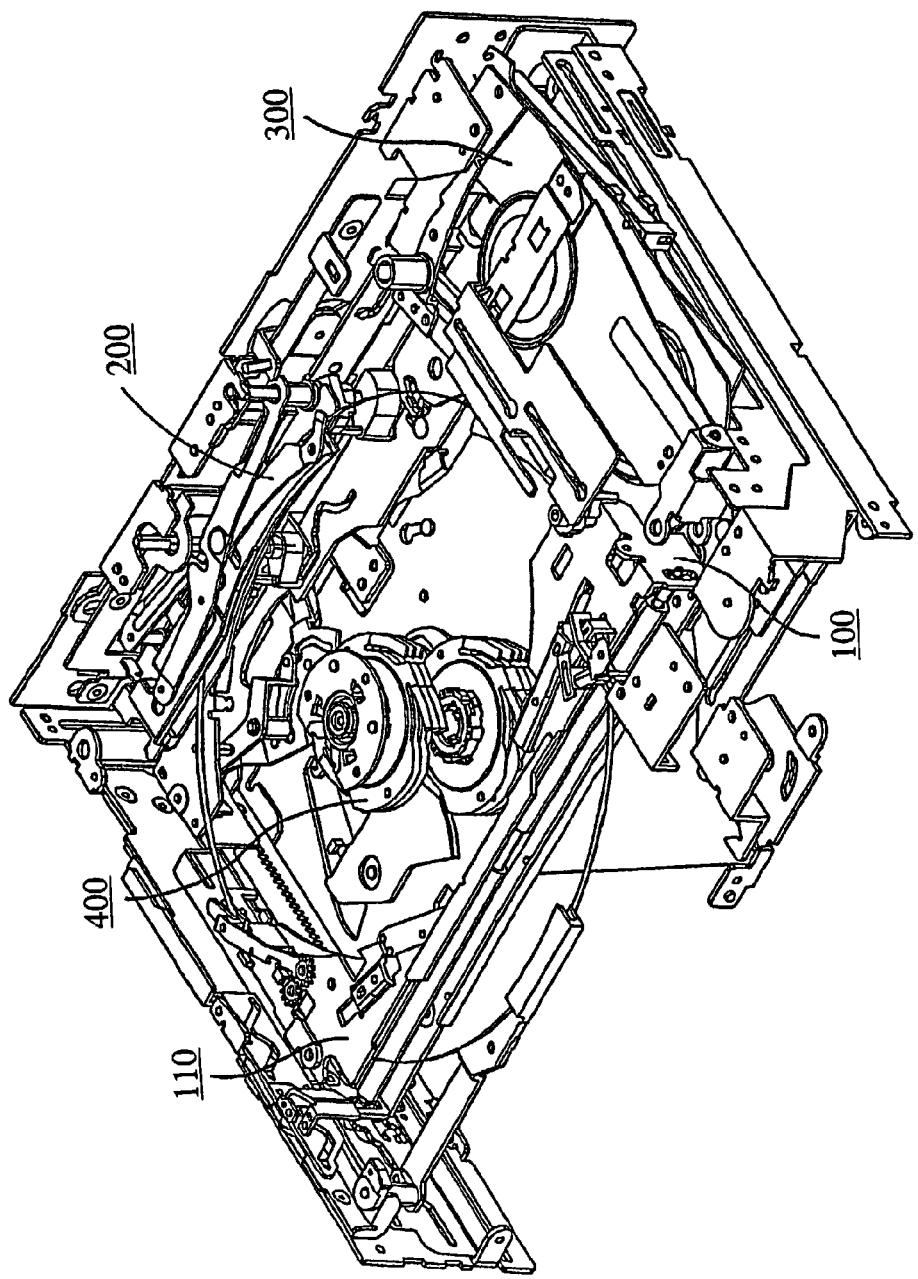

FIG. 163 is an operating state transition diagram explaining an operating state of the disk device shown in FIG. 1.

Figure 164:
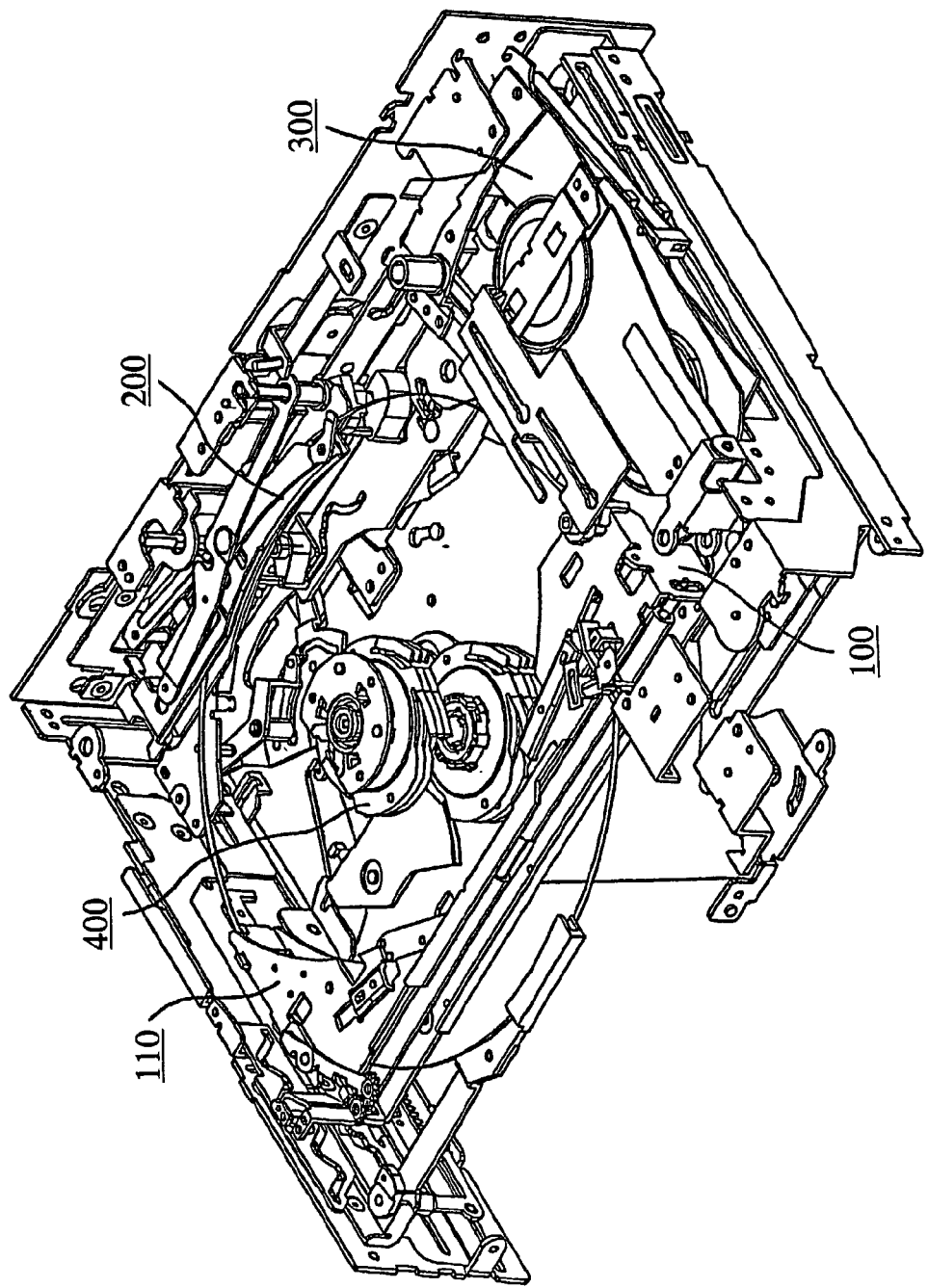

FIG. 164 is an operating state transition diagram explaining an operating state of the disk device shown in FIG. 1.

FIG. 165 is an operating state transition diagram explaining an operating state of the disk device shown in FIG. 1.

Figure 166:
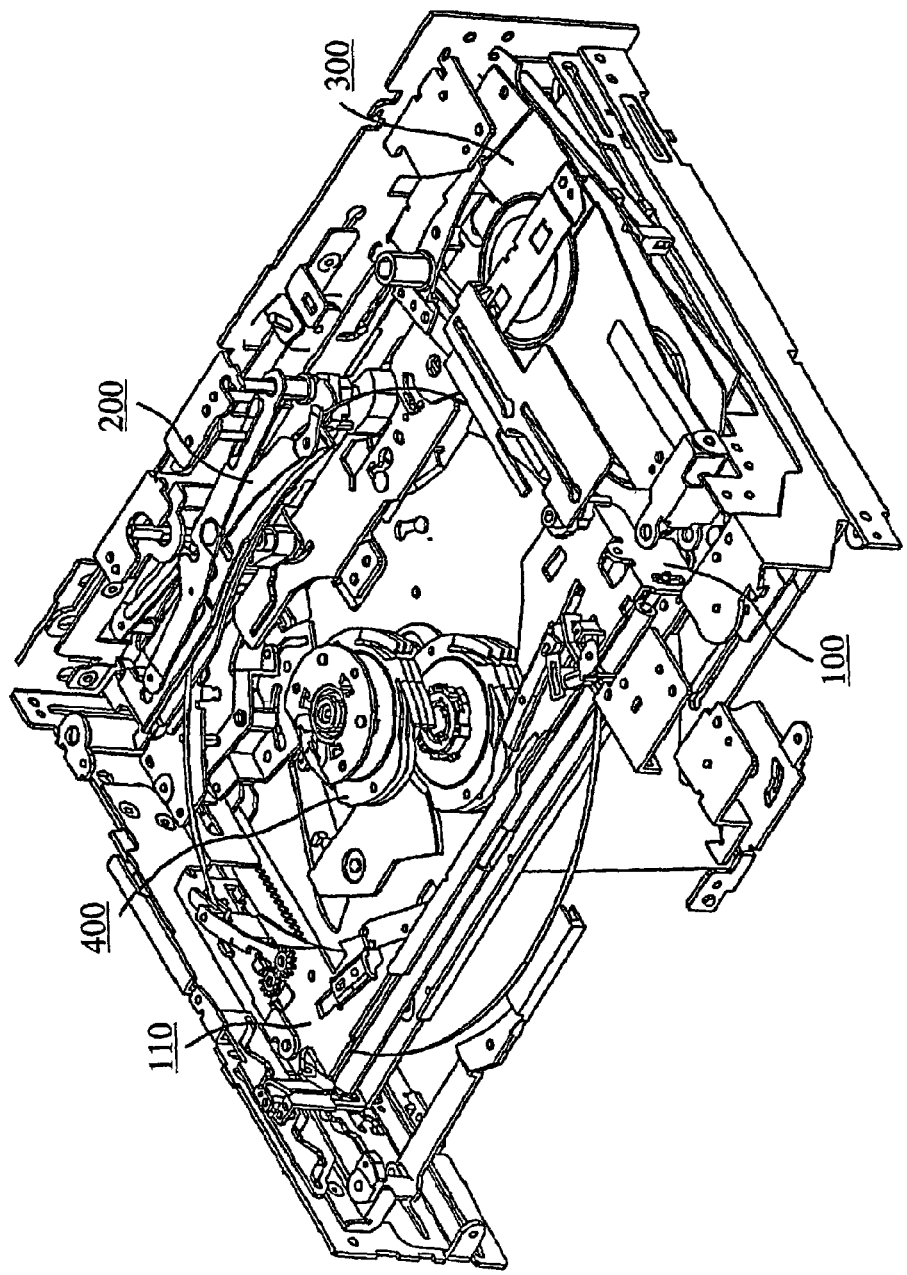

FIG. 166 is an operating state transition diagram explaining an operating state of the disk device shown in FIG. 1.

Figure 167:
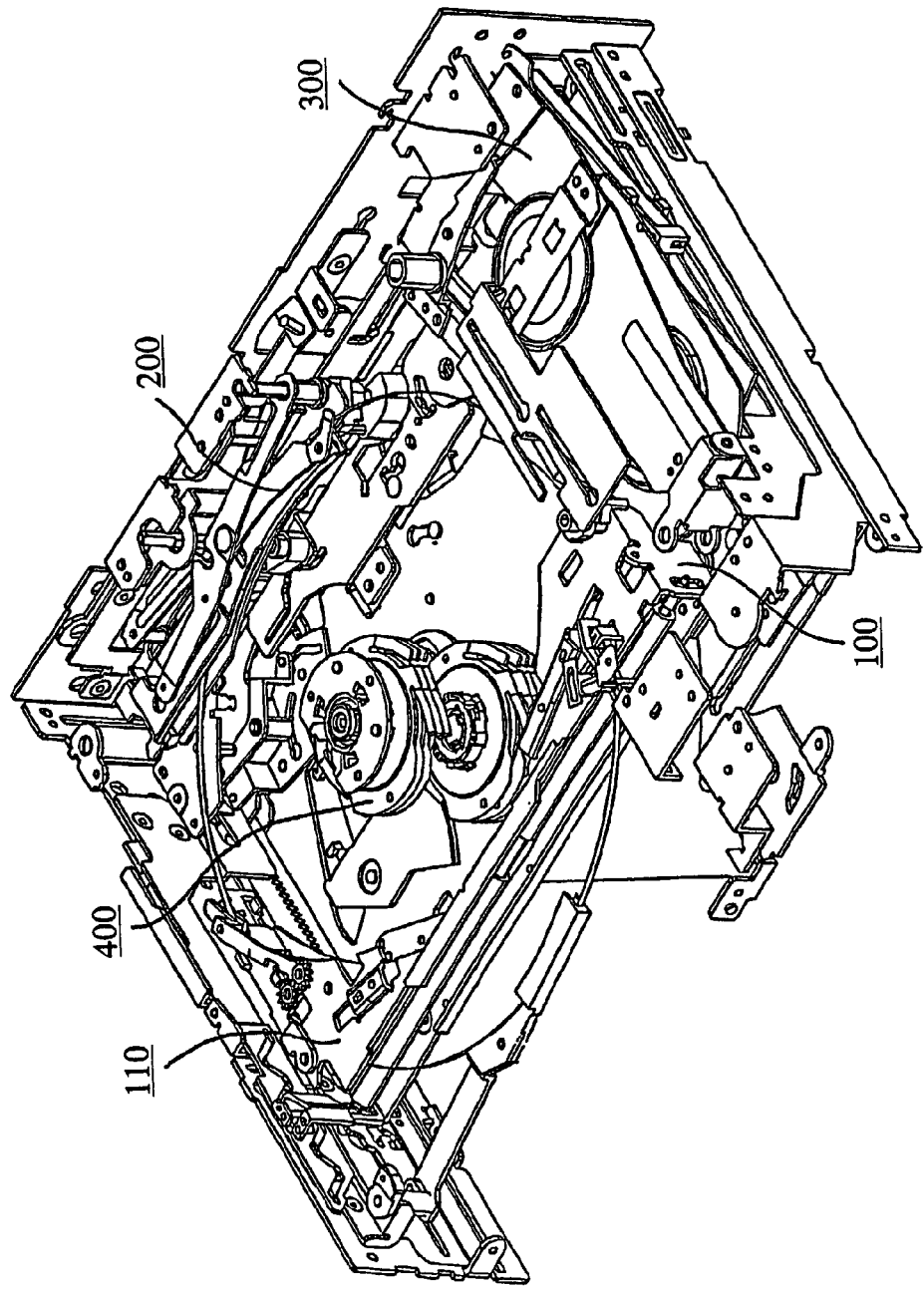

FIG. 167 is an operating state transition diagram explaining an operating state of the disk device shown in FIG. 1.

Figure 168:
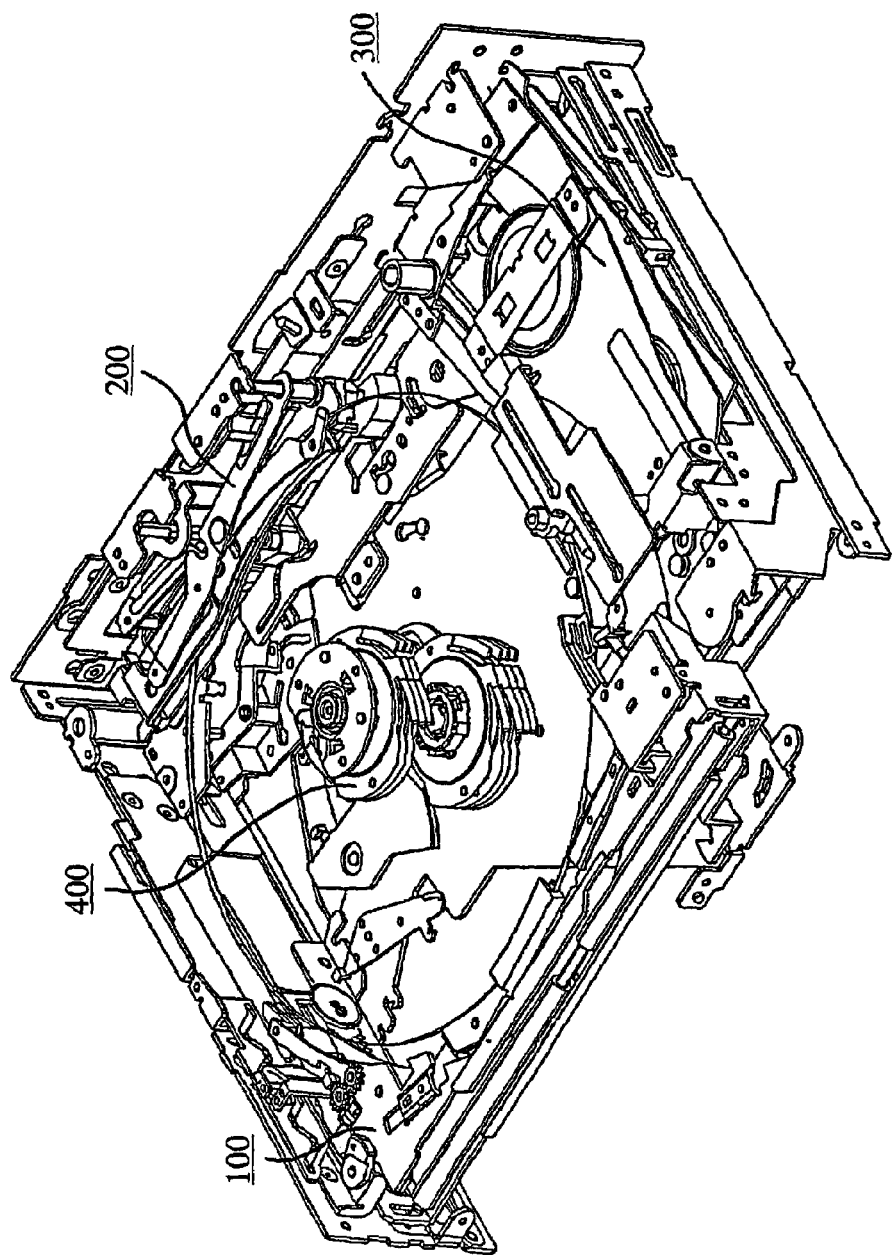

FIG. 168 is an operating state transition diagram explaining an operating state of the disk device shown in FIG. 1.

Figure 169:
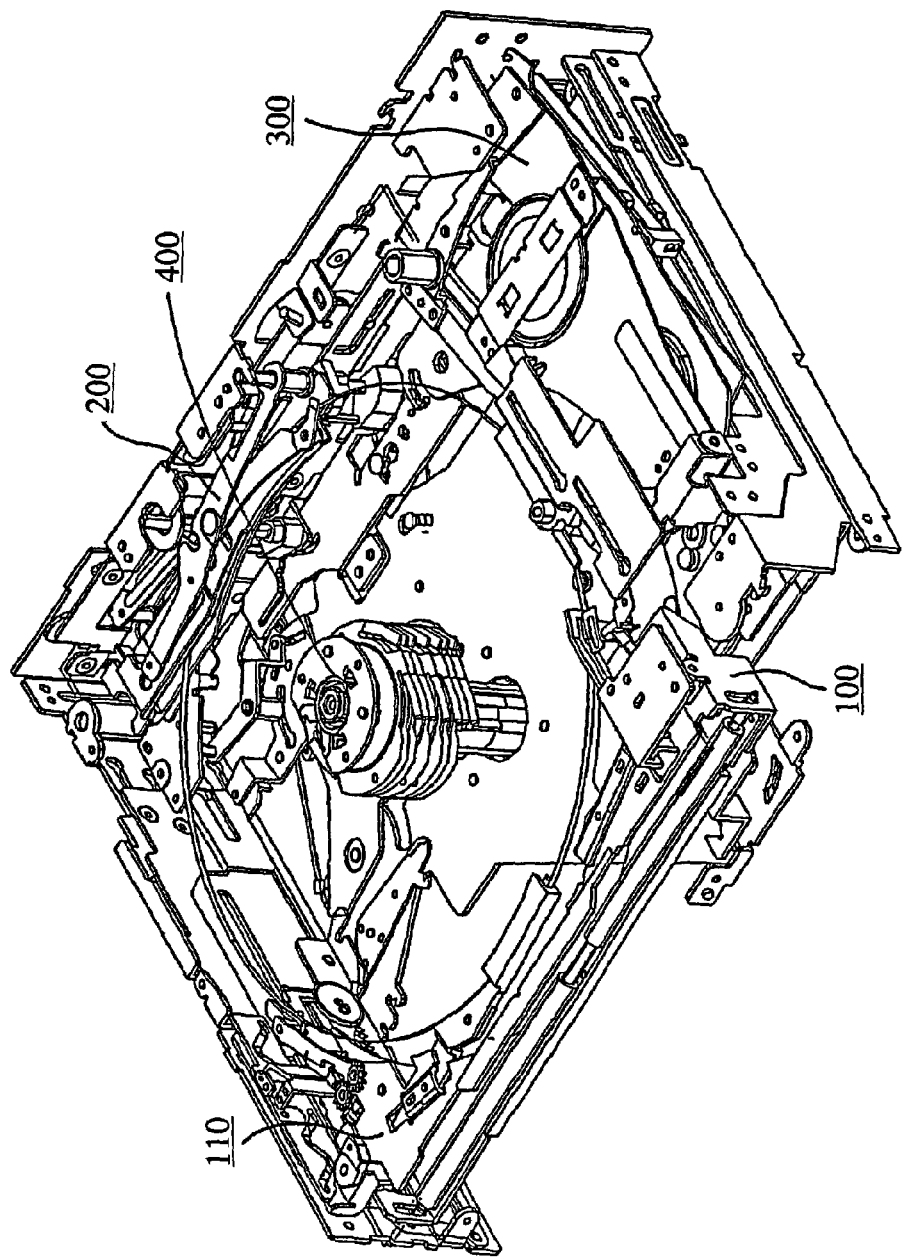

FIG. 169 is an operating state transition diagram explaining an operating state of the disk device shown in FIG. 1.

Figure 170:
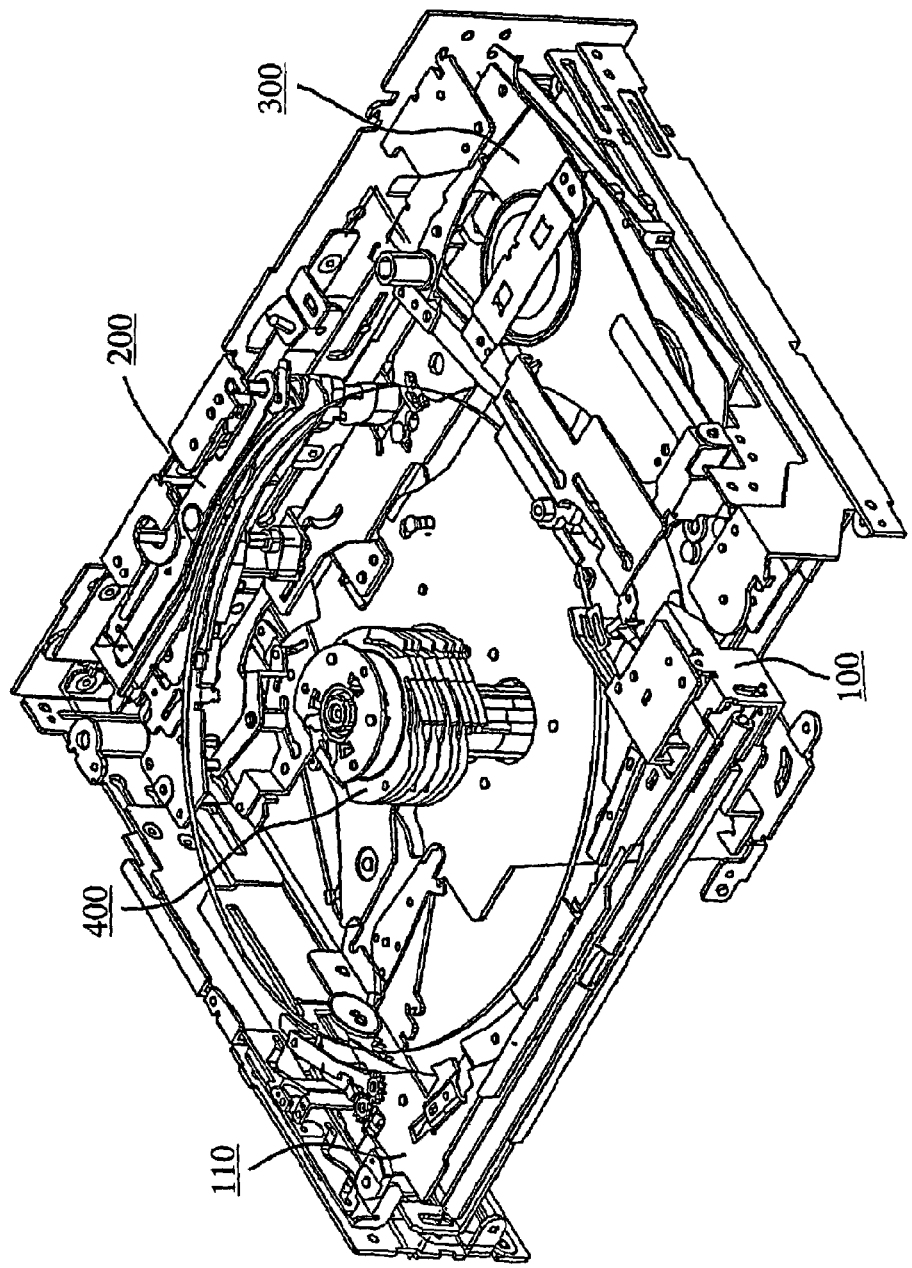

FIG. 170 is an operating state transition diagram explaining an operating state of the disk device shown in FIG. 1.

Figure 171:
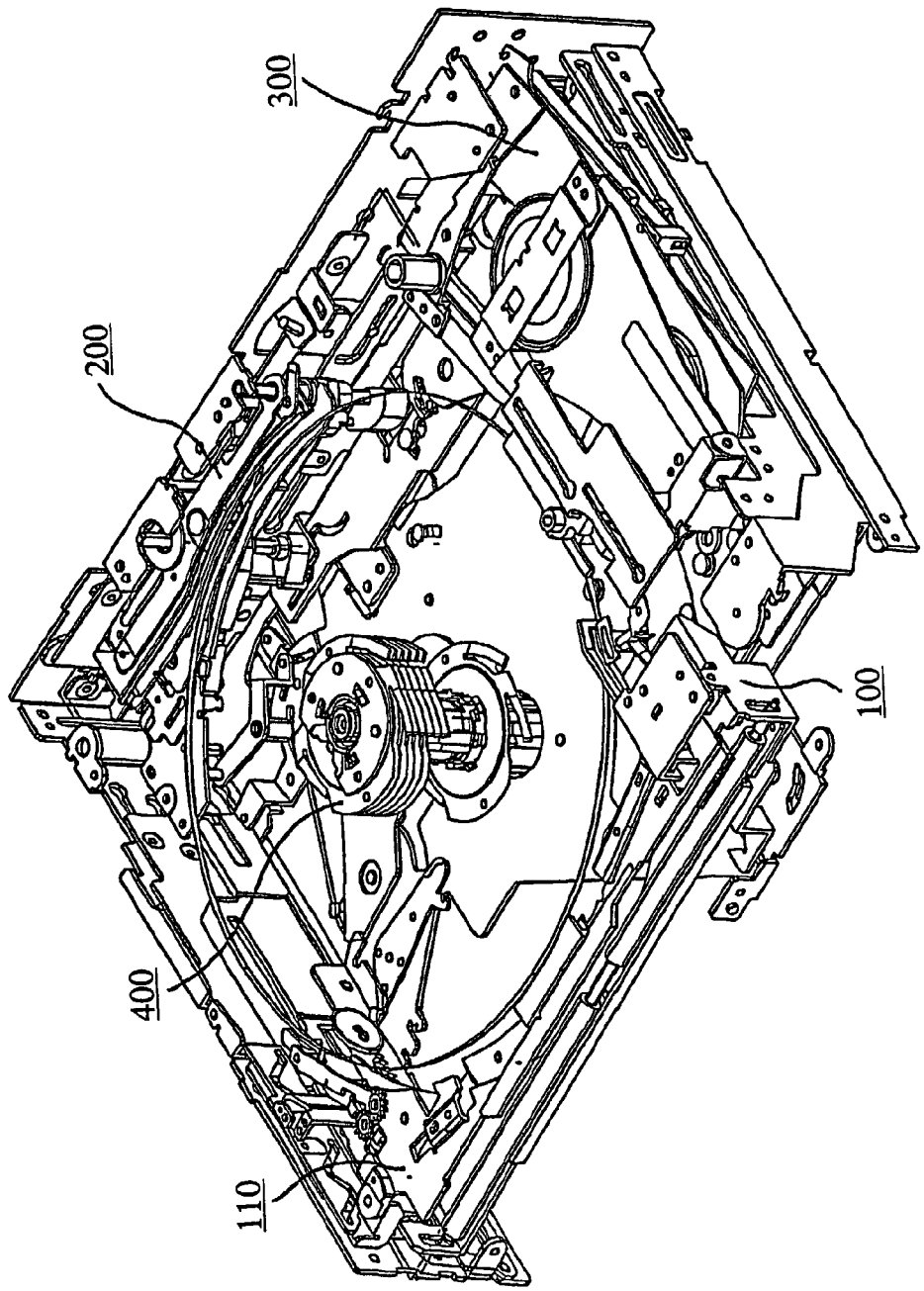

FIG. 171 is an operating state transition diagram explaining an operating state of the disk device shown in FIG. 1.

Figure 172:
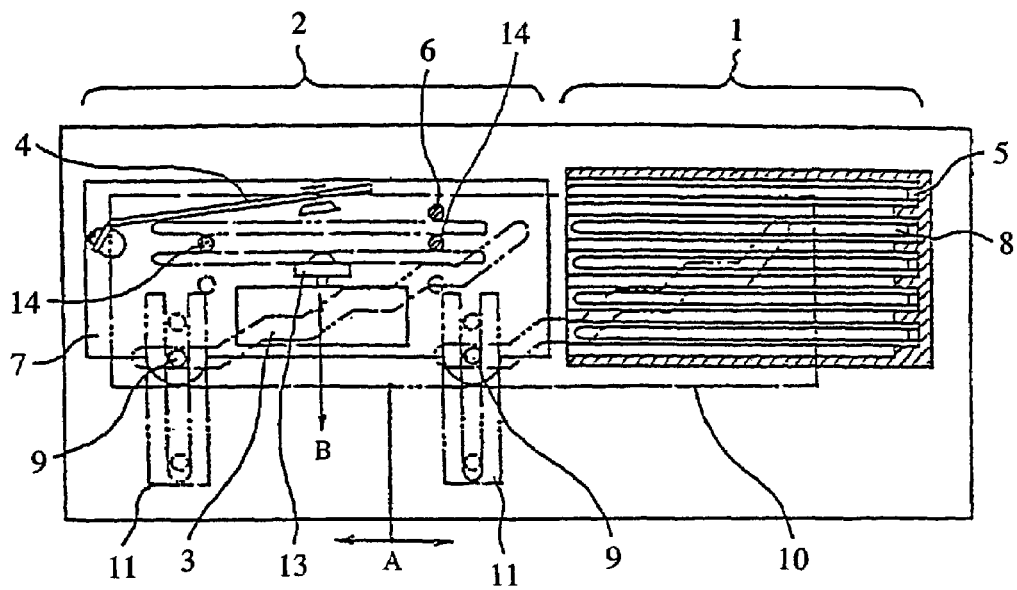

FIG. 172 is a schematic structure diagram showing a conventional disk device.

Figure 173:
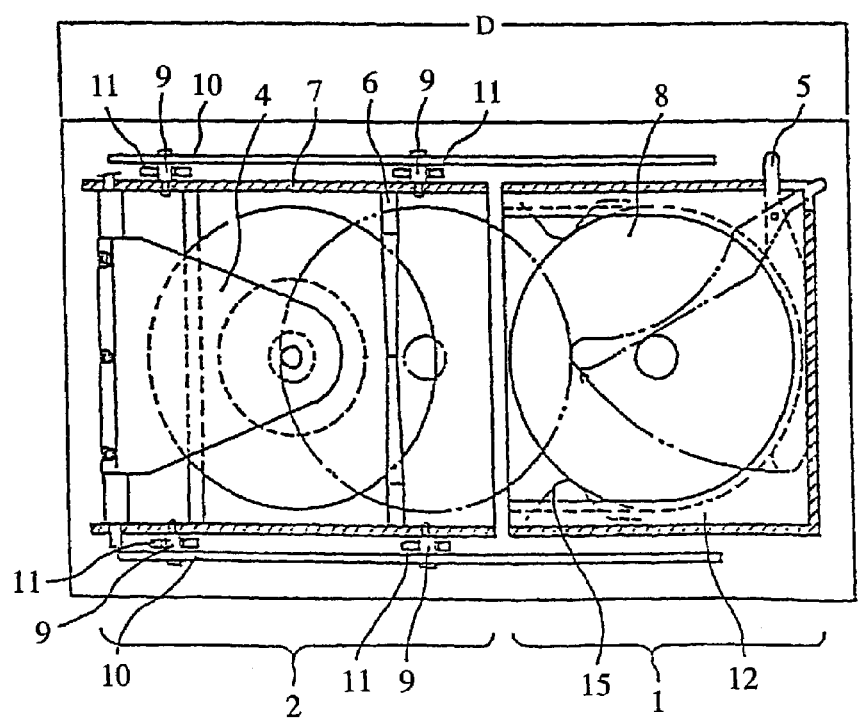

FIG. 173 is a sectional side view of the conventional disk device.

Figure 174:
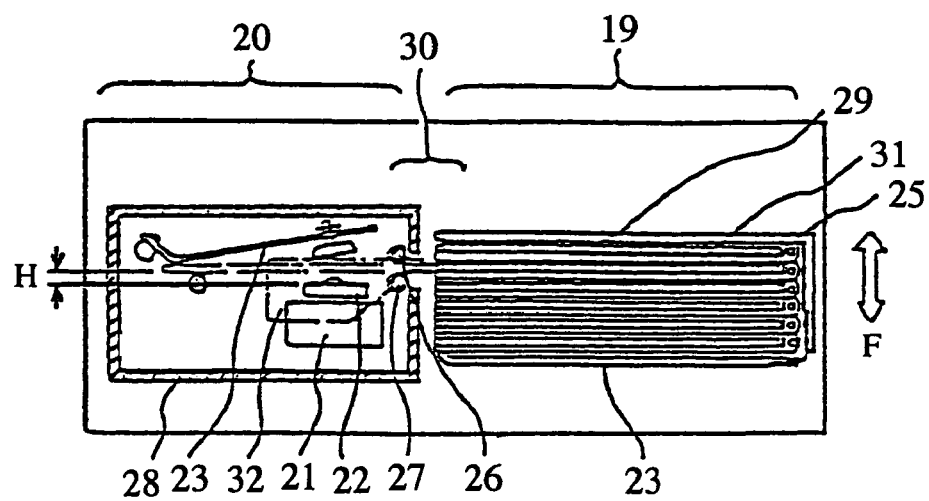

FIG. 174 is a sectional top view of the conventional disk device.

Figure 175:
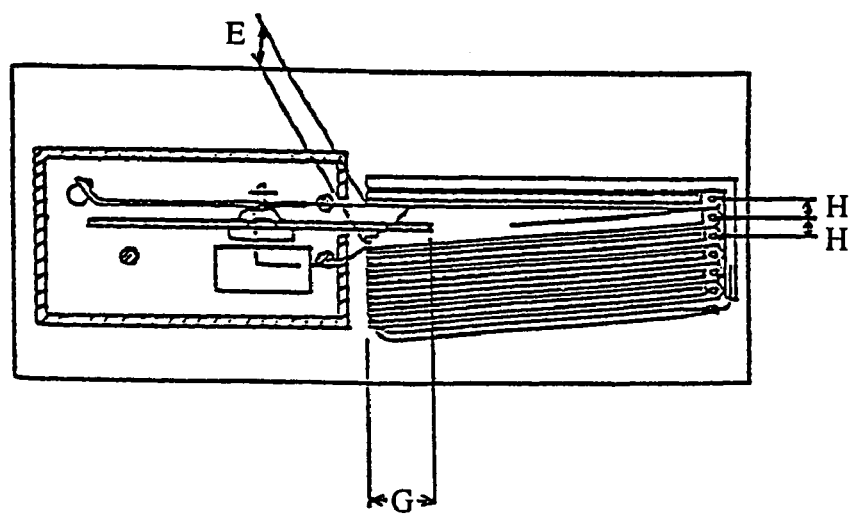

FIG. 175 is a sectional top view of the conventional disk device.

Figure 176:
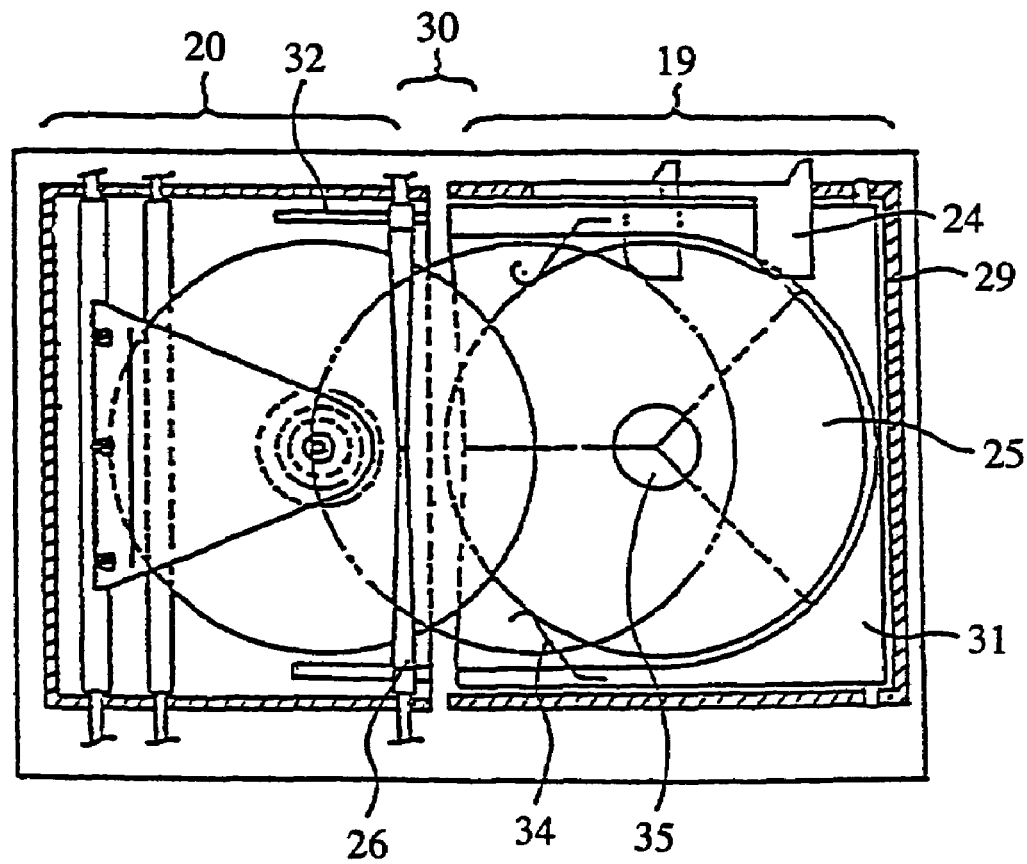

FIG. 176 is a sectional side view of the conventional disk device.

Figure 177:
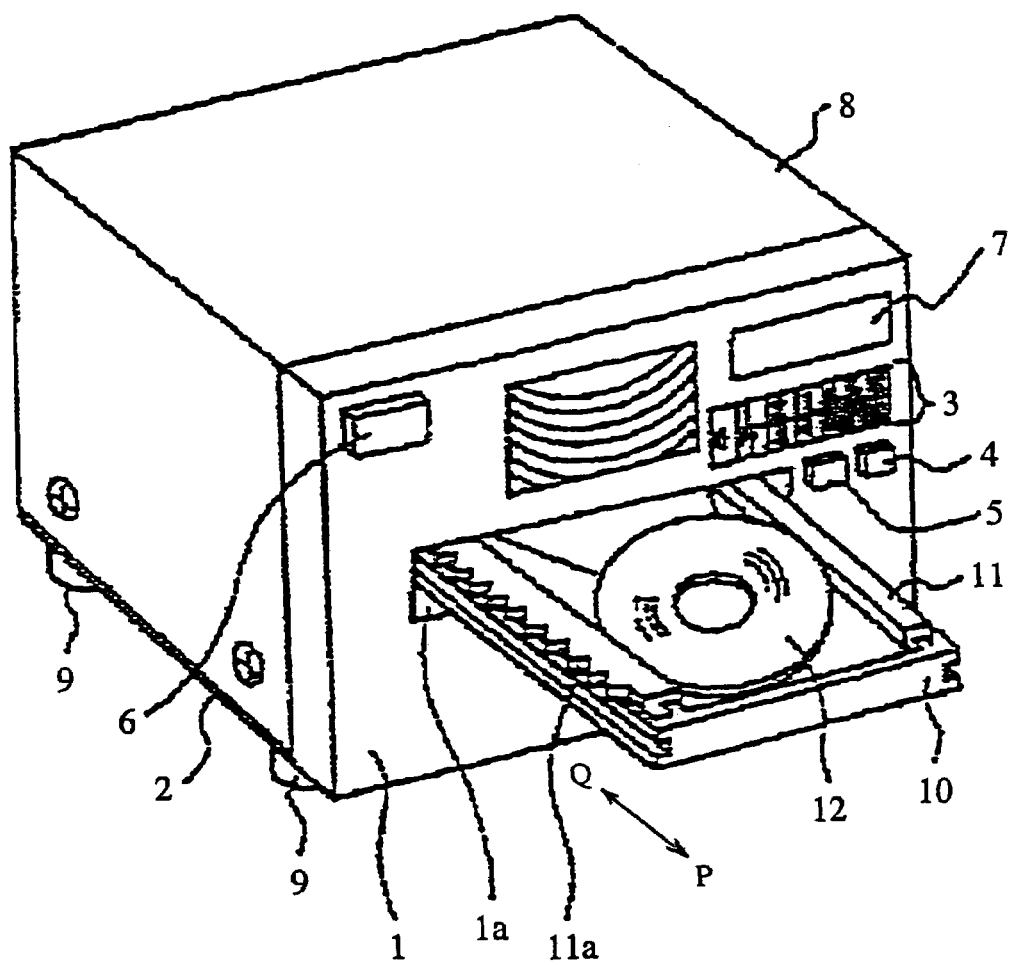

FIG. 177 is a schematic structure diagram showing another conventional disk device.

Figure 178:
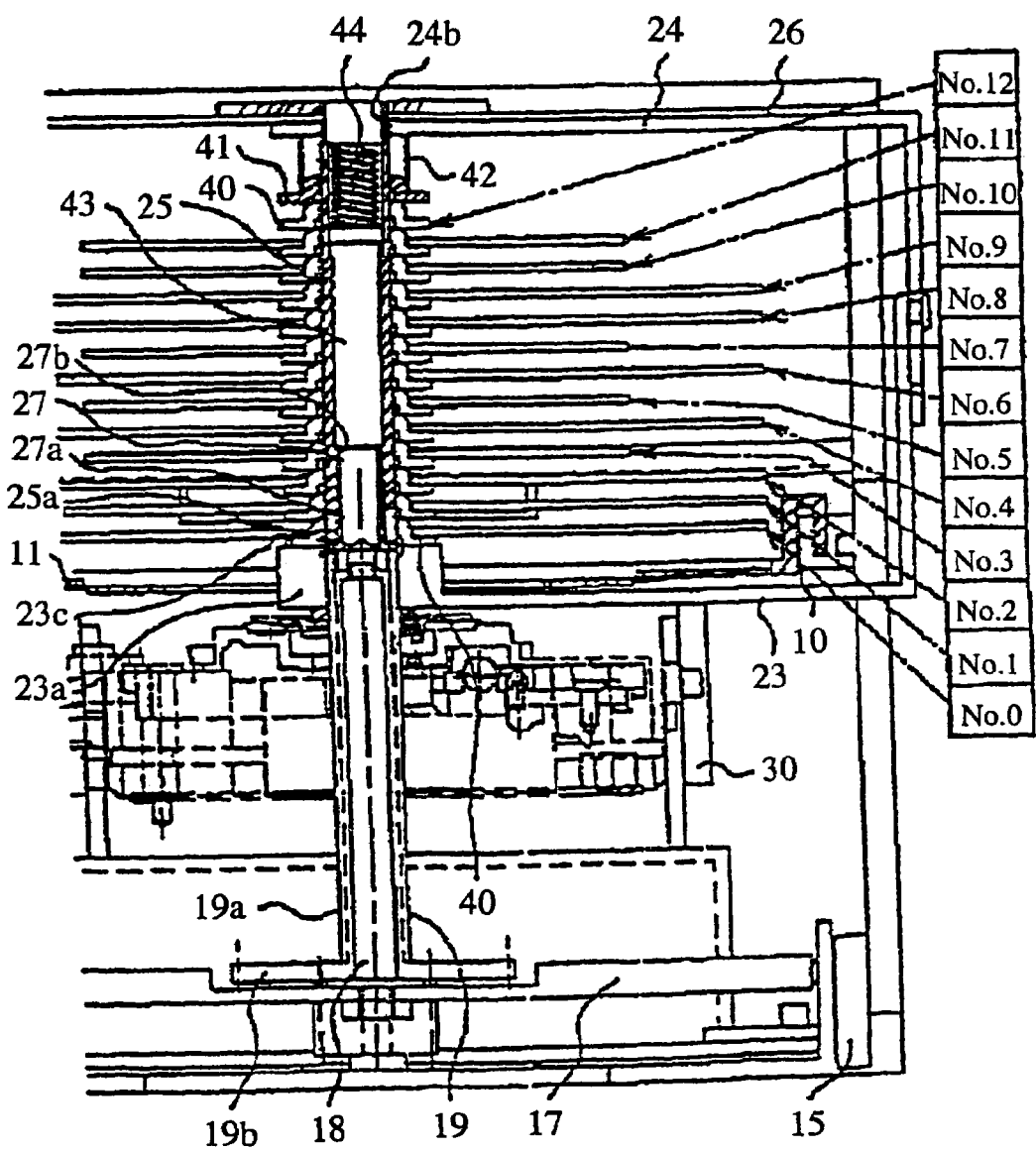

FIG. 178 is a schematic structure diagram showing another conventional disk device.

BEST MODE FOR CARRYING OUT THE INVENTION

For explaining the present invention in more detail, best modes for carrying out the invention will be described hereinafter with reference to the accompanying drawings.

First Embodiment

FIG. 1 is a schematic structure diagram showing the interior of a disk device according to a first embodiment of the present invention. This disk device can broadly be divided into four sections of mechanisms.

A first mechanism is a disk loading/unloading mechanism 100, which is disposed near a disk inlet, for loading and unloading a disk, and a second mechanism is a disk holding mechanism 200 which holds a disk within the disk device after the disk is loaded from the disk loading/unloading mechanism 100.

A third mechanism is a disk reproducing mechanism 300 which performs operation for reproducing the disk held by the disk holding mechanism 200 and a fourth mechanism is a disk storing mechanism 400 which stores and holds within the disk device the disk held by the disk holding mechanism 200 and which delivers the disk thus stored and held to the disk holding mechanism 200 at the time of reproducing or discharging the disk.

A basic operation of this disk device will be described below.

When it is detected that a disk has been inserted into the disk device, loading of the disk into the disk device is started by the disk loading/unloading mechanism 100. Then, a part of the disk loading/unloading mechanism 100 comes into abutment against a peripheral edge portion of the disk to recognize the diameter of the disk and guides the disk so that the disk is conveyed to a center portion within the disk device.

When the disk loading/unloading mechanism 100 conveys the disk, the disk holding mechanism 200 performs a vertical positioning of the disk within the disk device and holds a part of the disk peripheral edge portion so that the disk is conveyed up to the disk storing mechanism 400.

Next, the disk storing mechanism 400 receives the disk held by the disk holding mechanism 200, then stores and supports it.

Upon issuance of a command for disk reproducing operation, the disk holding mechanism 200 holds the disk stored by the disk storing mechanism 400, causing the disk to leave the disk storing mechanism 400, then the disk reproducing mechanism 300, which is disposed sideways of the disk device, moves toward the disk and rotates, whereby a disk reproducing operation is set and started.

On the other hand, upon receipt of a disk discharge command, operations reverse to the above operation flow are performed. First, the disk reproducing mechanism 300 stops disk reproduction and the disk holding mechanism 200 holds the disk after reproduction. Thereafter, the disk reproducing mechanism 300 turns in a direction opposite to the disk reproducing position and moves to a side position of the disk device, i.e., a retracted position.

Next, the disk loading/unloading mechanism 100 performs a disk unloading operation so as to discharge the disk to the exterior of the disk device, whereby a series of operations is completed.

Although the above description concerns only a series of operations involving reproduction of a disk loaded into the disk device and unloading of the disk to the exterior of the disk device, the following description is now provided about a series of operations for switching from a disk being reproduced to a disk to be reproduced next.

First, the reproduction of a first disk being reproduced is stopped and the disk holding mechanism 200 holds the first disk. Thereafter, the disk reproducing mechanism 300 turns sideways of the disk device from the reproducing position of the first disk and moves to a storing position. In this case, a second disk is stored in the disk storing mechanism.

Next, the disk loading/unloading mechanism 100 is moved to the disk inlet side so as to be retracted up to a predetermined position not opposed to the first disk surface. Thereafter, a part of the disk storing mechanism 400 extends upwards of the disk device while being loosely fitted in a hole of the first disk from below the disk device and is connected to another part of the disk storing mechanism 400. After this connecting operation, the holding state of the first disk by the disk holding mechanism 200 is released.

At this time, the first disk is stored by the disk storing mechanism 400 alone.

Further, upon release of the first disk, a driving means begins to operate. With this driving force, the disk storing mechanism 400 loosely fitted in the disk is turned to switch the height of a desired disk, i.e., the second disk, to a reproducing height. At the same time, in accordance with the rotational movement of the disk storing mechanism 400 there is made switching of height so that the first disk is stored at a height different from the height of the reproducing position.

Next, the disk holding mechanism 200 operates to support the second disk and, after the second disk is held, the disk storing mechanism 400 turns in a direction opposite to its moving motion performed for storing of the first disk, becomes disengaged from the hole of the second disk and it is retracted downwards of the disk device.

At this time, the second disk is held by only the disk holding mechanism and is set in the reproducing position.

Next, after the disk loading/unloading mechanism 100 has moved to a predetermined position within the disk device, the disk reproducing mechanism 300 moves to the second disk side for reproducing the second disk. After the disk reproducing mechanism 300 has reached a predetermined reproducing position, the disk holding mechanism is released and then the second disk is reproduced.

The basic operation of the disk device involves the above described functions. First, a principal structure of the whole of the disk device will be described and subsequently the four mechanisms referred to above will be described in detail.

[1. Principal Structure of the Whole of the Disk Device]

Figure 2:
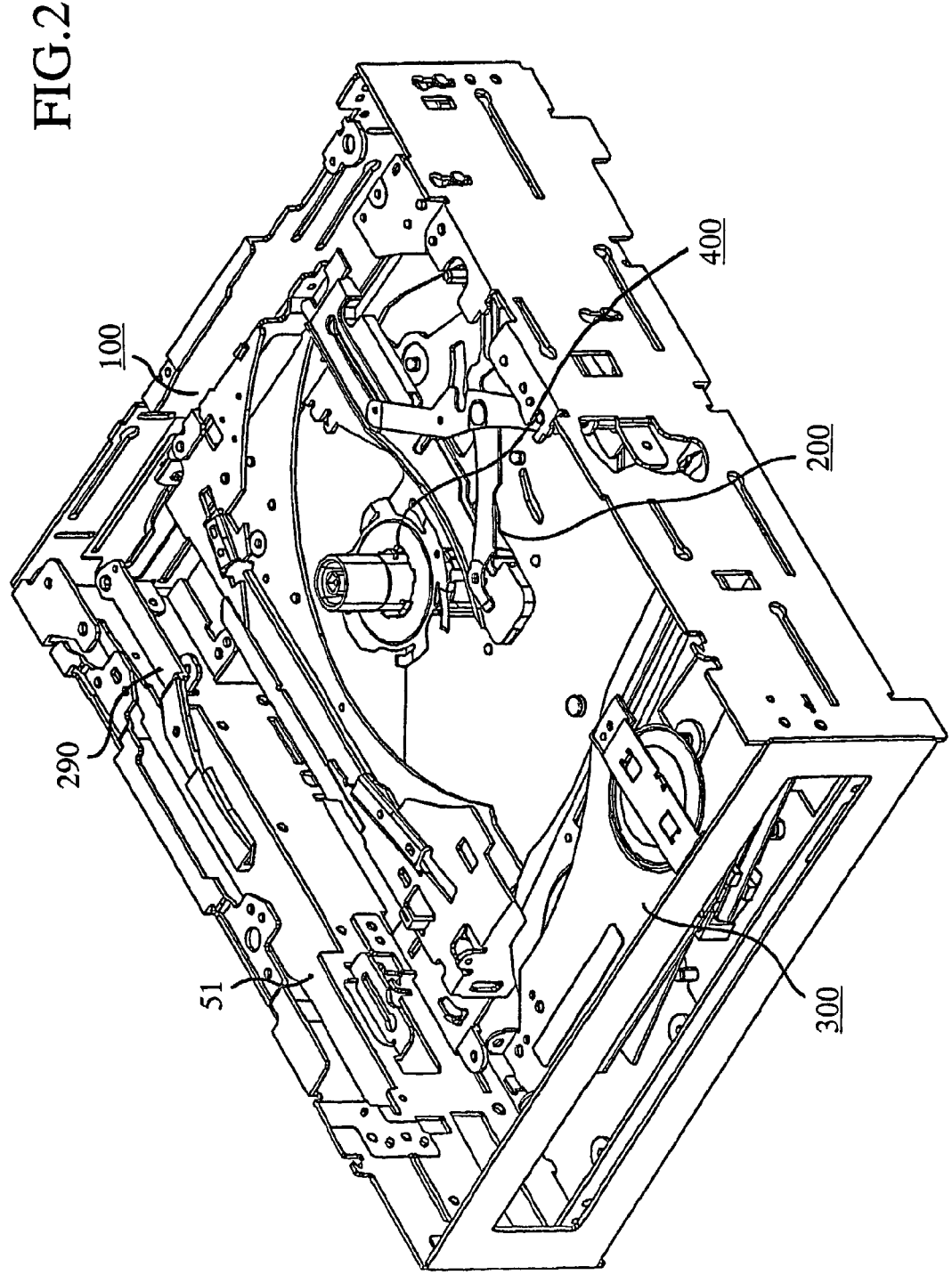
FIG. 2 is an entire structure diagram showing a schematic structure of the disk device shown in FIG. 1, as seen in a different direction.

FIG. 1 is a schematic structure diagram of the whole of the disk device according to the first embodiment of the present invention. In FIGS. 1 and 2, the reference numeral 50 denotes a housing of the disk device and 51 denotes a disk inlet for the insertion of discharge of each disk into or from the interior of the disk device.

The disk loading/unloading mechanism 100, which is for loading and unloading a disk into and from the interior of the housing 50, is made up of a roller portion 101 (to be described later) for loading and unloading a disk with respect to the interior of the disk device, a disk pressing portion 102 disposed in a position opposed to the roller portion 101, and a roller unit moving means 103 for moving the roller portion 101 and the disk pressing portion 102 as a unit within the range from the disk inlet 51 side up to the interior of the disk device. The disk inserted through the disk inlet 51 is held grippingly by both the roller portion 101 and the disk pressing portion 102 and is loaded into the interior of the disk device by a rotating motion of the roller portion 101.

The disk holding mechanism 200 is made up of a disk holding portion 201 and a moving means 220 for moving the disk holding portion 201 in the direction shown by A or B. The disk holding portion 201 is normally positioned so as to approach the disk inlet 51 side of a disk conveyance path. A part of a peripheral edge portion of the disk loaded by the disk loading/unloading mechanism 100 comes into abutment against the disk holding portion 201, and in accordance with the diameter of the disk thus loaded the disk holding portion 201 holds the disk while positioning the disk at a corresponding predetermined position out of predetermined positions for different disk diameters. The moving means 220 is formed in a cross link shape. More specifically, the moving means 220 is composed of a left arm 221 and a right arm 222 both crossing each other at a rotational axis 223. The disk holding mechanism 200 moves vertically in the direction shown by E or F in accordance with an operating state of the disk.

In the disk holding portion 201 is formed a groove for insertion therein of a part of the disk peripheral edge portion.

In a state (including a preparatory state for the reproducing operation) where the disk reproducing operation is not performed, the disk reproducing mechanism 300 is retracted so as to be positioned near a side wall of the housing 50 and is moved to the disk reproducing position side only when the disk reproducing operation is to be performed.

In the disk reproducing mechanism 300, although the details will be described later, there are provided a turntable 310 having a table portion 311 for resting a disk thereon, a drive motor (not shown) for rotating the disk on the turntable 310, and a pickup portion (not shown) for reading information recorded in the disk. Further provided is a clamp portion 320 which clamps the disk from above after the disk is rested on the turntable.

When an operating portion attached to the disk device for issuing a reproduction command is operated by a user for the disk which has been loaded into the disk device, the turntable 310 is turned in direction G so that the center of the table portion 311 resting the disk thereon becomes coincident with the center of the disk, then is moved in the direction shown by H, and the moving means 220 descends in the direction shown by F, allowing the disk to be rested on the table portion 311.

At this time, the disk holding portion 220 is disengaged from the disk and the disk is carried by only the turntable 310.

Next, the clamp portion 320 is turned in the direction shown by I and thereafter is moved in the direction of H, allowing the disk held by the turntable 310 to be clamped from above. Thus, the disk is gripped by both turntable 310 and clamp portion 320.

For stopping the disk reproducing operation, there are performed operations reverse to the above, whereby the disk reproducing mechanism is moved so as to be retracted on the housing side.

The disk storing mechanism 400 functions to store and hold each disk within the disk device and can adjust the disk height by a turning motion. With the disk storing mechanism 400, plurality of disks are stored within the disk device, and when a desired disk is to be selected and reproduced from the plurality of disks, the disk storing mechanism switches from one disk height to another.

The disk storing mechanism 400 stores and holds disks after loading by the disk loading/unloading mechanism 100 in such a manner that surfaces of the disks are nearly parallel to one another and rotational axes of the disks are substantially coincident with one another. In this first embodiment, six disks can be stored in the disk storing mechanism 400.

A schematic structure of the entire disk device is as described above. Next, structure and contents of operations will be described in detail below mechanism by mechanism.

[2. Disk Loading/Unloading Mechanism]

FIGS. 3 to 46 are drawings concerning the disk loading/unloading mechanism.

The disk loading/unloading mechanism is composed of a roller portion for conveying a disk with a rotating force, a roller base portion which holds the roller portion, a first position delimiting portion which delimits a height position of the disk when the disk is inserted, a second position delimiting portion which delimits the position of the disk so that the center of the disk coincides with the center of the disk conveyance path at the time of conveying the disk inserted from the disk inlet, a position changing portion for changing the position of the second position delimiting portion in accordance with the movement of the roller base portion, a link portion which fixes or releases a shaft of the roller portion in accordance with the disk conveyance position and which changes the height of the roller base portion, a third position delimiting portion which delimits a radial position of a disk when the disk is inserted and wherein, when the roller base portion moves from the inner part of the disk device toward the disk inlet for example at the time of reproducing the disk, a member for delimiting a radial position of the disk falls down in the moving direction of the roller base portion so as to retract, an arm portion for moving the disk holding mechanism to be described later so as to be interlocked with the movement of the third position delimiting portion, and a disk roller base movement suppressing mechanism which operates so as to suppress the movement of the roller base portion 110 at a predetermined position when the disk is inserted.

Structure and operations of the first position delimiting portion with reference to FIGS. 3 to 14, the second position delimiting portion and the link portion with reference to FIGS. 15 to 31, the third position delimiting portion with reference to FIGS. 32 to 42, and a principal portion of the roller base movement suppressing mechanism with reference to FIGS. 43 to 46 will be described below in a divided manner, respectively.

<First Position Delimiting Portion>

Figure 3:
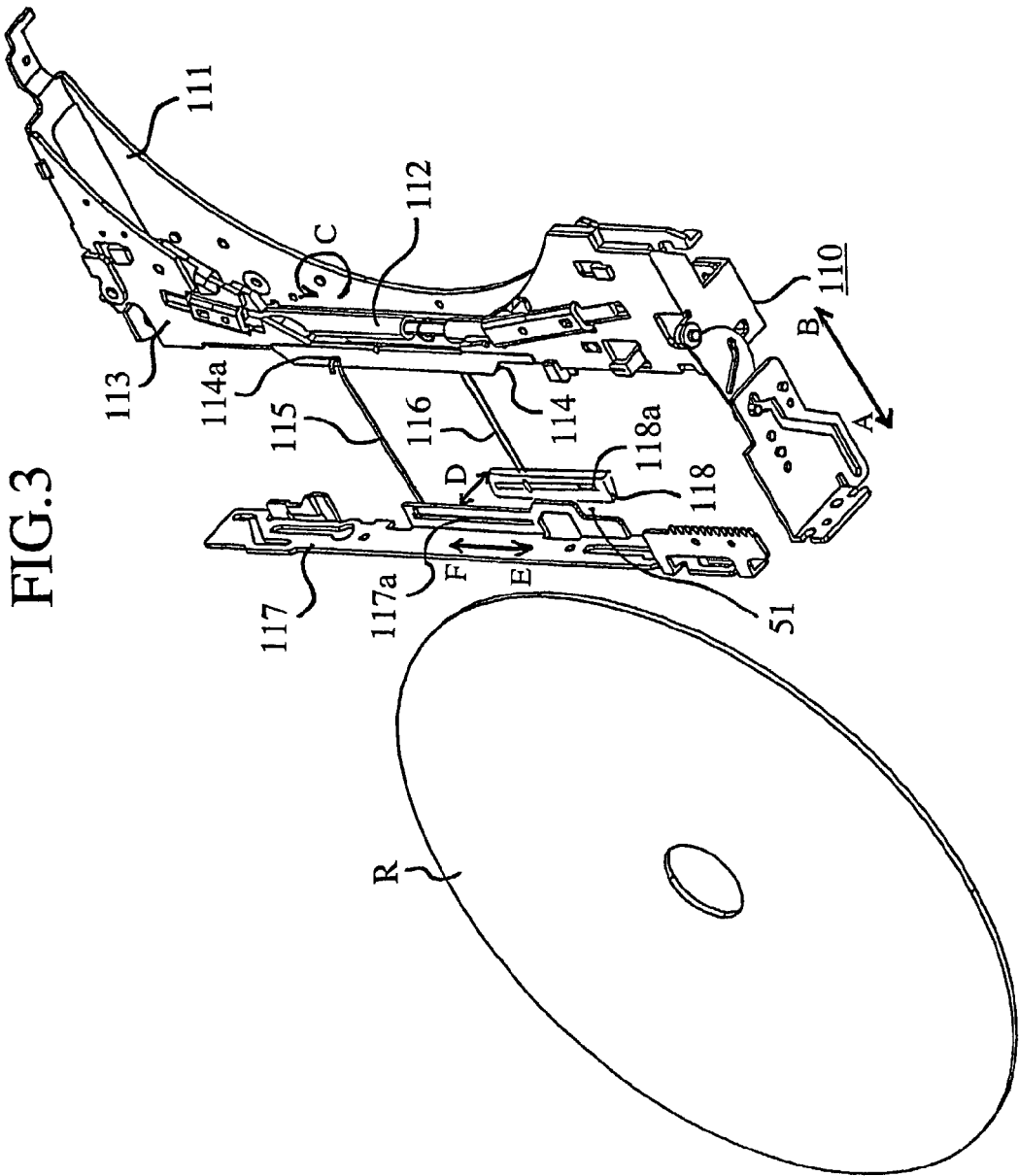
FIG. 3 is a structure diagram of a principal portion of the disk device shown in FIG. 1.
Figure 4:
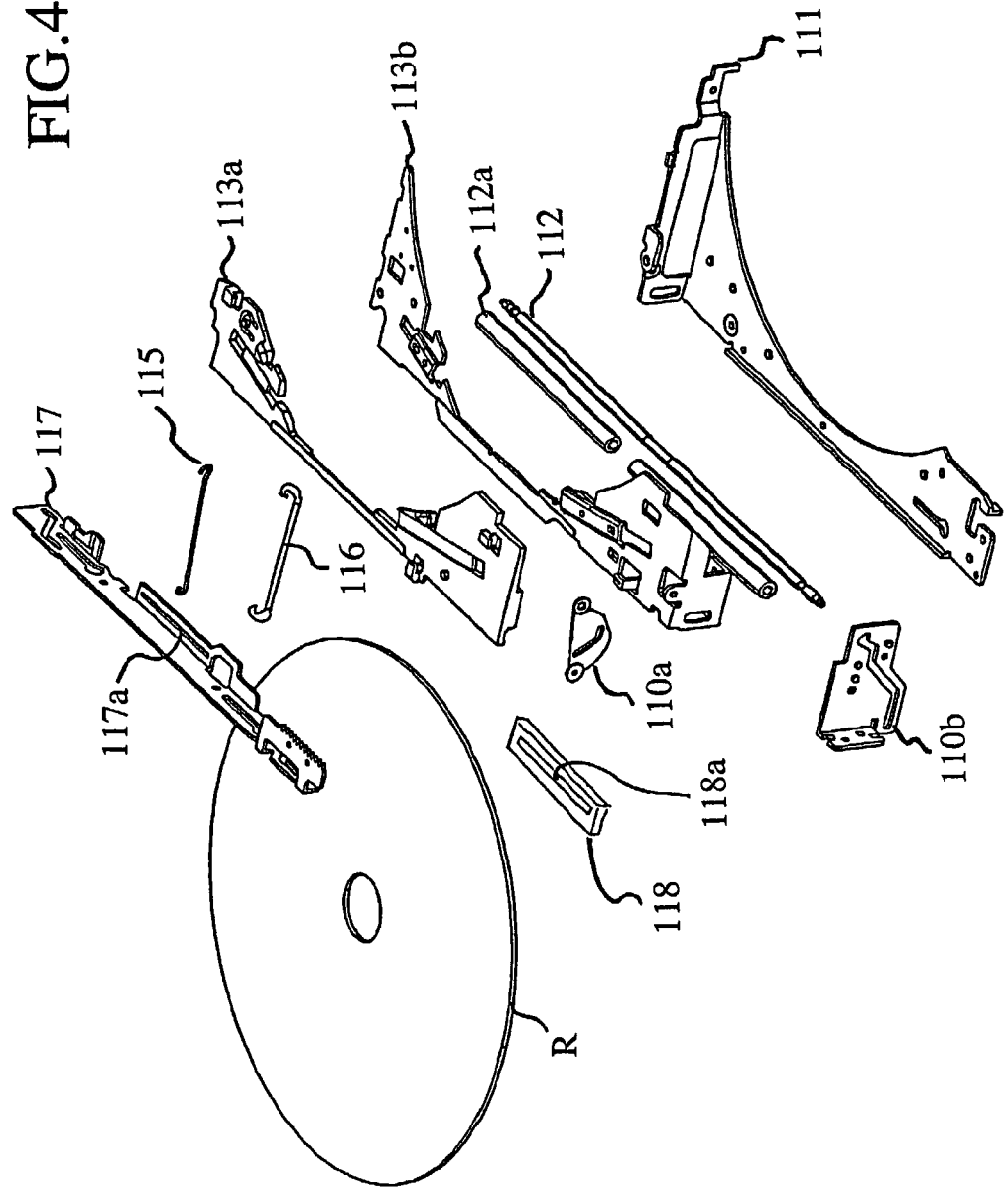
FIG. 4 is an exploded perspective view of the disk device shown in FIG. 3.
Figure 5:
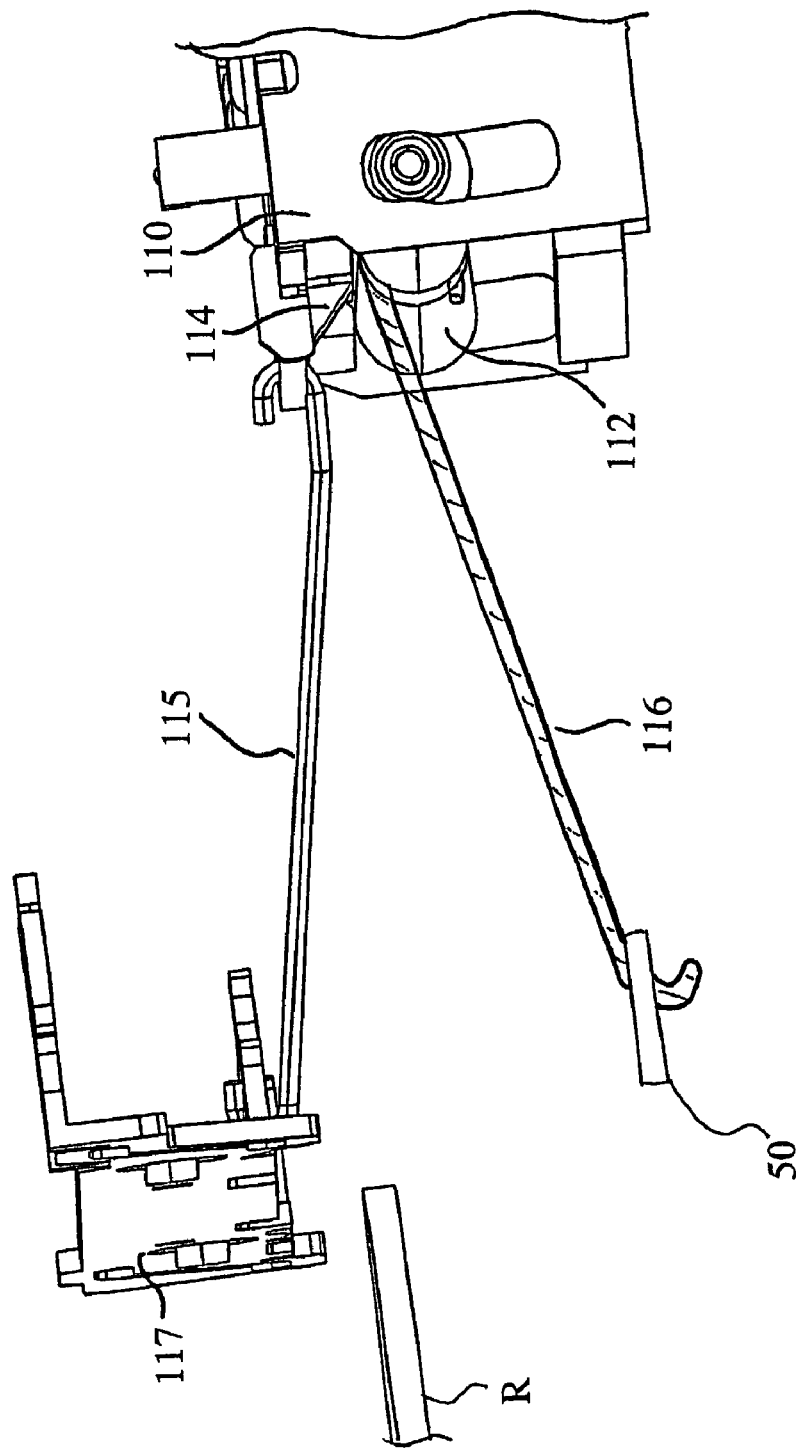
FIG. 5 is a side view of a principal portion of the disk device shown in FIG. 3.

FIG. 3 is a structure diagram of a principal portion, showing a structural relation among the first position delimiting portion, the roller portion, and the roller base portion, FIG. 4 is a developed structure diagram showing the structure of FIG. 3 in a developed form, and FIGS. 5 to 8 are sectional side views of the structure shown in FIG. 3, illustrating operating states in various operation modes.

Figure 9:
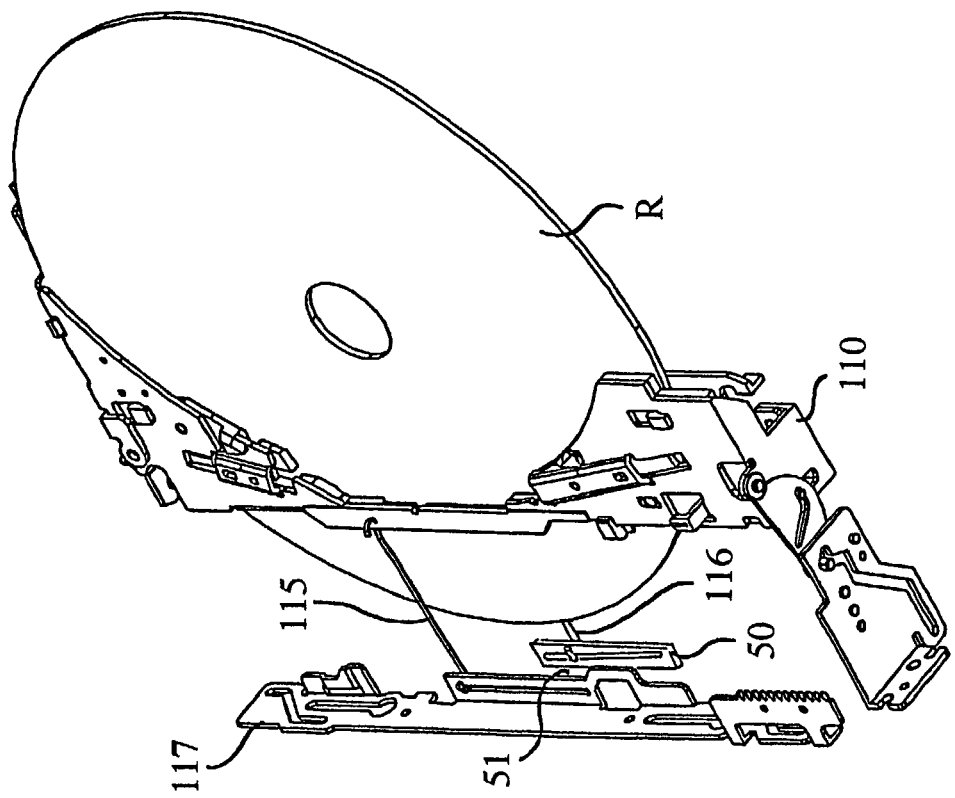
FIG. 9 is an operating state transition diagram explaining an operating state of the disk device shown in FIG. 3.
Figure 10:
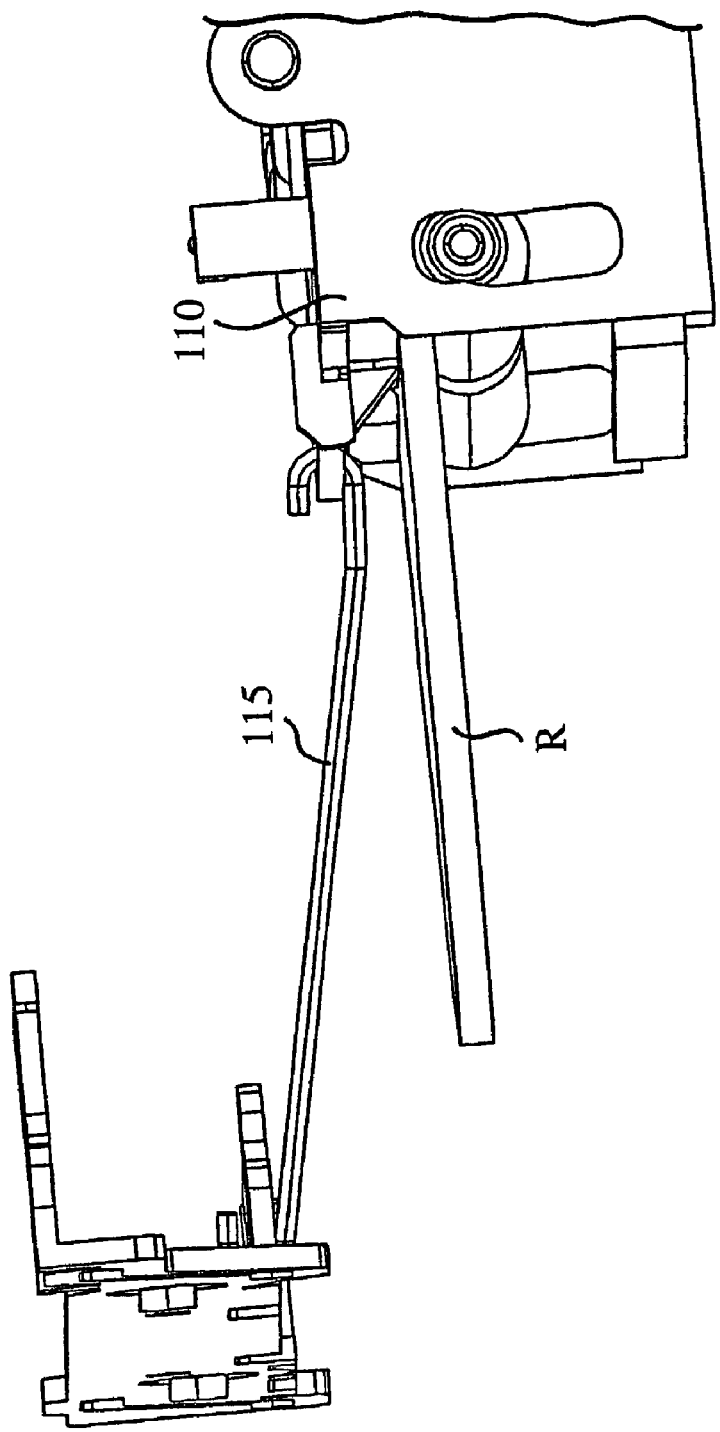
FIG. 10 is a side view of a principal portion of the disk device shown in FIG. 9.
Figure 11:
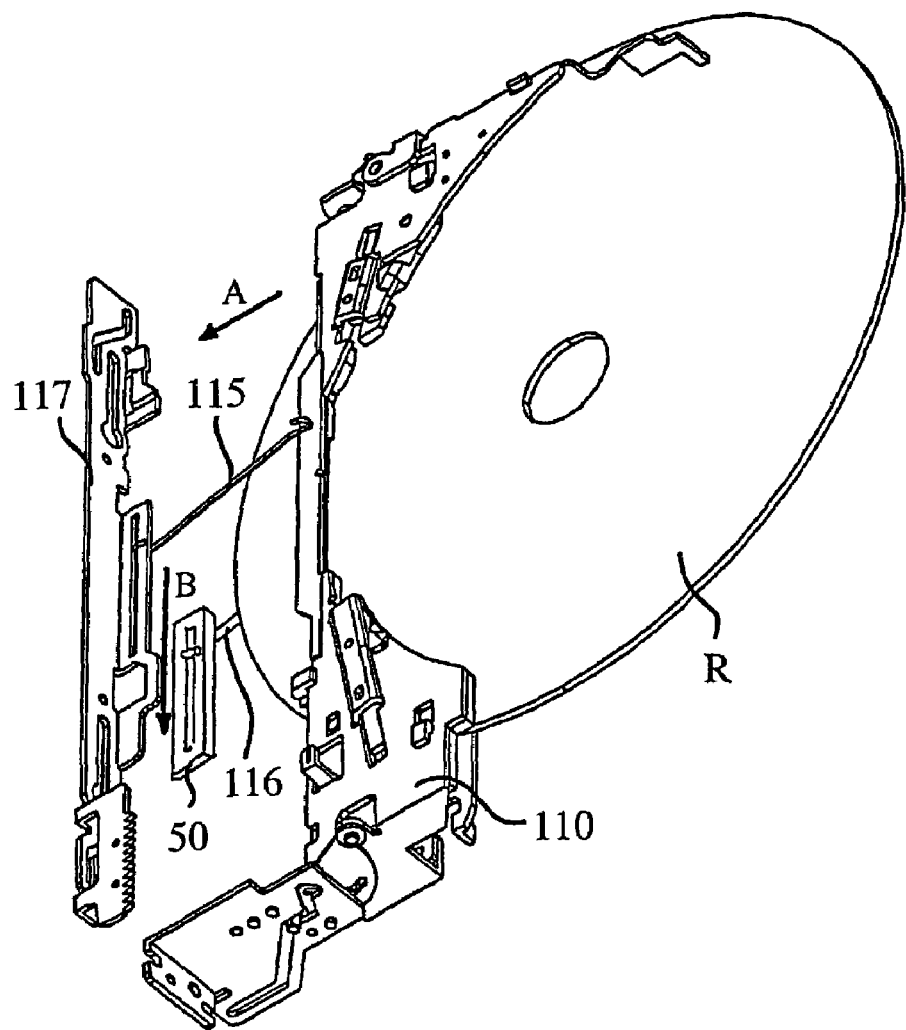
FIG. 11 is an operating state transition diagram explaining an operating state of the disk device shown in FIG. 3.
Figure 12:
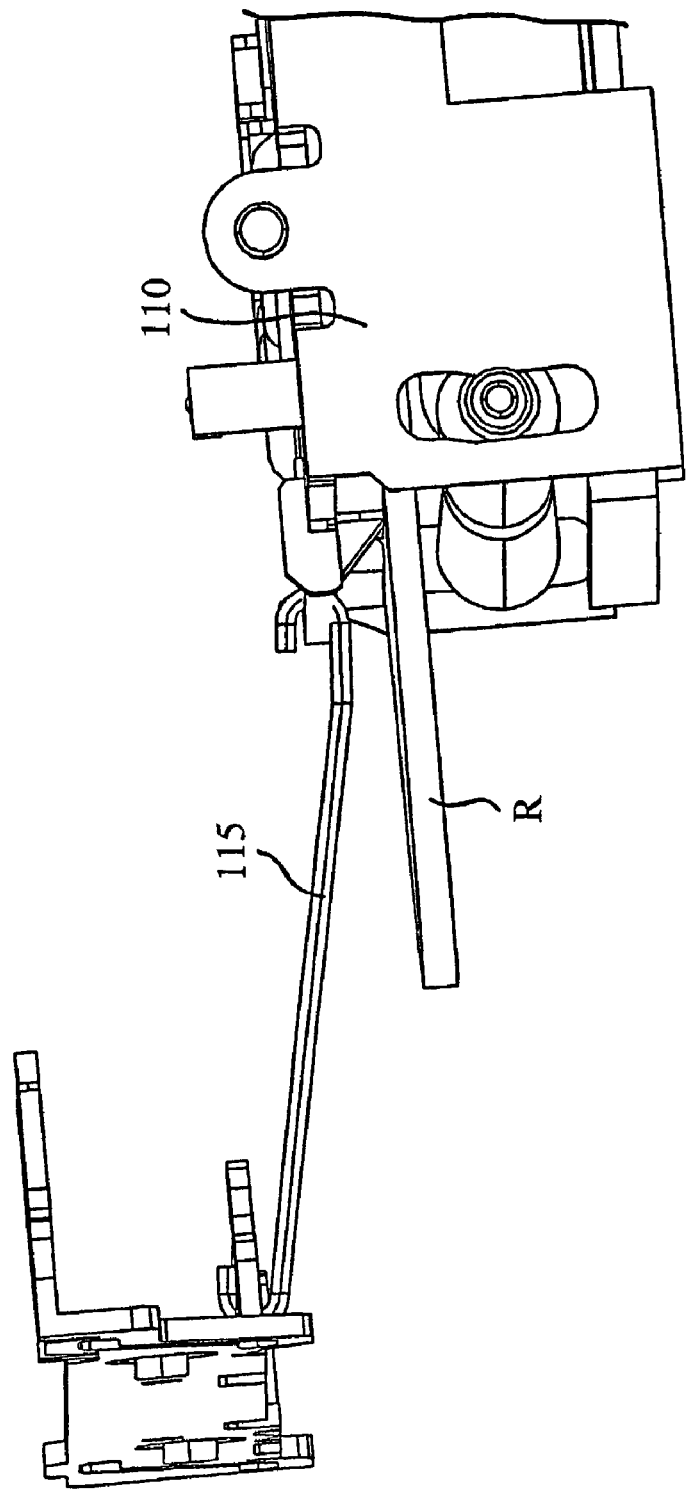
FIG. 12 is a side view of a principal portion of the disk device shown in FIG. 11.
Figure 13:
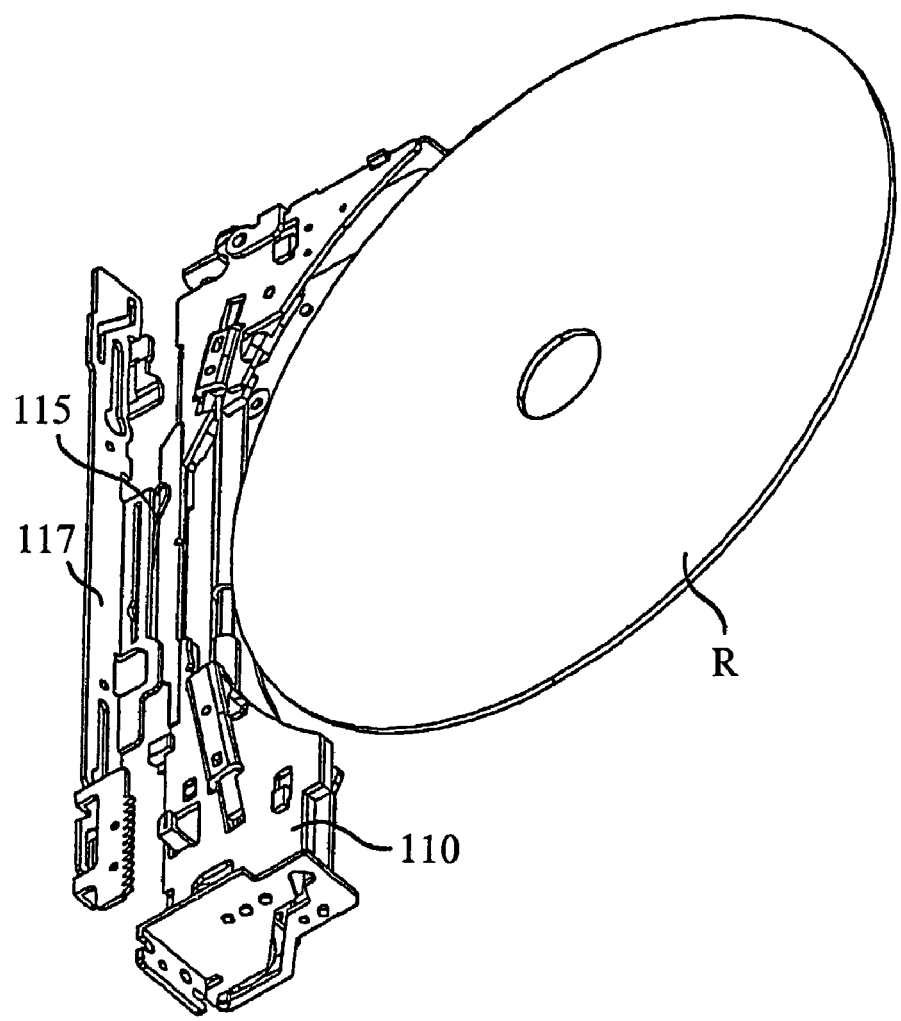
FIG. 13 is an operating state transition diagram explaining an operating state of the disk device shown in FIG. 3.
Figure 14:
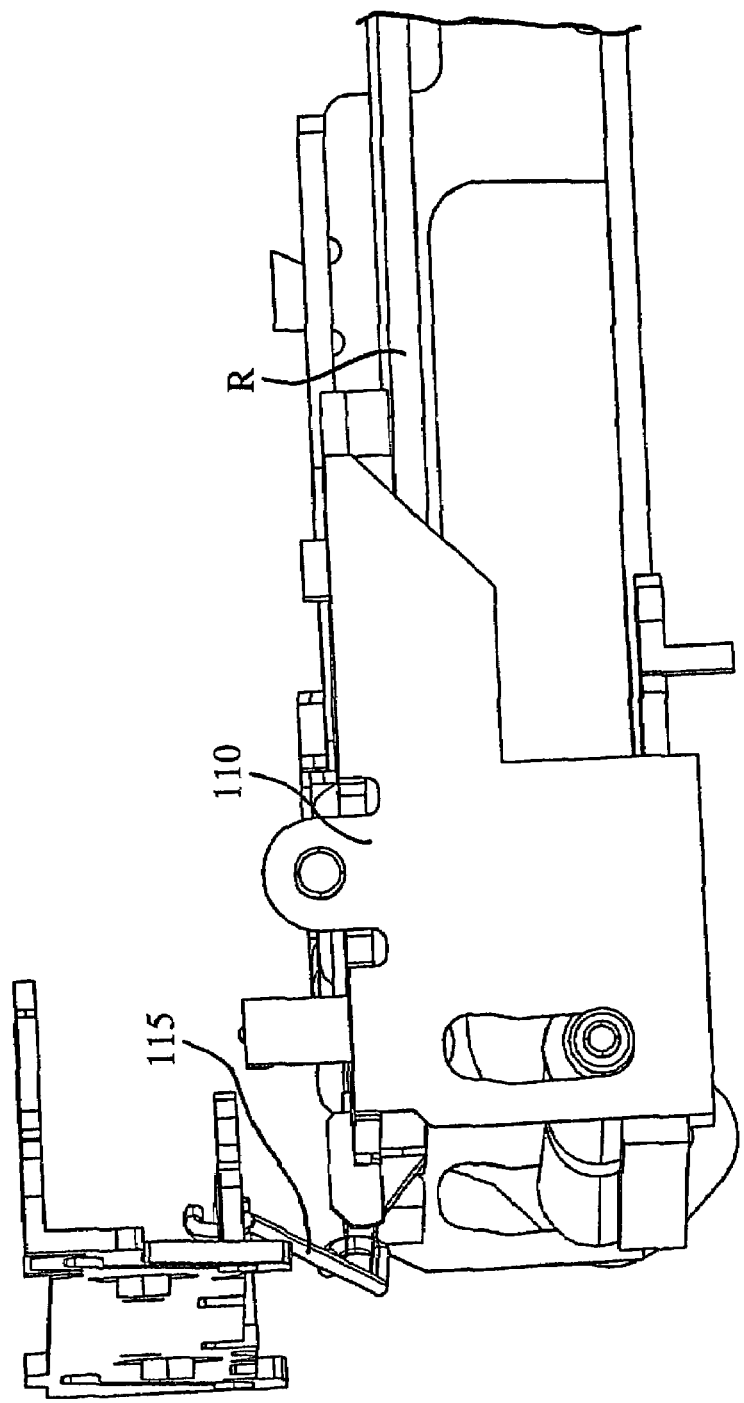
FIG. 14 is a side view of a principal portion of the disk device shown in FIG. 13.

FIG. 9 is an operating state transition diagram illustrating an operating state in an operation mode different from that shown in FIG. 3, FIG. 10 is a sectional side view of the structure shown in FIG. 9, FIG. 11 is an operating state transition diagram illustrating an operating state in an operation mode different from that shown in FIG. 3, FIG. 12 is a sectional side view of the structure shown in FIG. 11, FIG. 13 is an operating state transition diagram illustrating an operating state in an operation mode different from that shown in FIG. 3, and FIG. 14 is a sectional side view of the structure shown in FIG. 13.

A description will now be given with reference to FIGS. 3 and 4. Reference numeral 51 denotes a disk inlet having a space D and 110 denotes a roller base portion, which is structured as follows.

Reference numeral 111 denotes a lower roller base portion provided with a roller portion 112 (to be described later) which conveys a disk into and out of the disk device, 113 denotes an upper roller base portion mounted above the lower roller base portion 111 and on a center side of a disk conveyance path on which a disk is conveyed, the upper roller base portion 113 confronting the roller portion 112. The upper roller base portion 113 is provided with a disk pressing portion 114 formed by a metallic plate at a position confronting the disk inlet 51, the disk pressing portion 114 gripping the disk in cooperation with the roller portion 112.

A part of the roller portion 112 which comes into abutment against the disk surface, i.e., the outer periphery of its rotary shaft, is covered with a rubbery member so as to permit loading and unloading of a disk into and out of the interior of the disk device. The roller portion 112 is inclined so as to become smaller in diameter from both right and left outer sides toward the central side. A cutout is formed centrally of the roller portion 112 and one end of a position delimiting member is attached thereto as described later.

When a disk is to be inserted or discharged, the disk is gripped by both roller portion 112 structured as above and the disk pressing portion 114 and is conveyed by rotational movement of the roller portion 112.

At the time of insertion or discharge of a disk, the roller base portion 110 is positioned away from the disk inlet 51, i.e., on the inner side of the disk device with respect to the retracted position, so that the disk inlet 51 and the roller base portion 110 are spaced away from each other. Therefore, when a disk is inserted from the disk inlet 51, the disk conveying direction sometimes faces above or below the disk receiving position of the roller base portion 110. This is prevented by position delimiting portions, which are an upper position delimiting portion 115 for delimiting an upper height position and a lower position delimiting portion 116 for delimiting a lower height position.

One end 115a, which is hook-shaped, of the upper position delimiting portion 115 is engaged in a hole 114a formed in the disk pressing portion 114, while an opposite end 115b also formed in hook shape is slidably fitted in a groove 117a formed in a shutter portion 117. Likewise, one end 116a, which is hook-shaped, of the lower position delimiting portion 116 is engaged in a hole 112d formed in a lower position of the roller portion 112, while an opposite end 116b also formed in hook shape is slidably fitted in a groove 118a of a slide portion 118 provided on the housing 50 below the disk inlet.

The shutter 117, which is provided in the disk inlet, closes the disk inlet to prevent the entry of disk into the disk device during reproduction of the disk and opens the disk inlet to permit the entry of the disk into the disk device at the time of disk insertion.

Figure 6:
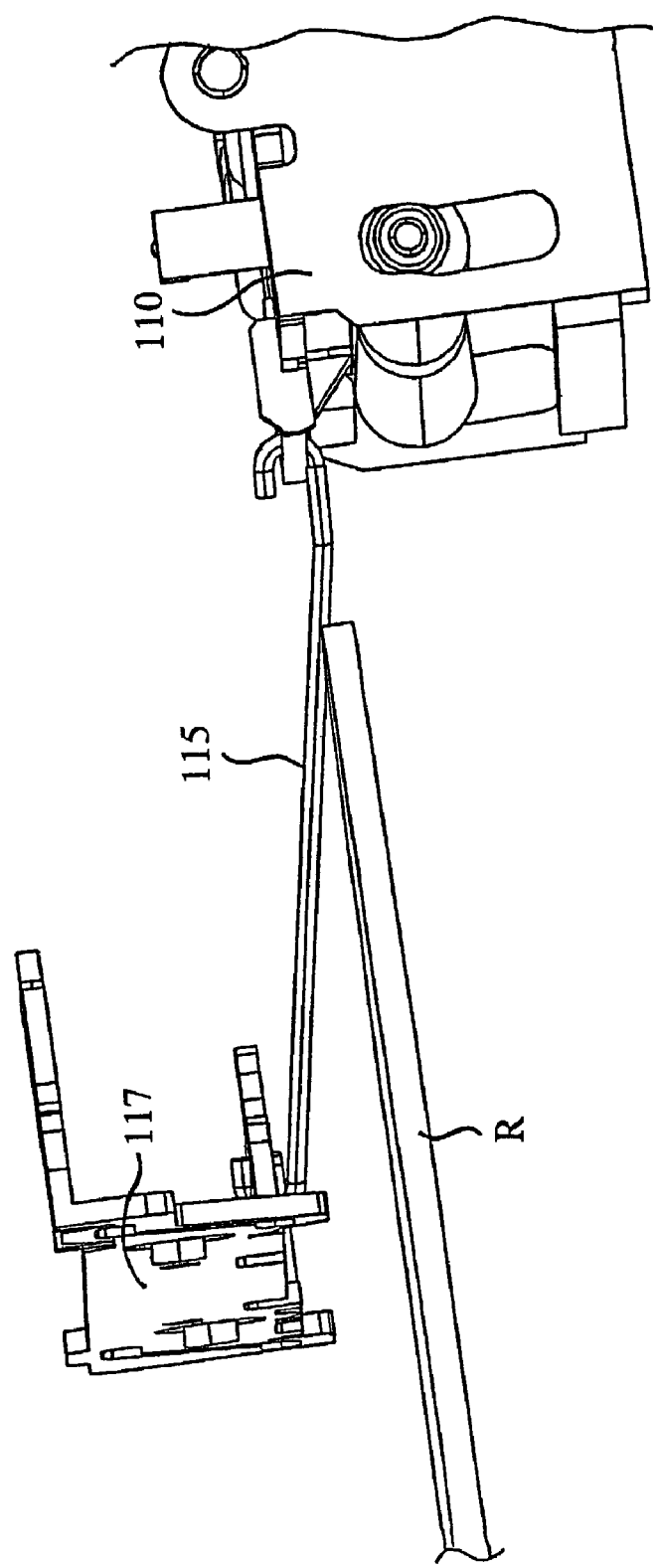
FIG. 6 is a side view explaining an operating state of the disk device shown in FIG. 3.
Figure 7:
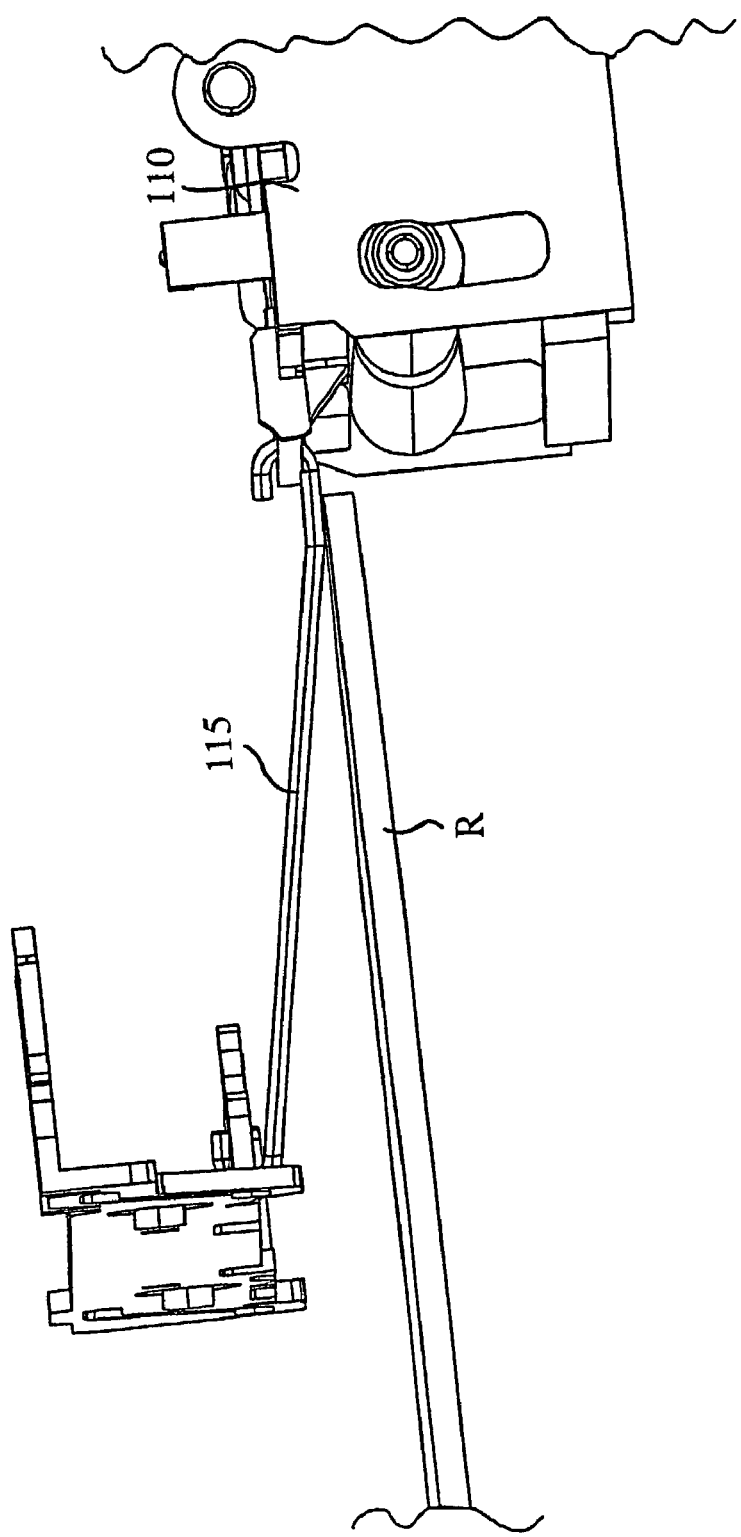
FIG. 7 is a side view explaining an operating state of the disk device shown in FIG. 3.
Figure 8:
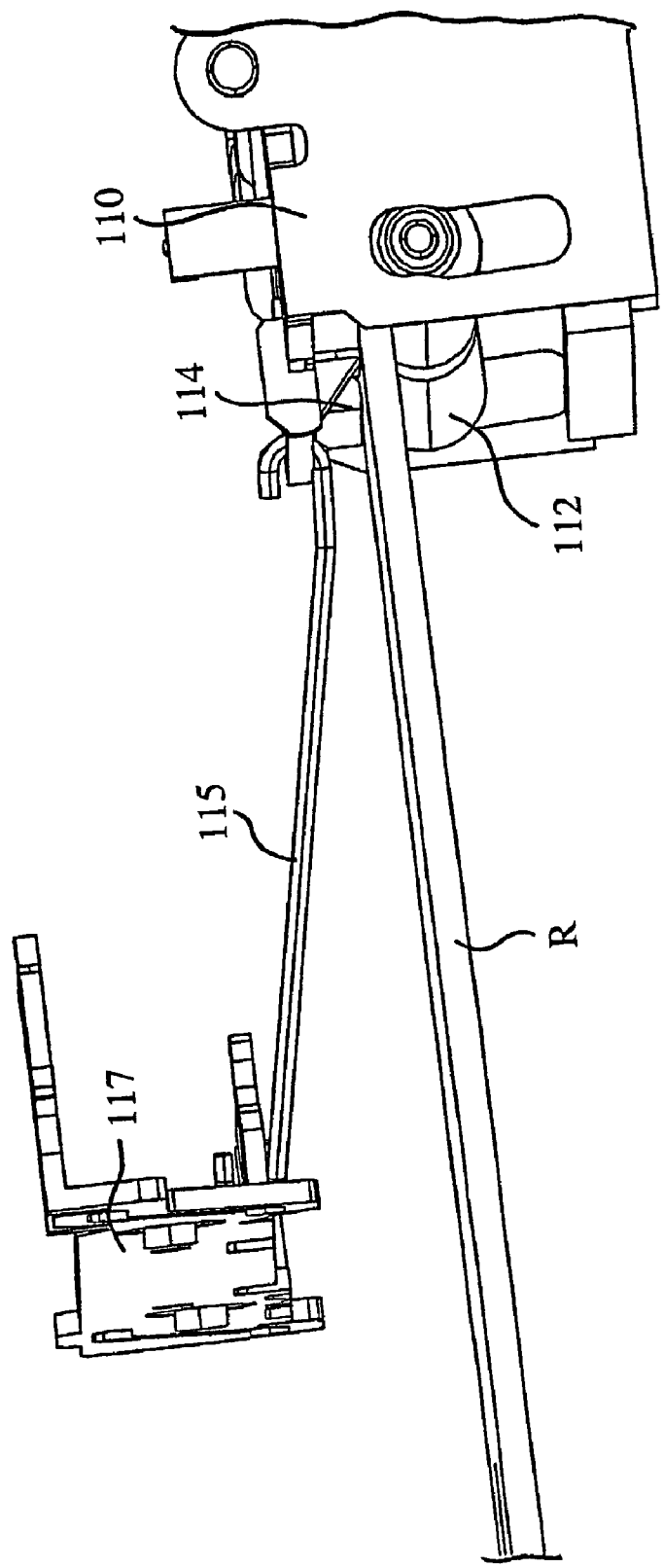
FIG. 8 is a side view explaining an operating state of the disk device shown in FIG. 3.

The upper position delimiting portions 115 and lower position delimiting portions 116 are each inclined so that the spacing between the two is shorter on the roller base side D2 than on the disk inlet side D1. With this arrangement, if a disk moves upward when inserted, it comes into abutment against the upper position delimiting portion 115 as shown in FIG. 6, which in turn the upper position delimiting portion 115 guides the disk so as to convey the disk to a predetermined position in the roller base portion 110 as shown in FIGS. 7 and 8. On the other hand, if the disk moves downward, it comes into abutment against the lower position delimiting portion 116, which in turn guides the disk for conveyance to a predetermined position in the roller base portion 110.

FIG. 10 shows a state in which the guide by the position delimiting portions is over and the disk has been conveyed (loaded) by the roller portion 112.

Further, as shown in FIG. 11, when the conveyance of the disk up to a disk reproducing position or a disk changing position, which are predetermined disk positions, is over, the roller base portion 110 moves in the direction shown by A up to its position shown in FIG. 13 because it is an obstacle to the disk reproducing or changing operation. At this time, with the hole 114a of the disk pressing portion 114 as fulcrum, the opposite end 115b of the upper position delimiting portion 115 slides in direction E through the groove 117a formed in the shutter portion 117 and likewise the opposite end 116b of the lower position delimiting portion 116 slides in the same direction through the groove 118a formed in the slide portion 118, so that the disk inlet and the roller base portion approach each other. In this case, the ends of both upper and lower position delimiting portions 115 and 116 come into abutment against end portions in the direction of E, of the grooves while sliding through the grooves to complete the movement of the roller base portion.

A description will now be given about the operation. First, in the state shown in FIG. 3, that is, in the state before disk insertion, the disk inlet and the roller base portion 110 are in such a positional relation as to afford a predetermined gap L. From this state, as shown in FIG. 9, the disk leaves the disk inlet 51 and is conveyed by only the roller base portion. In this state, the positional relation between the disk inlet and the roller base portion 110 remains the same as in FIG. 3.

Next, as the disk is conveyed into the interior of the disk device, the moving mechanism in the roller base portion 110 operates, so that, as shown in FIG. 11, the roller base portion moves in the direction of A and is allowed to begin retracting on the disk inlet side.

Further, as shown in FIG. 13, the roller base portion 110 moves in the direction of A up to a position adjacent to the disk inlet.

At this time, as shown in FIG. 13, with the hole 114a of the disk pressing portion 114 as fulcrum, the opposite end 115b of the upper position delimiting portion 115 slides in the direction of E through the groove 117a formed in the shutter portion 117 and likewise the opposite end 116b of the lower position delimiting portion 116 slides in the same direction through the groove 118a, so that the disk inlet and the roller base portion approach each other. Now, a series of operations is completed.

<Second Position Delimiting Portion and Link Portion>

Figure 15:
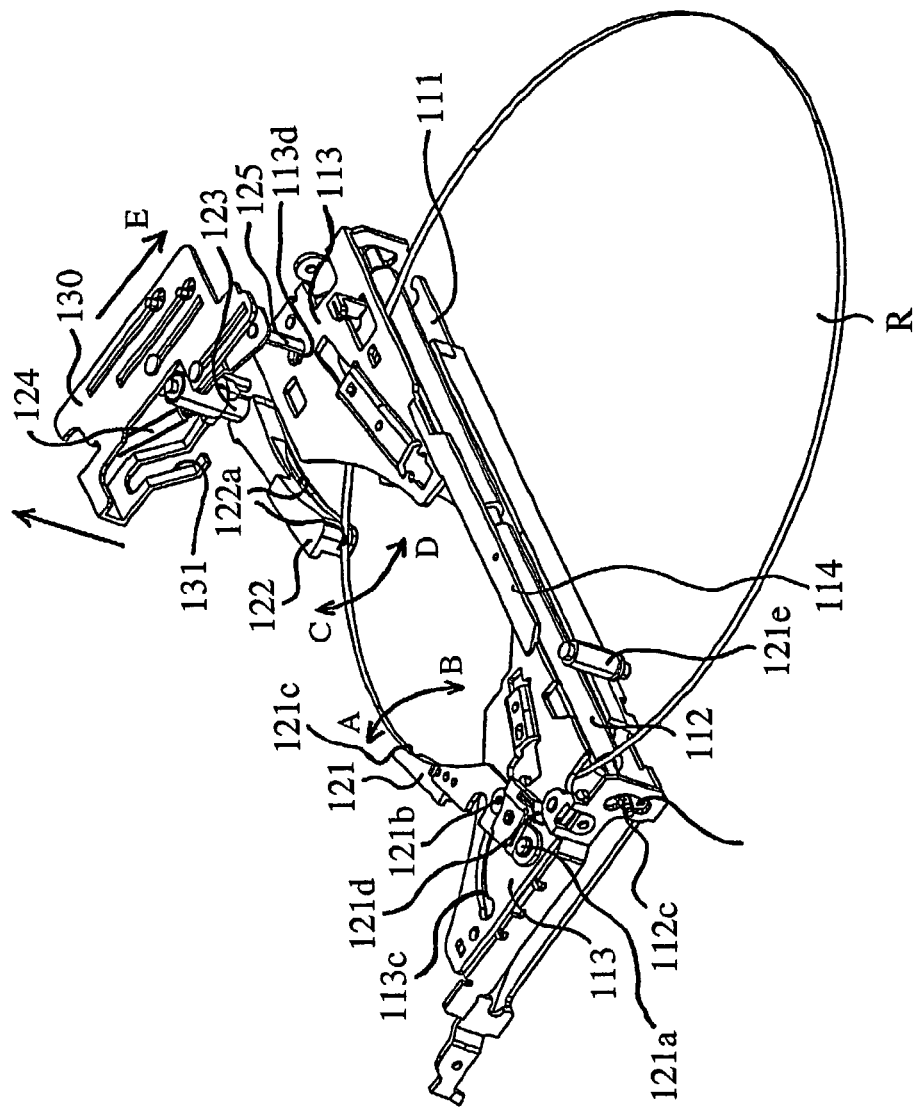
FIG. 15 is a structure diagram of a principal portion of the disk device shown in FIG. 1.
Figure 16:
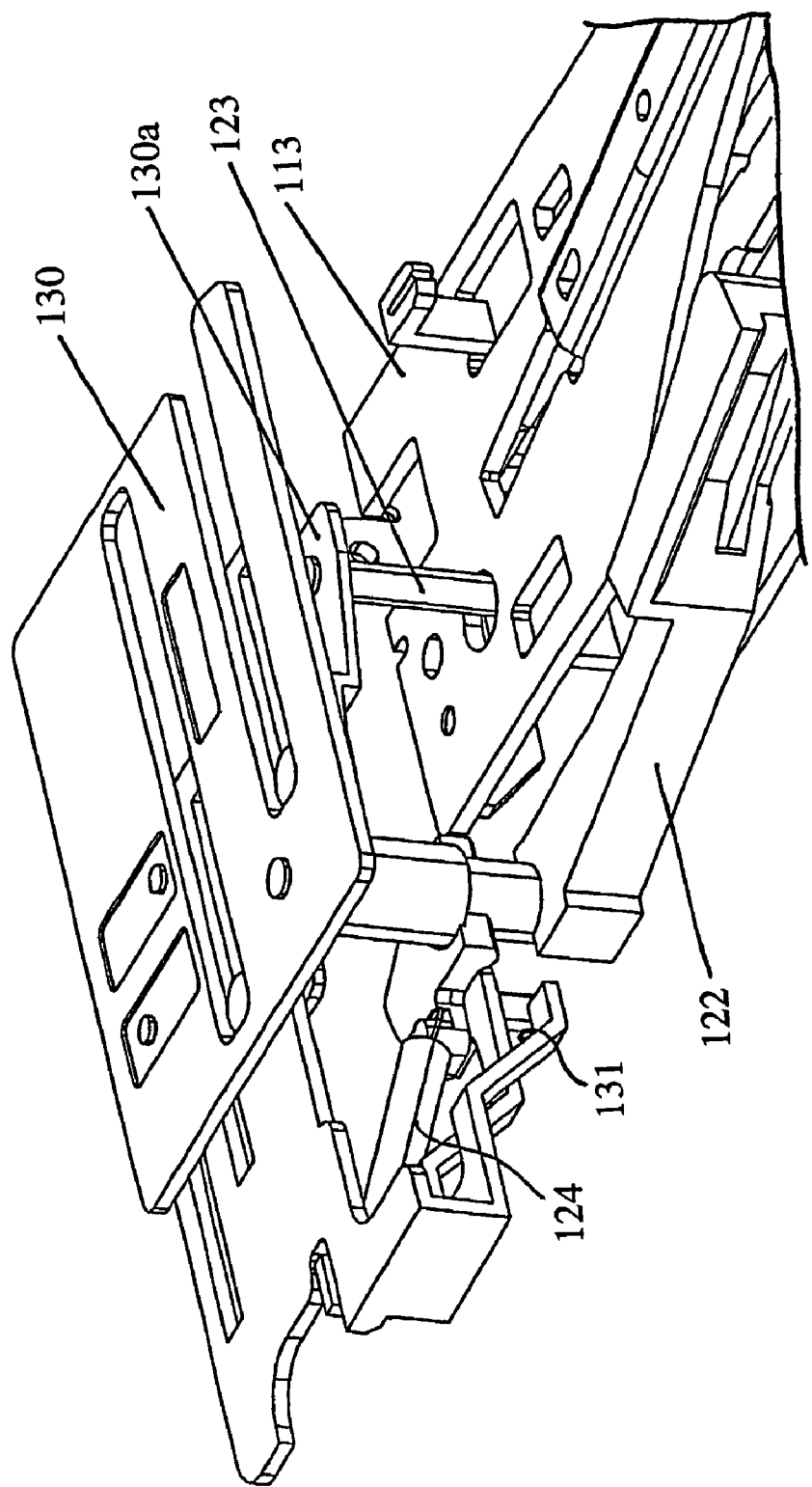
FIG. 16 is a detailed diagram of a principal portion of the disk device shown in FIG. 15.
Figure 17:
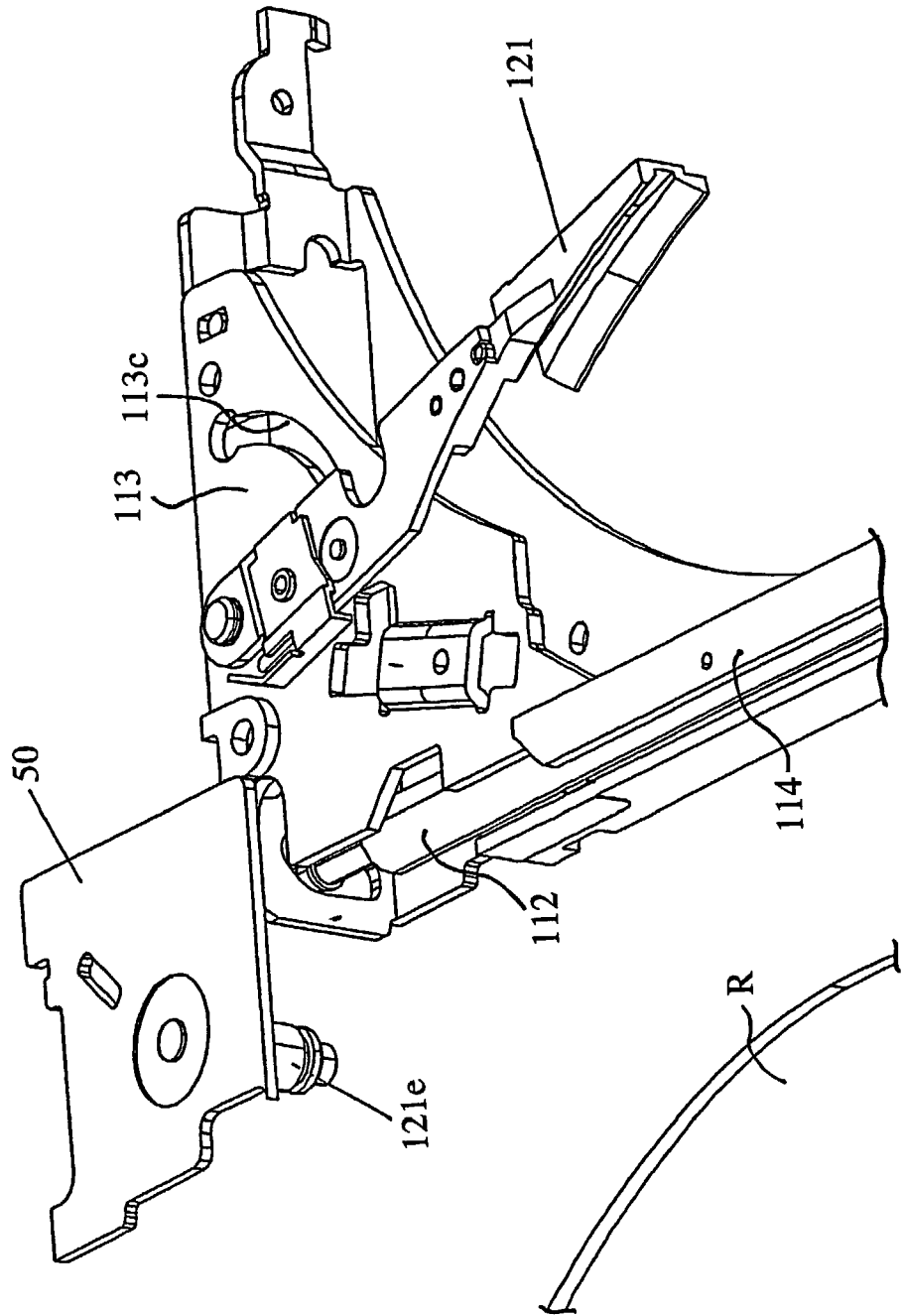
FIG. 17 is a detailed diagram of a principal portion of the disk device shown in FIG. 15.

FIG. 15 is a structure diagram showing a structural relation among the second position delimiting portion, the roller portion, the roller base portion, and the height adjusting portion.

In FIG. 15, reference numeral 113c denotes a groove formed arcuately in the upper roller base portion, and s 121 and 122 denote holding arms as disk holding portions formed with grooves respectively, the grooves serving to hold a part of a peripheral edge portion of a disk R inserted from the disk inlet.

The arm 121 is a left arm. On the backside of the left arm 121 is formed a pin 121b. The left arm 121 is rotatable in the direction of A or B about a fulcrum 121a while a projecting portion of the pin 121b is slidably fitted in and guided by the groove 113c.

The arm 122 is a right arm, which is rotatable in the direction of C or D through a pivot shaft 123 attached to a height delimiting portion 130 which will be described later.

The height delimiting portion 130, which delimits the height of the right arm 122, moves in the direction of E in accordance with a conveyance position of the disk and in interlock with the operation of a link portion (not shown). Then, the pivot shaft 123 of the right arm 122 comes into abutment against the inside of an inclined portion 131 to be described later and is guided thereby, causing the height of the right arm 122 to shift in the direction of F. Upon arrival of the pivot shaft 123 at an upper position of the inclined portion 131, a projecting portion (not shown) formed on the pivot shaft 123 abuts the height delimiting portion 130 and turns in the longitudinal direction of the height delimiting portion 130.

Reference numeral 113d denotes a hole formed in the upper roller base portion 113 and reference numeral 125 denotes a projecting portion projecting from the height delimiting portion 130, the projecting portion 125 being loosely fitted in the hole 113d.

Reference numeral 131 denotes an inclined portion. When the pivot shaft 123 of the right arm 122 is not in abutment against the inclined portion 131, the right arm 122 is positioned as shown in FIG. 3 by an urging portion connected to both the pivot shaft 123 and the height delimiting portion 130 so that the right arm can hold the disk. As the height delimiting portion 130 moves in the direction of E, the pivot shaft 123 begins to abut the inclined portion 131, and with further movement in the direction of E, of the height delimiting portion 130, the pivot shaft 123 lifts the right arm 122.

Figure 18:
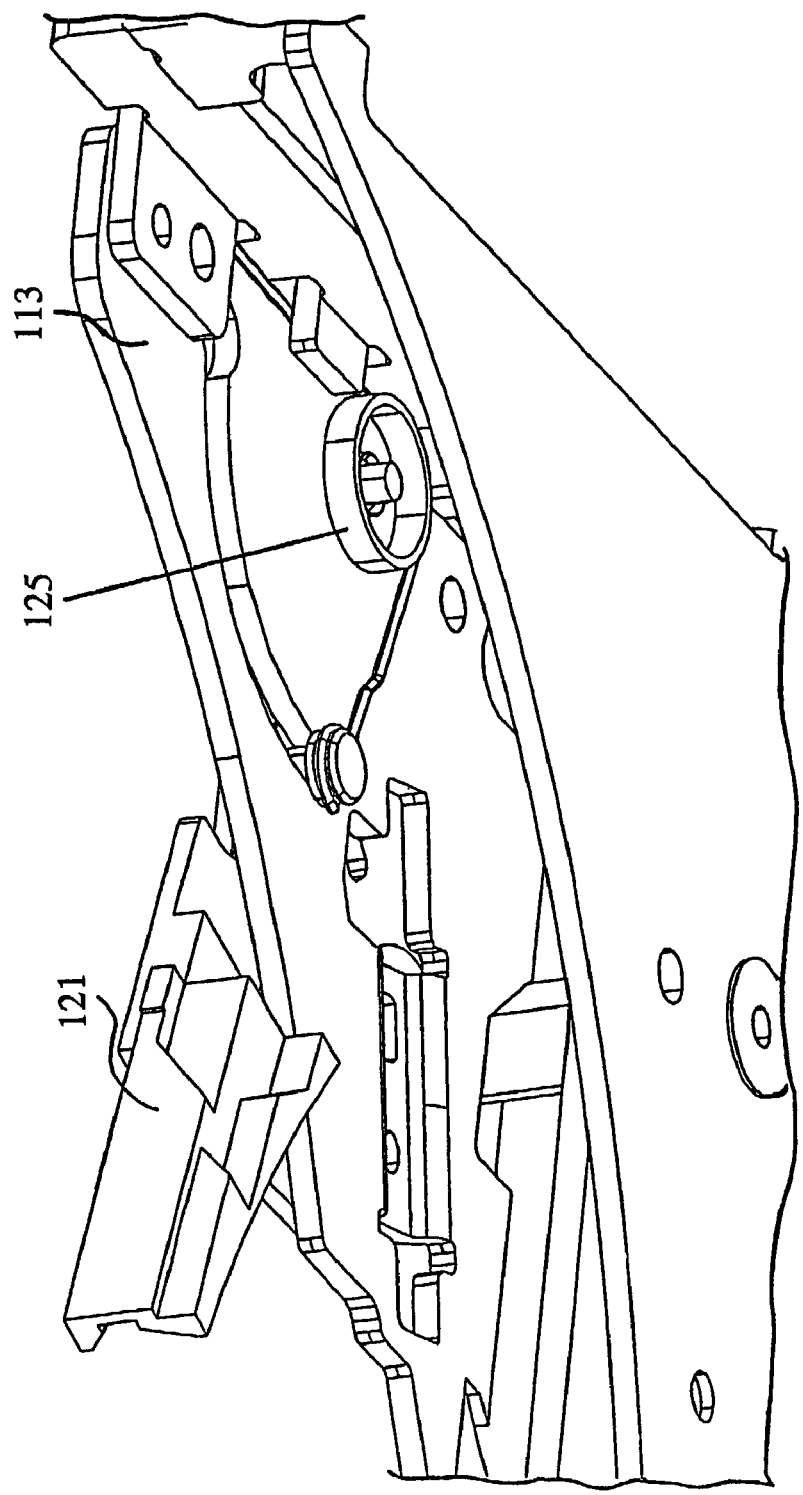
FIG. 18 is a detailed diagram of a principal portion of the disk device shown in FIG. 15.
Figure 19:
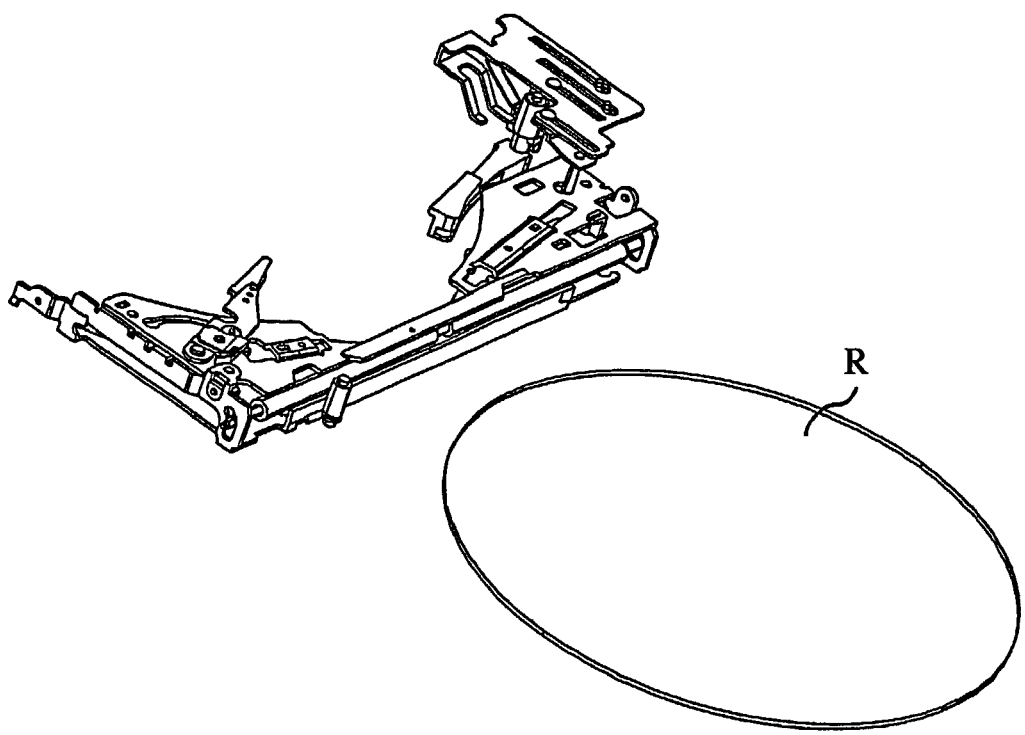
FIG. 19 is an operating state transition diagram explaining an operating state of the disk device shown in FIG. 15.

The operation will now be described. When a disk not inserted, the disk device is assumed in such a state as shown in FIG. 19. At this time, the right arm 122 is urged in the direction of D by an urging means 124, while the left arm 121 is urged on its back side in the direction of B by an urging means 125, as shown in FIG. 18. Therefore, when a disk has been conveyed from the roller arm portion 110 and is not in abutment against the left arm 121 and right arm 122, it stands by at its position shown in FIG. 19.

Figure 20:
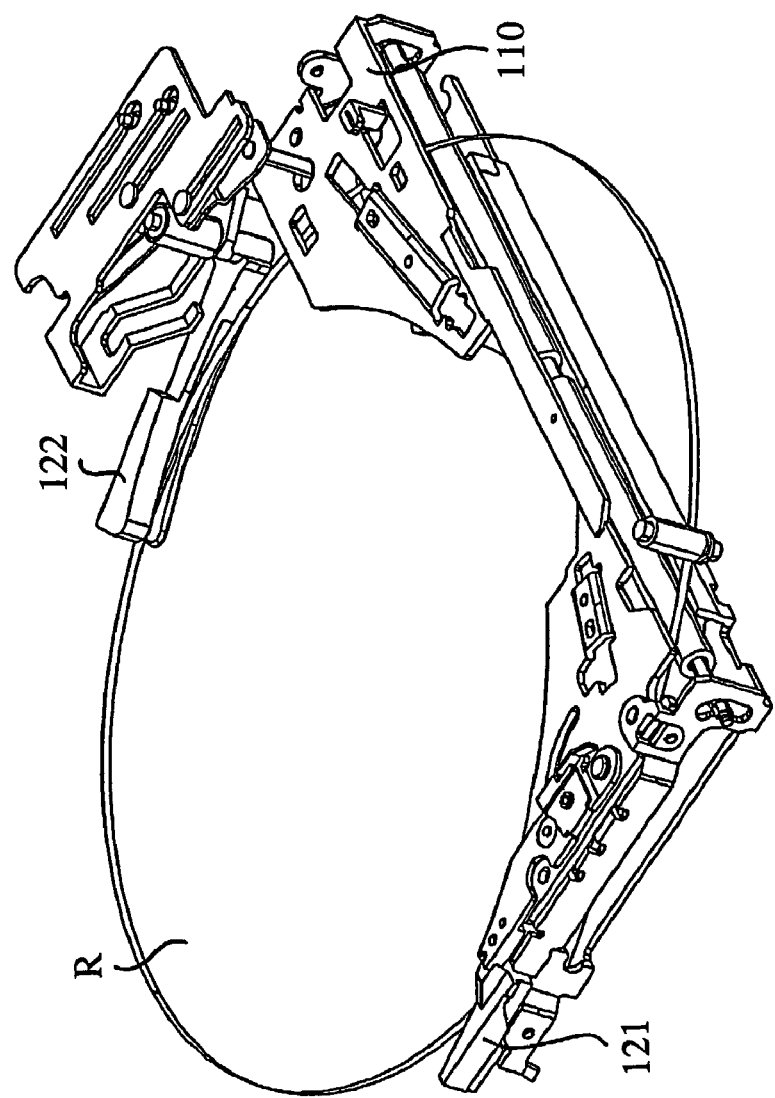
FIG. 20 is an operating state transition diagram explaining an operating state of the disk device shown in FIG. 15.

Next, when the disk is conveyed by the roller portion 112 and its peripheral edge portion comes into abutment against the left arm 121 and right arm 122, the disk is assumed in such a state as shown in FIG. 15. Upon further conveyance of the disk to the inner part of the disk device, there is obtained such a state as shown in FIG. 20, in which the peripheral edge portion of the disk is held by both left and right arms 121 and 122. Then, upon arrival of the disk at a predetermined position, the roller base portion 110 begins to move in the direction of A, so that the projecting portion 125, which is loosely fitted in the hole 113d formed on the upper roller base portion 113, switches from its abutment against the peripheral edge portion of the hole 113d on the disk inlet side to its abutment against the inner side of the disk device, that is, the protrusion 125 is interlocked with the movement in direction A of the roller base portion 110, so that the roller base portion 110 moves to the disk inlet side and further moves into the state shown in FIG. 22.

Figure 23:
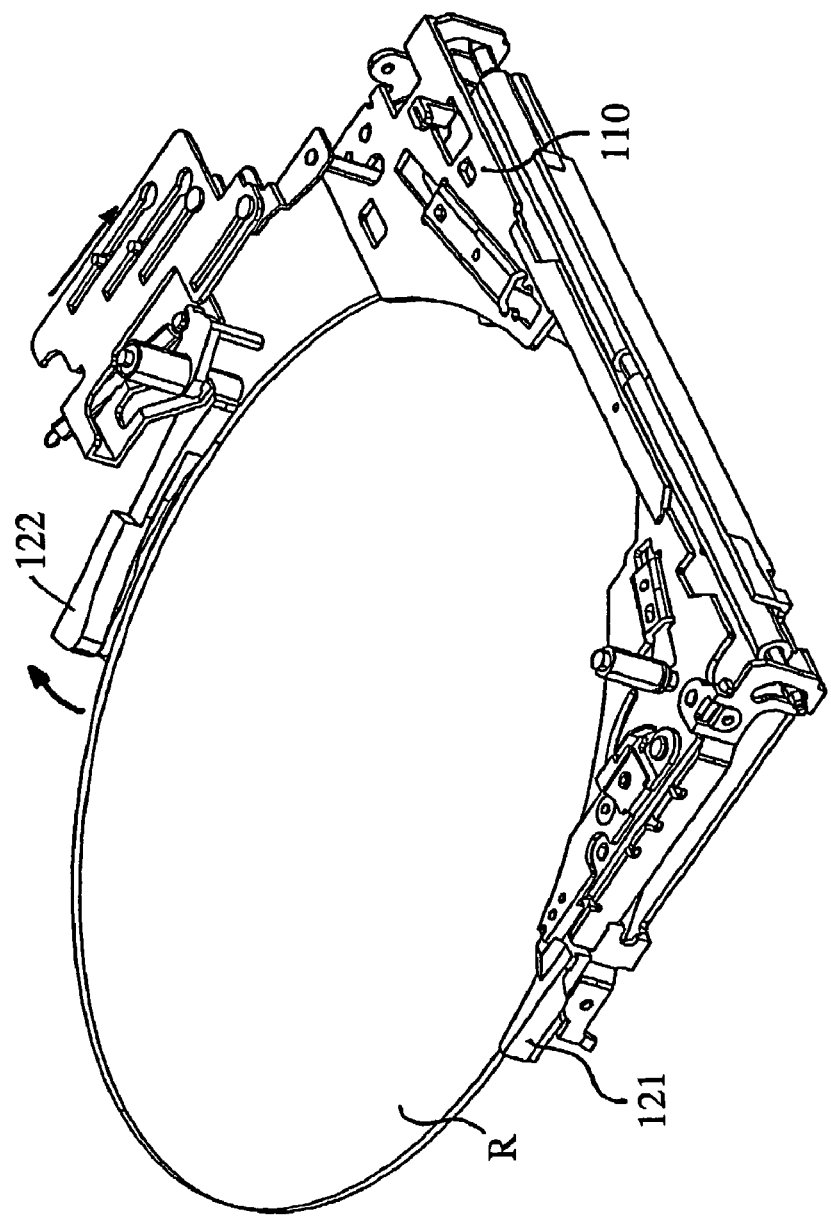
FIG. 23 is an operating state transition diagram explaining an operating state of the disk device shown in FIG. 15.
Figure 24:
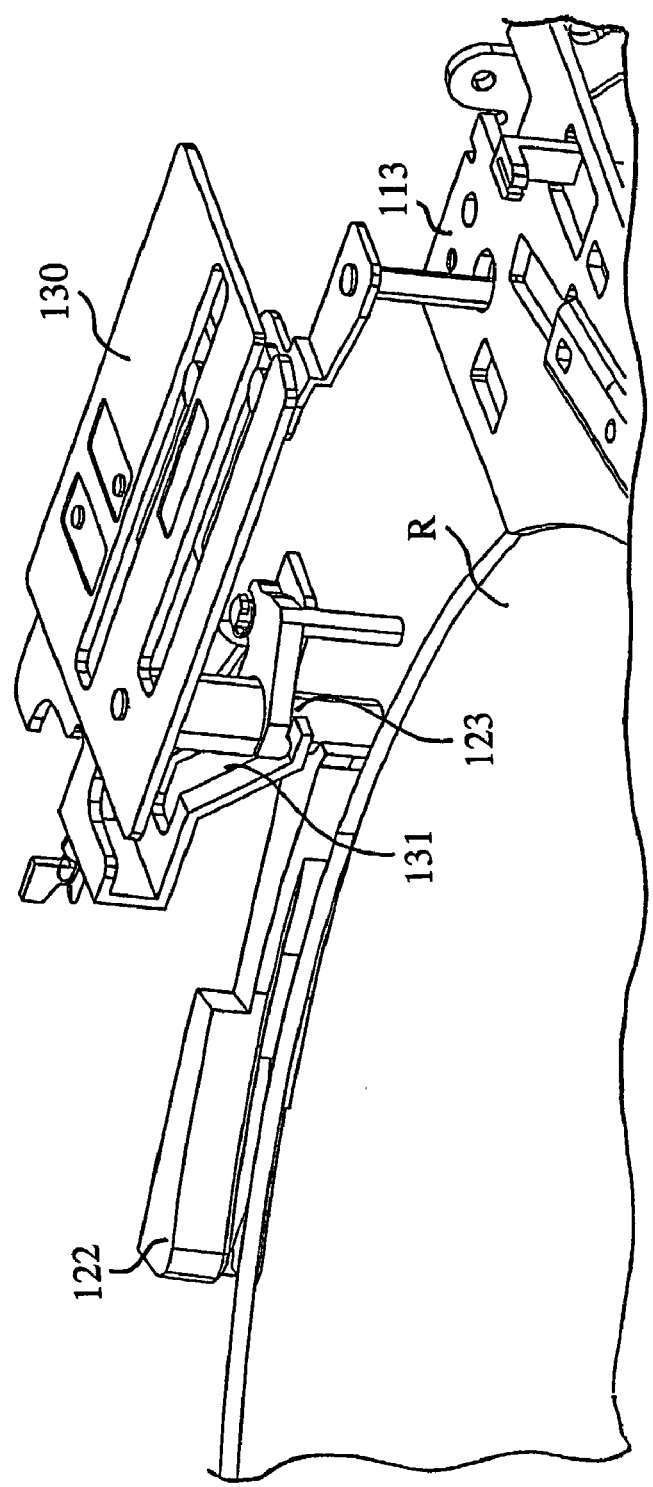
FIG. 24 is a detailed diagram of a principal portion of the disk device shown in FIG. 23.
Figure 25:
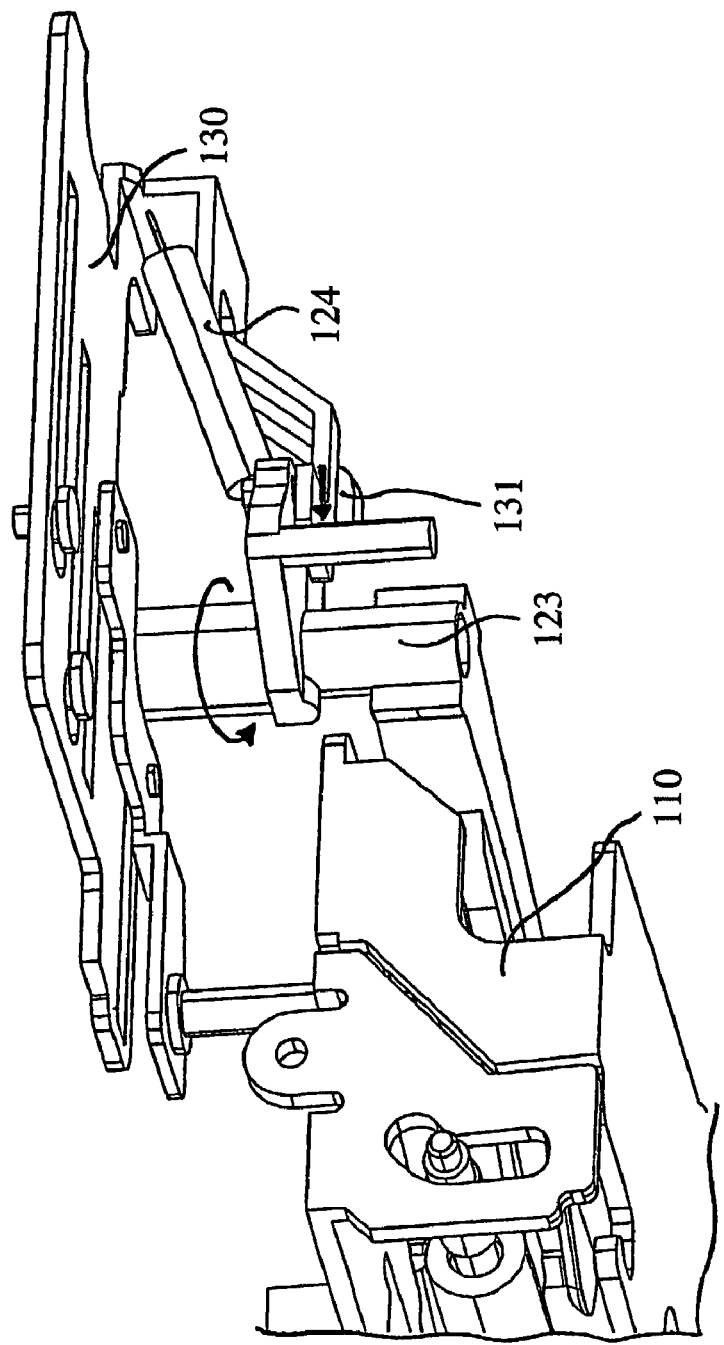
FIG. 25 is a detailed diagram of a principal portion of the disk device shown in FIG. 23.

Upon further movement of the roller base portion 110 in the direction of A, a concave portion 123a of the pivot shaft 123 on the right arm 122 comes into abutment against the inclined portion 131 of the height delimiting portion 130, as shown in FIG. 23. Upon this abutment, as shown in FIGS. 24 and 25, a projecting portion 130a formed on a part of the height delimiting portion 130 abuts against and pushes the pin 123b which is in abutment against a part of the pivot shaft 123 of the right arm 122, so that the pin 123b turns in direction A shown in FIG. 25 and the right arm 122 turns in the direction of C in FIG. 15 to release the disk from its holding state.

Figure 26:
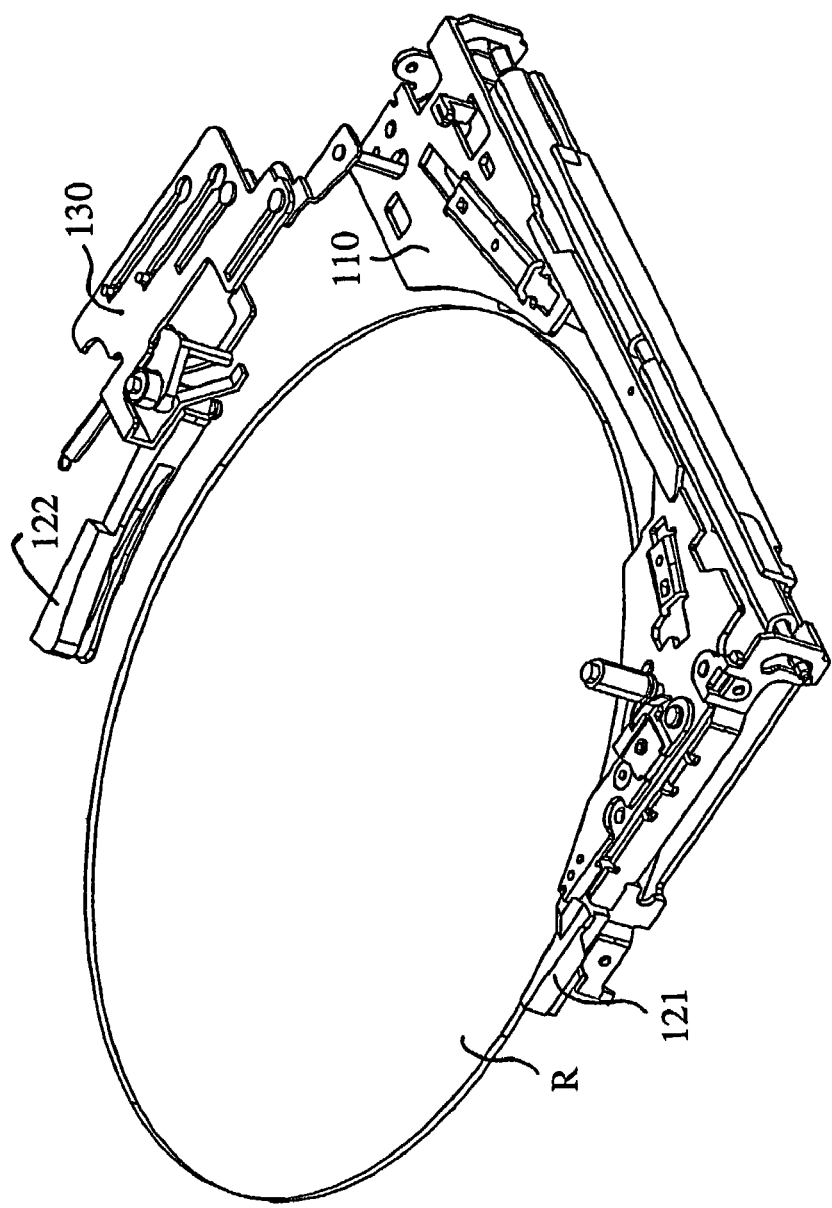
FIG. 26 is an operating state transition diagram explaining an operating state of the disk device shown in FIG. 15.
Figure 27:
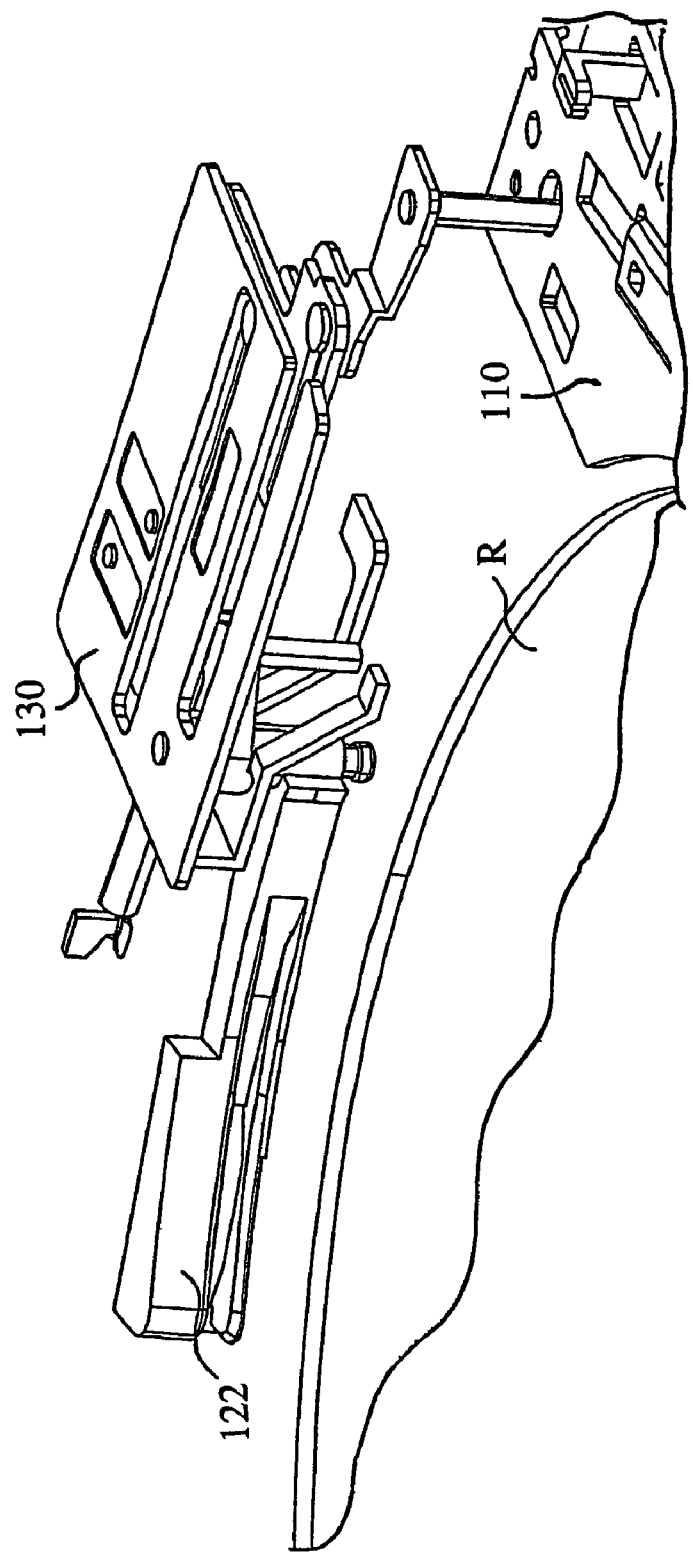
FIG. 27 is a detailed diagram of a principal portion of the disk device shown in FIG. 26.

Further, as the roller base portion 110 moves in the direction of A, as shown in FIGS. 26 and 27, the concave portion 123a of the pivot shaft 123 on the right arm 122 rises along the inclined portion 131 of the height delimiting portion 130. Thus, the right arm 122 also changes its height while releasing the disk from the holding state.

In this way the loading of the disk is completed, it becomes ready for disk reproducing or replacing operation.

Figure 28:
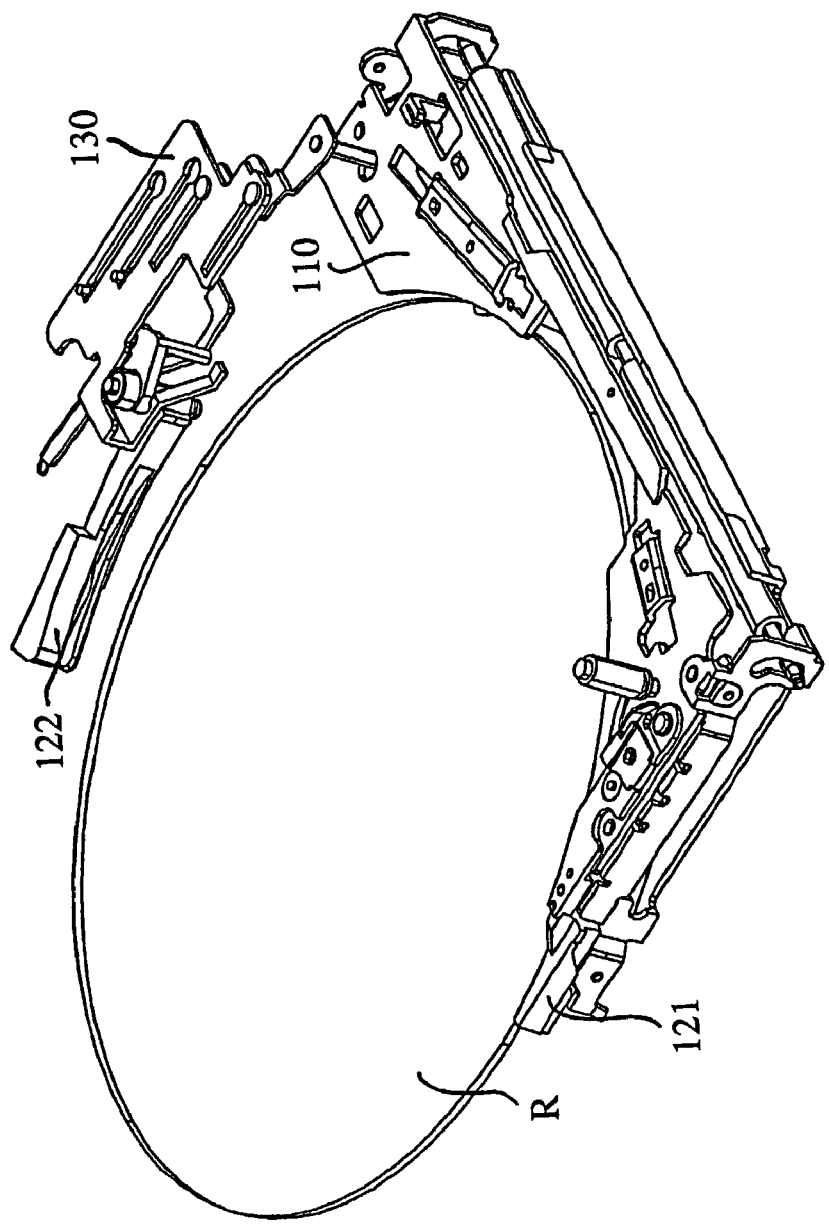
FIG. 28 is an operating state transition diagram explaining an operating state of the disk device shown in FIG. 15.
Figure 29:
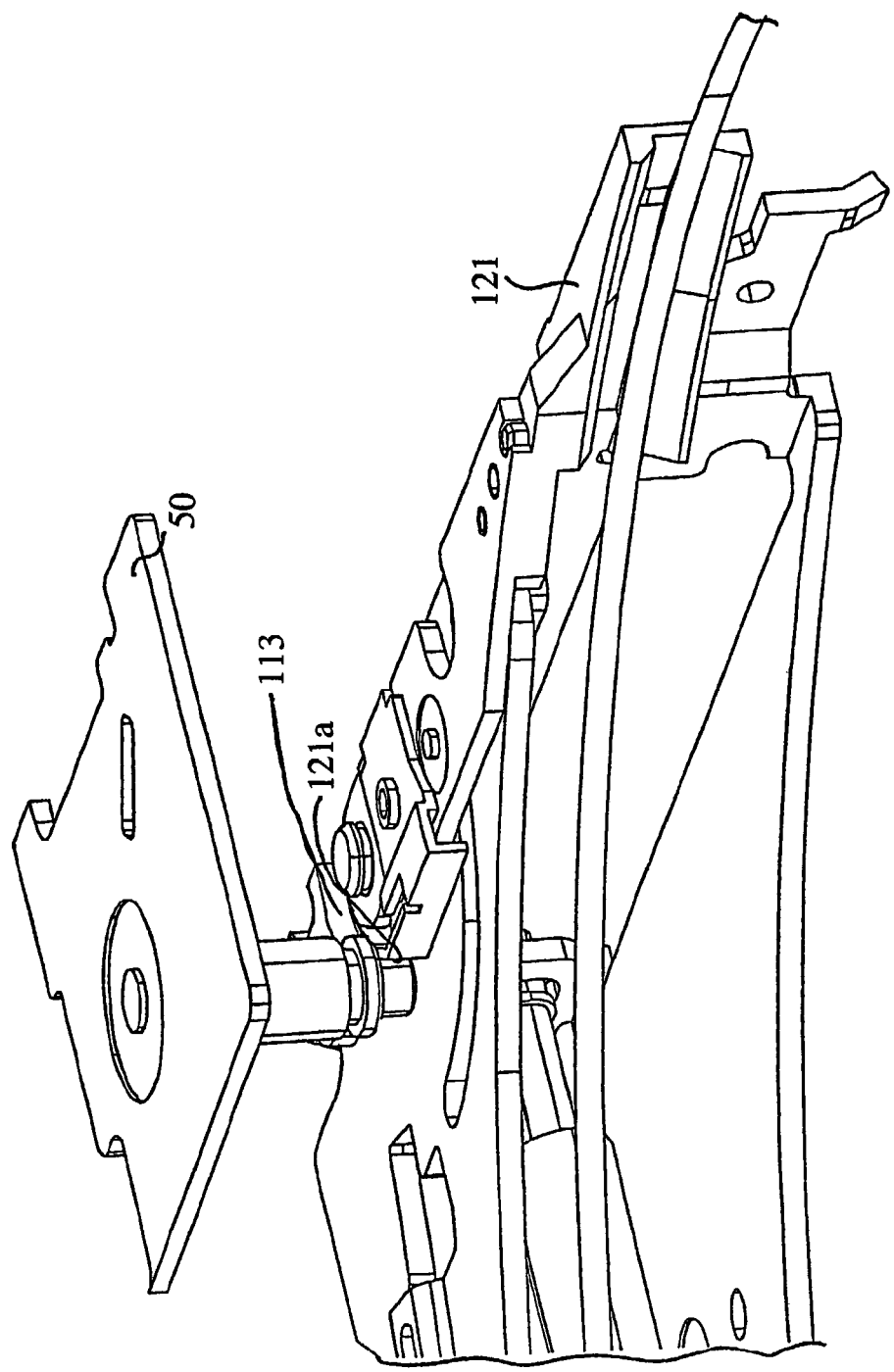
FIG. 29 is a detailed diagram of a principal portion of the disk device shown in FIG. 28.

On the other hand, the left arm 121 shown in FIG. 28 is assumed in its state shown in FIG. 29 and an abutment portion 141 of an abutment pin 140 provided on the roller base portion 110 is put in abutment against an abutment portion 121d of the left arm 121 to restrict the movement of the left arm in the direction of B shown in FIG. 20.

Figure 30:
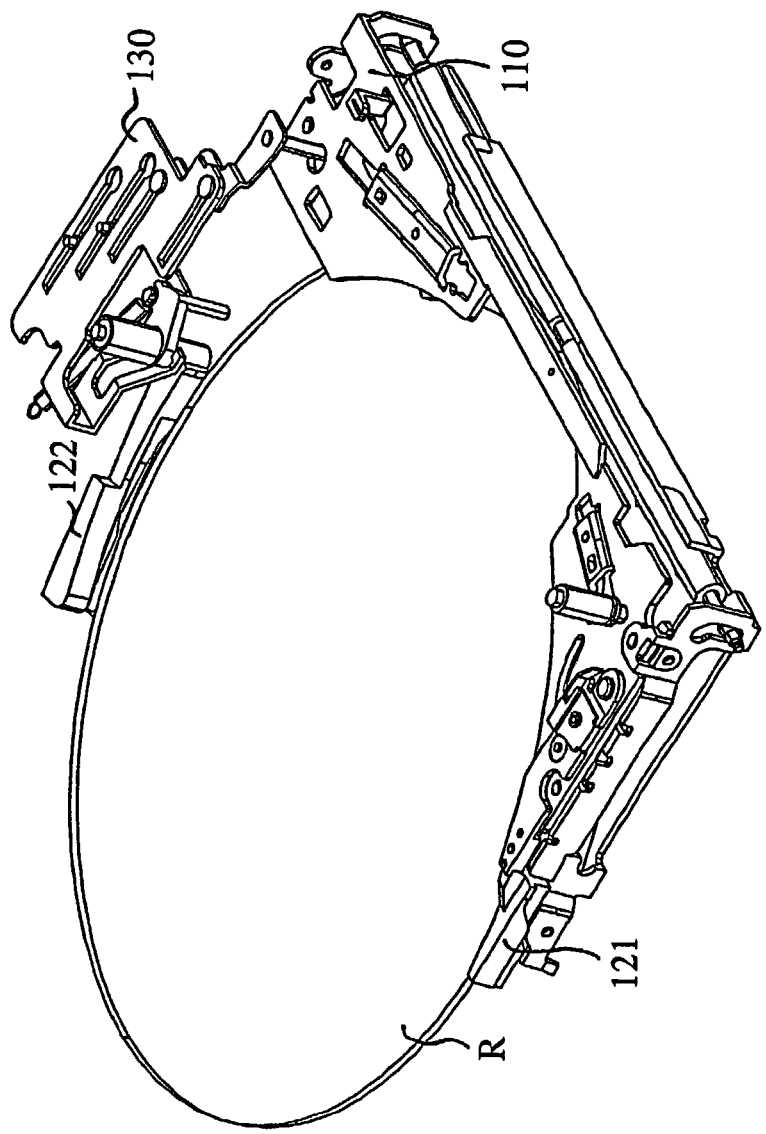
FIG. 30 is an operating state transition diagram explaining an operating state of the disk device shown in FIG. 15.
Figure 31:
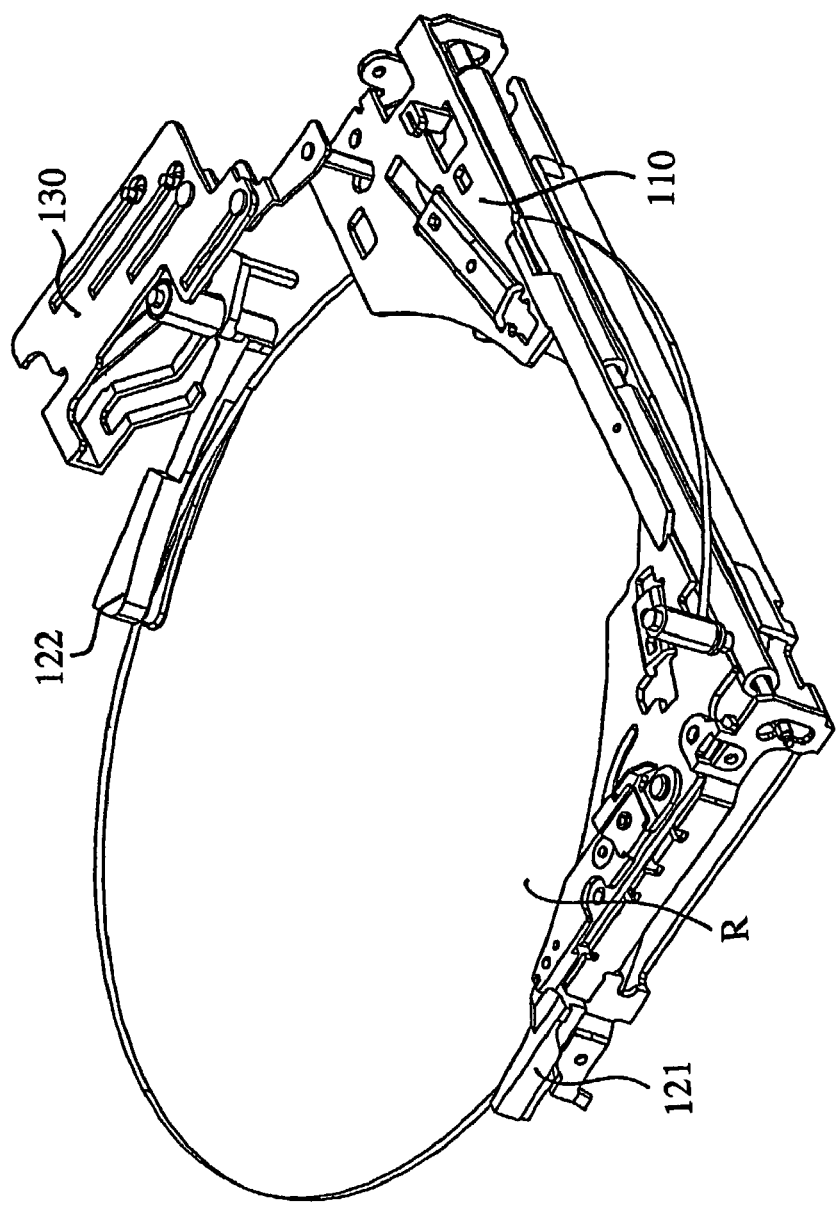
FIG. 31 is an operating state transition diagram explaining an operating state of the disk device shown in FIG. 15.

Next, when the disk is to be discharged after the state shown in FIG. 28, the roller base portion 110 moves in the direction of A, as shown in FIG. 30. The height delimiting portion 130 also moves in the direction of A in interlock with this movement, the concave portion 123a of the pivot shaft 123 on the right arm 122 descends along the inclined portion 131 of the height delimiting portion 130. As the roller base portion 110 further moves in the direction of A, the pin 123b abutted against a part of the pivot shaft 123 of the right arm 122 and the projecting portion 130a formed on part of the height delimiting portion 130 become out of abutment against each other and the right arm 122 turns in the direction of B with the urging force of the urging means 124 acting in the direction of B, restarting to hold a part of the peripheral edge portion of the disk. Now, a series of operations are completed.

<Third Position Delimiting Portion>

Figure 32:
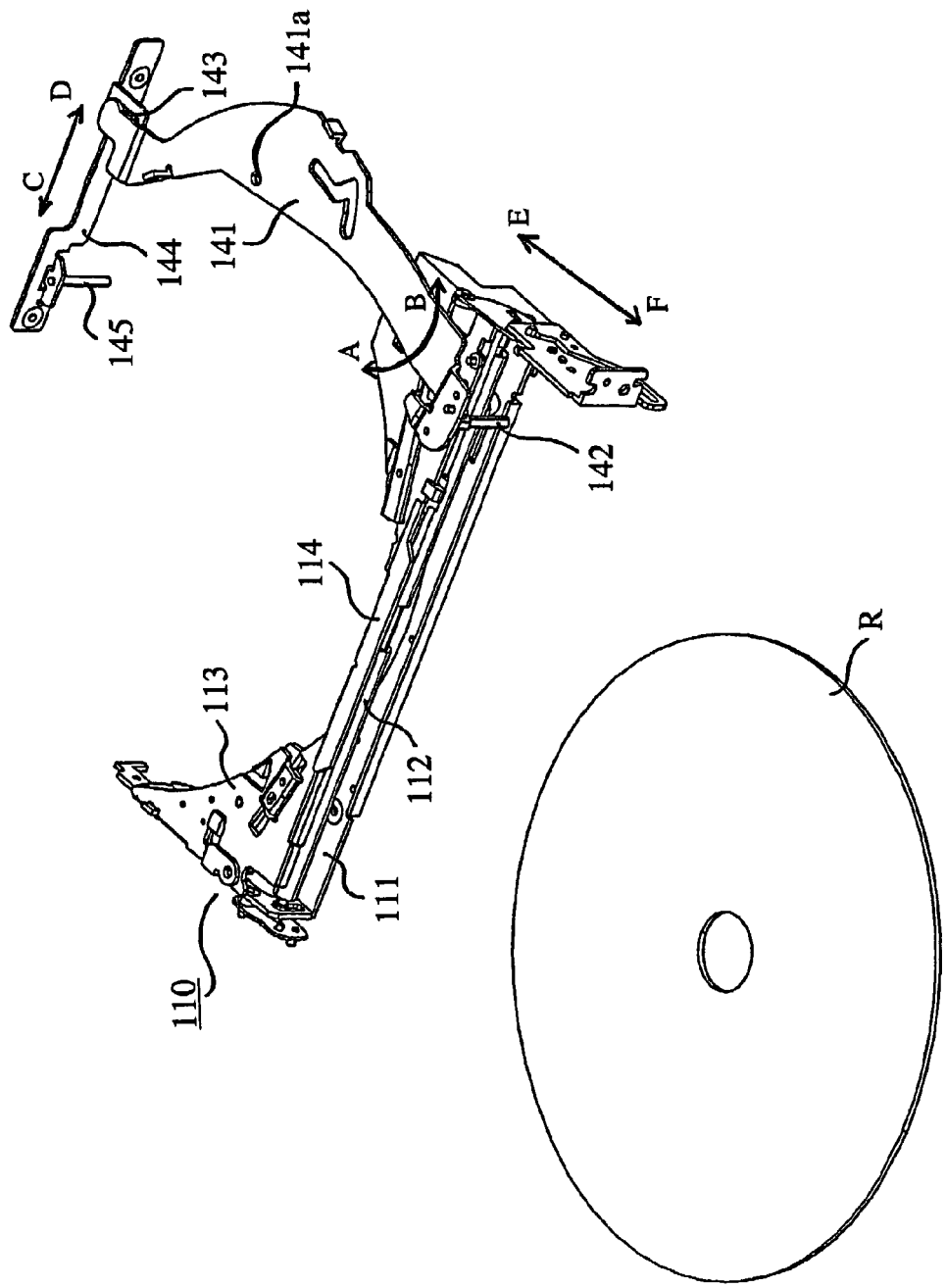
FIG. 32 is a structure diagram of a principal portion of the disk device shown in FIG. 1.

FIG. 32 is a structure diagram of a principal portion, showing a structural relation among the third position delimiting portion, the roller portion, the roller base portion, and the link portion.

In FIG. 32, the reference numeral 141 denotes a link portion adapted to pivot in the direction of A or B with a fitting hole 141a as a pivot axis, the fitting hole 141a being fitted on a pivot shaft (not shown) disposed in the interior of the disk device. The link portion 141 is urged in the direction of A constantly by an urging means (not shown). Reference numeral 142 denotes a projecting portion as a disk abutting portion against which a part of the disk outer peripheral portion abuts in accordance with the position of the disk inserted from the disk inlet. In the case of abutment of a portion located at a diametrical position of the disk, the projecting portion 142 moves a maximum quantity in the direction of B, while in the case of disengagement from the disk, the projecting portion is turned in the direction of A with an urging force of an urging means attached to the link portion 141 and is capable of falling in the direction of F.

Reference numeral 143 denotes a plate having a fitting hole 143 formed at one end thereof in which is fitted a projecting portion (not shown) formed at one end of the link portion 143. A projecting portion 145 is formed on part of the plate 144.

In this embodiment, although the details will be described later, the projecting portion 145 is linked with a lock plate which inhibits the movement of the disk holding mechanism. The projecting portion 145 locks or unlocks the disk holding mechanism interlocking with the movement of the disk holding mechanism.

Therefore, when the link portion 141 moves in the direction of B, the plate portion 144 moves in the direction of C and the projecting portion 145 moves another mechanism. On the other hand, when the link portion 141 moves in the direction of A, the plate portion 144 moves in a direction opposite to the direction of C.

Figure 35:
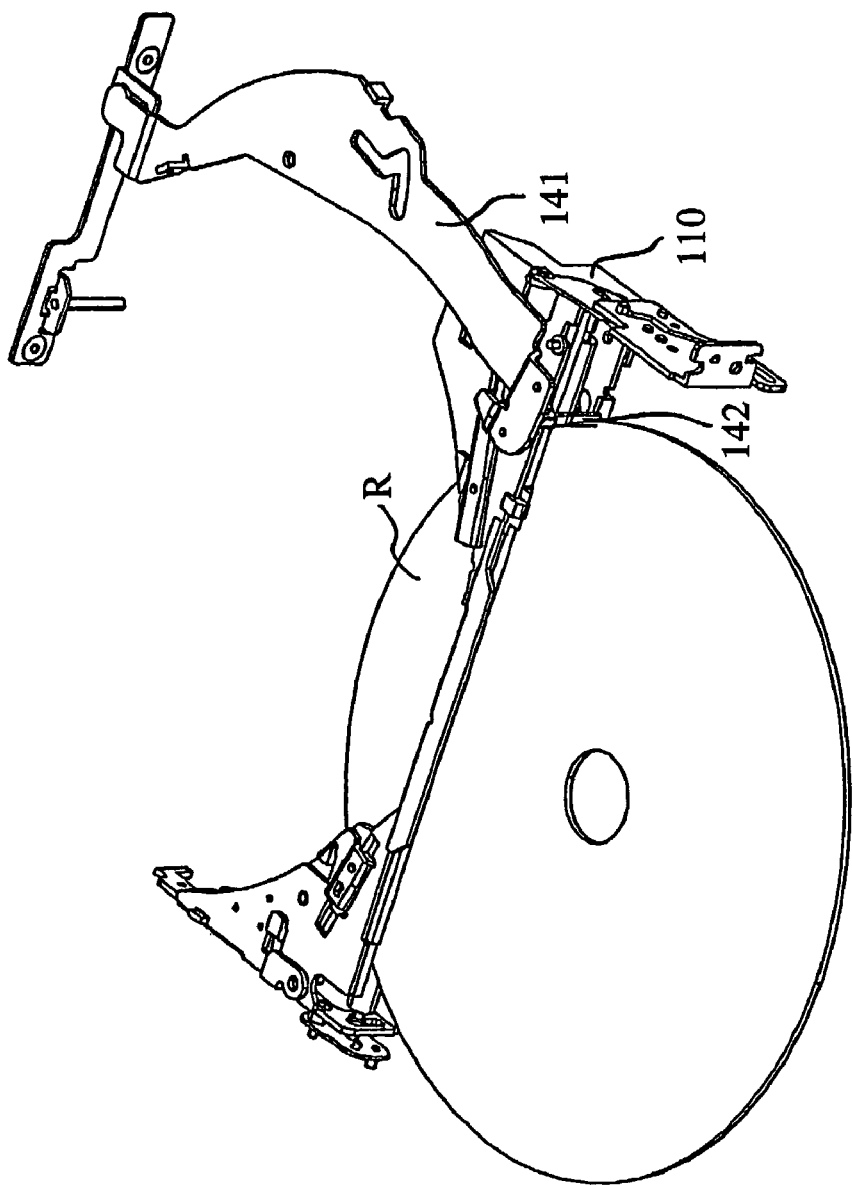
FIG. 35 is an operating state transition diagram explaining an operating state of the disk device shown in FIG. 32.

For the conveyance of a disk, the roller base portion 110 occupies its position shown in FIG. 35, while when the disk is to be subject to the reproducing or replacing operation, the roller base portion 110 moves to its retracted position side. At this time, the projecting portion 142 falls to the disk inlet side with a pressing force induced during movement of the roller base portion 110, thus so as to cause no obstacle to the movement of the roller base portion 110.

A description will be given below about the operation.

Figure 34:
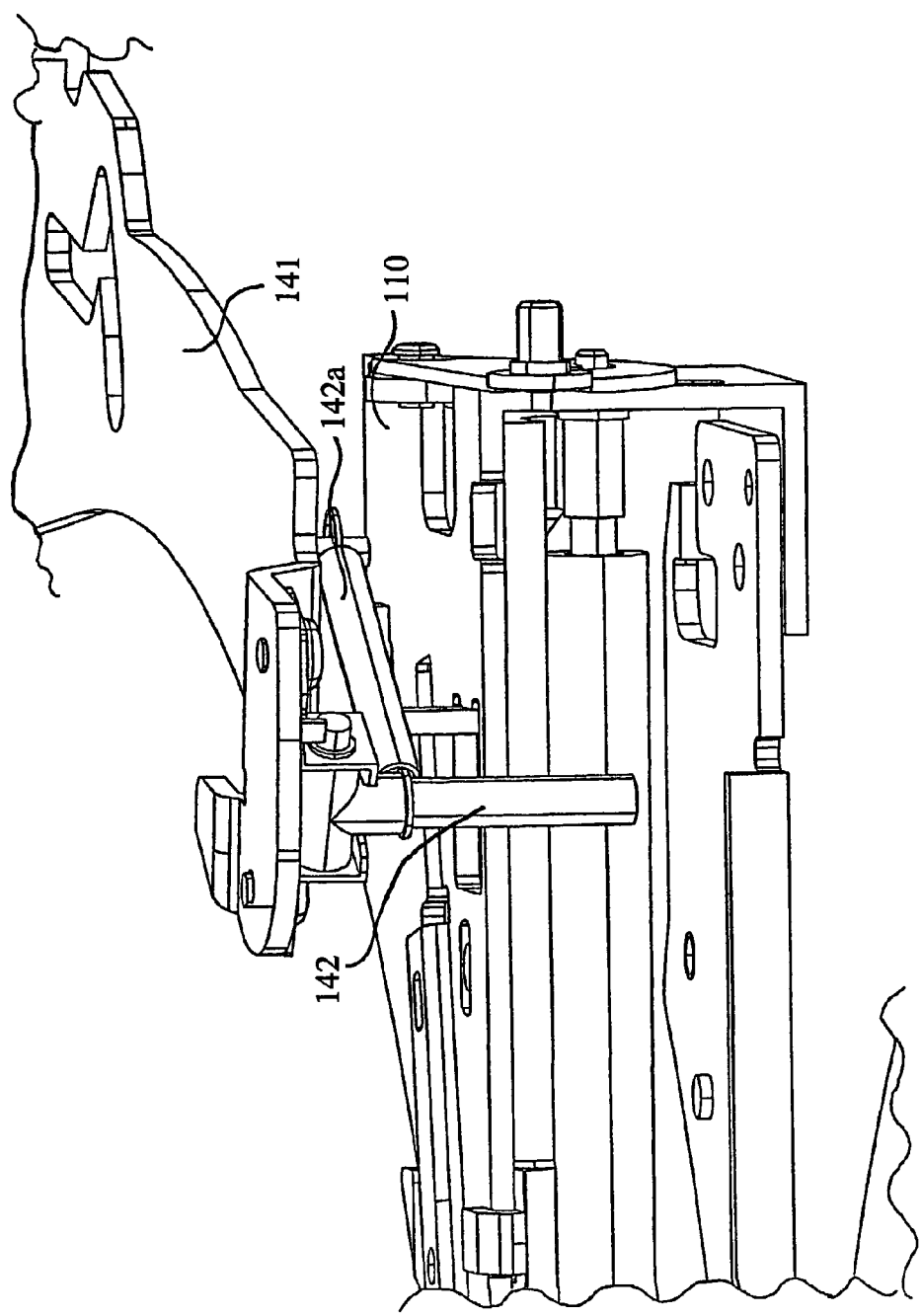
FIG. 34 is a detail view of a principal portion of the disk device shown in FIG. 32.

First, with no disk inserted as in FIG. 32, the disk device is in a disk insertion stand-by state and the projecting portion 142 lies on the disk inlet side with respect to the roller base portion 110. FIG. 34 shows the details of a principal portion in this state.

Figure 36:
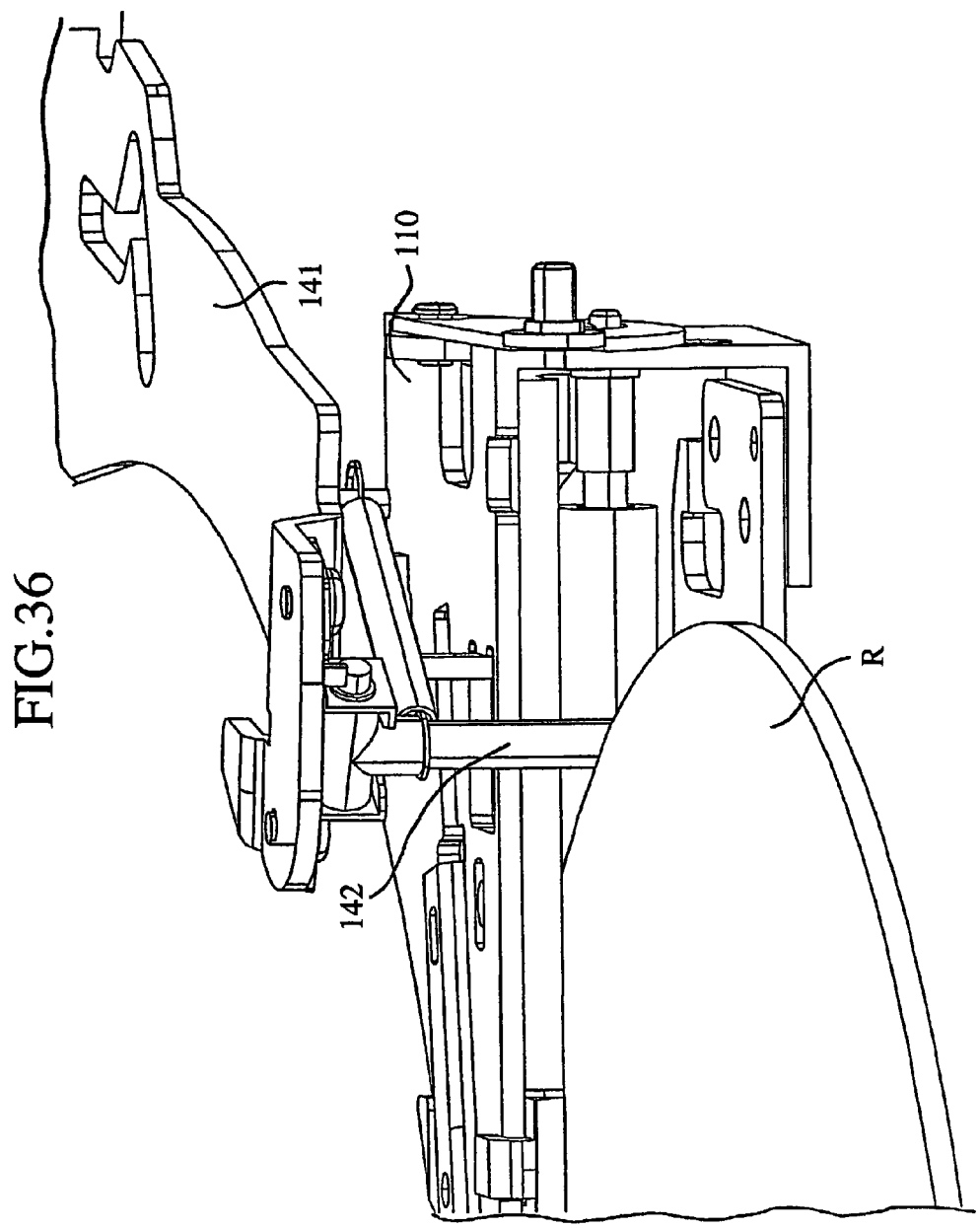
FIG. 36 is a detailed diagram of a principal portion of the disk device shown in FIG. 35.
Figure 37:
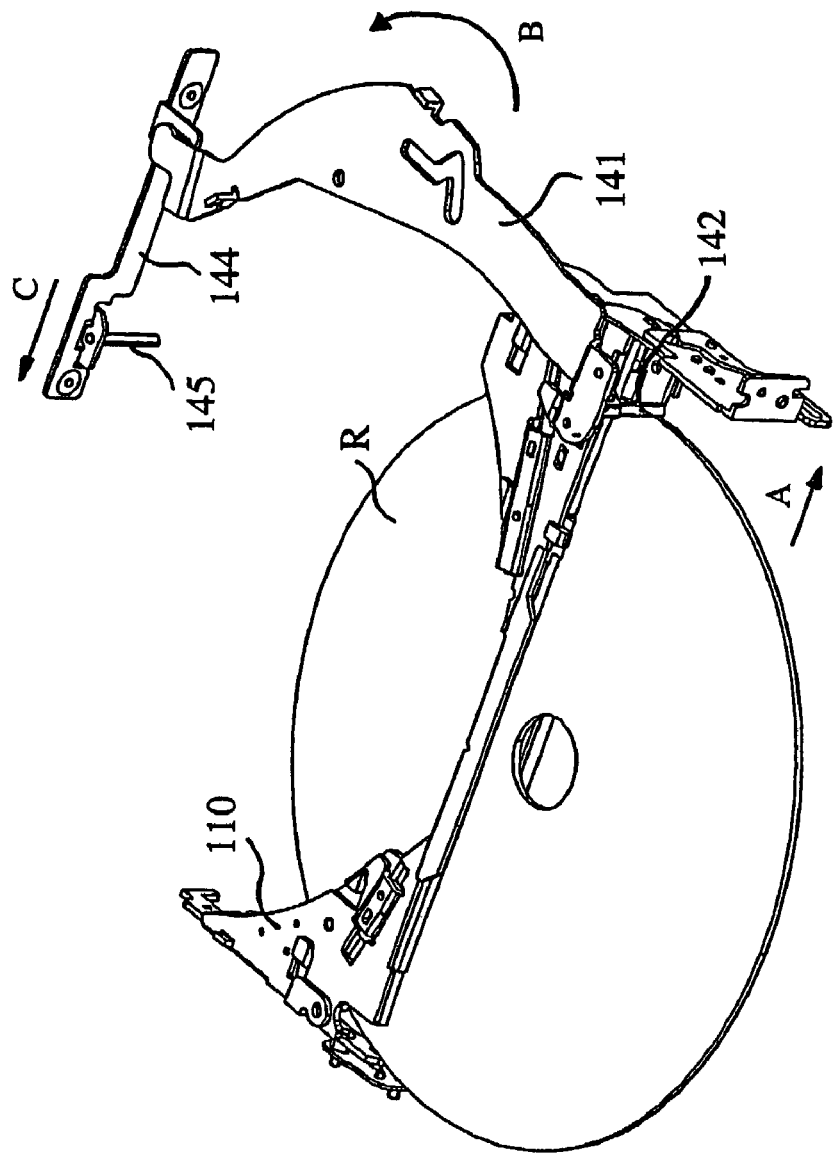
FIG. 37 is an operating state transition diagram explaining an operating state of the disk device shown in FIG. 32.

Next, a disk is inserted from the disk inlet and the loading of the disk is started by the roller base portion 110, whereupon the peripheral edge portion of the disk comes into abutment against the projecting portion 142 as shown in FIG. 35. FIG. 36 shows the details of a principal portion in this state. Further, as the disk is conveyed into the disk device by the roller portion 112, the peripheral edge portion of the disk pushes the projecting portion 142 in direction A as shown in FIG. 37 since the urging force of the link portion 141 is smaller than the disk conveying force. With this movement in the direction of A, the link portion 141 turns in the direction of B about the pivot shaft fitted in the fitting hole 141a and the plate 144 moves in the direction of C. This movement causes movement of the lock plate linked to the projecting portion 145, whereby the disk holding mechanism is unlocked.

Figure 38:
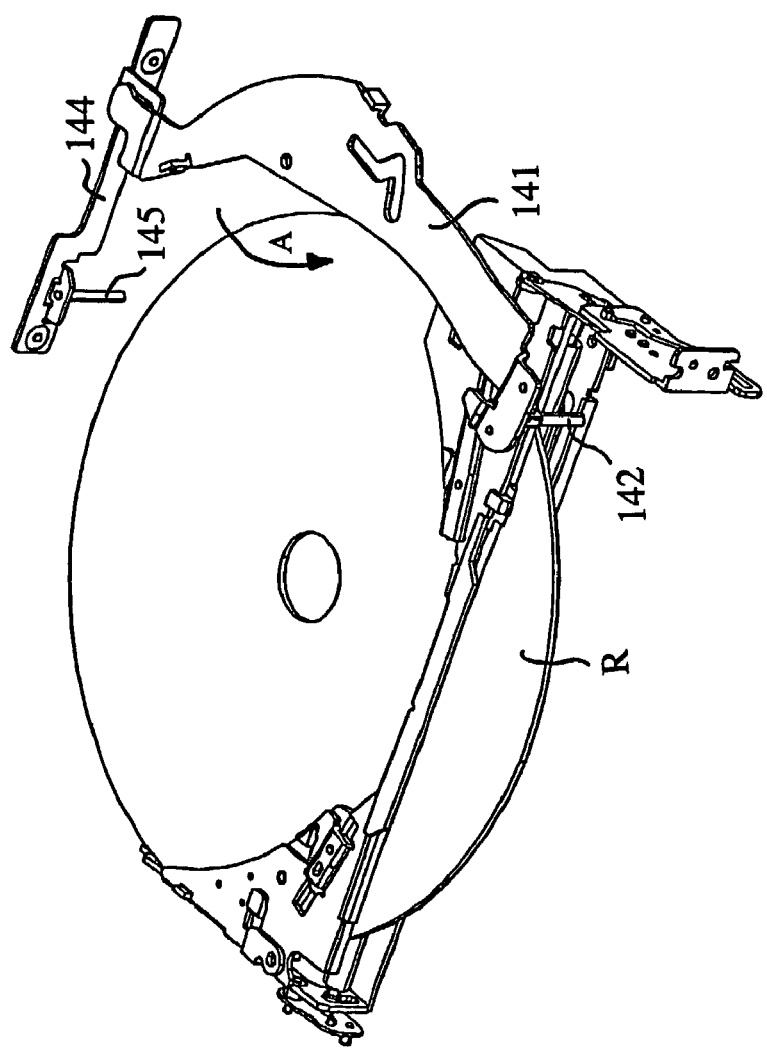
FIG. 38 is an operating state transition diagram explaining an operating state of the disk device shown in FIG. 32.

Next, as the disk is further conveyed into the disk device, the peripheral edge portion of the disk and the projecting portion 142 are disengaged from each other as shown in FIG. 38 and the link portion 141 turns in the direction of A with the urging force of the urging means. At this time, the disk is set to the reproducing position or the replacing position.

Figure 39:
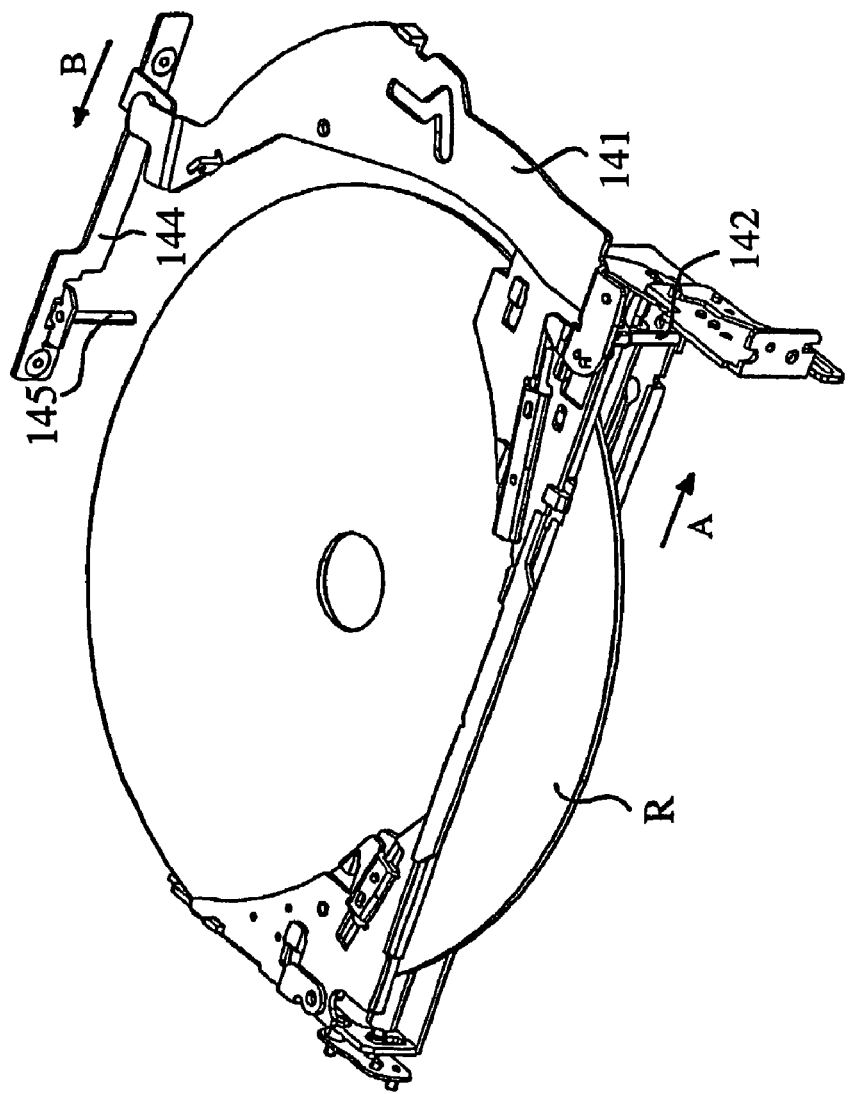
FIG. 39 is an operating state transition diagram explaining an operating state of the disk device shown in FIG. 32.

At the time of reproducing or replacing the disk, the roller base portion 110 is started to move to the disk inlet side because it becomes an obstacle and should therefore be retracted. At this time, the projecting portion 142 against which the upper roller base portion 113 abuts moves in the direction of A as shown in FIG. 39 and further moves into its state shown in FIG. 40. A still further movement of the upper roller base portion 113 results in such a state as shown in FIG. 41. At this time, the projecting portion 142 falls in the direction of B with the moving force, in the direction of A, of the roller base portion 110, allowing the roller base portion to escape. FIG. 42 is a diagram showing the details of a principal portion in this state.

<Roller Base Movement Suppressing Mechanism>

Figure 43:
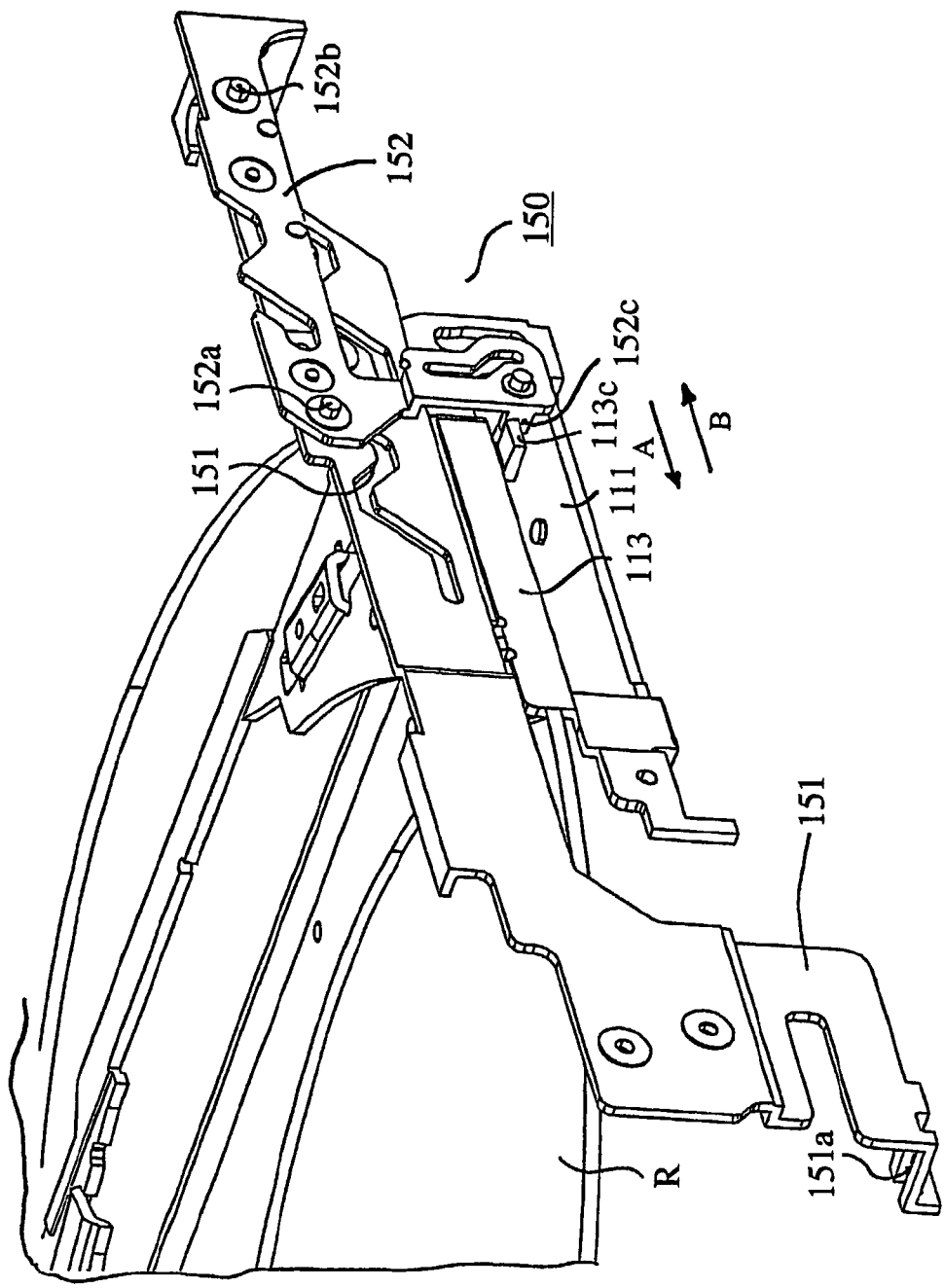
FIG. 43 is a detailed diagram of a principal portion of the disk device shown in FIG. 1.
Figure 44:
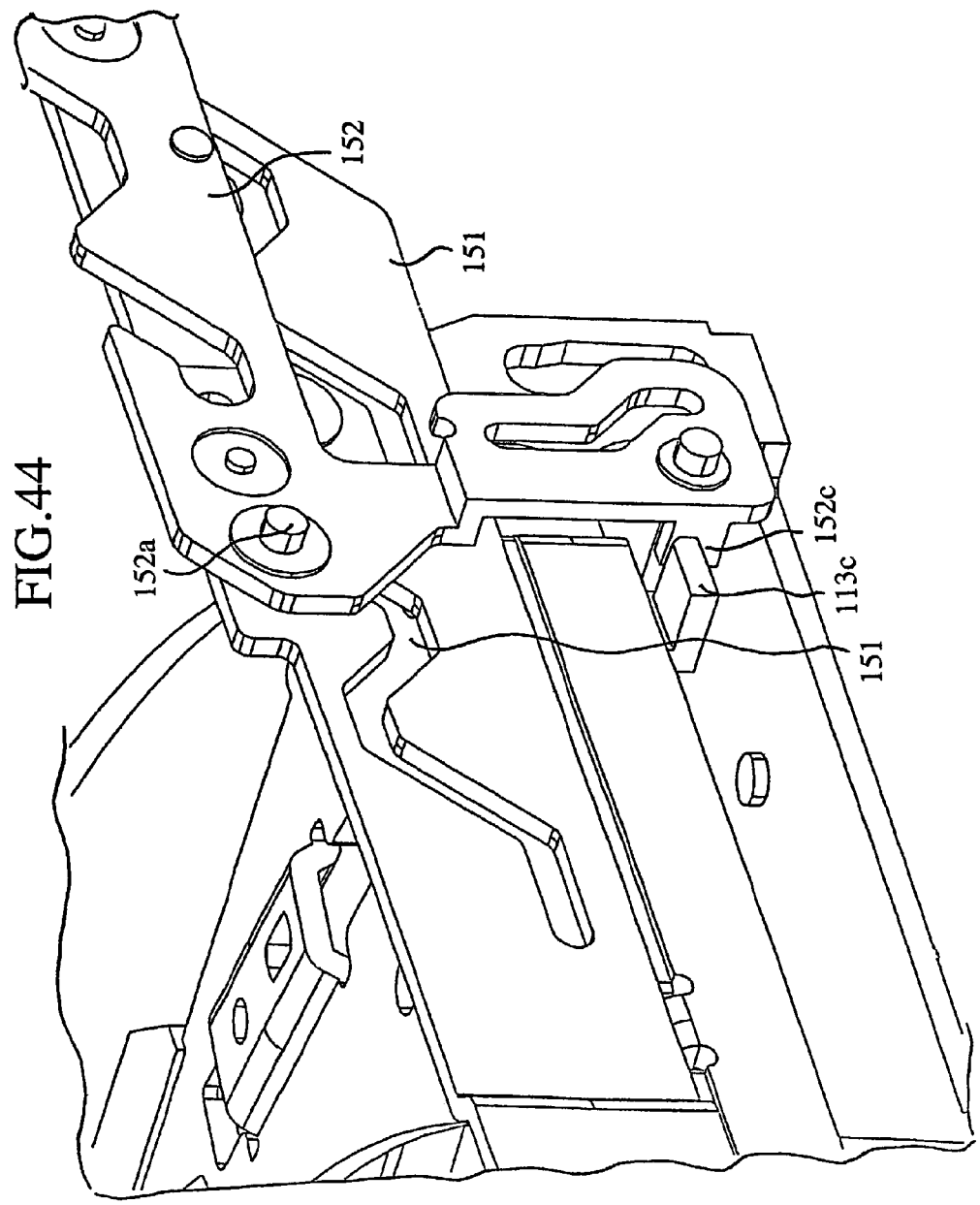
FIG. 44 is a detailed diagram of a principal portion of the disk device shown in FIG. 1.
Figure 45:
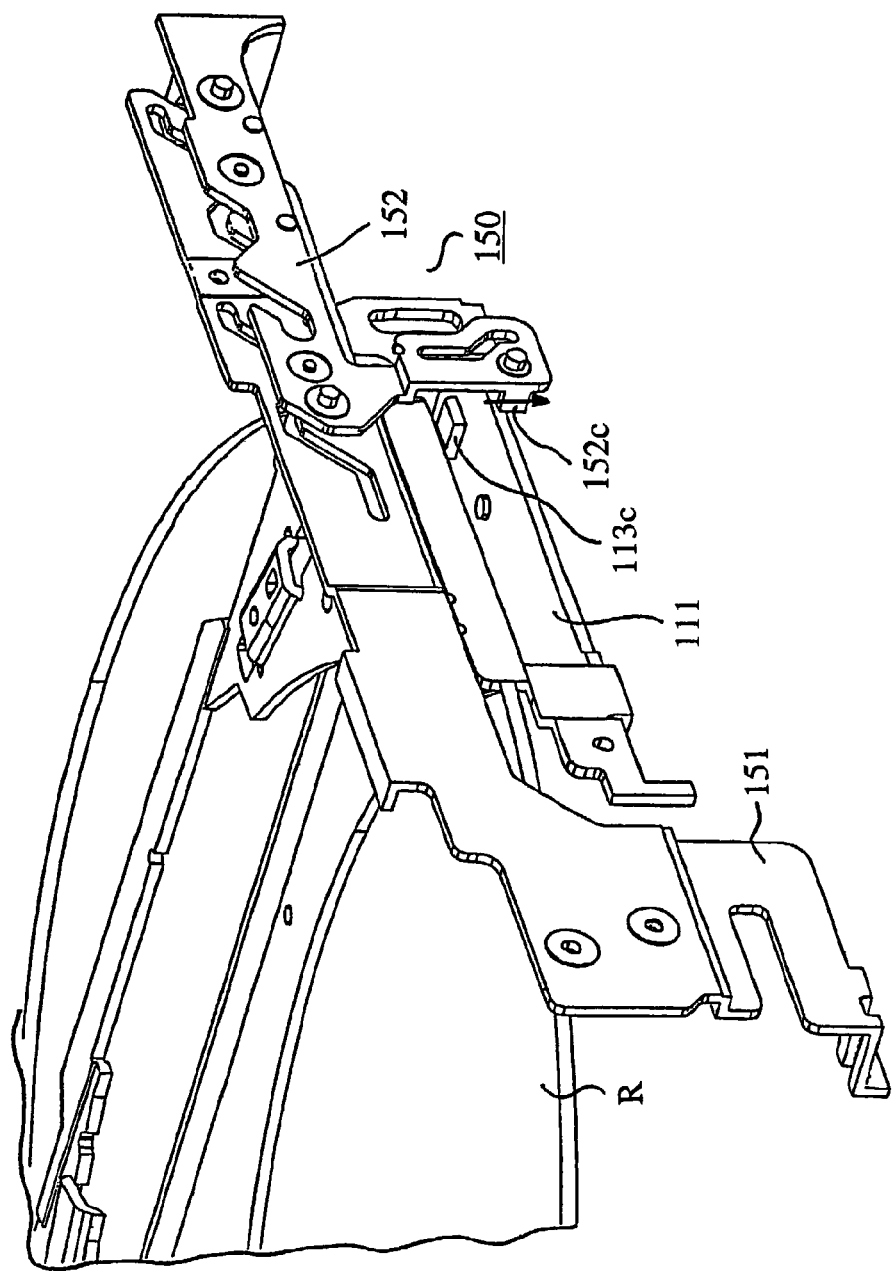
FIG. 45 is a detailed diagram of a principal portion of the disk device shown in FIG. 1.
Figure 46:
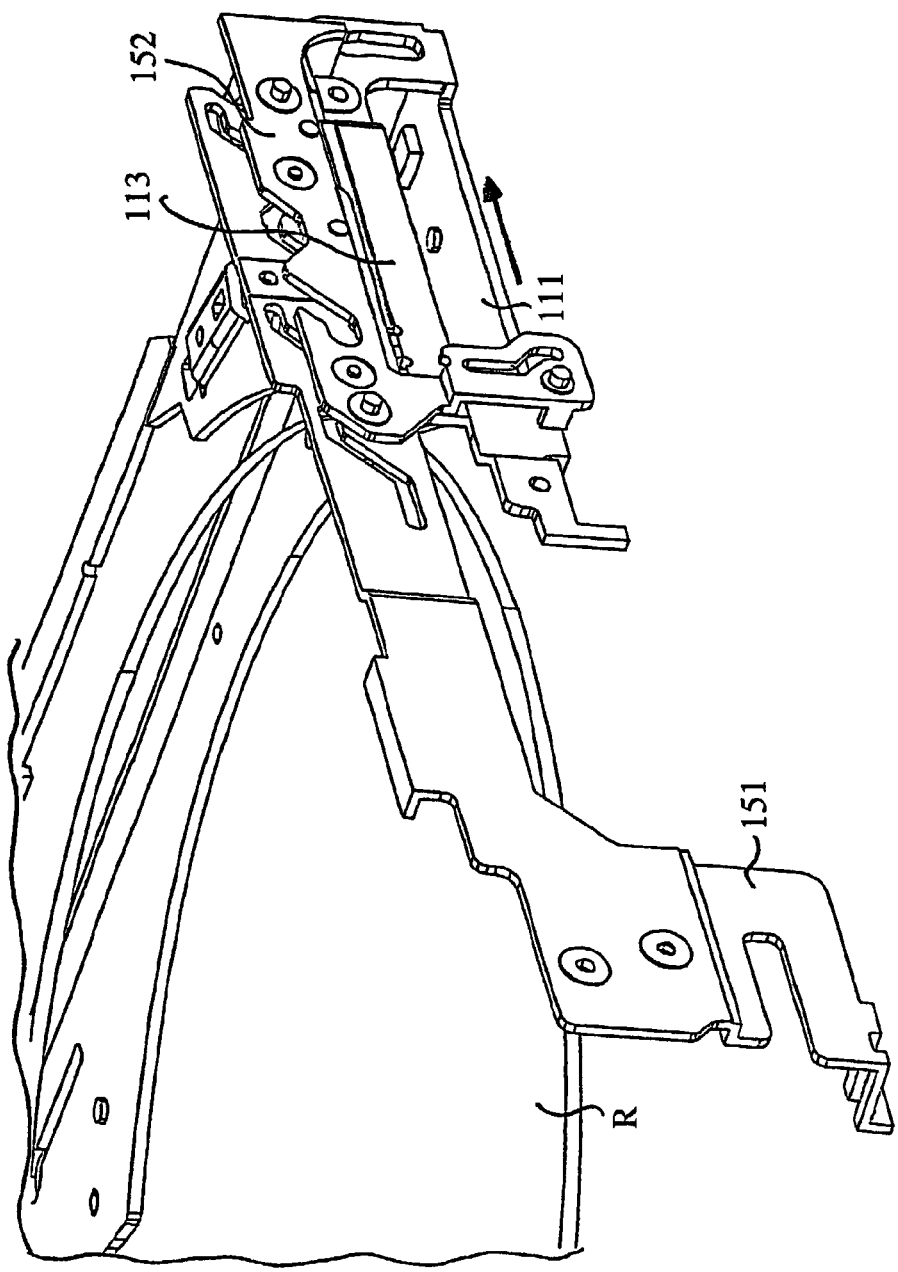
FIG. 46 is a detailed diagram of a principal portion of the disk device shown in FIG. 1.

FIG. 43 is a structure diagram of a roller base movement suppressing mechanism for suppressing the movement of the roller base portion 110 at a predetermined position when a disk is inserted, FIG. 44 is an explanatory diagram of a principal portion shown in FIG. 43, FIG. 45 is an operating state transition diagram explaining an operating state of the disk device shown in FIG. 43, and FIG. 46 is an operating state transition diagram explaining an operating state of the disk device shown in FIG. 43.

The roller base movement suppressing mechanism will be described below with reference to FIGS. 43 to 46.

Before describing the structure and operation of this mechanism, a description will first be given below about the purpose of this mechanism. When a disk is inserted from the disk inlet and the roller portion turns to feed the disk into the disk device, the roller base portion undergoes a repulsive force of the disk conveying force and moves in a direction opposite to the disk inserting direction. During conveyance of the disk, therefore, it is necessary to inhibit the movement of the roller base portion to the disk inlet side. This is to be done by this mechanism.

Reference numeral 151 denotes a cam plate disposed between an end face of the roller base portion and a surface of a link plate (to be described later). The cam plate 151 has a link hole 151a formed in one end thereof, the link hole 151a being linked with a part of a mechanism (not shown) which causes the disk holding mechanism 200 (to be described later) to move vertically. In the cam plate 151 is formed a wavy groove 151b.

Reference numeral 152 denotes a link plate disposed between the housing and the cam plate 151. A first pin 152a and a second pin 152b are provided on a surface of the link plate 152 which surface confronts the housing, and a projecting portion (not shown) is formed on a surface of the link plate 152 which surface confronts the cam plate 151. The projecting portion is slidably fitted in the groove 151b of the cam plate 151 and a groove (not shown) for slidable fitting therein of the first and second pins is formed vertically in the housing opposed to the link plate 152. Further, reference numeral 152c denotes an abutment portion for abutment against a retaining portion 113c provided at an end portion of the upper roller base portion 113 to inhibit the movement, in the direction of B, of the roller base portion 110.

According to this structure, in response to movement, in the direction of A or B, of the cam plate 151, the projecting portion of the link plate 152 slides within the groove 151b and moves in the vertical direction (direction C or D) through the first and second pins 152a and 152b. A principal portion of FIG. 43 is shown in FIG. 44.

The following description is now provided about the operation.

As shown in FIG. 43, when a disk is to be inserted and conveyed, the retaining portion 113c formed on the upper roller base portion 113 is put in abutment against the abutment portion 152c of the link plate 152 and is inhibited from moving in the direction of D. Thus, during conveyance of the disk, the disk inlet and the roller base portion can be spaced a certain distance from each other.

Next, as shown in FIG. 45, as the disk is conveyed, the mechanism for moving the disk holding mechanism 200 (to be described later) vertically in accordance with the disk conveyance operates and the link hole 151a linked with the link portion (not shown) which is interlocked with the operation of the mechanism is pushed in the direction of B, that is, the cam plate 151 moves in the direction of B, so that the abutment portion 152c of the link arm 152 which is in sliding engagement in the groove 15b formed in the cam plate 151 moves in the direction of D and is disengaged from the retaining portion 113c, thus permitting movement in the direction of B of the roller base portion 110.

Next, as shown in FIG. 46, when the disk has reached the inner part of the disk device, that is, when the disk reproducing operation is to be performed or upon storage of the disk, the roller base portion 110 is moved to the disk inlet side by the moving mechanism (not shown) which is for moving the roller base portion. Now, a series of operations is completed.

Next, reference will be made below to the disk holding mechanism.

[3. Disk Holding Mechanism]

FIGS. 47 to 91 are drawings concerning the disk holding mechanism.

The disk holding mechanism is composed of a disk holding section for holding disks of different diameters, i.e., disks of both large and small diameters, the disk holding portion performing the positioning of disk so as to permit a reliable setting to the disk reproducing position and the disk storing position, a disk detecting portion for detecting that the disk holding portion has held a disk, and an auxiliary holding portion which restricts the height and inclination of the disk in cooperation with the disk holding portion.

Structures and operations of principal portions of the disk holding portion, the disk detecting portion, and the auxiliary holding portion will be described below with reference to FIGS. 47 to 72, FIGS. 73 to 86, and FIGS. 87 to 91, respectively.

<Disk Holding Section>

Figure 47:
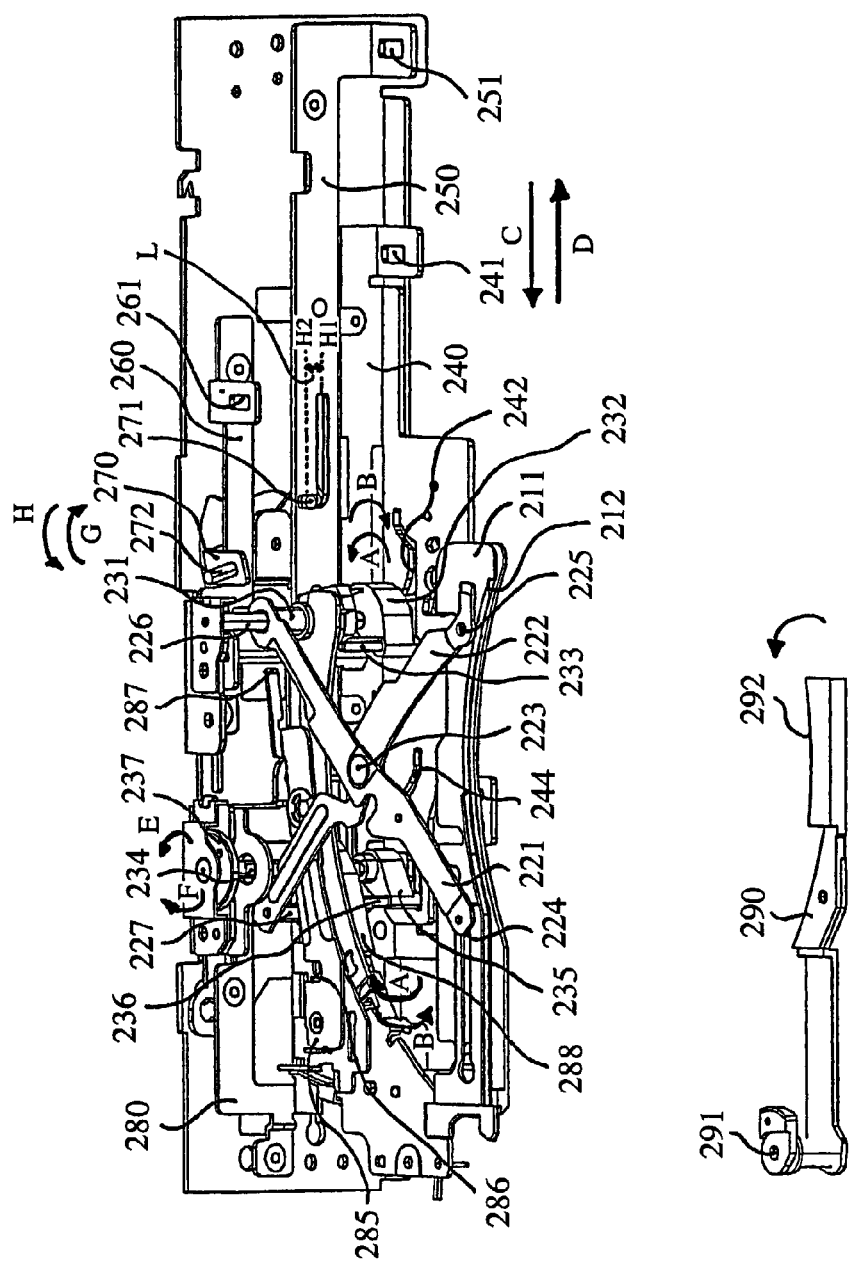
FIG. 47 is a structure diagram of a principal portion of the disk device shown in FIG. 1.
Figure 48:
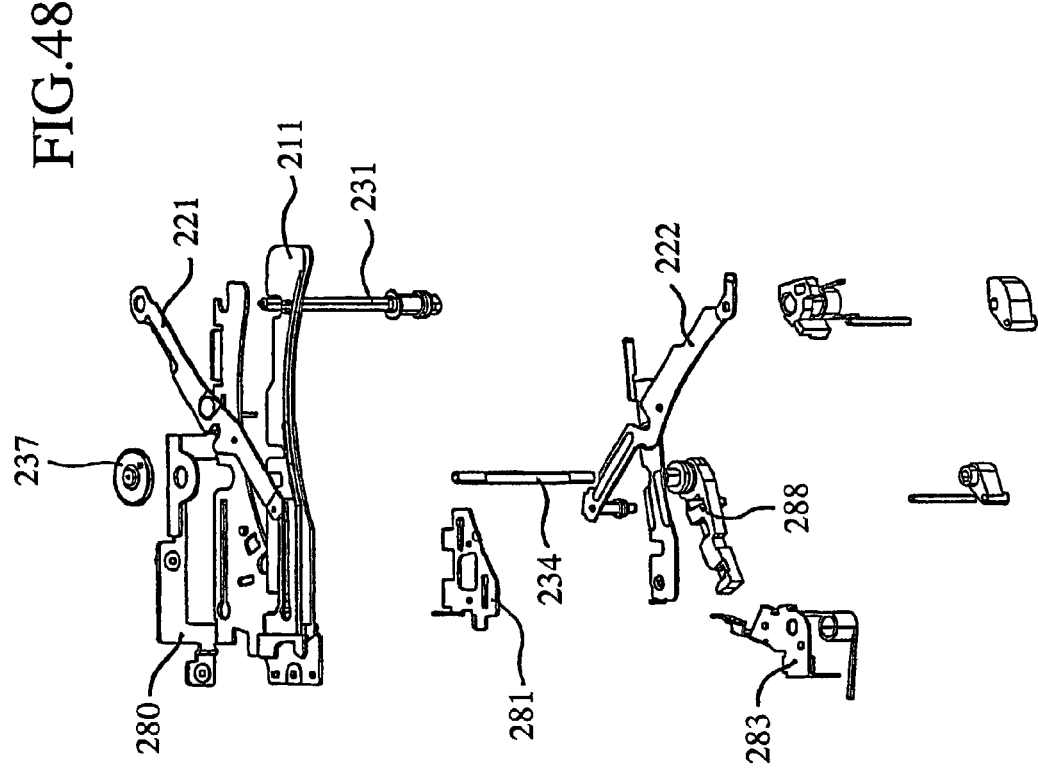
FIG. 48 is an exploded perspective view of the disk device shown in FIG. 47.
Figure 49:
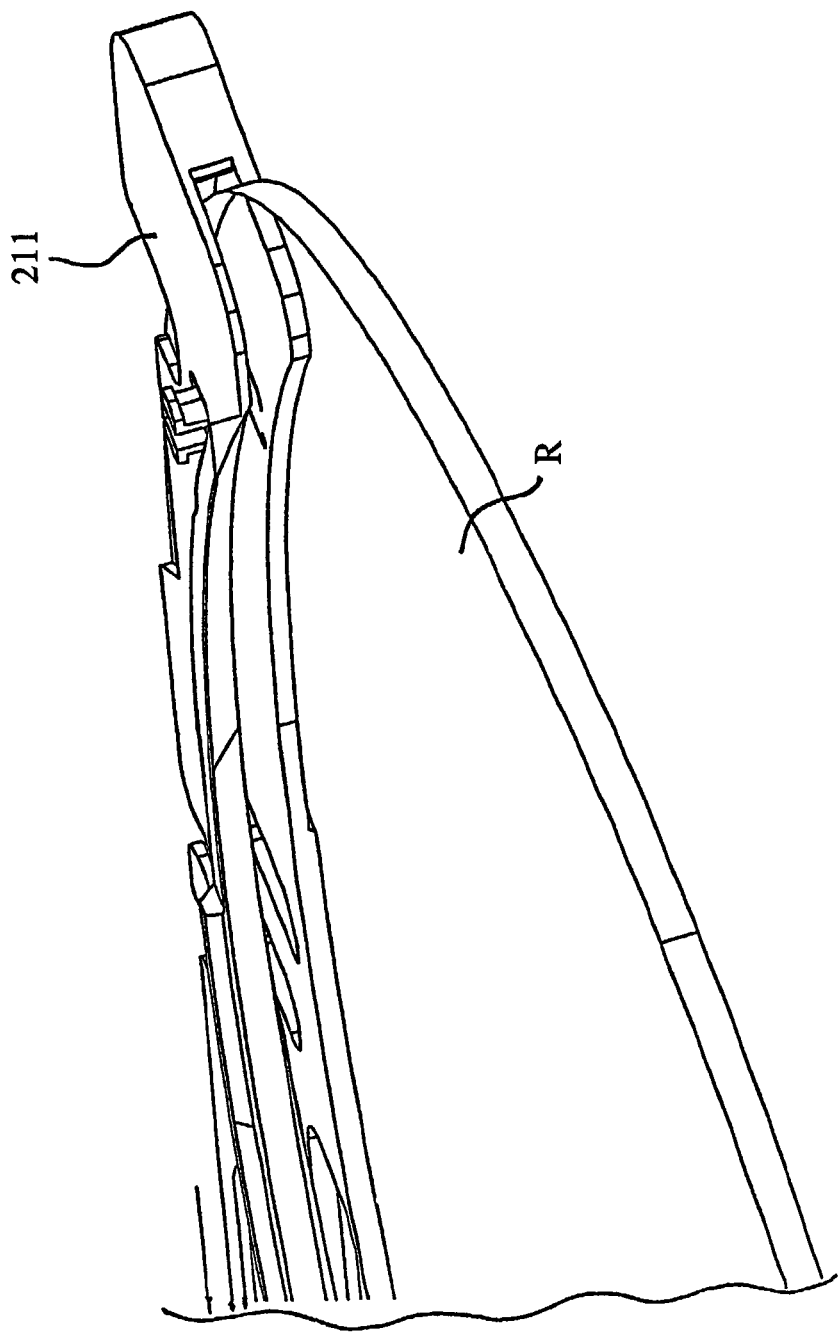
FIG. 49 is a detailed diagram of a principal portion of the disk device shown in FIG. 47.

FIG. 47 is a structure diagram of a principal portion of the disk holding portion and FIG. 48 is a developed structure diagram of the principal portion shown in FIG. 47. In FIG. 47, the reference numeral 211 denotes a holding portion for holding a part of the peripheral edge portion of a disk when the disk is to be conveyed or replaced. The holding portion 211 can hold disks of different diameters, i.e., a large diameter disk R1 (e.g., 12 cm disk) and a smaller diameter disk R2 (e.g., 8 cm disk). A groove 212 is formed in the holding portion 211 on the side opposed to the disk. The peripheral edge portion of the disk is inserted into the groove 212, whereby the disk is held. Further, a slid groove 213 is formed in an upper surface of the holding portion 211 so as to extend in the longitudinal direction of the holding portion 211. The details of holding the disk in the holding portion 211 are as shown in FIG. 49.

Figure 50:
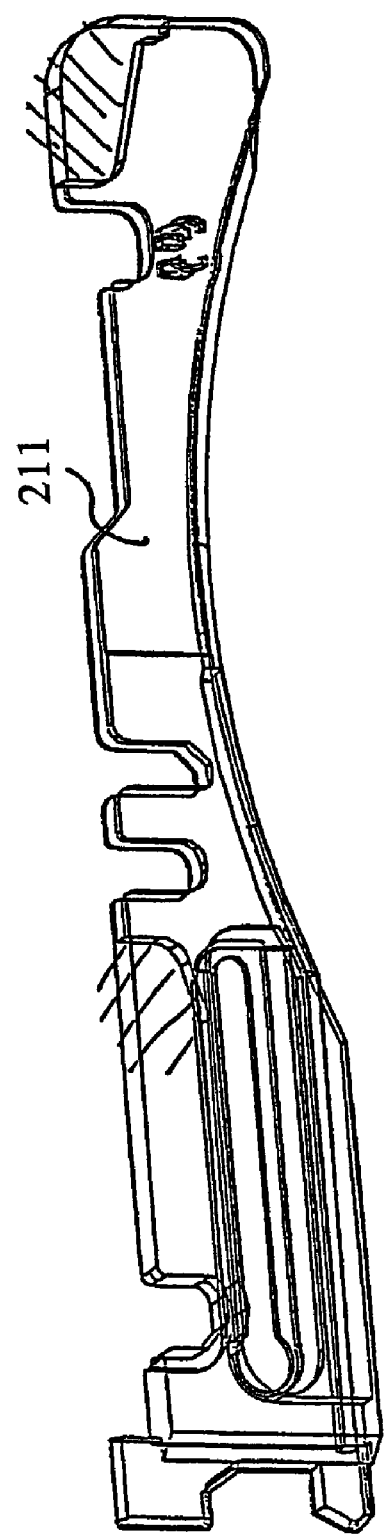
FIG. 50 is an explanatory diagram of a principal portion of the disk device shown in FIG. 47.
Figure 51:
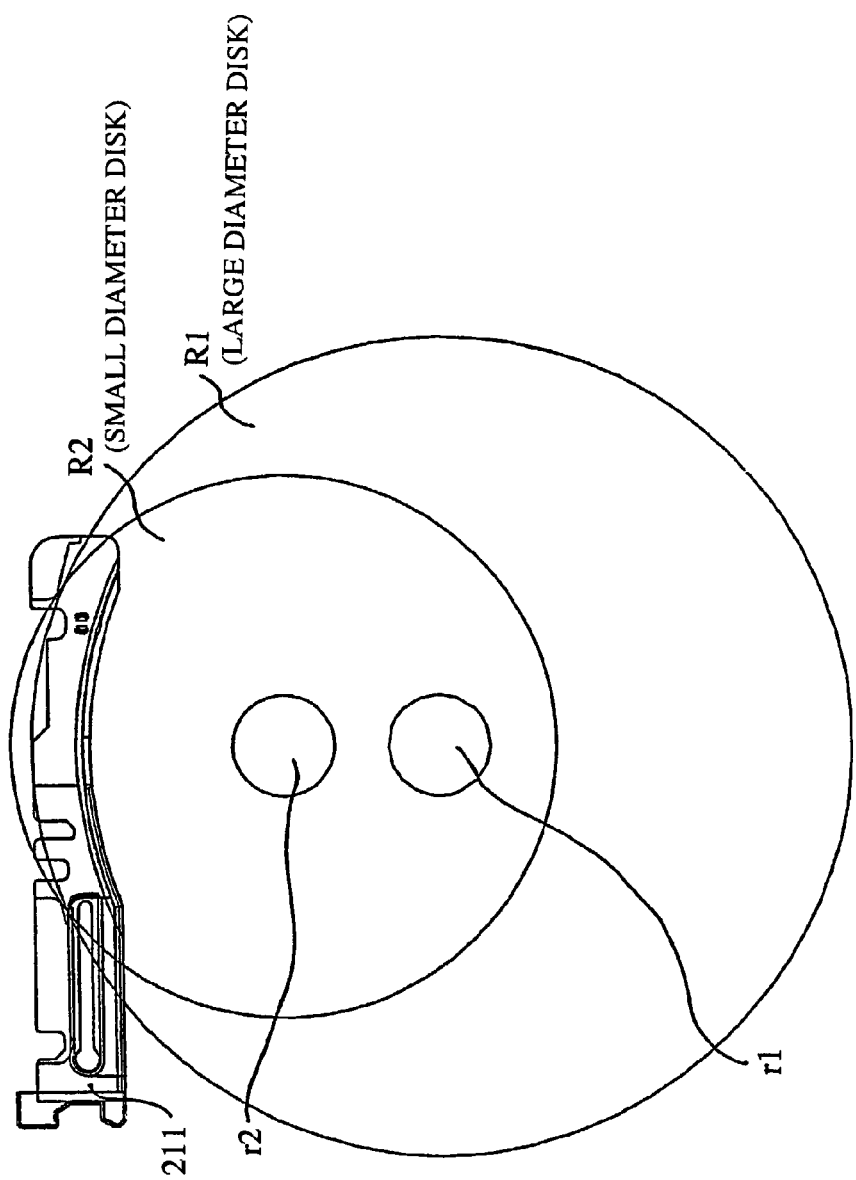
FIG. 51 is an explanatory diagram of a principal portion of the disk device shown in FIG. 47.

As to the shape of the holding portion 211, it is as shown in FIG. 50. FIG. 51 illustrates a state in which both large diameter disk R1 and small diameter disk R2 are held. Both disks are different in all of the length of diameter, the position of inside diameter (inside diameters of the large and small diameter disks are r1 and r2, respectively), and arc, so a space is formed on the inner side of the disk holding portion, thus permitting both disks to be held accurately.

Reference numeral 221 denotes a left arm for holding the holding portion 211, one end 224 of the left arm 221 being slidably fitted in the slide groove 213 of the holding portion 211. Reference numeral 222 denotes a right arm, one end 225 of which is pivoted or journaled in the holding portion 211, the right arm 222 being formed in a cross-link shape together with the left arm 221 with a pivot shaft 223 as axis and adapted to move in the direction of A when pushed upon insertion of a disk into the holding portion 211. An opposite end of the left arm 221 is formed with a hole 226 for fitting therein of a first shaft 231 (to be described later), while an opposite end 227 of the right arm 222 is provided with a shaft portion 225 extending downward.

Reference numeral 231 denotes a first shaft which is loosely fitted in the hole 226 of the left arm 221. At a lower end of the first shaft 231 is provided a first switching portion 232 with a pin 233 disposed at a position different from the axis of the first shaft 231. The first switching portion 232 is slidably fitted in a groove 242 (to be described later) formed in a first cam plate 240. When the first cam plate 240 moves in the direction of C, the pin 233 moves so as to be guided along the groove 242 with the first shaft 231 as fulcrum in accordance with the movement of the first cam plate. In the case of this movement in the direction of C, both left and right arms 221, 222, which are in a cross link shape, are turned in the direction of A, allowing the disk holding mechanism to be stored. On the other hand, when the first cam plate 240 moves in the direction D, the pin 233 moves so as to be guided along the groove 242 with the first shaft 231 as fulcrum in accordance with the movement of the first cam plate. In case of this movement in the direction D, both left and right arms 221, 222, which are in a cross link shape, are turned in the direction of B, allowing the disk holding mechanism to operate so as to project forward as shown in FIG. 47.

Reference numeral 234 denotes a second shaft which supports a lower portion of a vertical base 280. As is the case with the first shaft 231, at a lower end of the second shaft 234 is provided a second switching portion 235 with a pin 236 disposed at a position different from the axis of the second shaft 234. Like the first switching portion 232, the second switching portion 235 is slidably fitted in a groove 244 (to be described later) formed in the first cam plate 240. When the first cam plate 240 moves in the direction of C, the pin 236 moves so as to be guided along the groove 244 with the second shaft 234 as fulcrum in accordance with the movement of the first cam plate. In the case of this movement in the direction of C, the left and right arms 221, 222, which are in a cross link shape, are turned in the direction of A, allowing the disk holding mechanism to be stored. On the other hand, when the first cam plate 240 moves in the direction of D, the pin 236 moves so as to be guided along the groove 244 with the second shaft 234 as fulcrum in accordance with the movement of the first cam plate. In the case of this movement in the direction of D, the left and right arms 221, 222, which are in a cross link shape, are turned in the direction of B, causing the disk holding mechanism to operate so as to project forward as shown in FIG. 47. The first and second switching portions 232 and 235 are adapted to operate with movement, in the direction of C or D, of the first cam plate 240 and are interlocked with each other, whereby both arms 221, 222 can be allowed to perform a turning motion smoothly.

Reference numeral 237 denotes a gear portion mounted on an upper end of the second shaft 234, the gear portion 237 being rotated with rotational movement of the second shaft 234. That is, the gear portion 237 rotates in direction E with movement in the direction C of the first cam plate 240 and rotates in the direction of F with movement in the direction D of the first cam plate. A link arm (not shown) is linked to the gear portion 237, the link arm having at one end thereof a gear portion meshing with the gear portion 237 and also having at an opposite end thereof a pin which is fitted in a hole 291 (to be described later), the hole 291 being formed in a position corresponding to a pivot shaft of a holding arm 290.

Thus, the holding arm 290 is turned in the direction of G or H interlocking with movement, in the direction of C or D, of the first cam plate 240.

In one end of the first cam plate 240 is formed a hole 241. The hole 241 is linked to a gear train (not shown) on a drive motor (not shown) which turns ON upon conveyance of a disk to a predetermined position. In an opposite end of the first cam plate 240 is formed a groove 244 for slidable fitting therein of the pin 236 of the second switching section 235 provided on the second shaft 234. Further, near the central portion is formed a groove 242 for slidable fitting therein of the pin 233 in the first switching section 232 provided on the first shaft 231.

Reference numeral 250 denotes a second cam plate for moving the holding portion 211 and the left and right arms 221, 222 vertically. In one end of the second cam plate 250 is formed a hole 251 for fitting therein of a link portion (not shown), the link portion being linked to operations of a gear train (not shown) which are operated with the disk conveying operation. At an opposite end of the second cam plate 250 is formed a support portion for supporting a lower portion of the vertical base 280 (to be described later) and near a central part thereof is formed a groove 252 for permitting a vertical movement of the whole of the vertical base 280 including the holding portion 211 and the left and right arms 221, 222. The groove 252 is formed longitudinally so as to extend partially upward. A shutter cam plate 270 is positioned on the back of the second cam plate and a projecting portion 271 (to be described later) is formed on part of the shutter cam plate 270, the projecting portion 271 being slidably fitted in the groove 252.

When the second cam plate 250 moves in the direction of C, the vertical base 280 including the holding portion 211 and the left and right arms 221, 222 is supported at a normal height H1. When the second cam plate 250 moves in the direction of D, the vertical base 280 including the holding portion 211 and the left and right arms 221, 222 is supported halfway at the height H1. Upon further movement in the direction of D, the upper base 280 including the holding portion 211 and the left and right arms 221, 222 is moved upward up to height H2. The movement of the second cam plate 250 and that of the first cam plate 240 are independent of each other.

Reference numeral 260 denotes a third cam plate for restricting the movement of the right arm 222 in accordance with the state of disk conveyance, i.e., the movement, in the direction of A, of the holding portion 211 and the left and right arms 221, 222. In one end of the third cam plate 260 is formed a hole 261 for fitting therein of a pin, the pin being provided in a link mechanism (not shown) which operates in accordance with disk conveyance. At the other end of the third cam plate 260 is provided a retaining portion with which a retaining portion 287 of a switching plate 285 is engaged with movement, in the direction of C, of the third cam plate 260 to let the switching plate 285 turn in direction A. With this movement, in the direction of A, of the switching plate 285 the second shaft 234 is brought into engagement with a recess 286 formed in the switching plate 285. More specifically, the disk device can handle disks of different diameters, so if the holding portion 211 holds a disk of a small diameter at the same position as in the case of a large diameter disk, the center of the disk lies on an inner side of the disk device with respect to the disk reproducing position. Therefore, it is necessary that the large diameter be allowed to project on this side of the disk device in comparison with the case of a large diameter disk. This switching operation is performed by the switching plate 285. The switching plate 285 is operated with movement, in the direction of C or D, of the third cam plate 260.

Reference numeral 270 denotes a shutter cam plate. The shutter cam plate 270 has a projecting portion 271 which is slidably fitted in the groove 252 formed in the second cam plate 250 and a projecting portion 272 which is fitted in a hole formed in a link mechanism (not shown), the link mechanism functioning to actuate a shutter portion (not shown) provided in the disk inlet. When the shutter plate 270 moves in the direction of C, the link mechanism turns in the direction of G to close the shutter, while when the shutter plate 270 moves in the direction of D, the link mechanism turns in the direction of H to open the shutter.

The vertical base 280, which carries thereon the holding portion 211 and the left and right arms 221, 222, is structured so as to move vertically in accordance with the movement, in the direction of C or D, of the second cam plate 250. When the second dam plate 250 moves in the direction of C, the vertical base 280 including the holding portion 211 and the left and right arms 221, 222 is supported at the normal height H1. When the second cam plate 250 moves in the direction of D, the vertical base 280 including the holding portion 211 and the left and right arms 221, 222 is supported halfway at the height H1. Upon further movement, in the direction of D, of the second cam plate 250, the vertical base 280 including the holding portion 211 and the left and right arms 211 and 222 is raised up to the height H2.

Reference numeral 285 denotes a switching plate which is interlocked with the movement of the third cam plate 260. In one end of the switching plate 285 is formed a hole 261 for fitting a pin therein, the pin being provided on a link mechanism (not shown) which is adapted to operate in accordance with disk conveyance. At the other end of the switching plate 285 is formed a retaining portion for engagement with the retaining portion 287 of the switching plate 285 with movement, in the direction of C, of the third cam plate 260. In this engaged state the switching plate 285 is turned in the direction of A to bring the second shaft 234 into engagement in the recess 286 of the switching plate 285.

Figure 53:
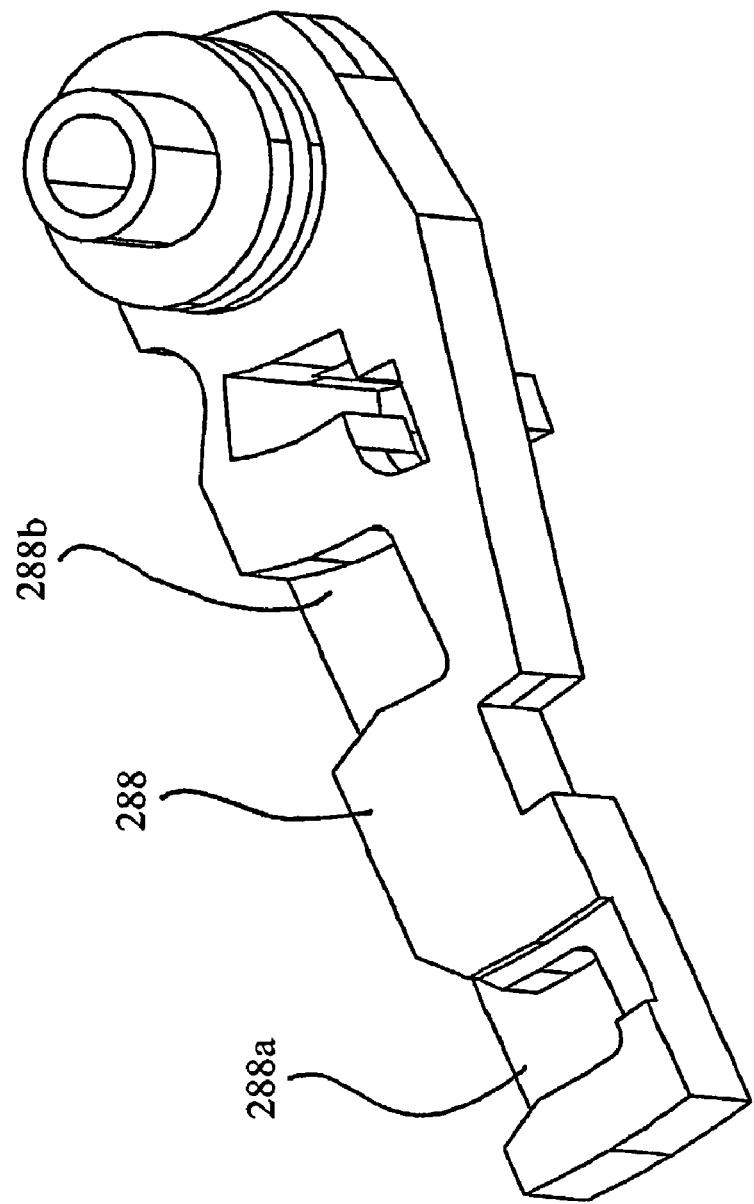
FIG. 53 is an explanatory diagram of a principal portion of the disk device shown in FIG. 47.
Figure 54:
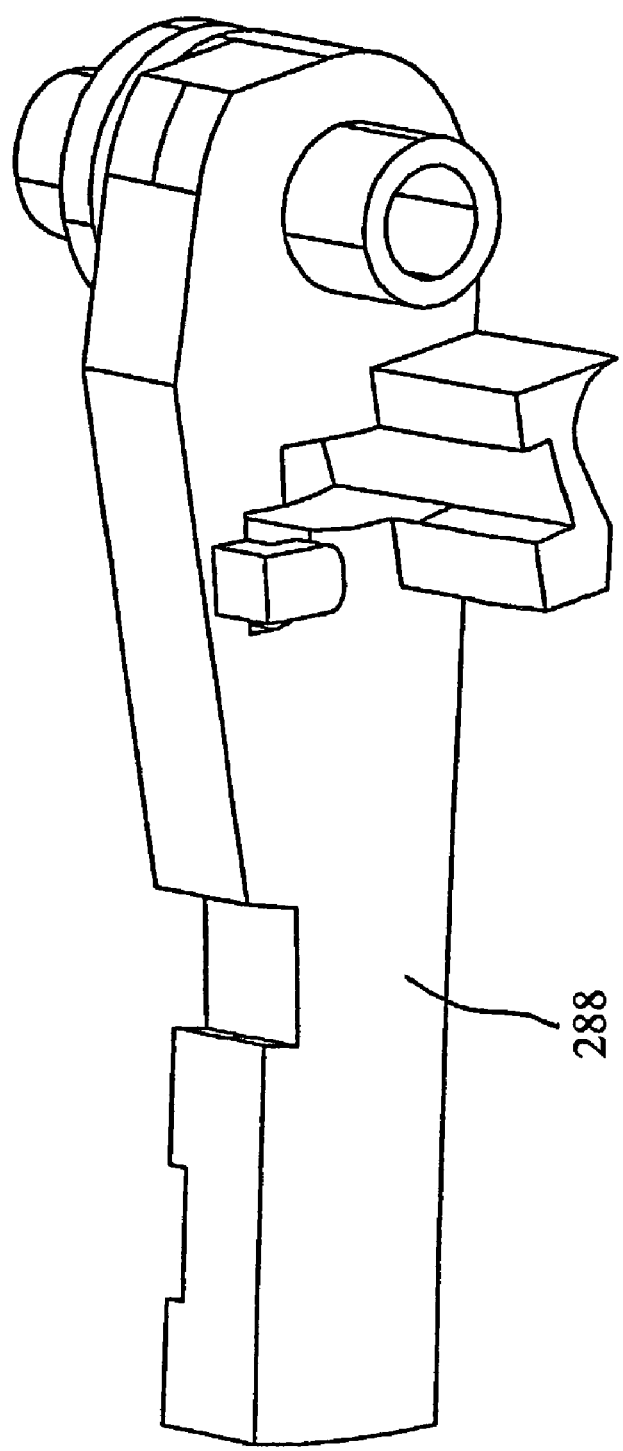
FIG. 54 is an explanatory diagram of a principal portion of the disk device shown in FIG. 47.

Reference numeral 288 denotes a lock lever having a position delimiting portion and a groove portion. The position delimiting portion delimits a projecting position of the holding portion 211 on the basis of the size of the disk held by the holding portion 211. In the groove portion is fitted the second shaft 234 to restrict the movement of the holding portion 211 and the left and right arms 222 and 223 at the time of setting the disk position. The groove portion is formed with a groove 288a in which the second shaft 234 is fitted in the case of a large diameter disk and a groove 288b in which the second shaft 234 is fitted in the case of a small diameter disk. The details of shape are as shown in FIG. 53. In addition, the details of shape on the back surface of the lock lever 288 are as shown in FIG. 54.

Figure 52:
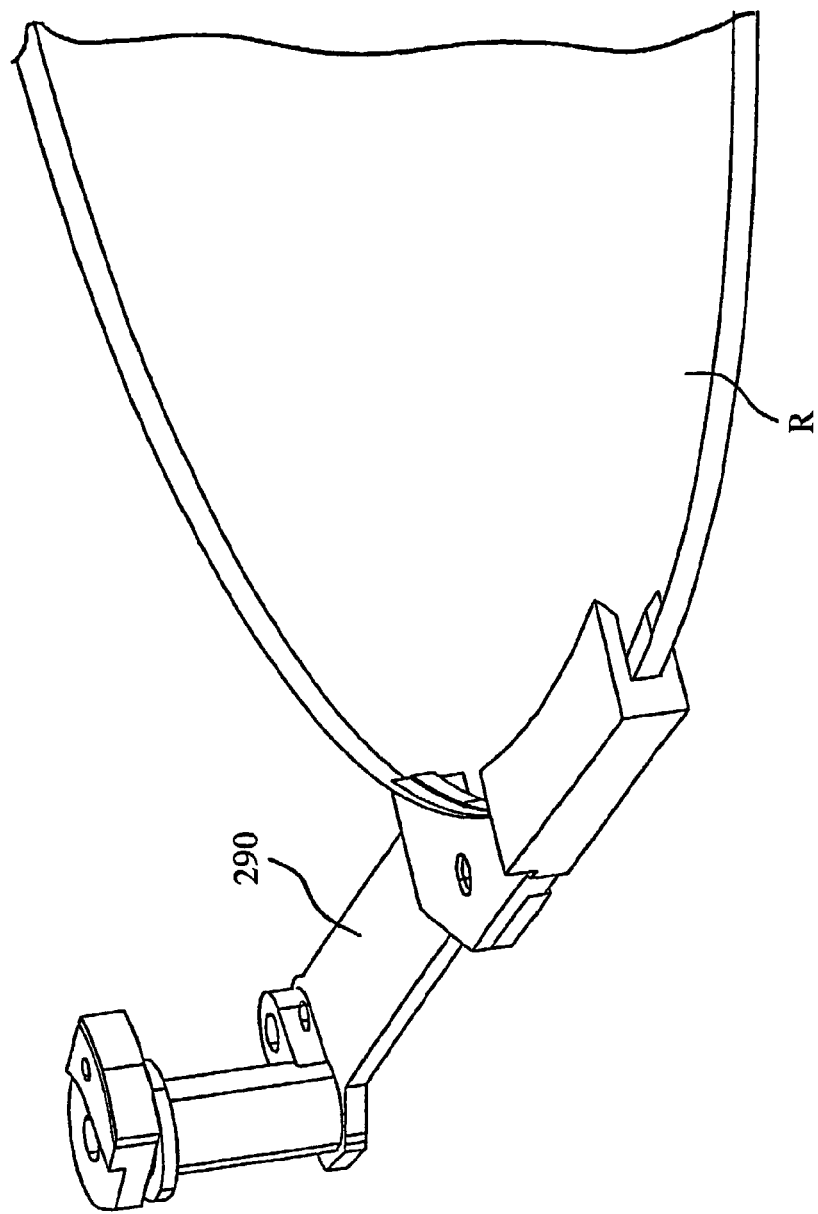
FIG. 52 is a detailed diagram of a principal portion of the disk device shown in FIG. 47.

Reference numeral 290 denotes a holding arm. In one end of the holding arm 290 is formed a hole 291 in which is fitted a pin provided at one end of a link portion, the link portion having a gear portion (to be described later) meshing with the gear portion 237 mounted on one end of the second shaft 234. At an opposite end of the holding arm 290 is provided a holding portion 292 for holding the peripheral edge portion of the disk. The holding portion 292 is internally formed with a groove to hold the disk. The holding arm 290 is disposed in opposition to the holding portion 211. That is, the disk is held at one diameter thereof by the holding portion 211 and at the other by the holding portion 292. The details of a disk holding state by the disk holding portion are as shown in FIG. 52.

When the disk is to be held by the holding portion 211, it is held also by the holding portion 292. Thus, the disk is gripped by both holding portions 211 and 292.

Figure 55:
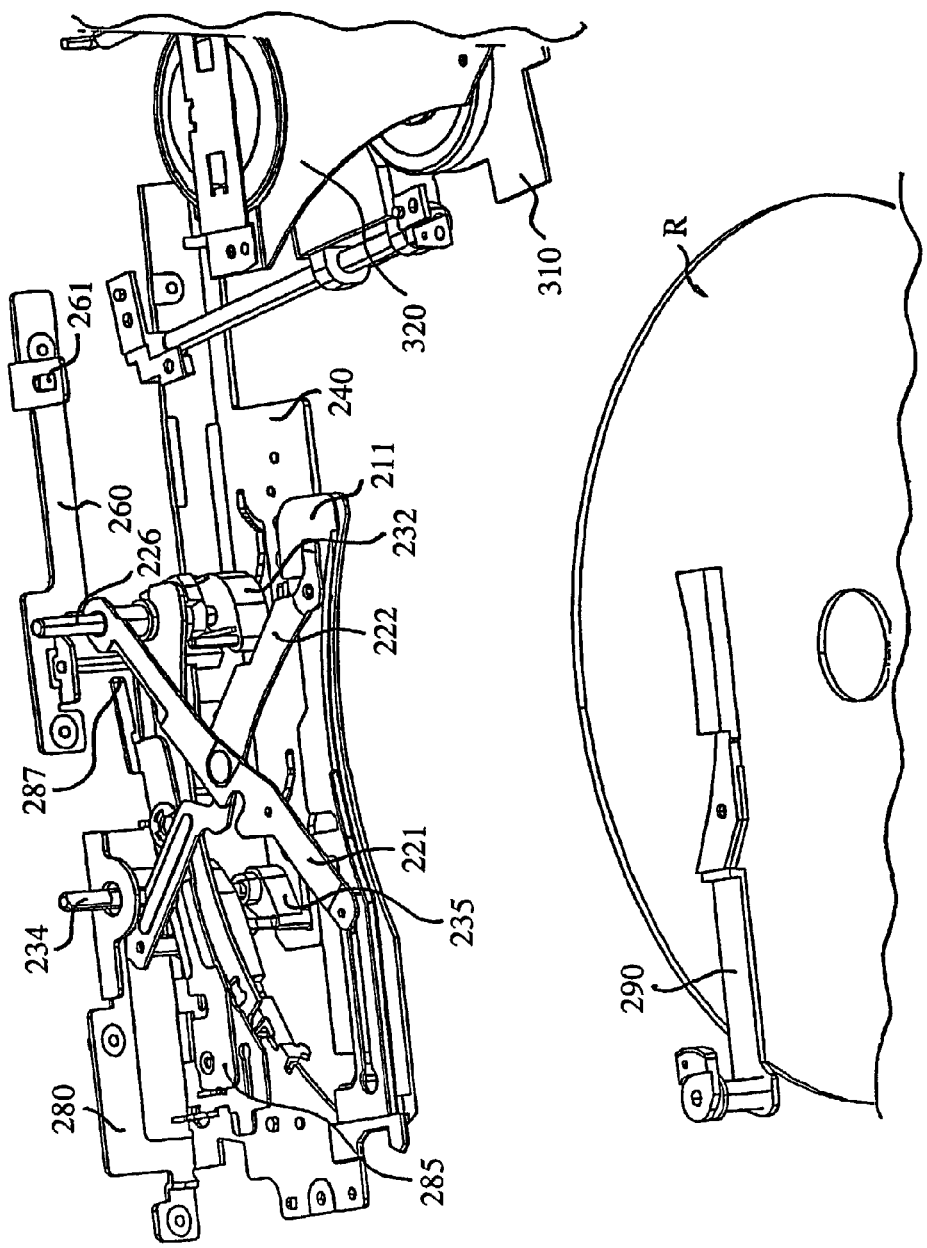
FIG. 55 is an operating state transition diagram explaining an operating state of the disk device shown in FIG. 47.
Figure 56:
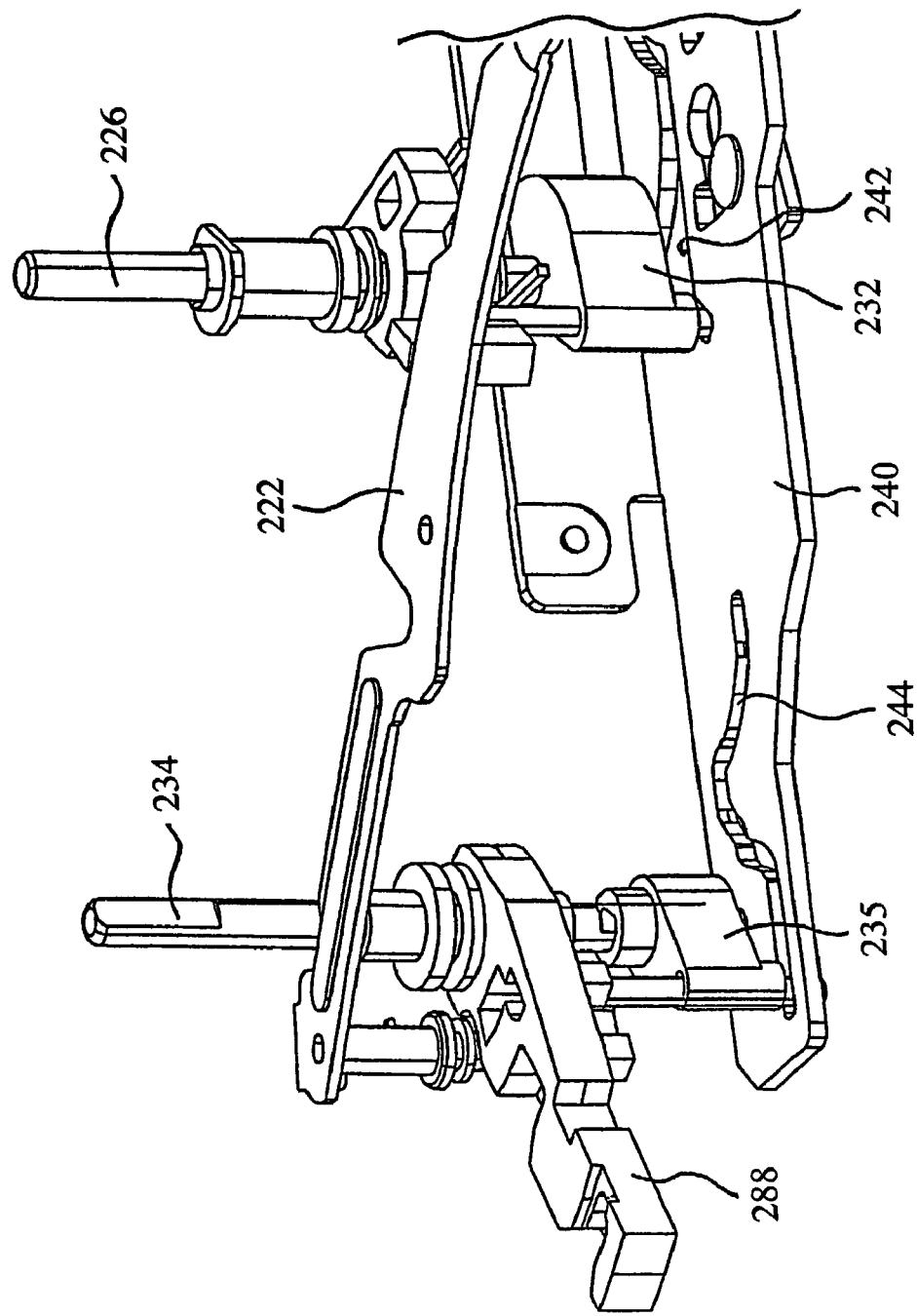
FIG. 56 is a detailed diagram of a principal portion of the disk device shown in FIG. 47.
Figure 57:
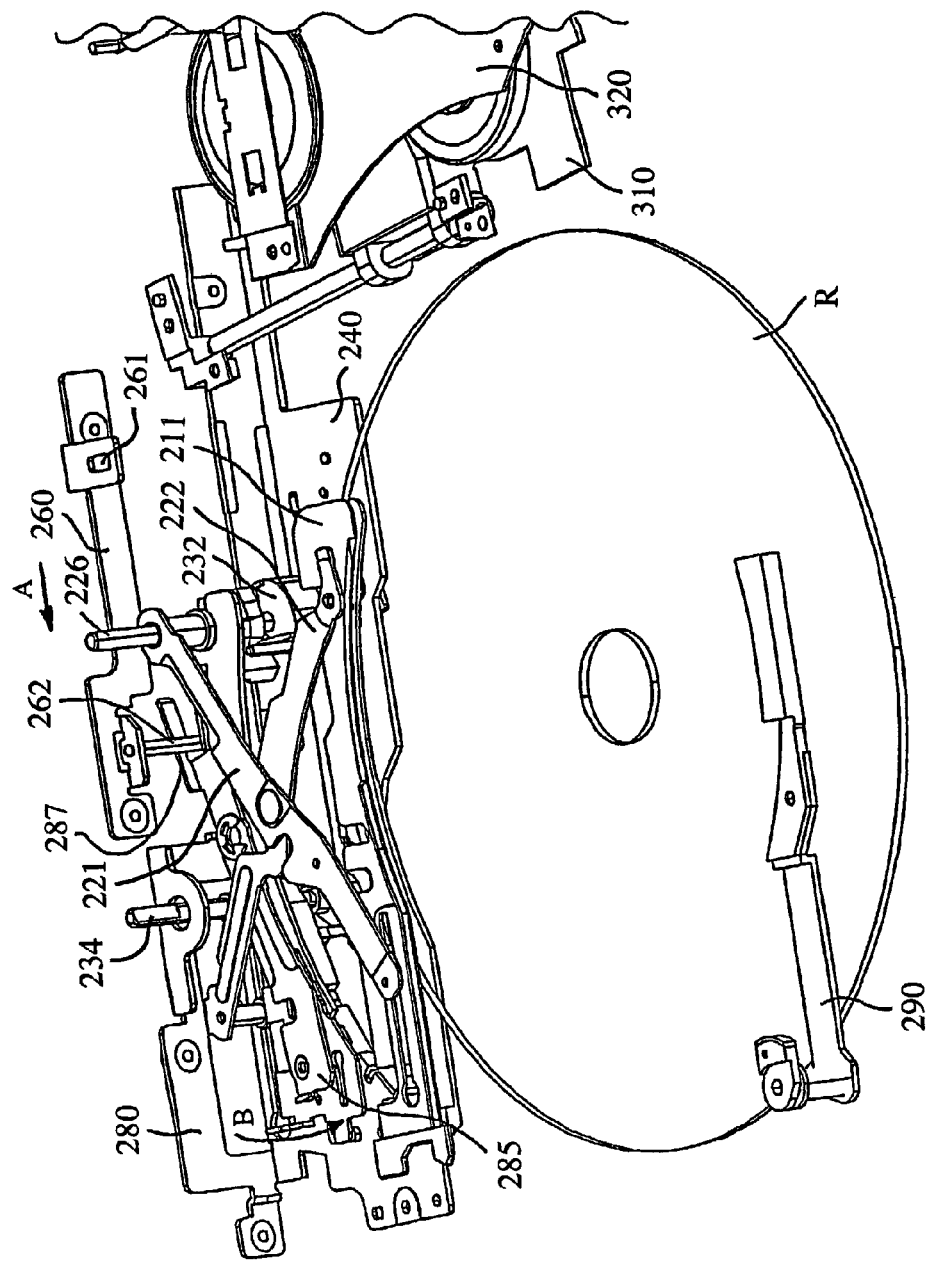
FIG. 57 is an operating state transition diagram explaining an operating state of the disk device shown in FIG. 47.

A description is now directed to the operation with reference to FIGS. 55 to 57.

FIGS. 55 to 67 illustrate a disk reproducing process involving conveyance of a disk, holding of the disk, replacement of the disk with another disk stored in the disk storing mechanism, and operation for reproducing the replaced disk.

First, as shown in FIG. 55, when a disk is not held by the holding portion 211, that is, in a stand-by state for holding a disk, the holding portion 211 and the left and right arms 221, 222 carried on the vertical base 280 project forwardly. The details of a principal portion in this state are as shown in FIG. 56.

Next, as shown in FIG. 57, when a disk is held by the holding portion 211, the third cam plate 260 moves in the direction of A in interlock with disk conveyance and a pin 262 provided below the third cam plate 260 is brought into engagement with the retaining portion 287 to unlock the lock lever 285.

Figure 58:
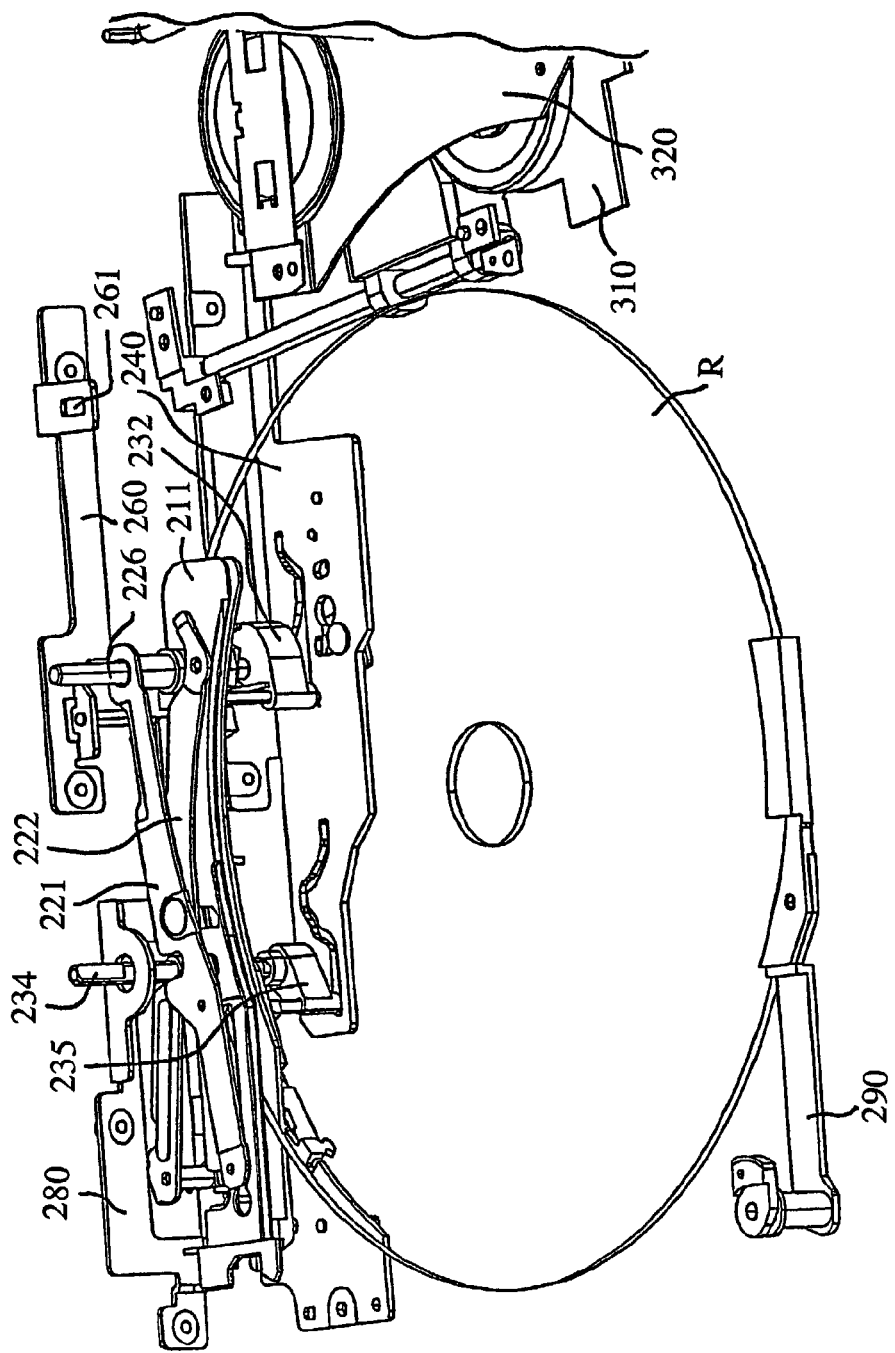
FIG. 58 is an operating state transition diagram explaining an operating state of the disk device shown in FIG. 47.

With the lock lever 285 thus unlocked, the left and right arms 221, 222 become movable. As shown in FIG. 58, the first cam plate moves in direction A and interlocking with this movement the left and right arms 221, 222 are folded so as to be stowed within the vertical lever 280. The holding arm 290 also turns in direction A so as to hold the disk. As a result, the disk is held by both holding portions 211 and 292. At this time, the holding portion 211 connected to both left and right arms 221, 222 is also stowed.

Figure 59:
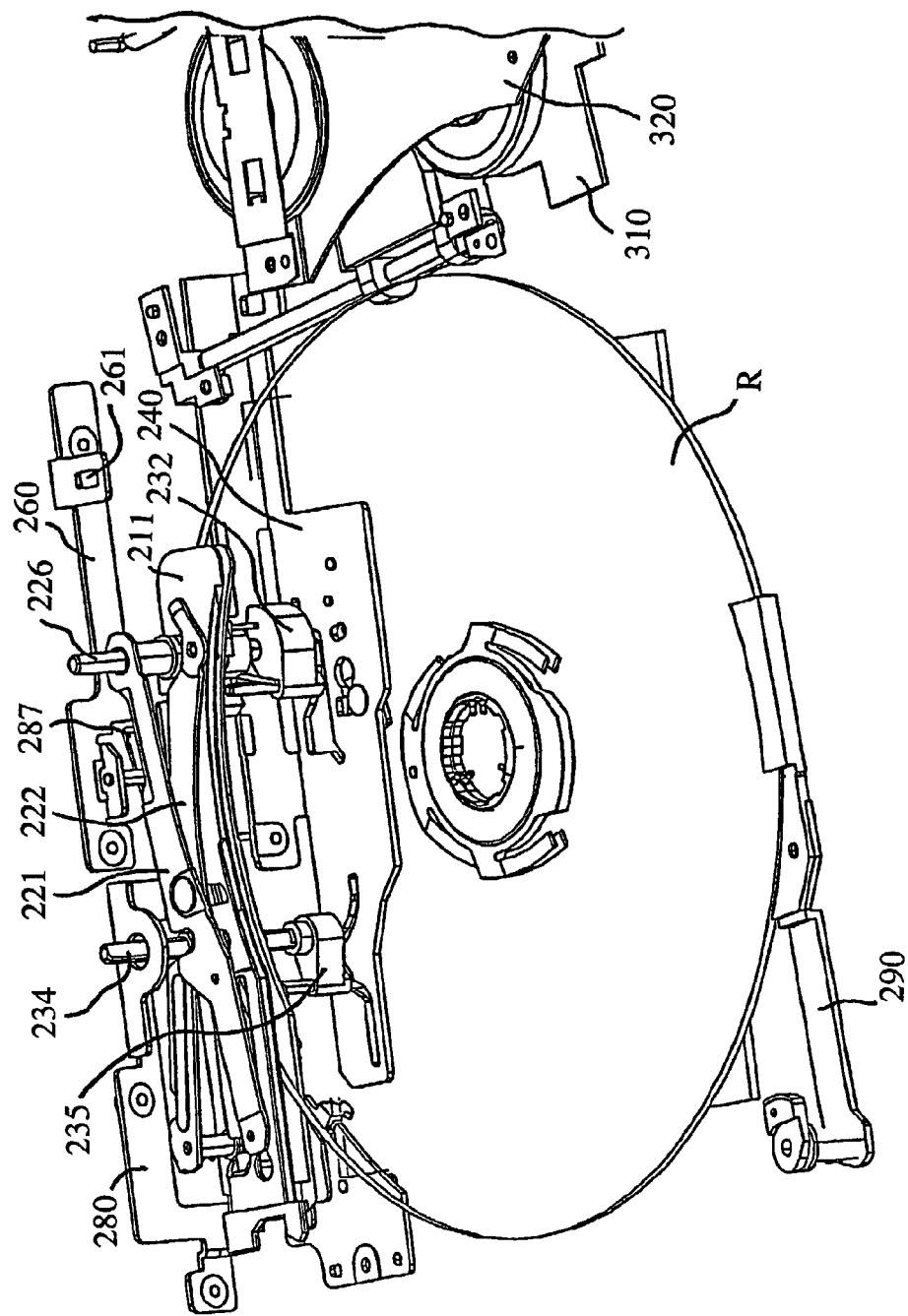
FIG. 59 is an operating state transition diagram explaining an operating state of the disk device shown in FIG. 47.
Figure 60:
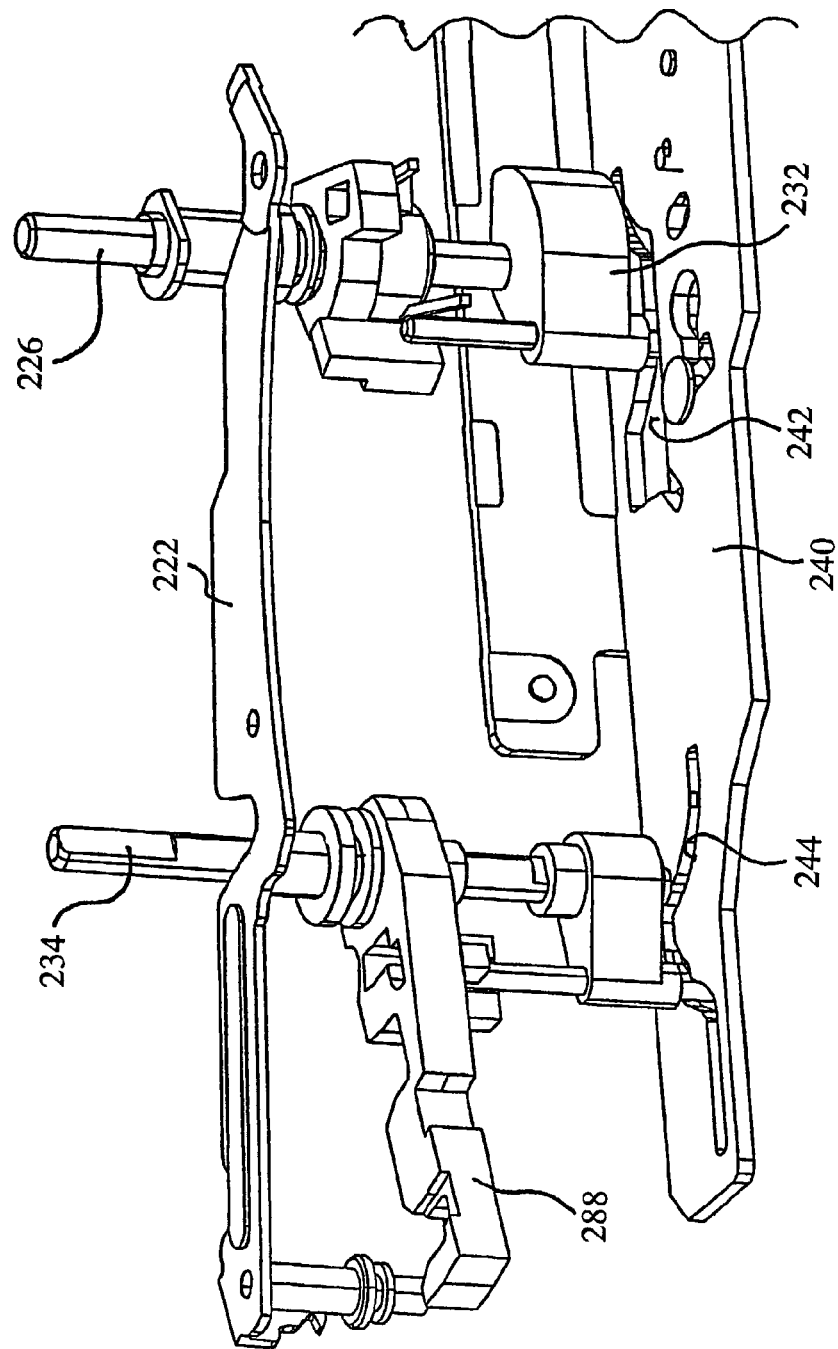
FIG. 60 is a detailed diagram of a principal portion of the disk device shown in FIG. 59.

Next, as shown in FIG. 59, when the disk is to be stored in the disk storing mechanism or when it is to be replaced with another disk already stored in the disk storing mechanism, the operation concerned is performed at the height H2 which is higher than the normal position H1 (shown in FIG. 47). Therefore, when the disk holding operation is completed as in FIG. 58, the second cam plate 250 moves in direction C shown in FIG. 47, causing the vertical base 280 including the holding portion 211 and the left and right arms 221, 222 to rise. This ascending motion is performed while holding the disk gripped by both holding portion 211 and holding arm 290. The details of a principal portion in this state of FIG. 59 is as shown in FIG. 60.

Figure 61:
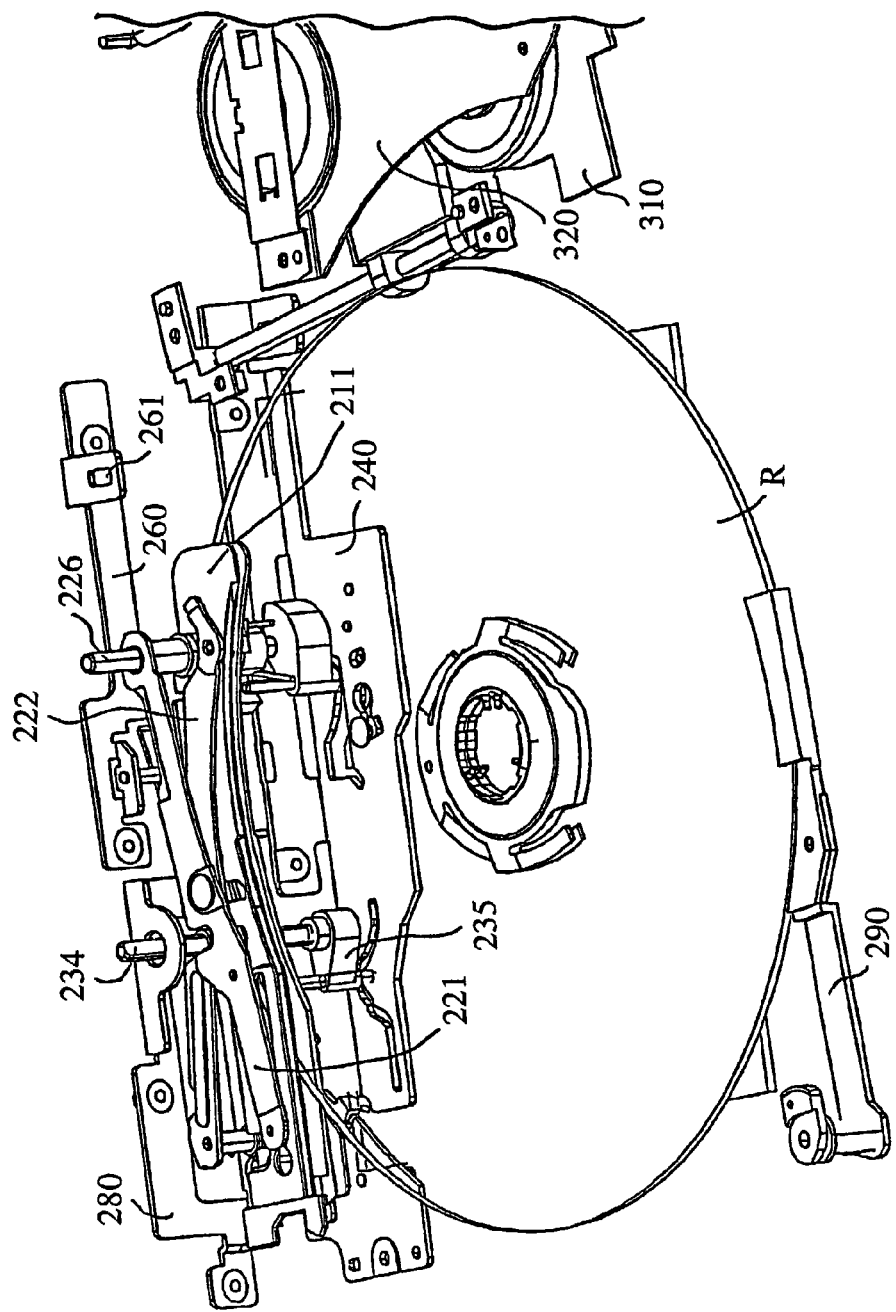
FIG. 61 is an operating state transition diagram explaining an operating state of the disk device shown in FIG. 47.
Figure 62:
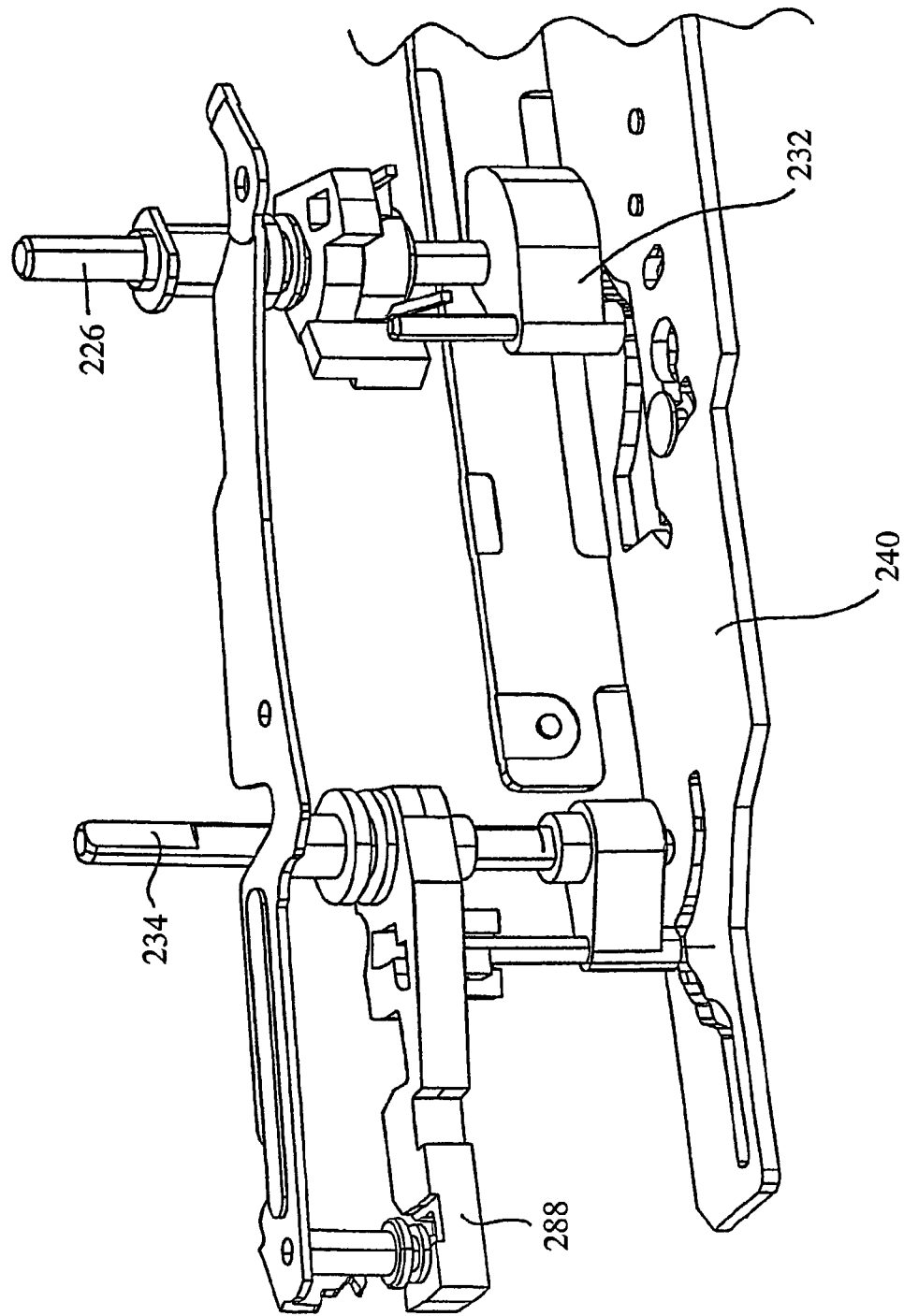
FIG. 62 is a detailed diagram of a principal portion of the disk device shown in FIG. 61.
Figure 63:
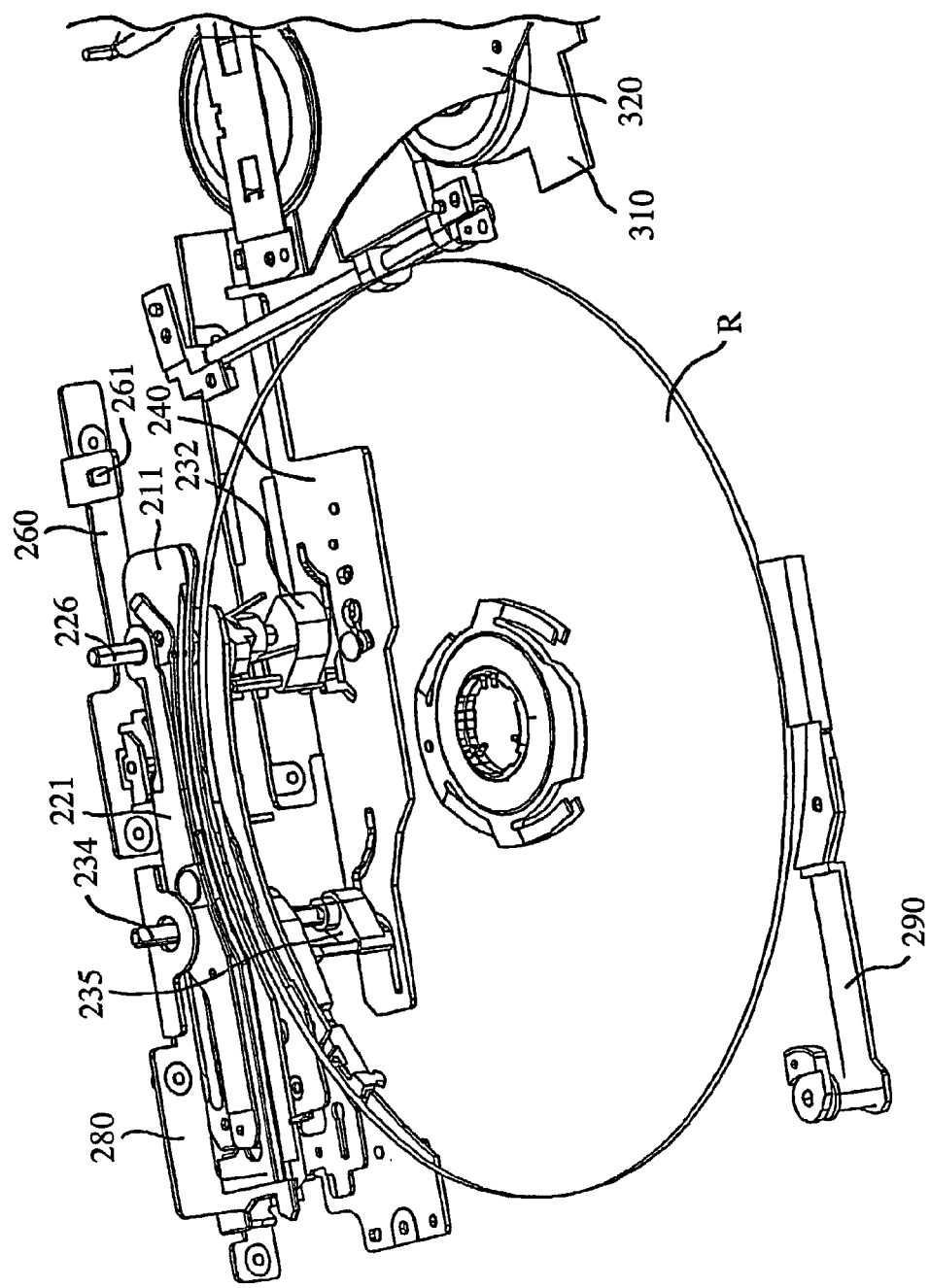
FIG. 63 is an operating state transition diagram explaining an operating state of the disk device shown in FIG. 47.
Figure 64:
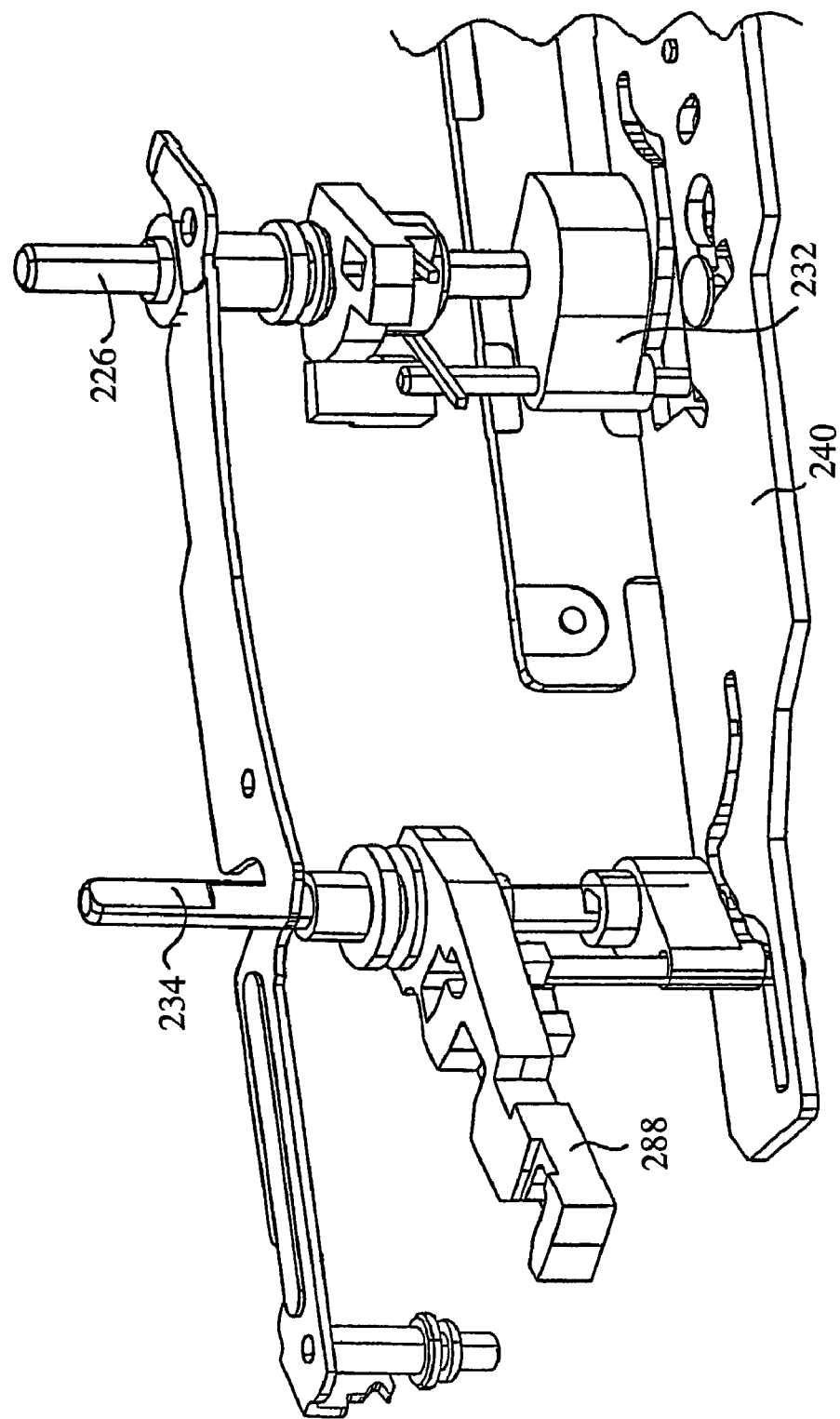
FIG. 64 is a detailed diagram of a principal portion of the disk device shown in FIG. 63.
Figure 65:
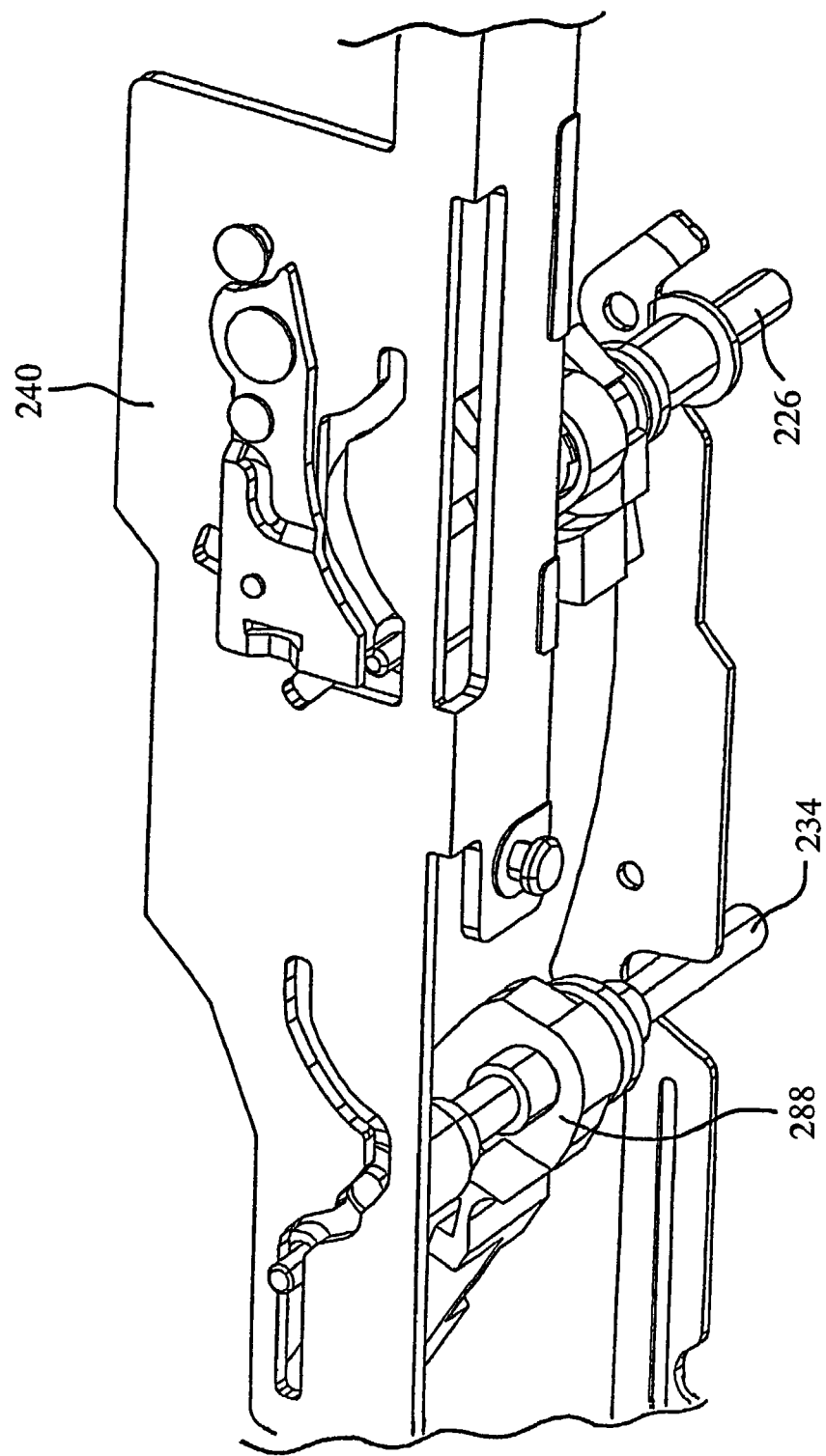
FIG. 65 is a detailed diagram of a principal portion of the disk device shown in FIG. 63.

After these series of operations, the disk storing mechanism stores the disk as in FIG. 61. While the vertical base 280 rises, the disk is urged from below against the support means (spacer portion) located at the top stage of the disk storing mechanism. The details of a principal portion in this state of FIG. 61 is as shown in FIG. 62. Further, as shown in FIG. 63, since the disk is urged against the support means (spacer portion) located at the top stage of the disk storing mechanism, it is supported without looseness. Therefore, the holding portion 211 and the holding arm 280 which have so far held the disk are disengaged from the disk. The details of a principal portion in this state of FIG. 63 are as shown in FIG. 64 and the details of a principal portion on the backside are as shown in FIG. 65.

Figure 66:
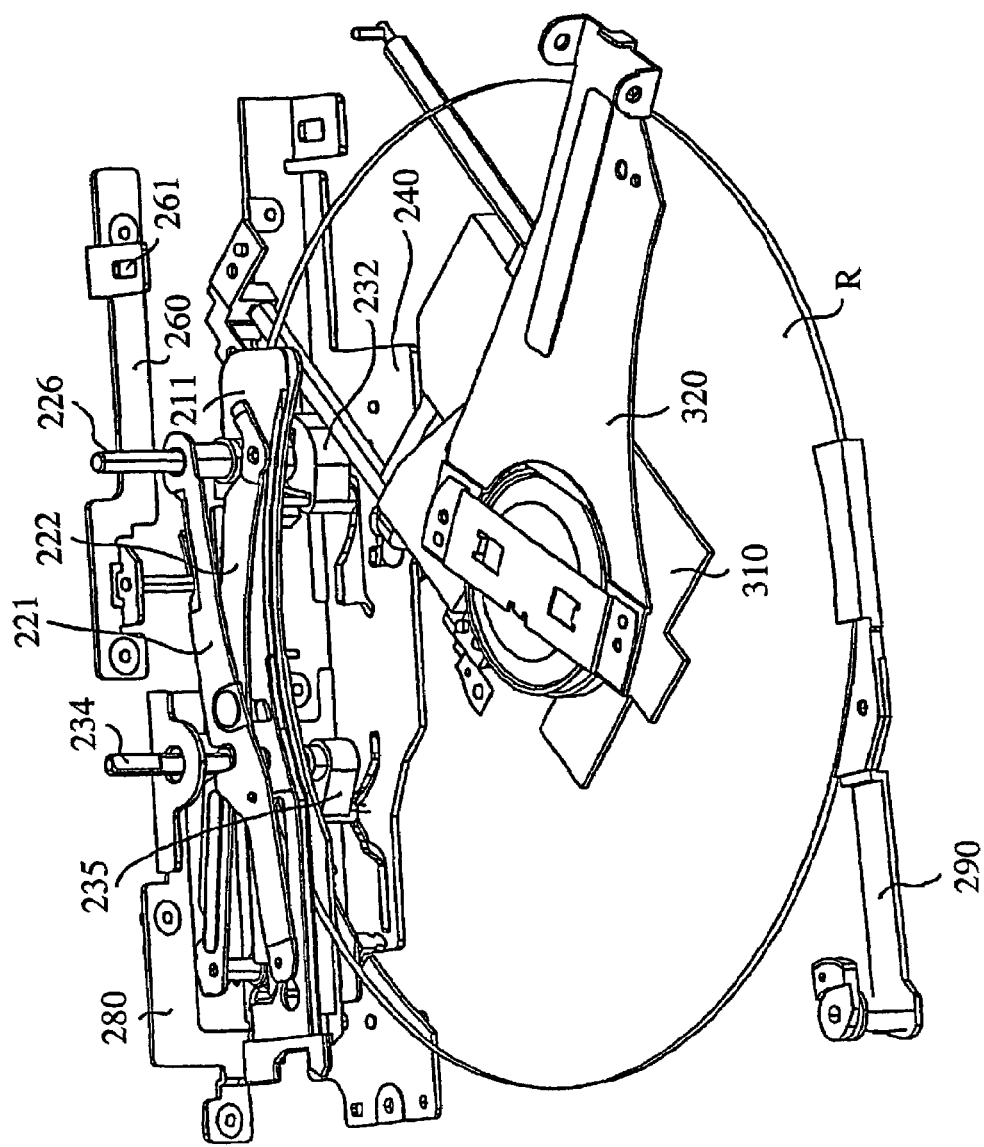
FIG. 66 is an operating state transition diagram explaining an operating state of the disk device shown in FIG. 47.

Next, the reproduction of the disk supported by the disk storing mechanism 400 is performed in the following manner. From the state of FIG. 63, first the turntable 310 turns in the direction of A, as shown in FIG. 66, and the second cam plate 250 moves in the direction of D shown in FIG. 47, causing the vertical base 280 to move down and allowing the disk to be rested on the table portion 311. Thereafter, the clamp portion 320 turns in the direction of B and clamps the disk from above the disk. With this operation, the disk is gripped by both turntable 310 and clamp portion 320. Next, since the disk is gripped by the turntable 310 and the clamp portion 320, the first cam plate 240 moves in the direction of C as in FIG. 67, allowing the left and right arms 221, 222 to be stowed in the vertical base, and the disk is released from its holding state. Now, a series of operations are completed. For reverse operations, the process described above is reversed.

Figure 68:
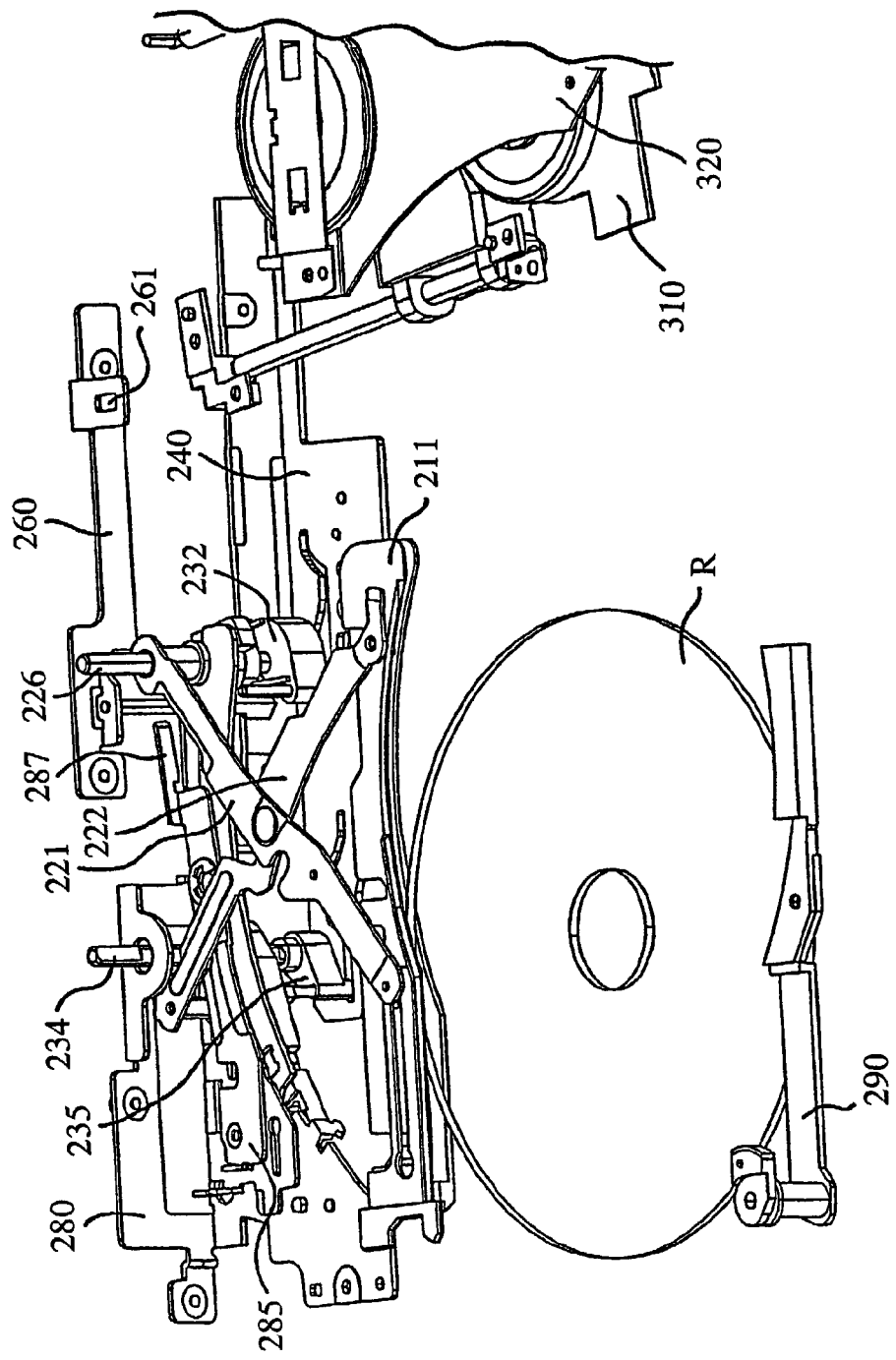
FIG. 68 is an operating state transition diagram explaining an operating state of the disk device shown in FIG. 47.
Figure 69:
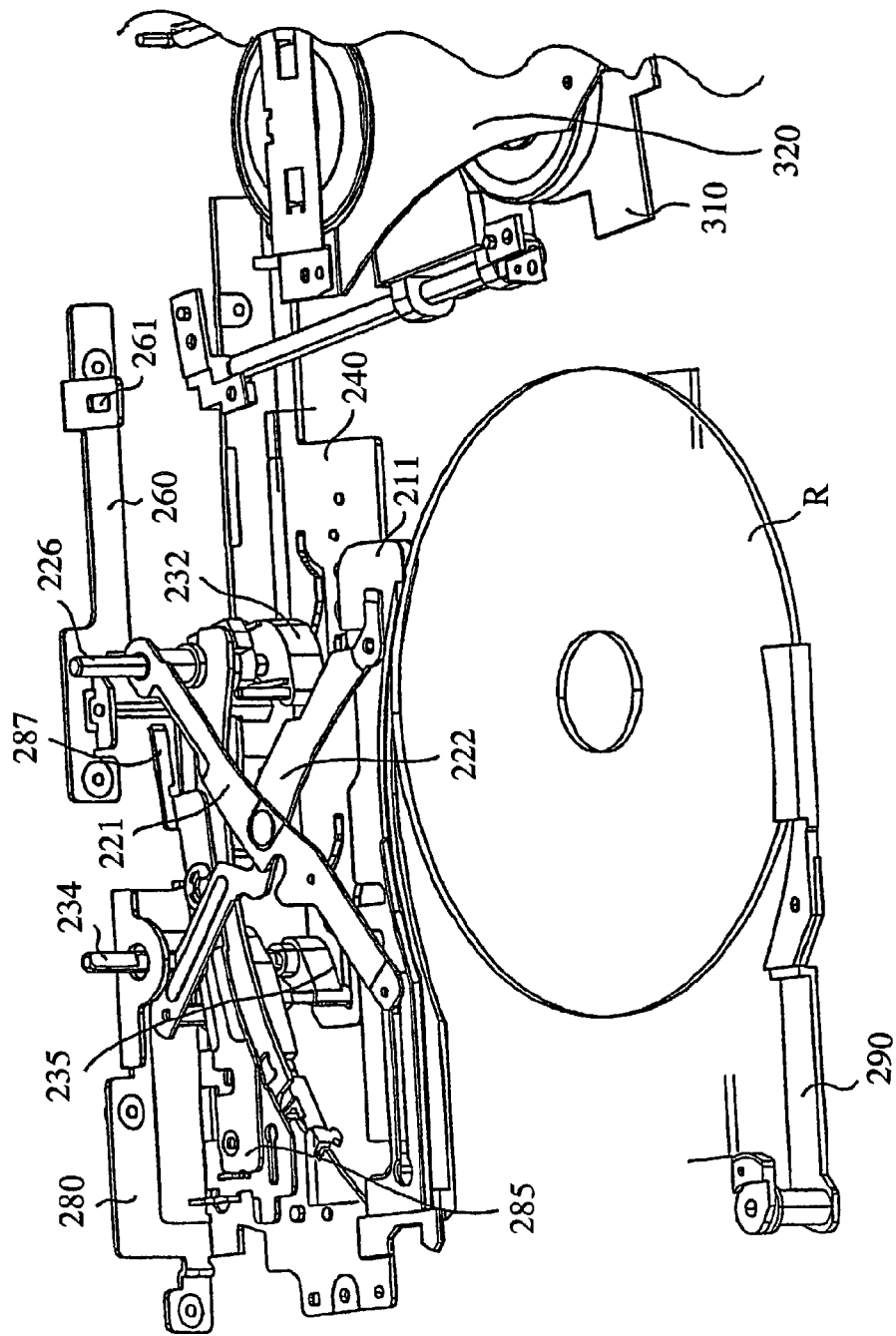
FIG. 69 is an operating state transition diagram explaining an operating state of the disk device shown in FIG. 47.
Figure 70:
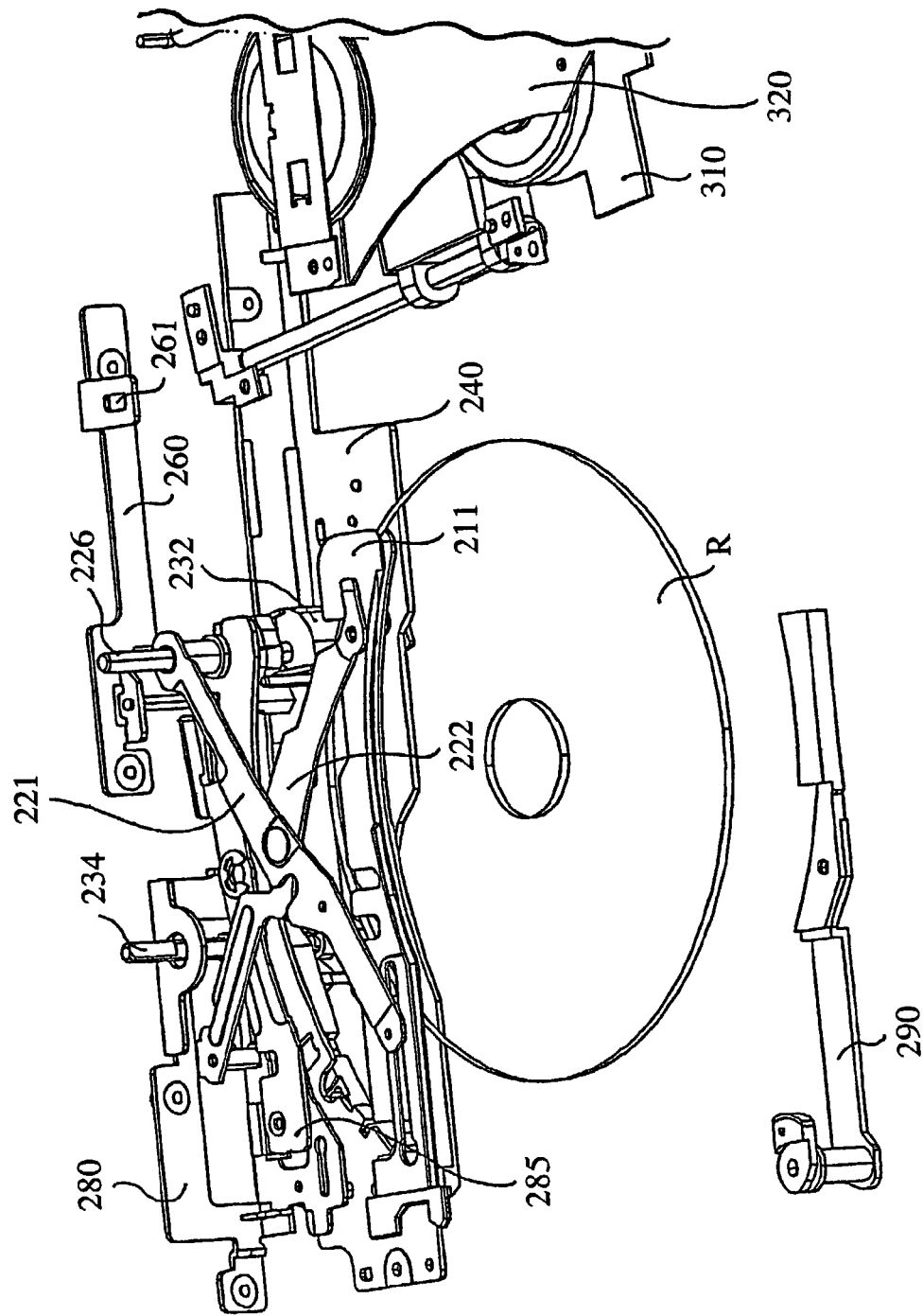
FIG. 70 is an operating state transition diagram explaining an operating state of the disk device shown in FIG. 47.
Figure 71:
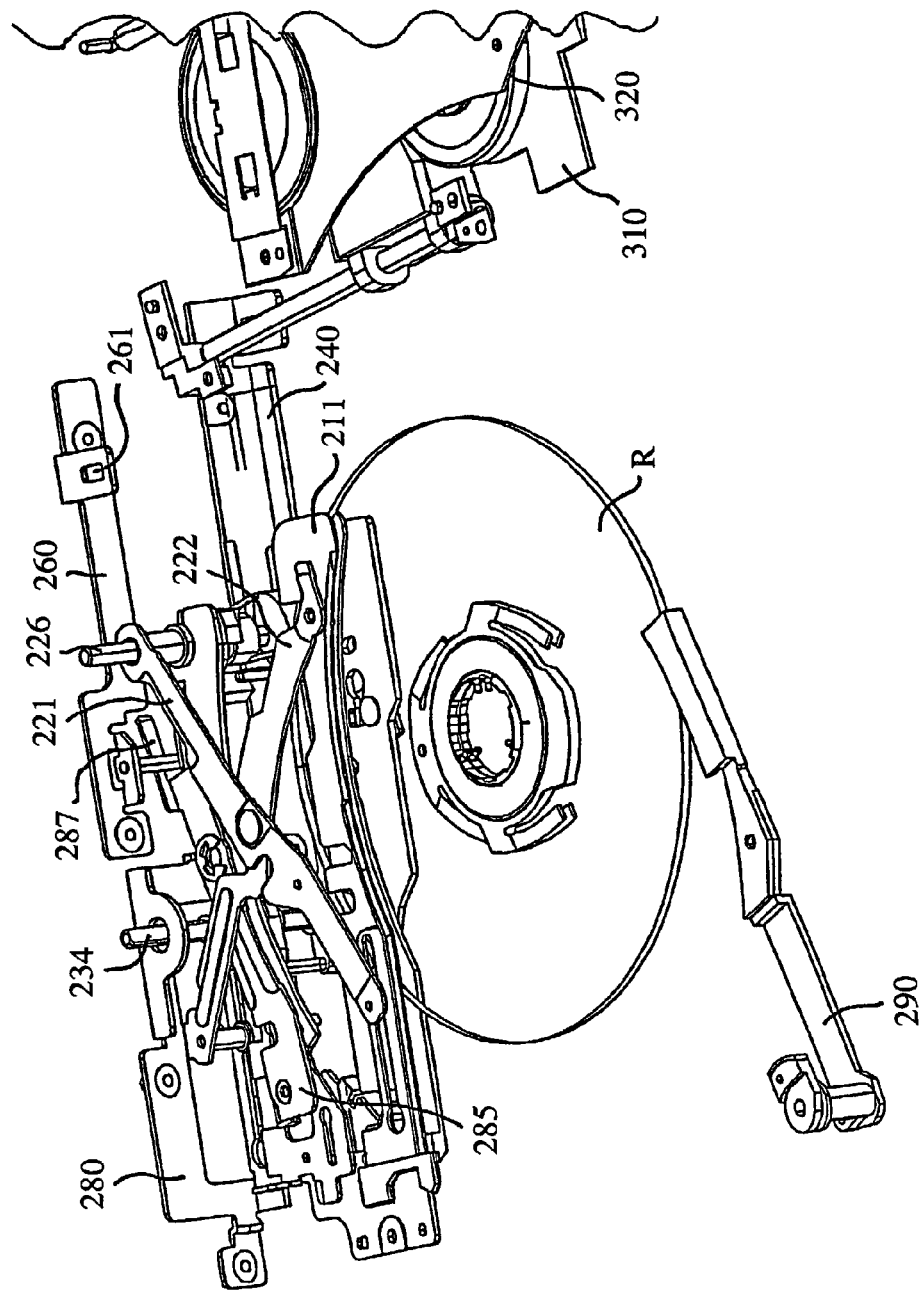
FIG. 71 is an operating state transition diagram explaining an operating state of the disk device shown in FIG. 47.
Figure 72:
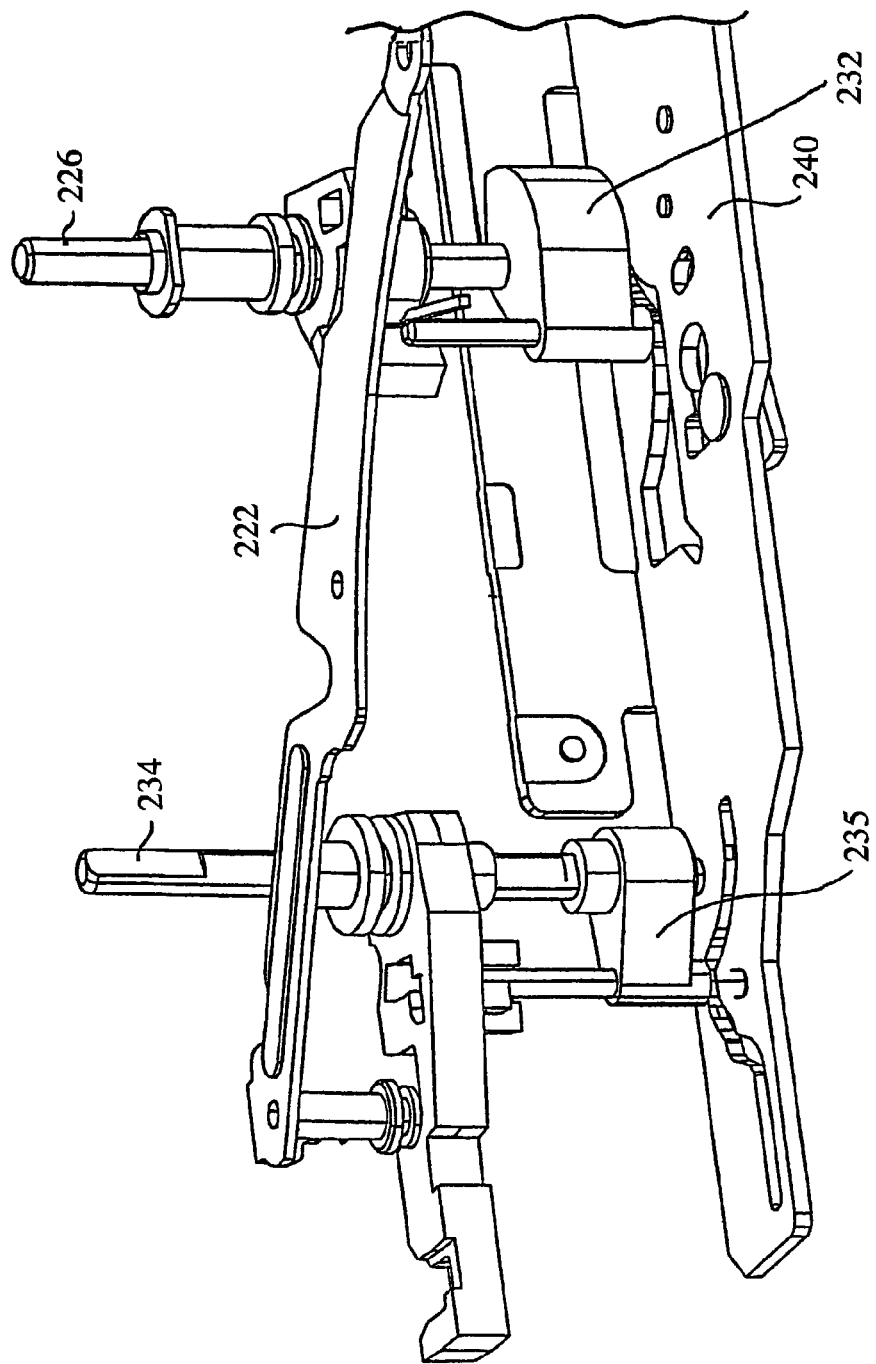
FIG. 72 is a detailed diagram of a principal portion of the disk device shown in FIG. 71.

Although the above description is of a large diameter disk, it is also applicable to a small diameter disk. FIGS. 68 and 69 illustrate a state in which a small diameter disk is held. FIG. 68 shows a state in which a disk is not held at a central position, but is held on a somewhat left side, and FIG. 69 shows a state in which a disk is held on a somewhat right side. A small diameter disk is pressed against the holding portion 211 by the holding arm 290 and is held thereby. Next, as shown in FIG. 71, the second cam plate 250 is moved, thereby raising the vertical base 280 and urging it from below against the support means (spacer portion) located at the top stage of the disk storing mechanism, whereby the disk is gripped by both holding portion 211 and holding arm 290. The details of a principal portion in this state of FIG. 71 are as shown in FIG. 72.

<Disk Detecting Portion>

Figure 73:
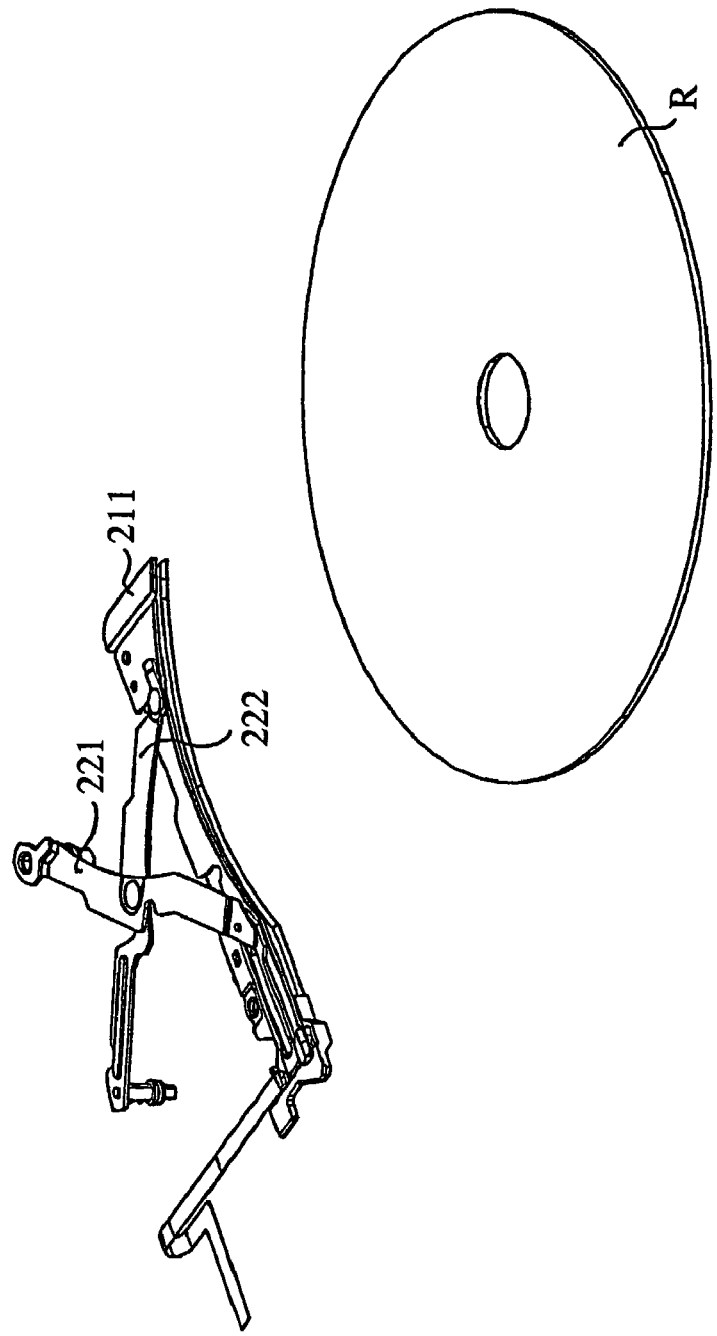
FIG. 73 is a structure diagram of a principal portion of the disk device shown in FIG. 1.
Figure 74:
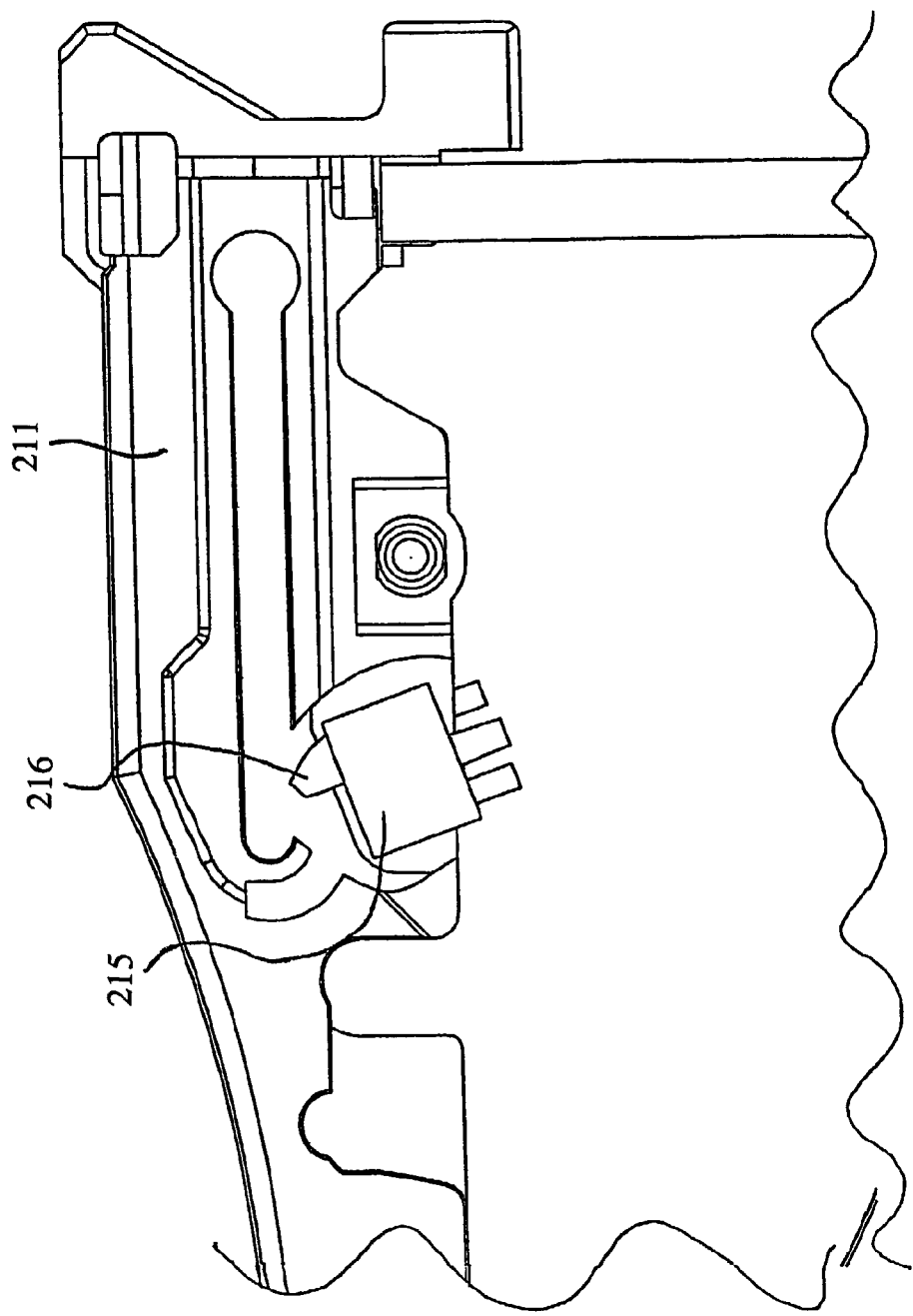
FIG. 74 is a detailed diagram of a principal portion of the disk device shown in FIG. 73.

FIG. 73 is a structure diagram showing the structure of the disk holding portion including the disk detecting portion and FIG. 74 is a structure diagram of a principal portion of the disk detecting portion. In both figures, reference numeral 215 denotes a detecting switch provided in an inner part of the groove 212 formed in the holding portion 211 and 216 denotes an abutment portion in the detecting switch 215. When a disk is inserted into and held by the disk holding portion 211, the peripheral edge portion of the disk is put in abutment against the abutment portion 216. When the disk is abutted and pushed against the abutment portion 216 to turn ON the detecting switch 215, a microcomputer (not shown) judges that the disk is held. In contrast therewith, if the detecting switch 215 remains OFF even upon lapse of a predetermined time after the start of disk insertion, the microcomputer judges that the holding portion 211 does not hold the disk accurately. Other structural points are the same as in FIG. 47 and so explanations thereof will here be omitted.

Next, a description will be given about the operation.

Figure 75:
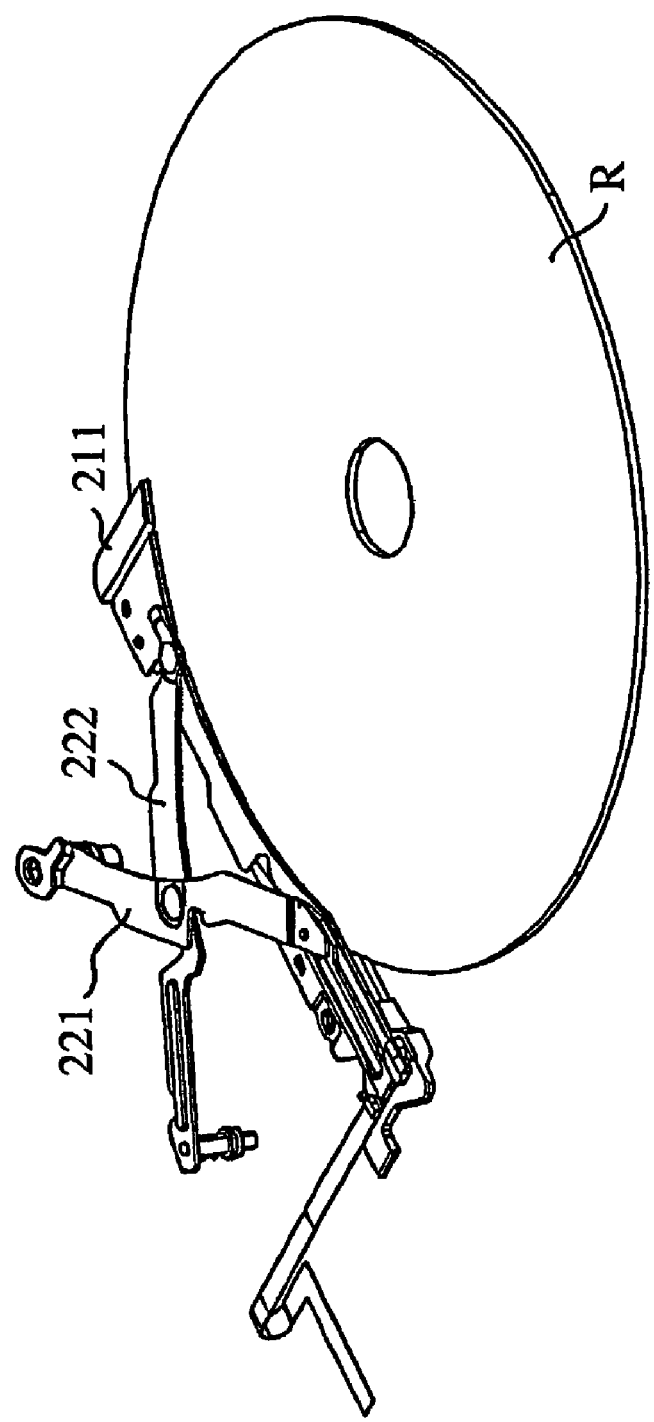
FIG. 75 is an operating state transition diagram explaining an operating state of the disk device shown in FIG. 73.
Figure 76:
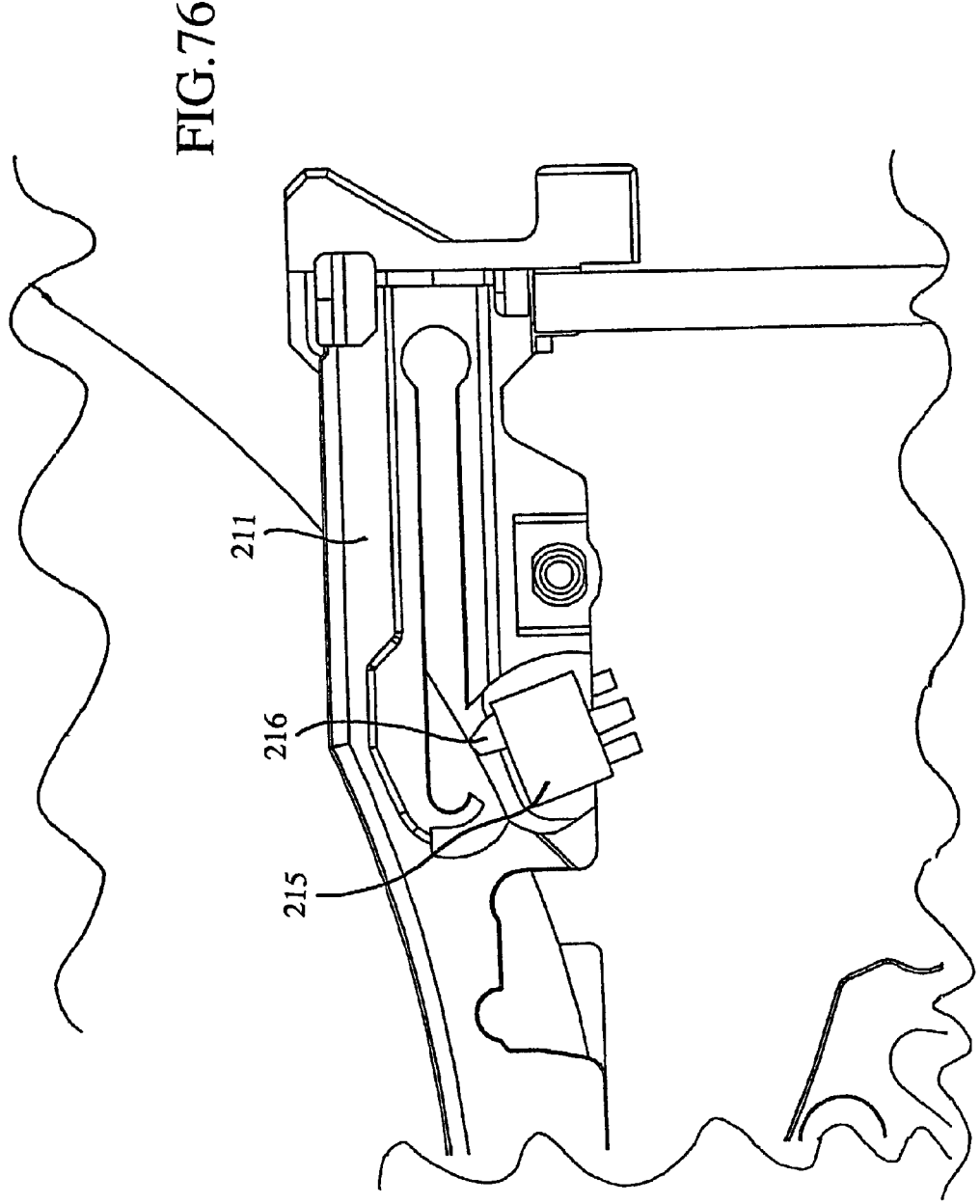
FIG. 76 is a detailed diagram of a principal portion of the disk device shown in FIG. 75.
Figure 77:
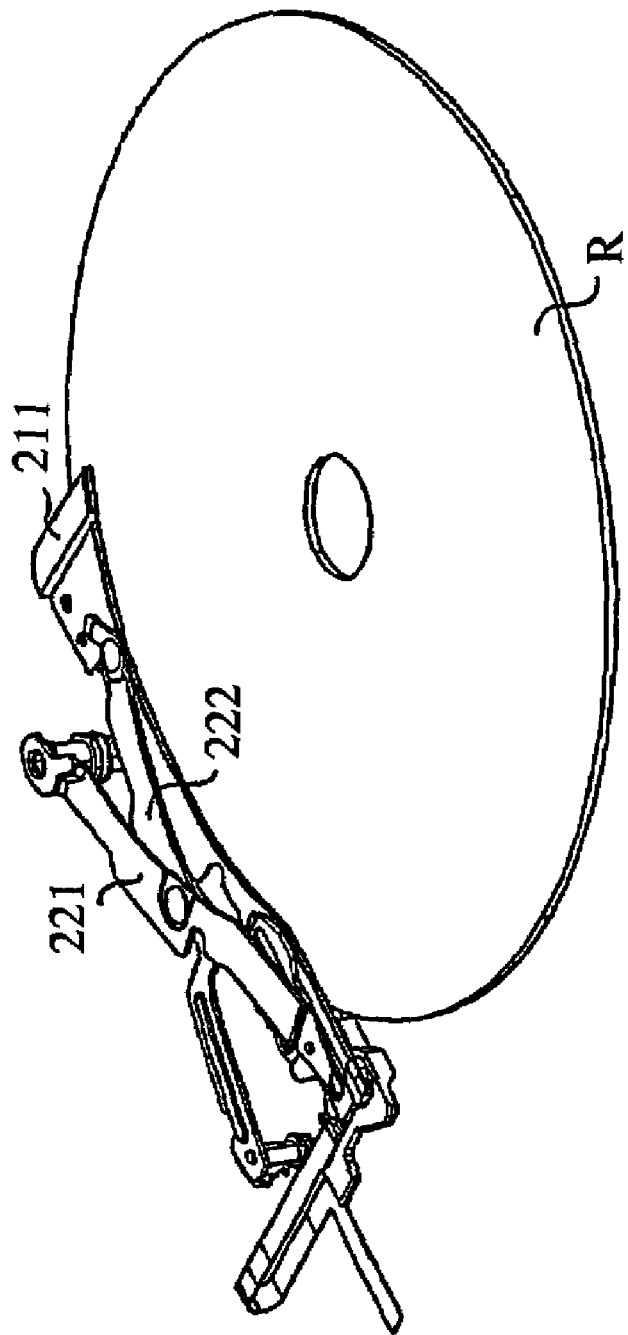
FIG. 77 is an operating state transition diagram explaining an operating state of the disk device shown in FIG. 73.
Figure 78:
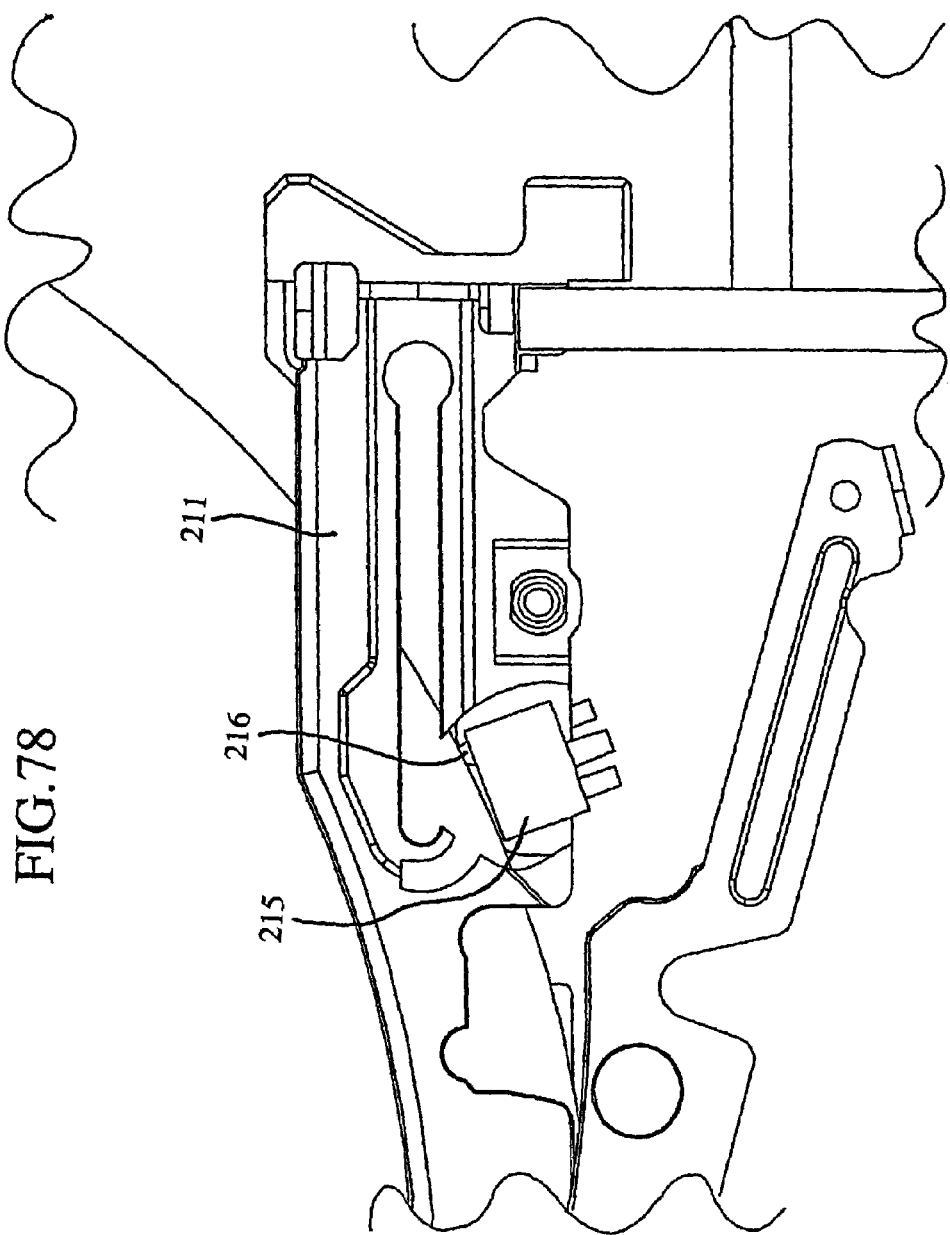
FIG. 78 is a detailed diagram of a principal portion of the disk device shown in FIG. 77.
Figure 79:
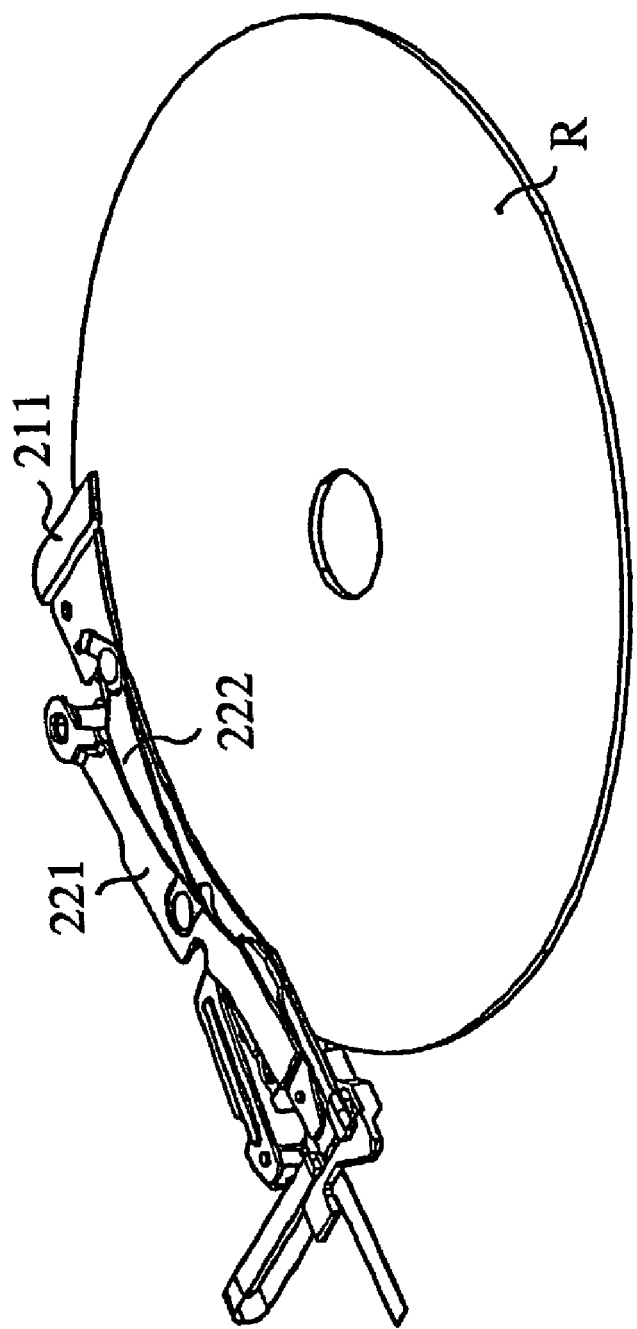
FIG. 79 is an operating state transition diagram explaining an operating state of the disk device shown in FIG. 73.

The operation of the disk holding portion is the same as that described above. FIG. 73 shows a state in which a disk is being conveyed and is not held by the holding portion 211. FIG. 75 shows a state in which the disk is being held by the holding portion 211. In this connection, FIG. 76 shows a state in which the disk begins to abut the abutment portion 216 of the detecting switch 215. In this state the detecting switch 215 is not turned ON yet. As the disk further moves in the direction of A so as to be held by the holding portion 211, it pushes the abutment portion 216, which turns ON the detecting switch, as shown in FIGS. 77 and 78. Upon turning ON of the detecting switch 215 it is judged in the disk device that the disk holding operation has been completed without any trouble, as shown in FIG. 79. Thus, the holding state of the disk can be judged accurately and it is possible to prevent the occurrence of malfunction of the disk device.

Figure 80:
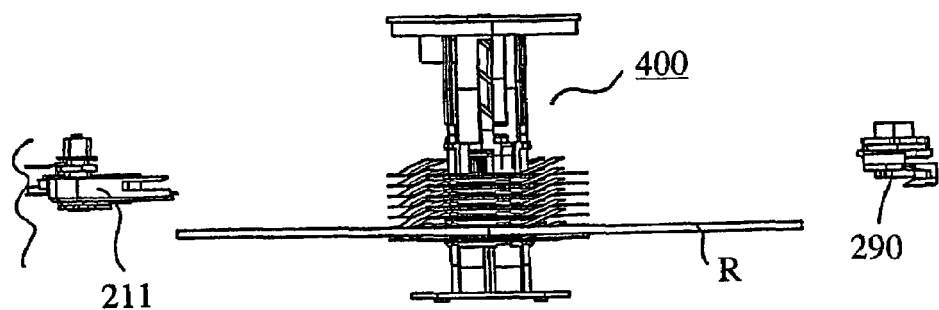
FIG. 80 is an explanatory diagram of a principal portion of the disk device shown in FIG. 73.
Figure 81:
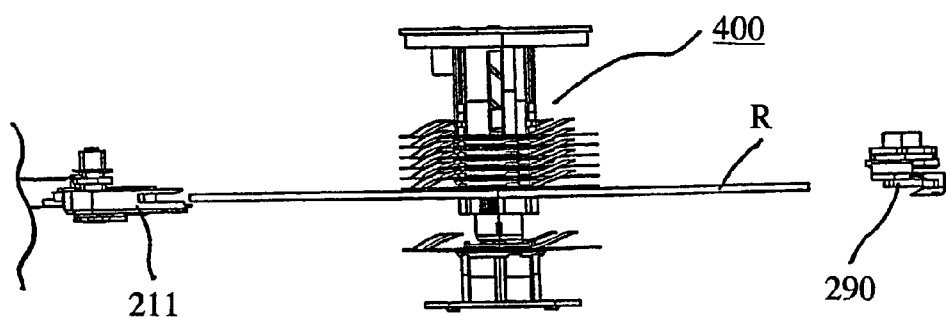
FIG. 81 is an operating state transition diagram explaining an operating state of the disk device shown in FIG. 80.
Figure 82:
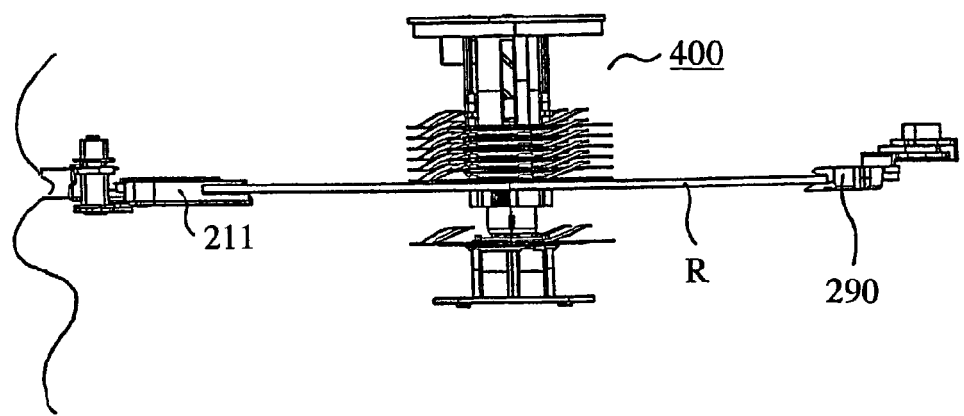
FIG. 82 is an operating state transition diagram explaining an operating state of the disk device shown in FIG. 80.
Figure 83:
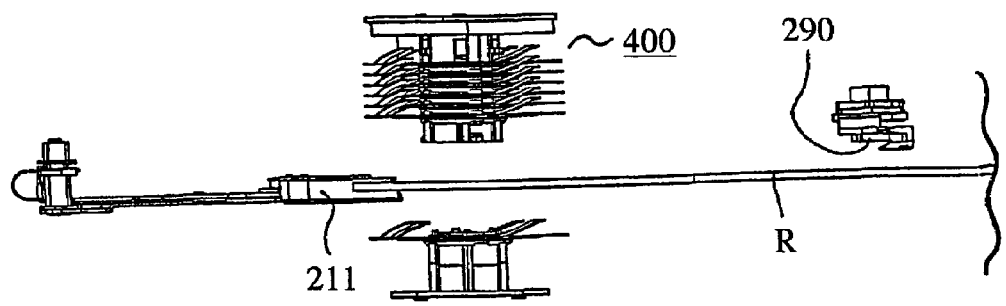
FIG. 83 is an operating state transition diagram explaining an operating state of the disk device shown in FIG. 80.
Figure 84:
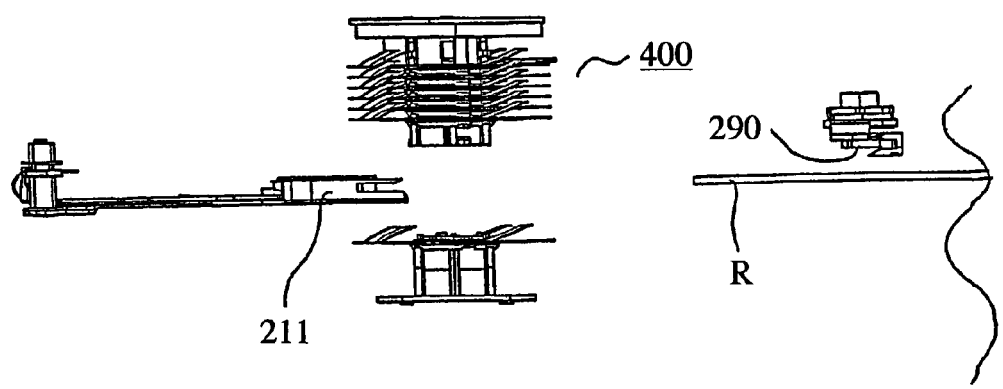
FIG. 84 is an operating state transition diagram explaining an operating state of the disk device shown in FIG. 80.

The following description is now provided in association with the operation of the disk holding mechanism 200 and that of the disk storing mechanism 400. In this example, these operations are a series of operations for discharging the disks stored in the disk storing mechanism to the exterior of the disk device. First, as shown in FIG. 80, disks are stored in the disk storing mechanism 400. At this time, the disk holding mechanism 200 does not hold any disk. Next, as shown in FIG. 81, the disk storing mechanism 400 operates to lower the disk height and the disk holding mechanism 200 is drawn close to the peripheral edge portion of the disk. Next, as shown in FIG. 82, the disk holding mechanism 200 holds the peripheral edge portion of the disk. At this instant, the detecting switch 215 disposed within the holding portion 211 detects the disk and issues a command to the microcomputer (not shown) so as to divide the disk storing mechanism 400. Next, as shown in FIG. 83, the disk storing mechanism 400 is divided in accordance with the disk detection command and the holding arm 290 is turned downward, whereby the disk is held by only the holding portion 211. Next, as shown in FIG. 84, the disk leaves the holding portion 211 and is conveyed to the disk inlet. In this way a series of operations are completed.

Figure 85:
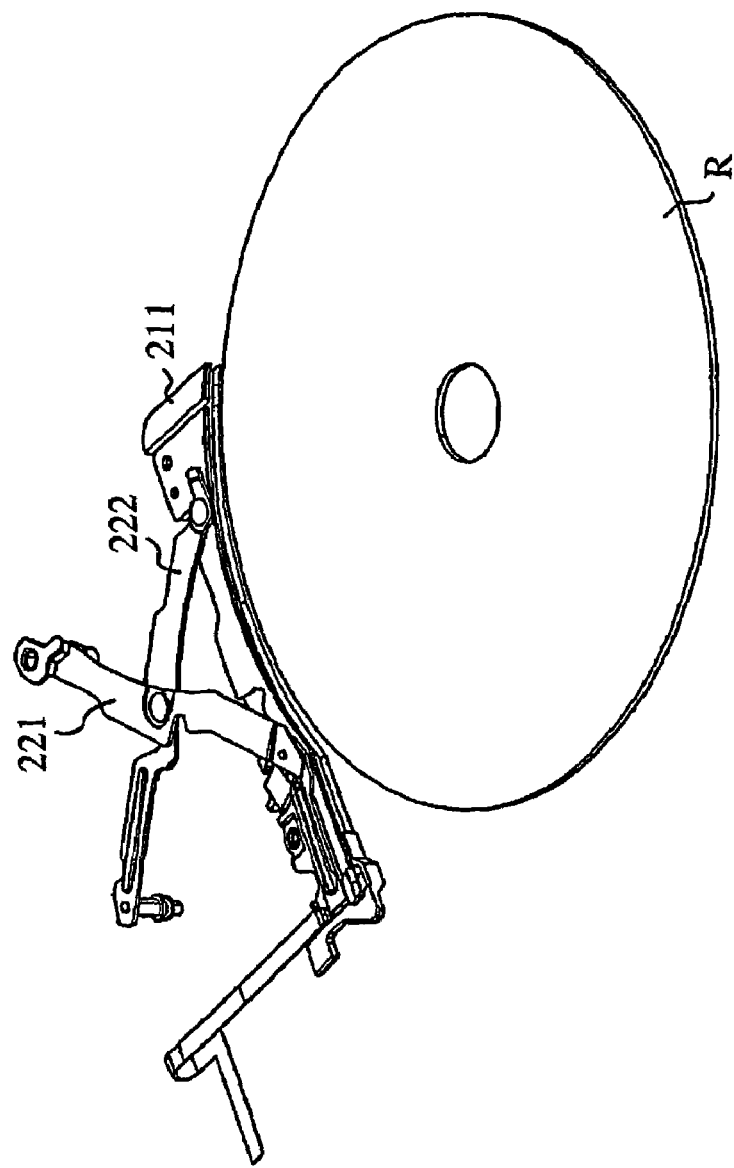
FIG. 85 is an explanatory diagram of a principal portion of the disk device shown in FIG. 73.
Figure 86:
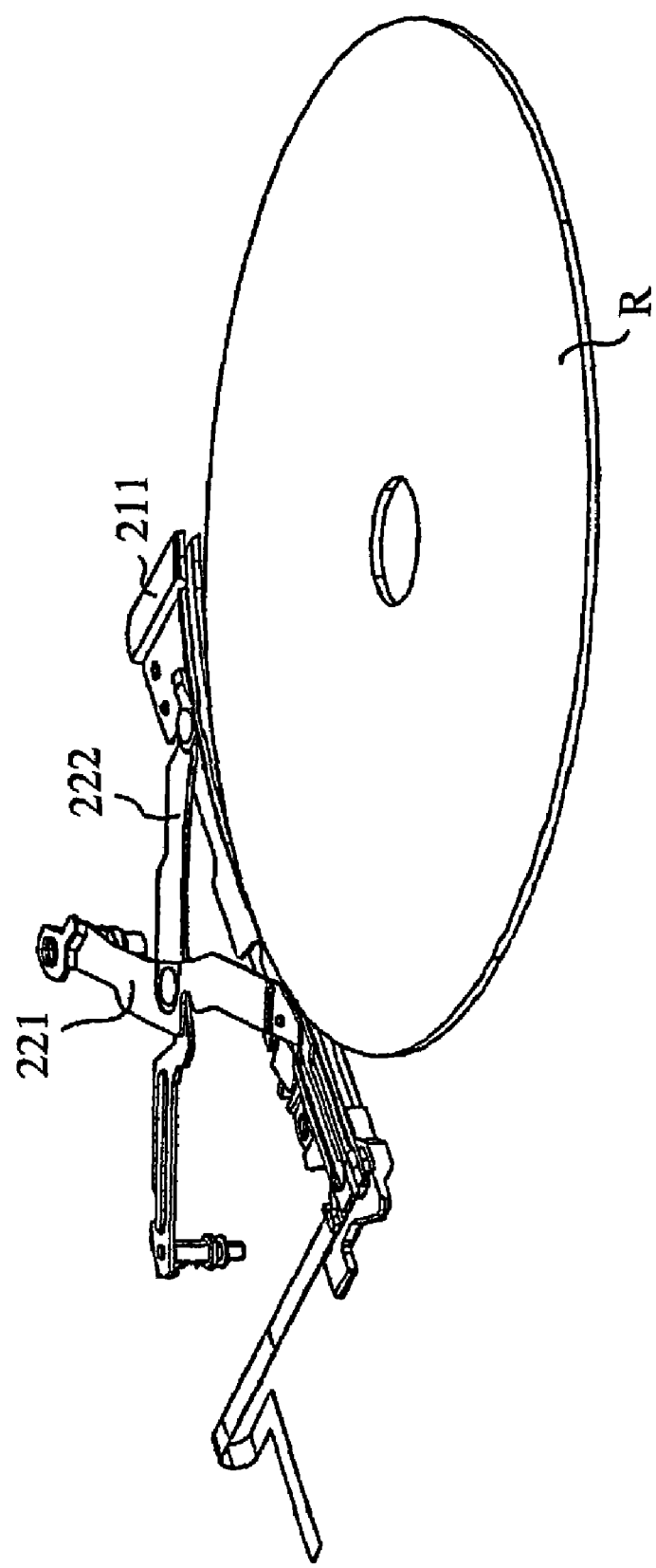
FIG. 86 is an explanatory diagram of a principal portion of the disk device shown in FIG. 73.

In the event a holding state of the inserted disk is not detected by the holding portion 211, such a state is as shown in FIGS. 85 and 86. FIG. 85 shows a state in which a disk is inclined downward and is not held by the holding portion 211 and FIG. 86 shows a state in which a disk is inclined upward and is not held by the holding portion 211. In this case, if a holding state of a disk by the disk holding portion is not detected even after the lapse of a predetermined time or longer despite a disk having been conveyed, this state is regarded as an error and a control is made to discharge the disk and again insert the disk.

<Auxiliary Holding Portion>

Figure 87:
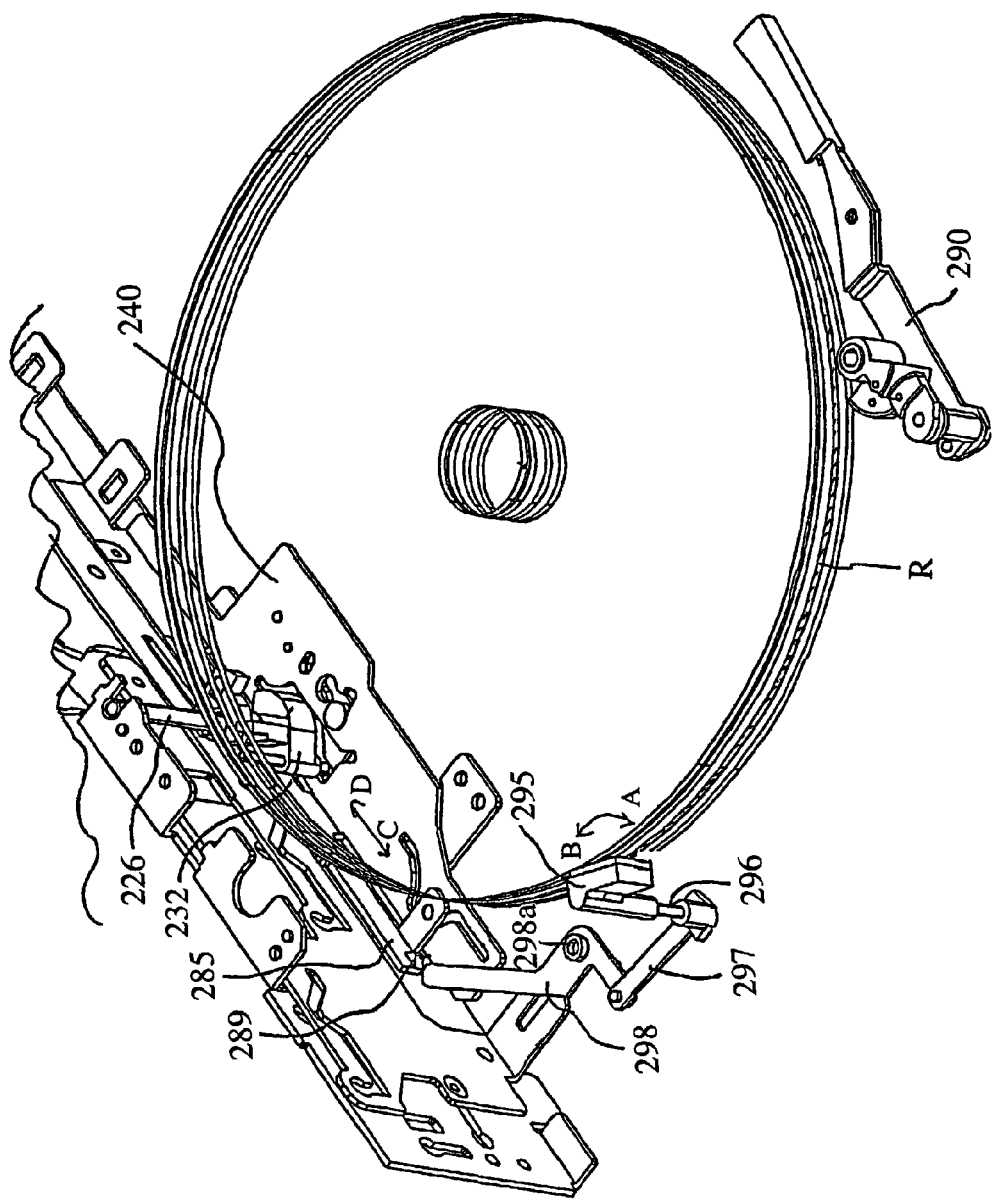
FIG. 87 is a structure diagram of a principal portion of the disk device shown in FIG. 1.
Figure 88:
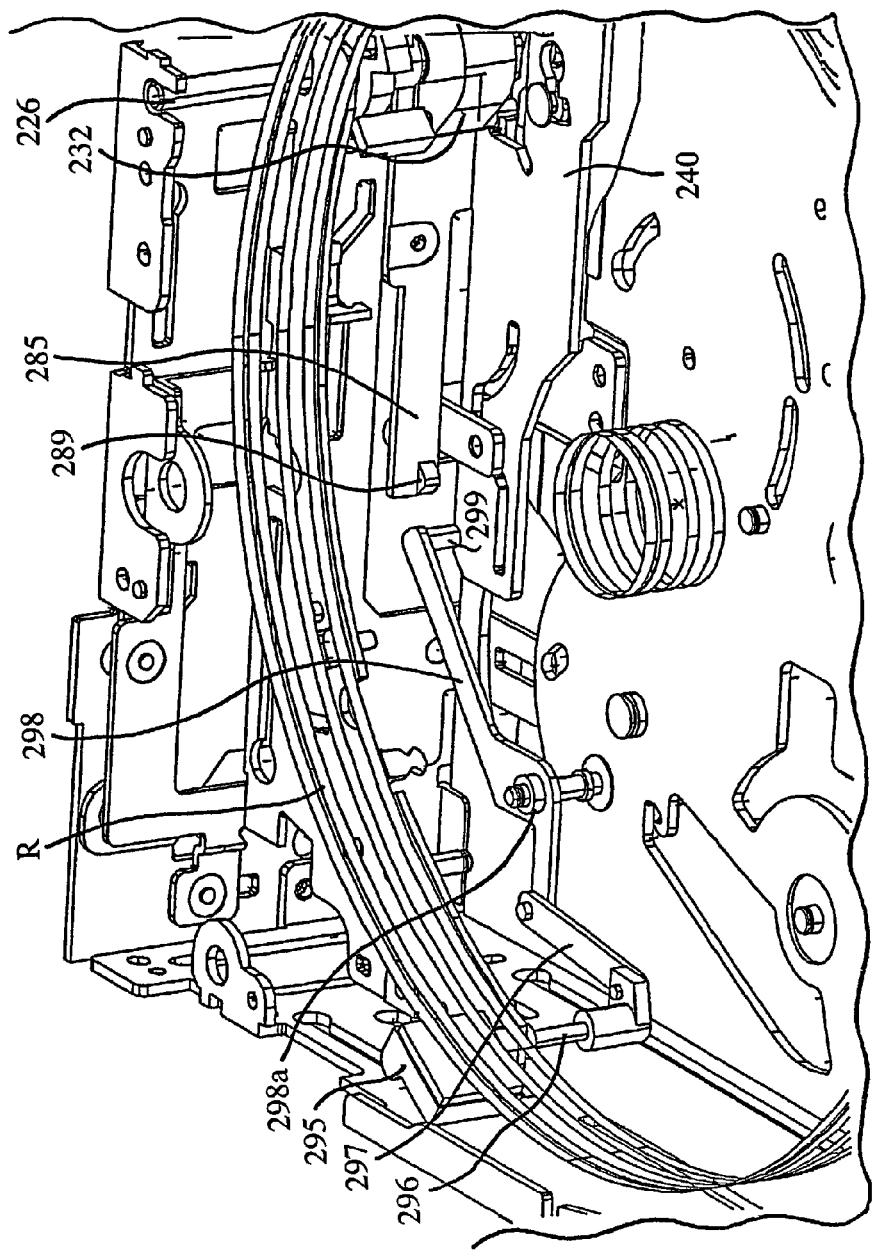
FIG. 88 is a detailed diagram of a principal portion of the disk device shown in FIG. 87.

FIG. 87 illustrates the structure of the auxiliary holding portion and FIG. 88 illustrates the details of a principal portion of FIG. 87. The structure of the auxiliary holding portion will be described with reference to FIGS. 87 and 88. Reference numeral 295 denotes an auxiliary arm which is brought into abutment against the peripheral edge portion of a held disk to restrict the height and inclination of the disk at the time of holding the disk in such a way that it is gripped by both holding portion 211 and holding arm 290. The auxiliary arm 295 is provided at a portion thereof with a pin 296, one end of which is attached to a first lever 297. Further, a second lever 298 supports one end of the first lever 297 and is turnable in the direction of A or B about a pivot shaft 298a. A projecting portion 299 is formed downwards at an opposite end of the second lever 298, as shown in FIG. 88.

Reference numeral 289 denotes a projecting portion formed at an opposite end of the switching plate 285. With movement, in the direction of C or D, of the switching plate 285, the projecting portion formed on the switching plate 285 comes into abutment against the projecting portion 299 formed on the second lever 298. With this abutting force, the auxiliary arm 295 and the first and second levers 296, 297 which have become integral with one another move pivotally in the direction of A or B about the pivot shaft 298. In this case, when the projecting portion 299 formed on the switching plate 285 abuts the projecting portion on the second lever 298, that is, when the switching plate 285 moves in the direction of C, the projecting portion 299 on the second lever 298 undergoes an abutting force in the direction of C, so that the auxiliary arm 295 and the first and second levers 296, 297 turn move pivotally in the direction of B as an integral mass and the auxiliary arm 295 comes into abutment against the peripheral edge portion of the disk. On the other hand, when the projecting portion 299 formed on the switching plate 285 becomes disengaged from the projecting portion on the second lever 298, that is, when the switching plate 285 moves in the direction of D, the abutting force of the projecting portion 299 on the second lever 298 becomes extinct and the auxiliary arm 295 and the first and second levers 296 and 297 as an integral mass lose their urging force in the direction of B and turn in the direction of A, whereby the auxiliary arm 295 is disengaged from the peripheral edge portion of the disk.

Figure 89:
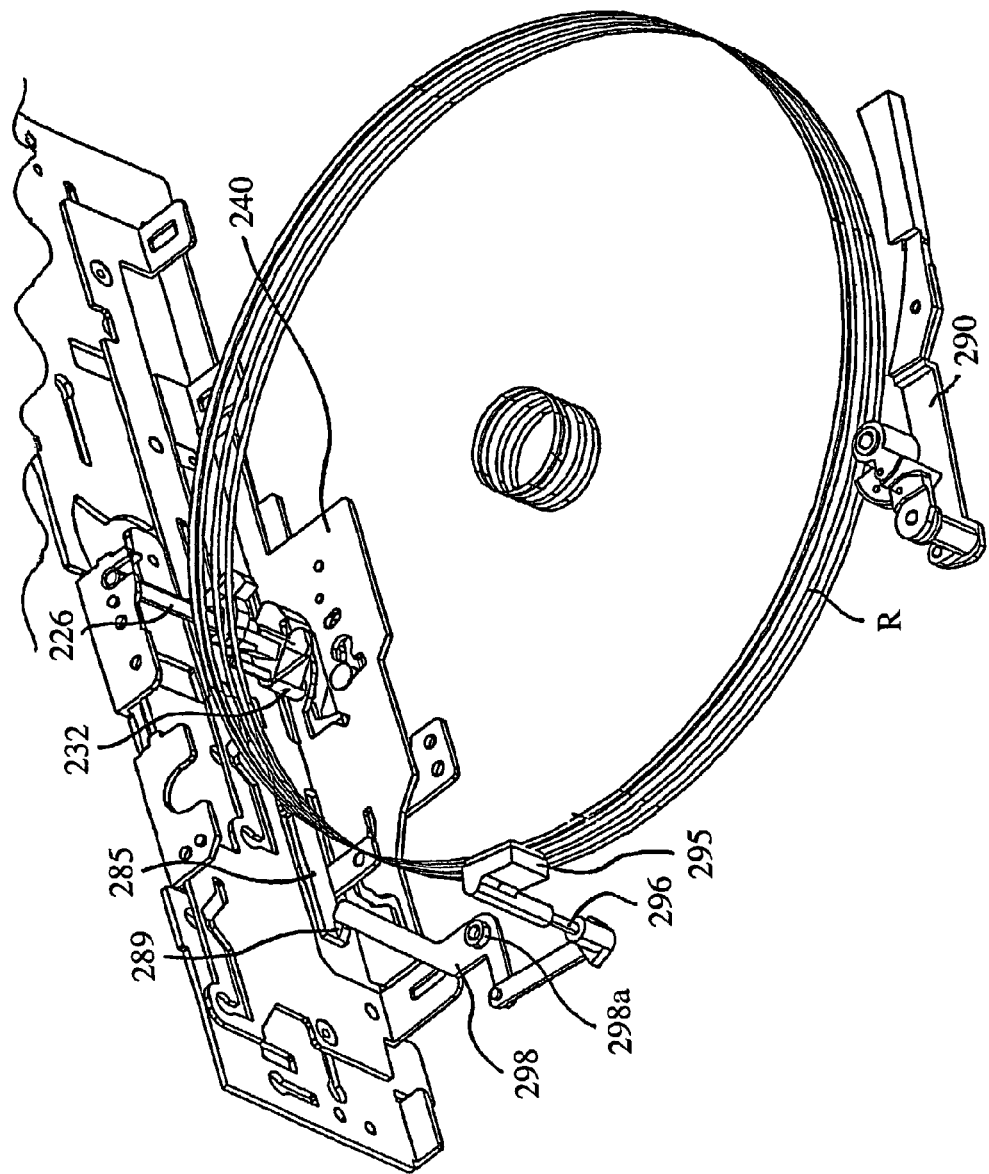
FIG. 89 is an operating state transition diagram explaining an operating state of the disk device shown in FIG. 87.
Figure 90:
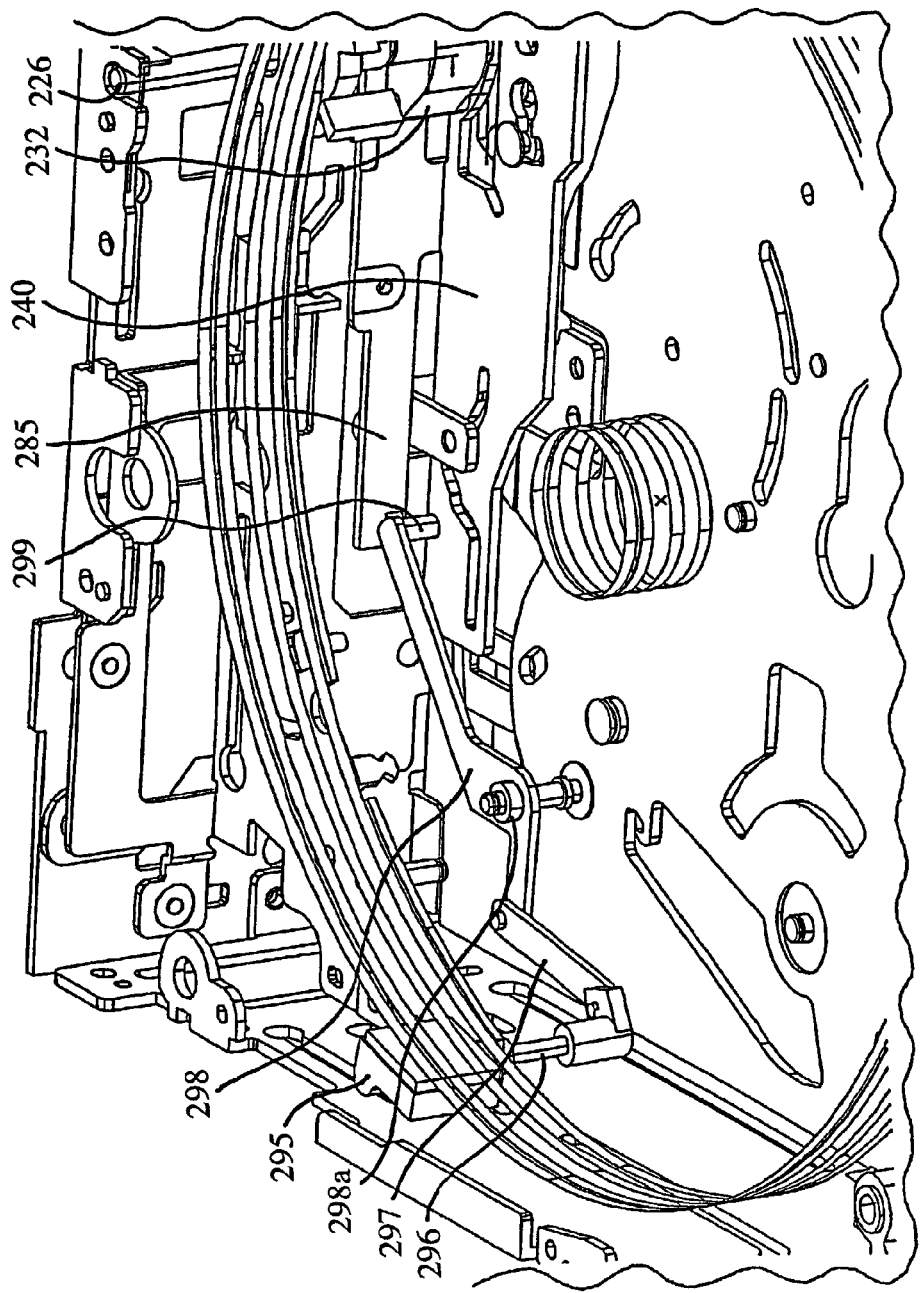
FIG. 90 is a detailed diagram of a principal portion of the disk device shown in FIG. 89.
Figure 91:
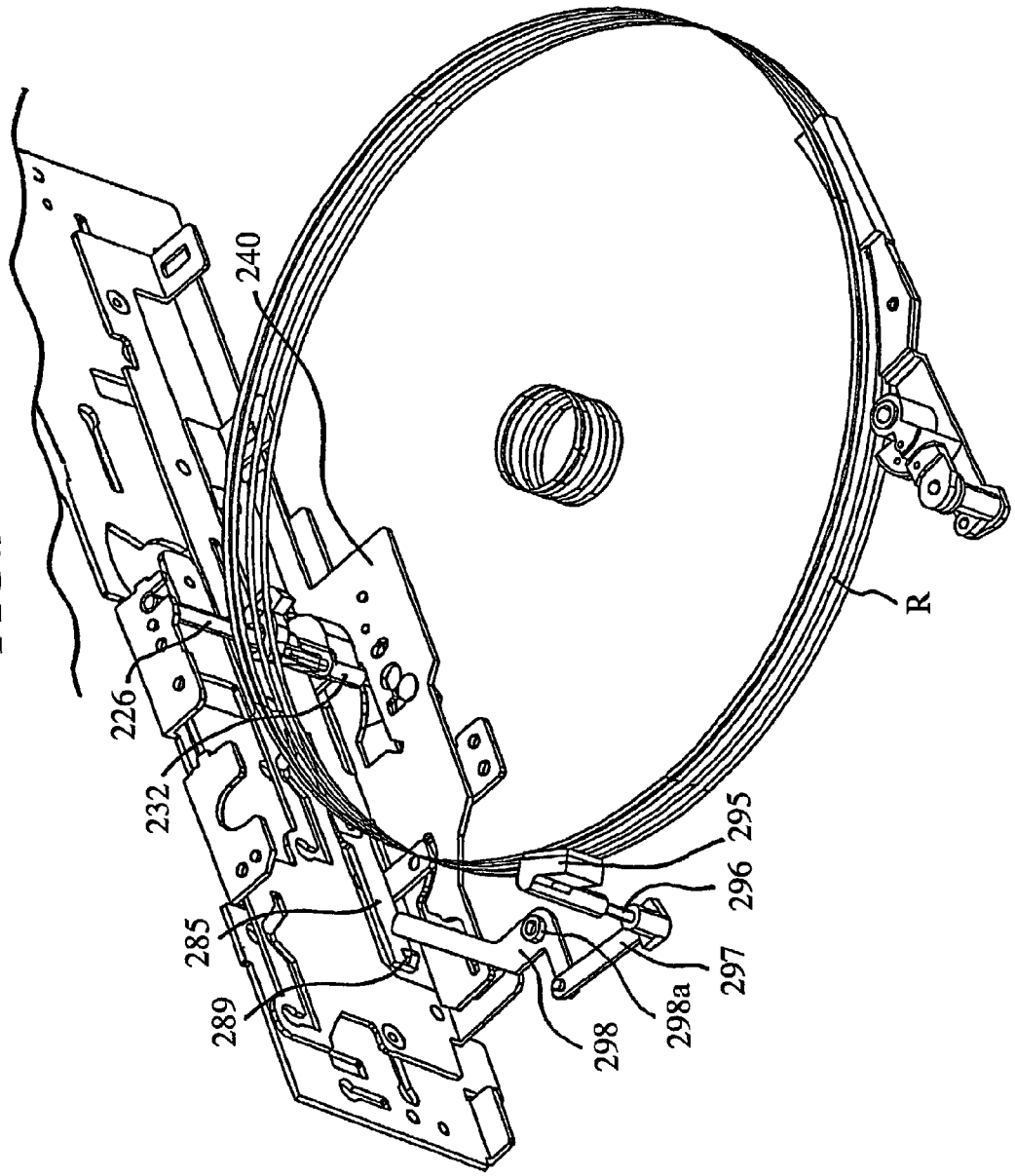
FIG. 91 is an operating state transition diagram explaining an operating state of the disk device shown in FIG. 87.

A description is now directed to the operation. First, in a state before a conveyed disk being set to the disk holding position, that is, when the disk is not held by the holding portion 211 and the holding arm 290, as shown in FIG. 87, the projecting portion 299 formed on the switching plate 285 and the projecting portion formed on the second lever 298 are not in abutment against each other, with no abutment against the disk. Next, at the time of setting the conveyed disk to the disk holding position, there is made adjustment of the disk holding height and inclination before the disk is held by both the holding portion 211 and holding arm 290. For this adjustment, as shown in FIG. 89, the switching plate 285 moves in the direction of C, so that the projecting portion 289 formed on the switching plate 285 comes into abutment against the projecting portion on the second lever 298, the auxiliary arm 295 and the first and second levers 296 and 297 as an integral mass turn in the direction of B, and the auxiliary arm 295 is put in abutment against the peripheral edge portion of the disk, whereby the height and inclination of the disk are delimited. The details of a principal portion in the state of FIG. 89 are as shown in FIG. 90. Next, as shown in FIG. 91, the disk is held by the holding portion 211 and the holding arm 290. Although the holding portion 211 is not shown in FIGS. 87 to 91, its structure is the same as that shown in FIG. 47. Now, a series of operations are completed.

Next, a description will be given below about the disk reproducing mechanism.

[4. Disk Reproducing Mechanism]

Figure 92:
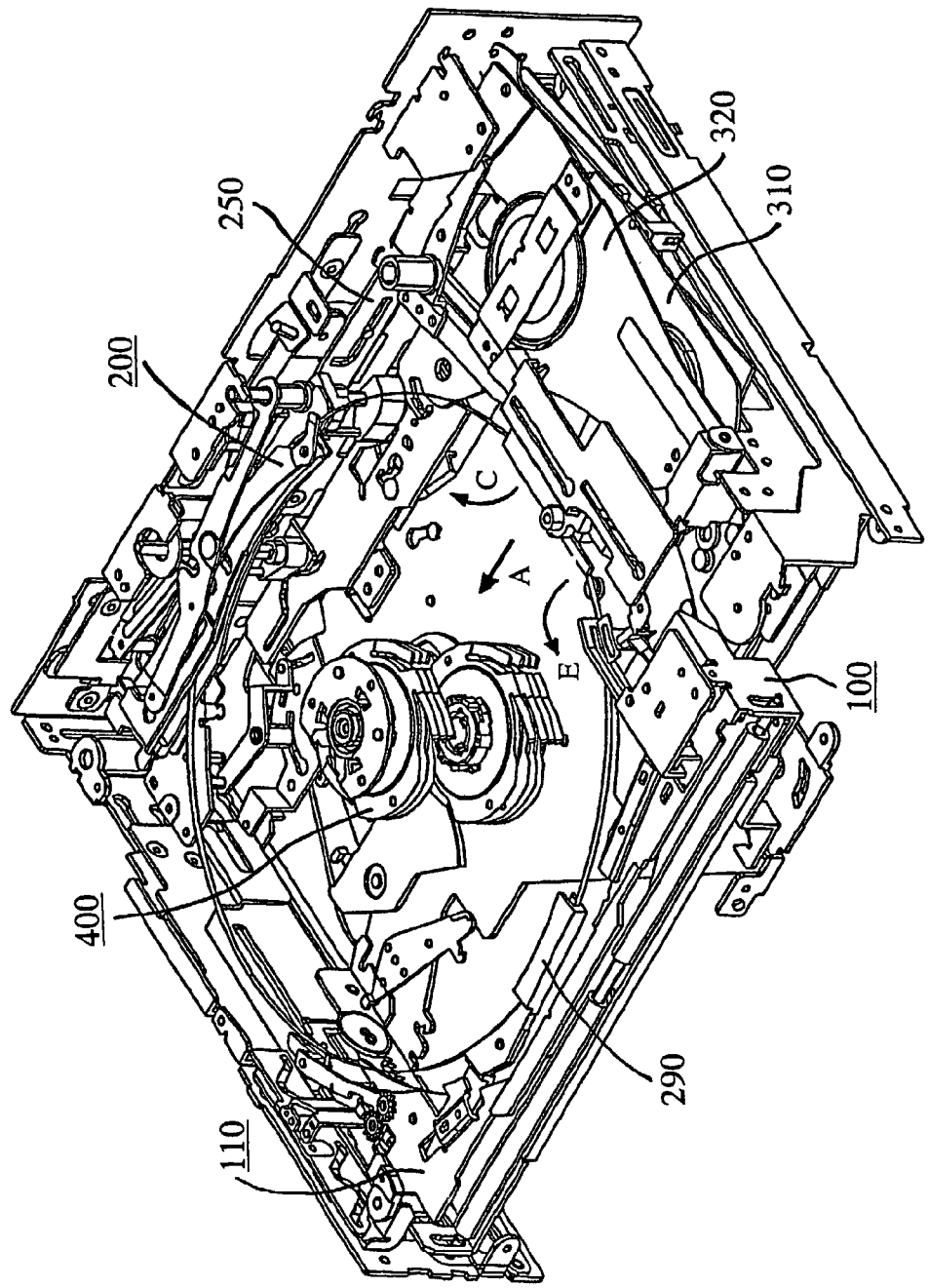
FIG. 92 is an operating state transition diagram illustrating the structure of a principal portion of the disk device shown in FIG. 1 and explaining an operating state thereof.
Figure 93:
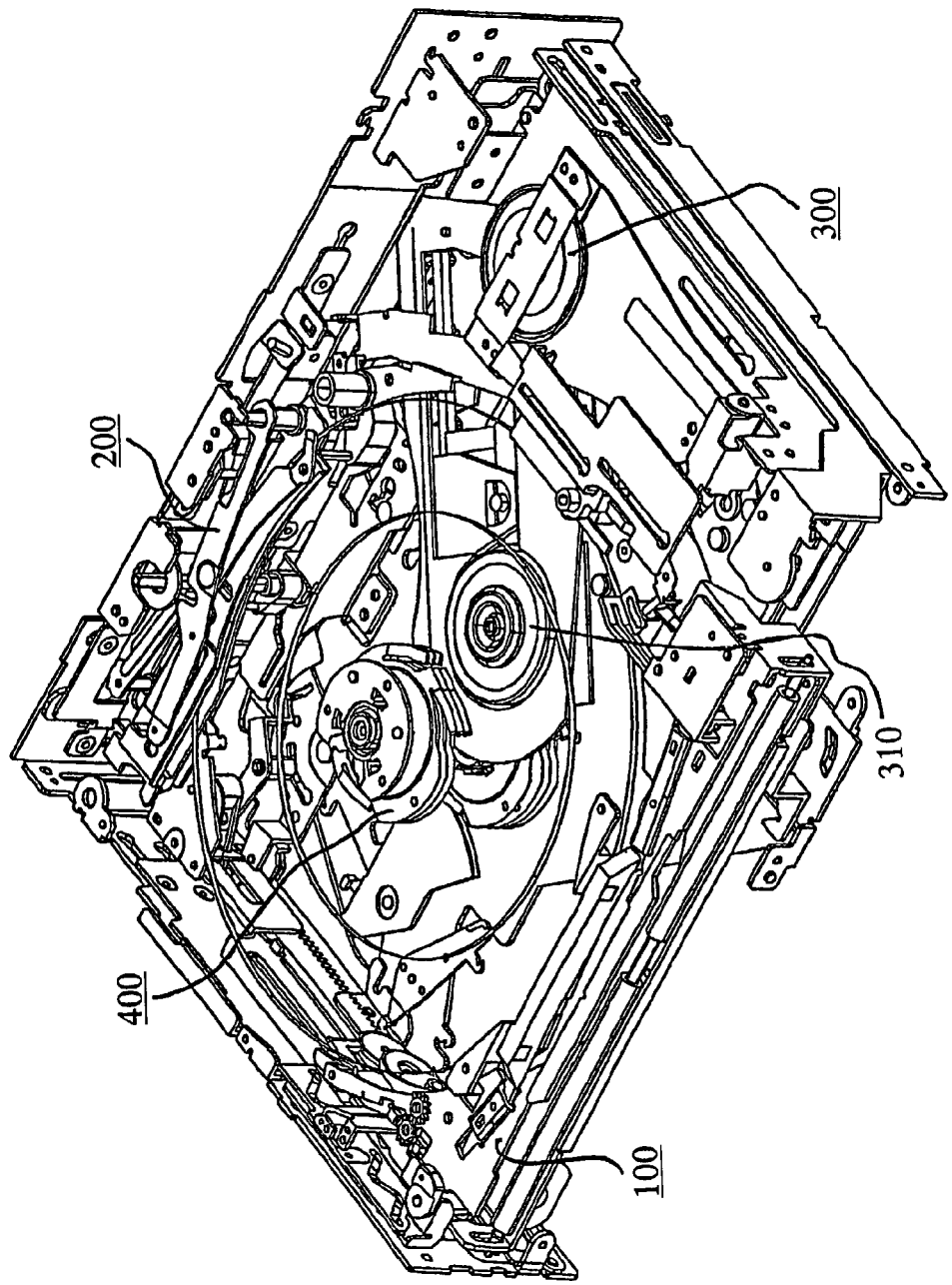
FIG. 93 is an operating state transition diagram explaining an operating state of the disk device shown in FIG. 1.

FIG. 92 is an entire structure diagram and FIG. 93 is an operating state transition diagram showing a state of transition from the state of FIG. 92 to the next operation.

The structure and operation of the disk reproducing mechanism 300 will be described below with reference to FIGS. 92 and 93.

The disk reproducing mechanism 300 is divided into three constituent groups: a disk reproducing section 310, a clamp section 320, and a lock section 330.

The disk reproducing section 310 is a mechanism for reproducing a disk and includes an optical pickup portion for reading a signal stored in the disk, a feed mechanism for the pickup portion, and a turntable for resting the disk thereon. The clamp section 320 is a mechanism for clamping a disk when it is rested on the turntable. The lock section 330 is a mechanism for keeping the disk reproducing mechanism in a floating state during reproduction of the disk and for canceling the floating state and fixing the disk reproducing mechanism.

The disk reproducing section 310 is provided with a turntable 311 for resting a disk thereon, an optical pickup portion 312 for reading information stored on the disk at the time of reproducing the disk, and a feed mechanism 313 for the pickup portion. The turntable 311 is movable in the direction of A or B and rotatable in the direction of C or D.

The clamp section 320, which is for clamping a disk, is provided with a clamp 321. On a surface of the clamp 321 which surface confronts a disk there is formed a chucking portion (not shown) which supports a hole formed in the disk. The clamp section 320 is movable in the direction of A or B and is rotatable in the direction of E or F. The clamp 320 and the disk reproducing section 310 constitute an integral mechanism 350. This mechanism will hereinafter be referred to as a floating deck section 350.

In the lock section 330, a lock pin 331 is disengaged from a hole formed in a side face of the floating deck section 350 so as to let the floating deck section float at the time of performing the reproducing operation, while in a state other than the reproducing state the floating deck section 350 is locked, with the lock pin 331 fitted in the hole formed in a side face of the floating deck section. This is for the purpose of making the disk reproducing system employable in a vibrational condition. That is, if vibration is exerted on the reproducing system and if the floating deck section 350 remains in a locked state, the pickup portion vibrates directly, so that there occurs a sound skip. As a countermeasure, the floating deck section 350 is brought into a floating state to avoid direct application of vibration. The details will be described later with reference to FIGS. 145 to 155.

Figure 94:
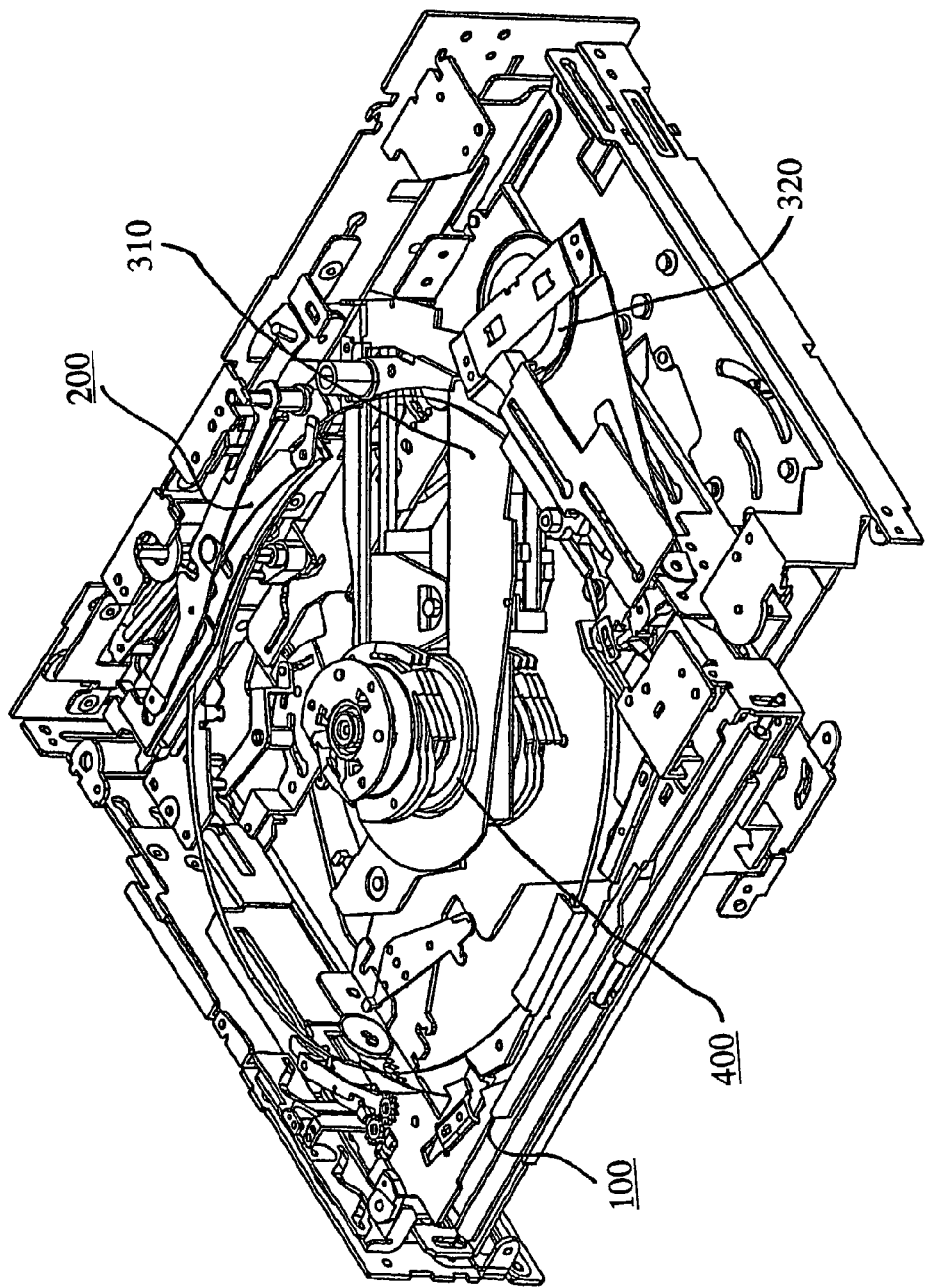
FIG. 94 is an operating state transition diagram explaining an operating state of the disk device shown in FIG. 1.
Figure 95:
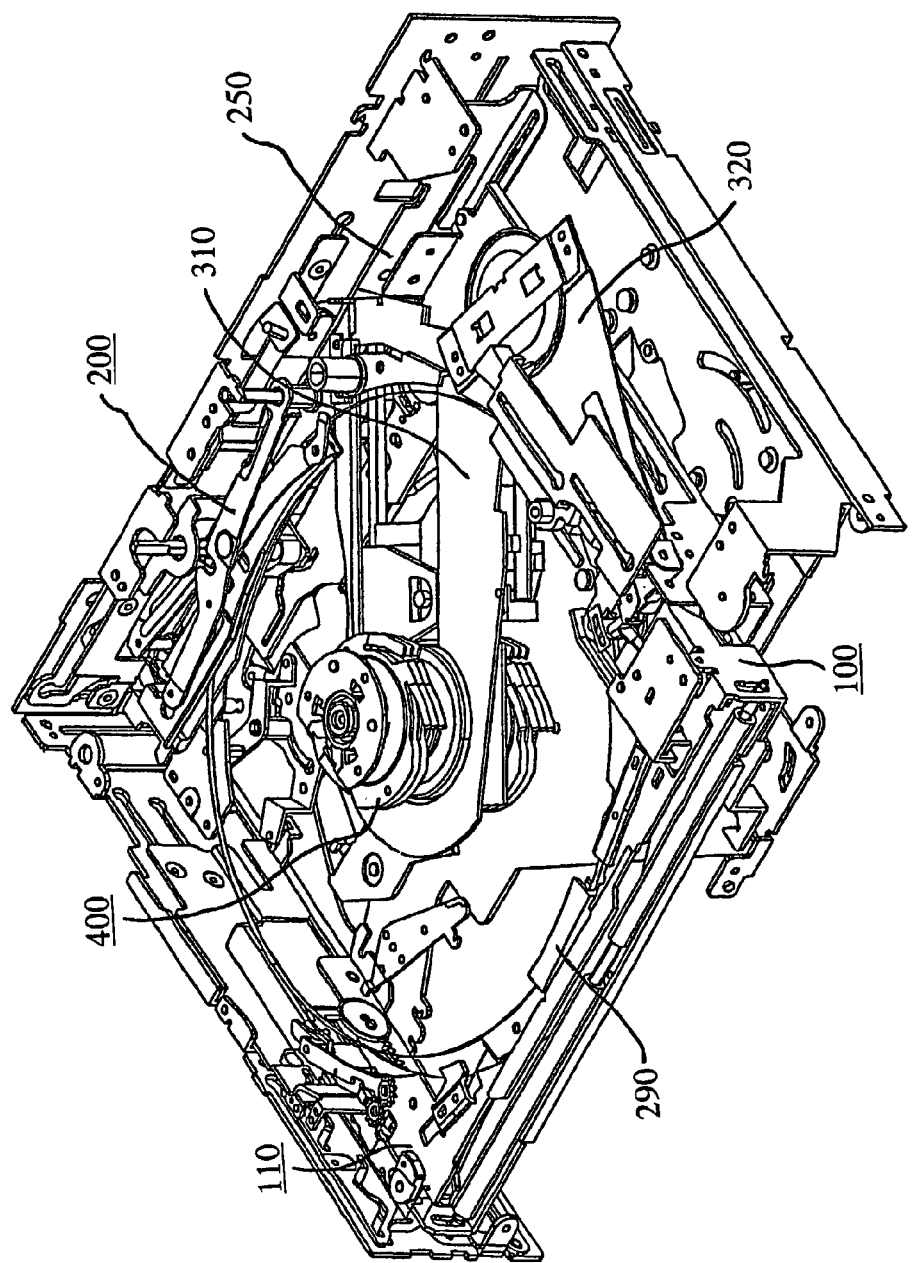
FIG. 95 is an operating state transition diagram explaining an operating state of the disk device shown in FIG. 1.
Figure 96:
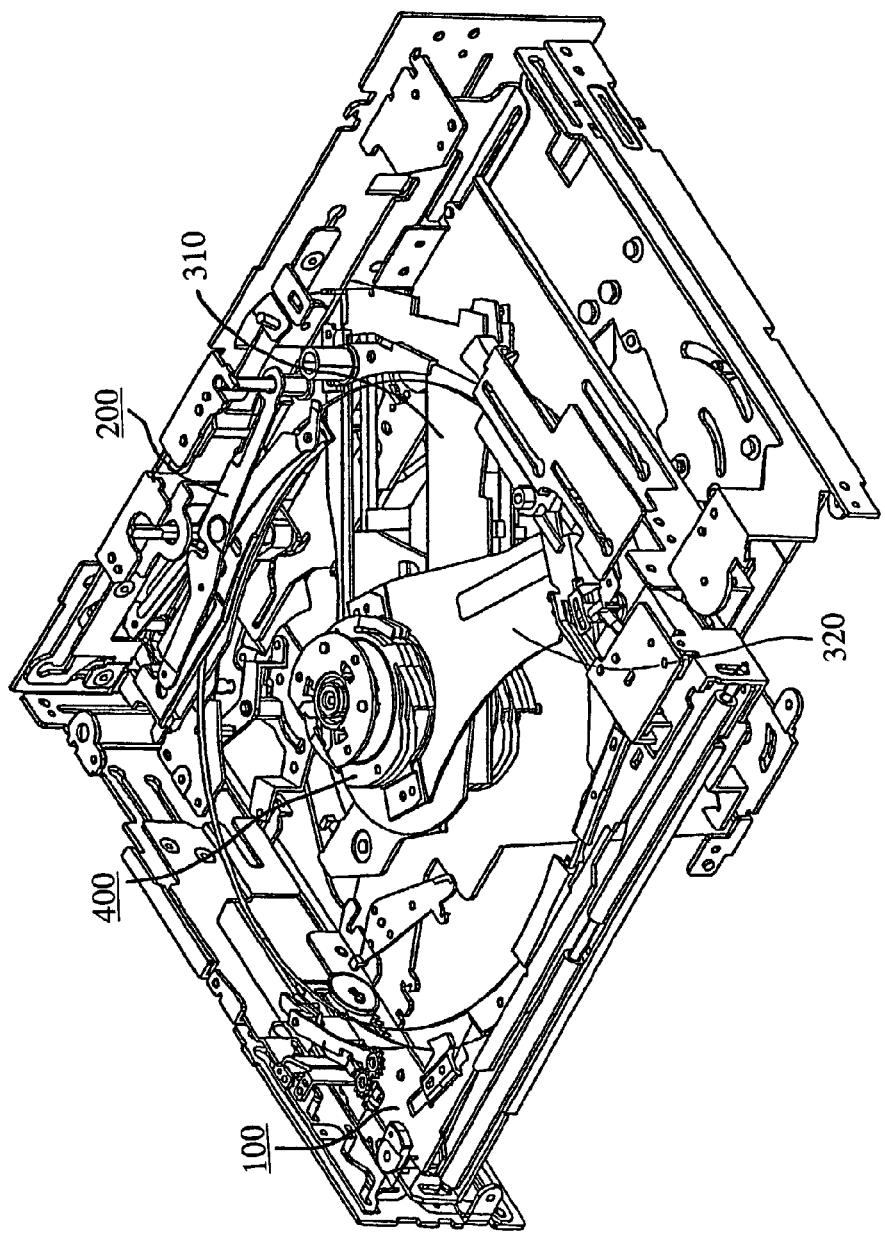
FIG. 96 is an operating state transition diagram explaining an operating state of the disk device shown in FIG. 1.
Figure 97:
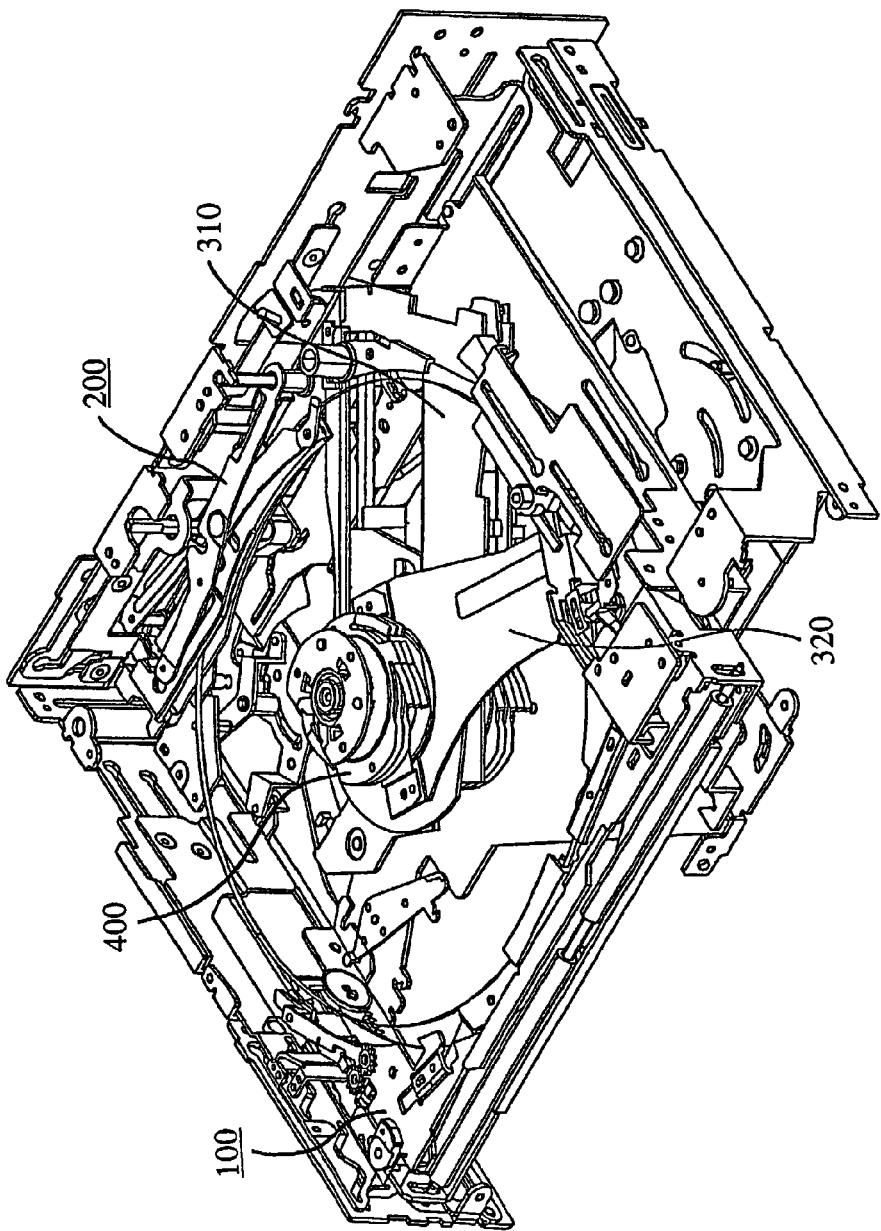
FIG. 97 is an operating state transition diagram explaining an operating state of the disk device shown in FIG. 1.
Figure 98:
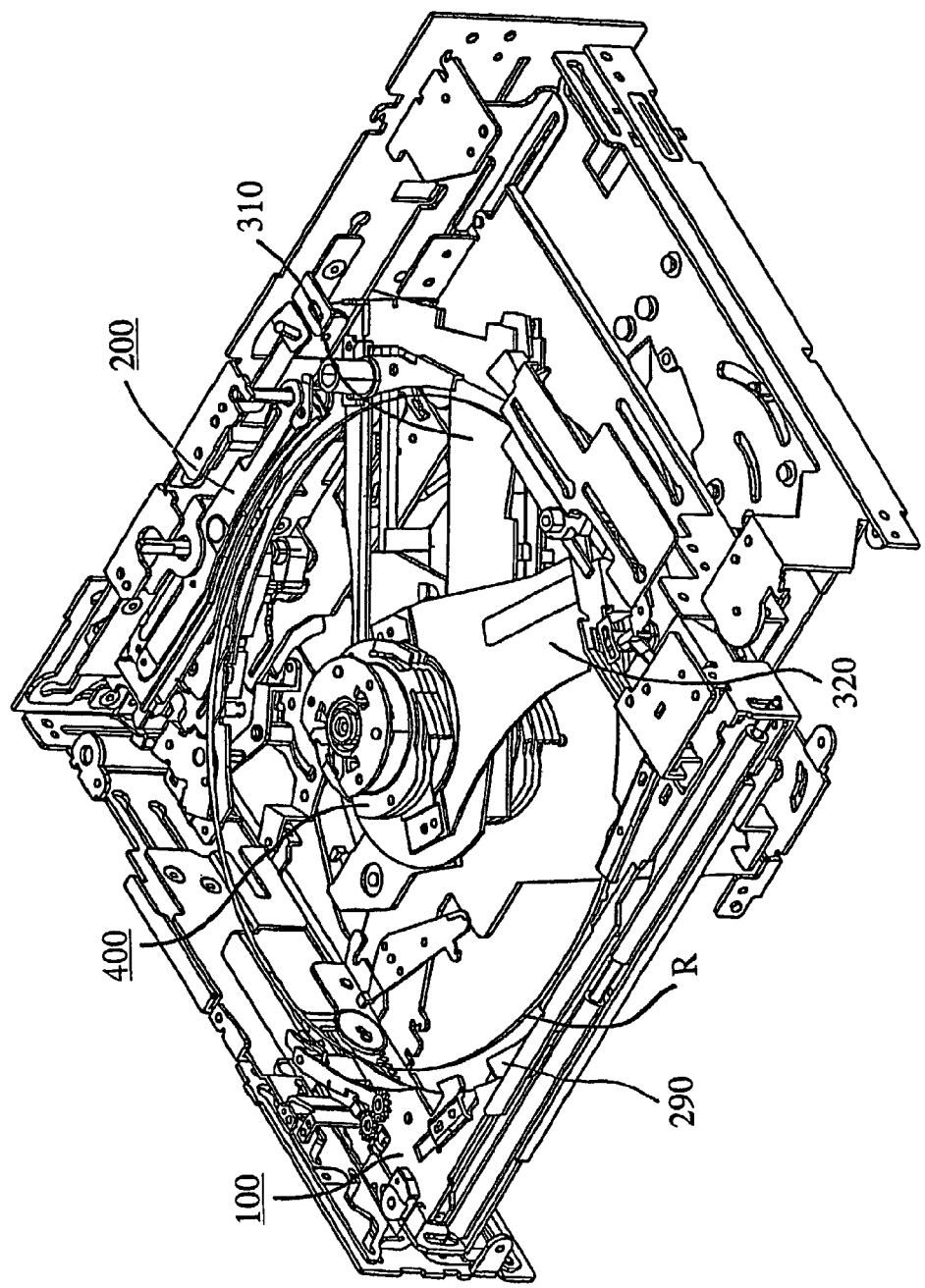
FIG. 98 is an operating state transition diagram explaining an operating state of the disk device shown in FIG. 1.
Figure 99:
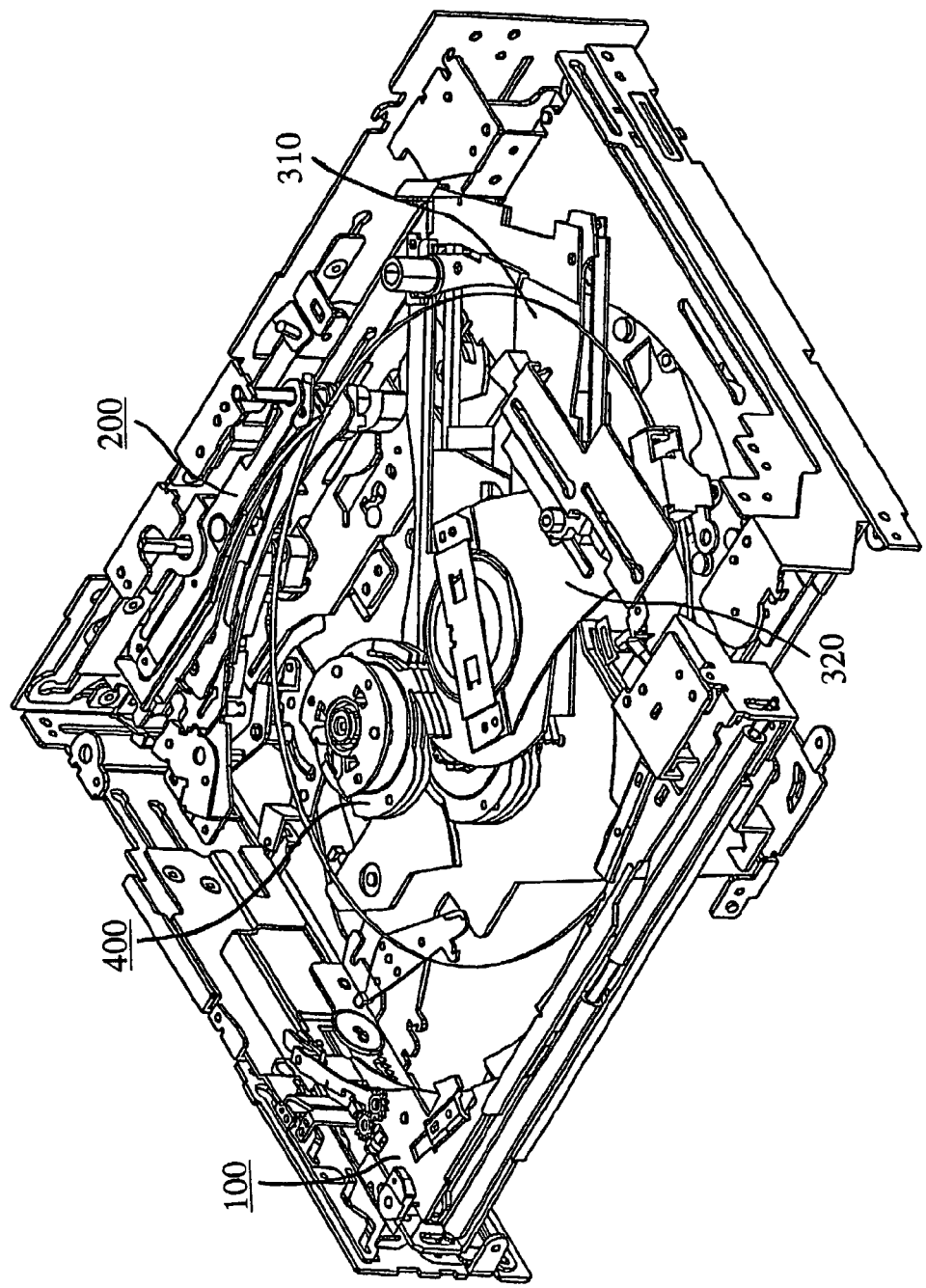
FIG. 99 is an operating state transition diagram explaining an operating state of the disk device shown in FIG. 1.
Figure 100:
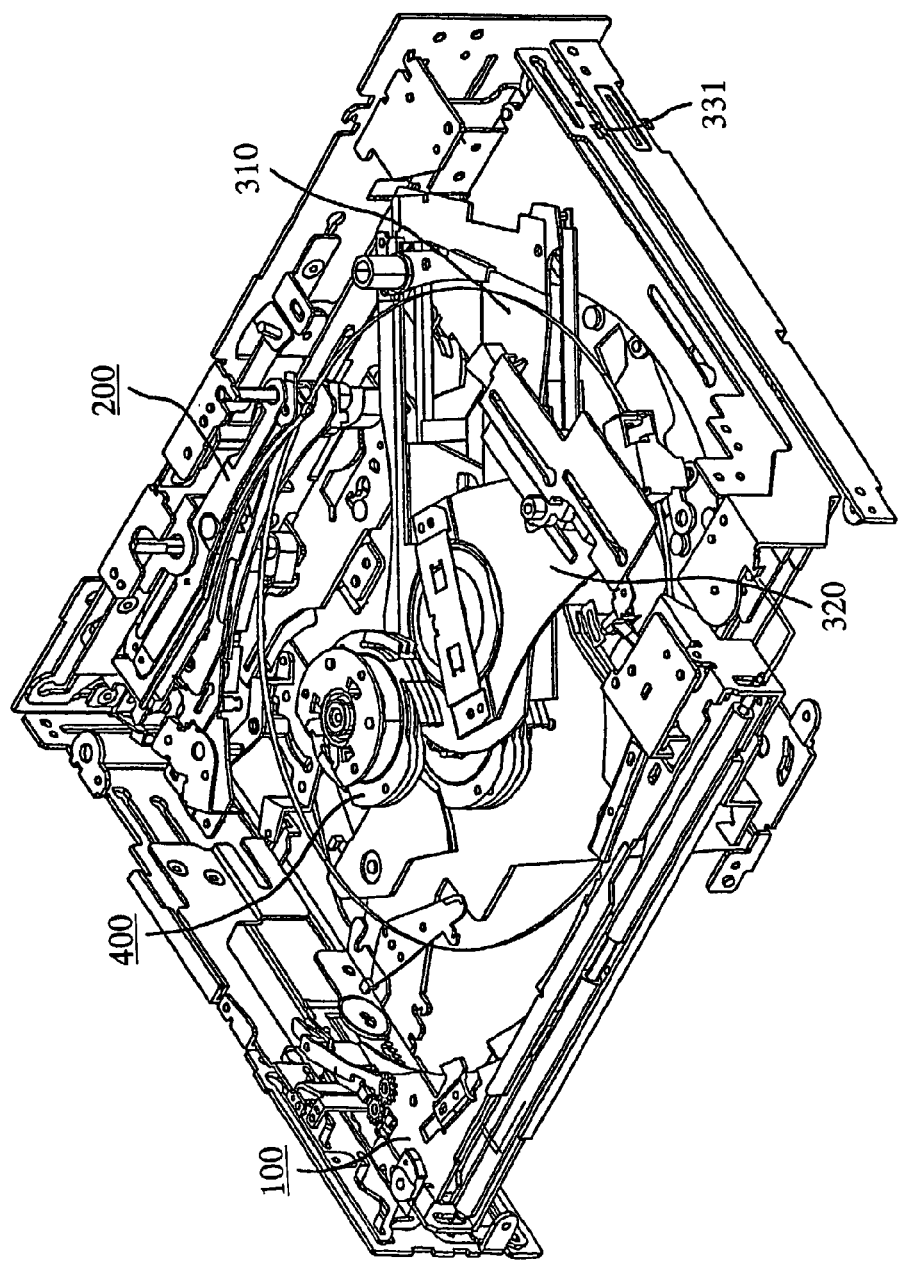
FIG. 100 is an operating state transition diagram explaining an operating state of the disk device shown in FIG. 1.

The operation will now be described. As shown in FIG. 92, a disk is held by both the holding portion 211 and holding arm 290. The reproducing operation starts from this state. In this case, the vertical base 280 including the holding portion 211 and the left and right arms 221, 222 lies at a high position. Next, as shown in FIG. 93, the disk reproducing section 310 turns in the direction of C and advances toward the underside of the disk to be reproduced. This state is as shown in FIG. 93. In this state, the vertical base 280 including the retaining portion 211 and the left and right arms 221, 222 still occupies the high position and the disk is held by both the holding portion 211 and holding arm 290. Next, when the disk reproducing section 310 turns up to a predetermined position as shown in FIG. 94, it moves in direction A and the disk is set so that the axis thereof becomes coincident with the center of the turntable 311. In this state, the vertical base 280 including the holding portion 211 and the left and right arms 221, 222 still lies in the high position and the disk is held by both holding portion 211 and holding arm 290. Next, as shown in FIG. 95, the height of the vertical base 280 including the holding portion 211 and the left and right arms 221, 222 is lowered and the disk held by both the holding portion 211 and holding arm 290 is put onto the turntable 311. At this time, the disk remains held by both the holding portion 211 and holding arm 290. Next, as shown in FIG. 96, the clamp section 320 moves in the direction of A and rotates in the direction of E so as to be set above the disk on the turntable 311. During this operation the disk continues to be held by both the holding portion 211 and holding arm 290. Next, as shown in FIG. 97, a chucking portion of the clamp section 320 clamps the disk so that a chucking portion of the clamp section 320 is fitted in the hole, i.e., inside diameter, of the disk. With this operation, the disk is gripped by both disk reproducing section 310 and the clamp section 320. The disk is held also by both the holding portion 211 and holding arm 290. Next, as shown in FIG. 98, the holding portion 211 and the holding arm 290, which have so far held the disk, are disengaged from the disk, thus releasing the disk, and are stowed in a predetermined portion. At this time, the disk is gripped by only the disk reproducing section 310 and the clamp section 320. Next, as shown in FIG. 99, the floating deck section 350 is moved in the direction of B and is set to the disk reproducing position. Next, as shown in FIG. 100, the lock section 330 cancels the locked state of the floating deck section 350, allowing the floating deck section to float, followed by starting of the disk reproducing operation. Now, a series of operations are completed. Next, the disk storing mechanism will be described below.

[5. Disk Stock Mechanism]

Figure 101:
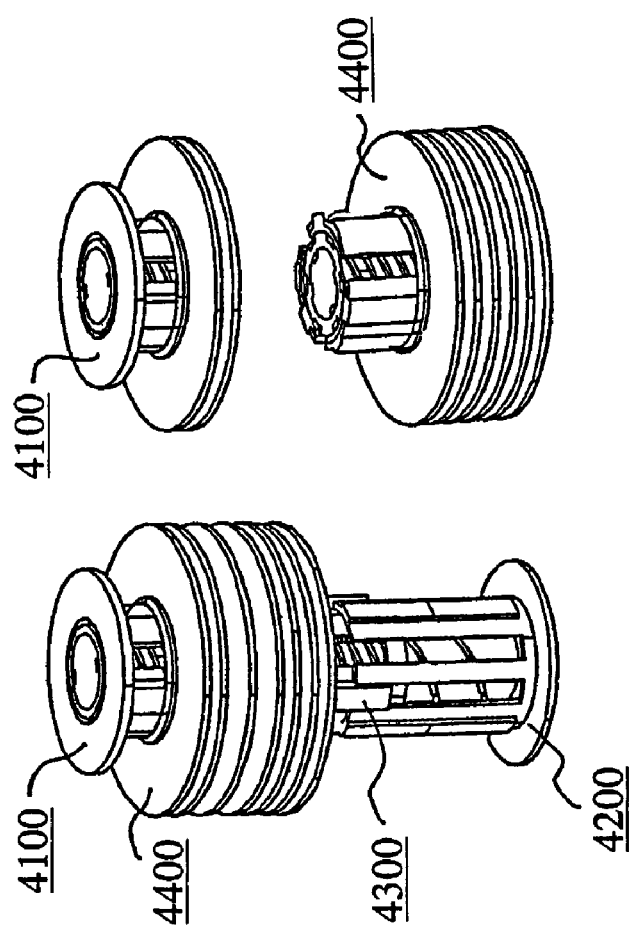
FIG. 101 is a structure diagram of a principal portion of the disk device shown in FIG. 1.
Figure 102:
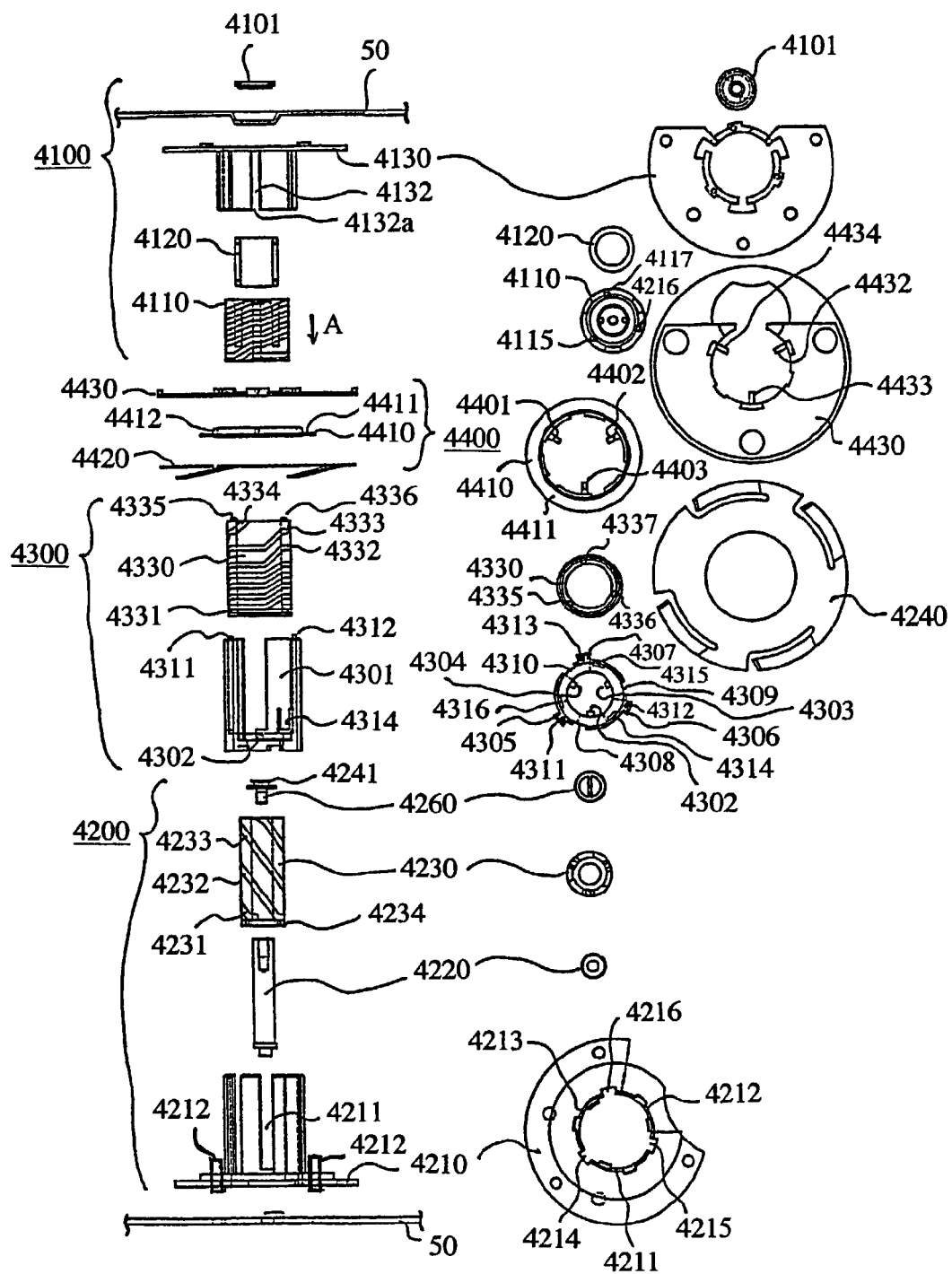
FIG. 102 is an exploded perspective view of the disk device shown in FIG. 101.
Figure 103:
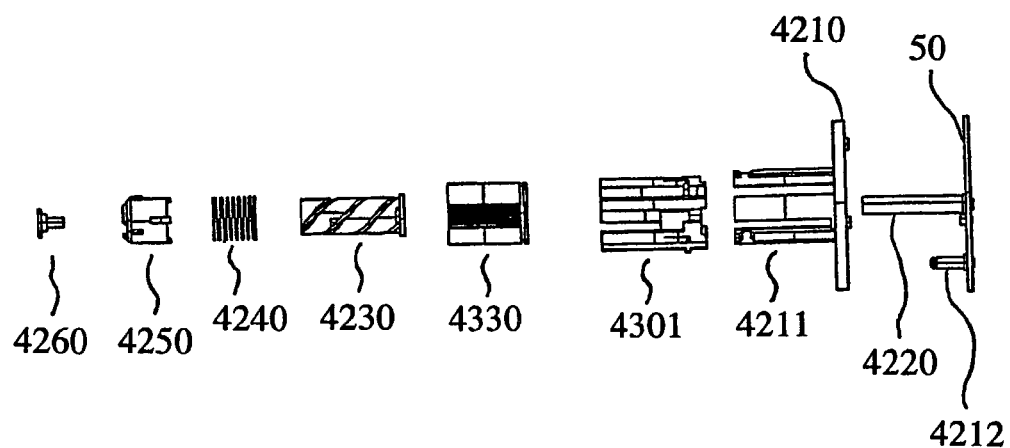
FIG. 103 is an exploded perspective view of the disk device shown in FIG. 101.

FIG. 101 is a perspective view showing an appearance of a principal portion of the disk storing mechanism, FIG. 102 is an exploded diagram of the disk storing mechanism disassembled into its components, FIG. 103 is also an exploded diagram to components of the disk storing mechanism, and FIG. 118(a) to (d) illustrate operating states of a principal portion of the disk storing mechanism, of which (a) is a side view of components and (b) to (d) are top views of the components in FIG. 118(a).

A schematic structure of the disk storing mechanism 400 and the details of its components will be described below with reference to FIGS. 101 and 102, respectively.

In FIG. 101, the disk storing mechanism, indicated at 400, is broadly divided into four components: a first mandrel mechanism 4100 a part of which is fixed to a ceiling portion of the housing 50 and which can be rotated with a driving force of a drive source (to be described later), a second mandrel mechanism 4200 a part of which is fixed to a bottom portion of the housing 50 and which can be rotated with a driving force of a drive source (to be described later), a third mandrel mechanism 4300 into which is fitted the second mandrel mechanism and which is movable in a rotary shaft direction in accordance with a rotational movement motion of the second mandrel mechanism 4200, and a doughnut-like disk supporting mechanism 4400 which is loosely fitted on the first mandrel mechanism and third mandrel mechanism 4300 and which has a projecting portion formed on an inner peripheral portion thereof, the projecting portion being engageable with both a groove formed in the first mandrel mechanism 4100 and a groove formed in the third mandrel mechanism 4300. Further, there is provided a drive mechanism for operating these four constituent mechanisms.

First, the disk supporting mechanism 4400 is structured so as to be movable in a rotary shaft direction, i.e., vertically of the disk device, along the grooves formed in the first and third mandrel mechanisms 4100, 4300, respectively, in accordance with rotational movement motions of the first and third mandrel mechanisms. The disk supporting mechanism 4400 possesses a disk supporting function.

The first mandrel mechanism 4100 is connected at one end thereof to a gear 4111 through a ceiling board. There is provided a first guide member 4110 which is rotatable and which has three grooves 4112–4114 formed in an outer peripheral edge portion thereof. A ring-like compression spring 4120 is disposed in the interior 4115 of the first guide member 4110. With this compression spring, the first guide member 4110 is urged in the direction of A. The three grooves 4112–4114 are open in the portion corresponding to an opposite end of the first guide member 4110 in such a manner that these openings coincide with openings of grooves formed in a second guide member (to be described later).

There is provided a first holder 4130 formed in a hollow shape and having an inner peripheral portion 4131 to guide the first guide member 4110. The first guide member 4110 is held by the housing 50 by fixing a part of the first guide member to the ceiling board of the housing 50. In the first holder 4130 are formed three slits 4132–4134 axially at equal intervals. The slits 4132–4134 are open as indicated at 4132a–4134a.

Further, three recesses 4135–4137 are formed at equal intervals in the peripheral edge portion of the opening side of the first holder 4130 and three recesses 4115–4117 are formed at equal intervals in the peripheral edge portion of the opposite end face of the first guide member 4110.

Figure 108:
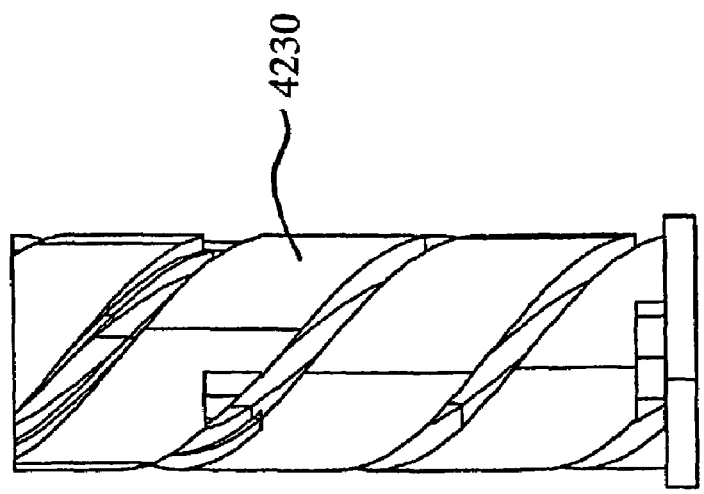
FIG. 108 is a detailed diagram of a principal portion of the disk device shown in FIG. 101.
Figure 109:
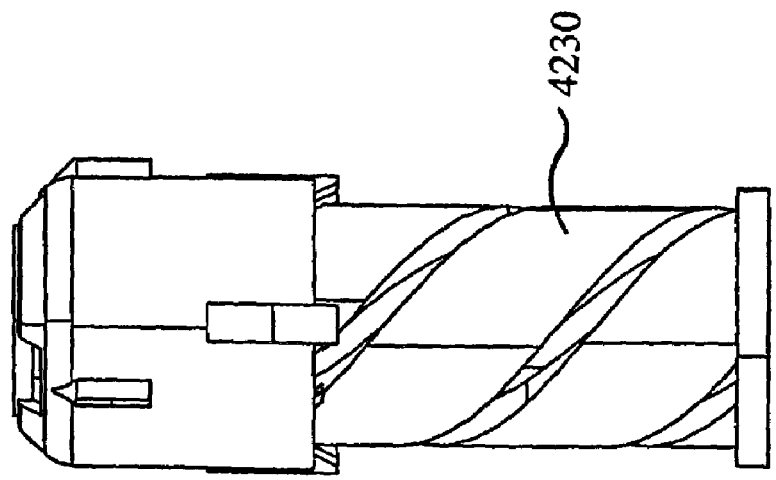
FIG. 109 is a detailed diagram of a principal portion of the disk device shown in FIG. 101.

As shown in FIG. 102, the second mandrel mechanism is made up of a second holder 4210 one end of which is abutted against the bottom of the housing 50 and whose interior is formed in a hollow shape, a shaft member 4220 serving as a rotary shaft of a second guide member 4230 (to be described later), the shaft member 4220 being received within the second holder 4210 and abutted at one end thereof against the bottom of the housing 50, a second guide member 4230 with the shaft member 4220 as a rotary shaft loosely fitted therein, the second guide member 4230 having three spiral grooves 4231–4233 formed in an outer peripheral surface thereof, a spring 4240 as a biasing member one end of which is abutted against an upper portion of the shaft member 4220, a projecting portion 4250 disposed on an opposite side of the spring 4240, the projecting portion 4250 being connected from the shaft member 4220 to a fitting portion formed on the underside of the first guide member 4110 to guide a third guide member 4330 at the time of connection of the third guide member 4330 to the first guide member 4110, and a screw 4260 for preventing dislodgment of the second guide member 4230 from an opposite end of the shaft member 4220. The second guide member 4230 has such an appearance as shown in FIG. 108. FIG. 109 shows an appearance of the second guide member 4230 with both the spring 4240 and projecting portion 4250 disposed thereon.

Figure 113:
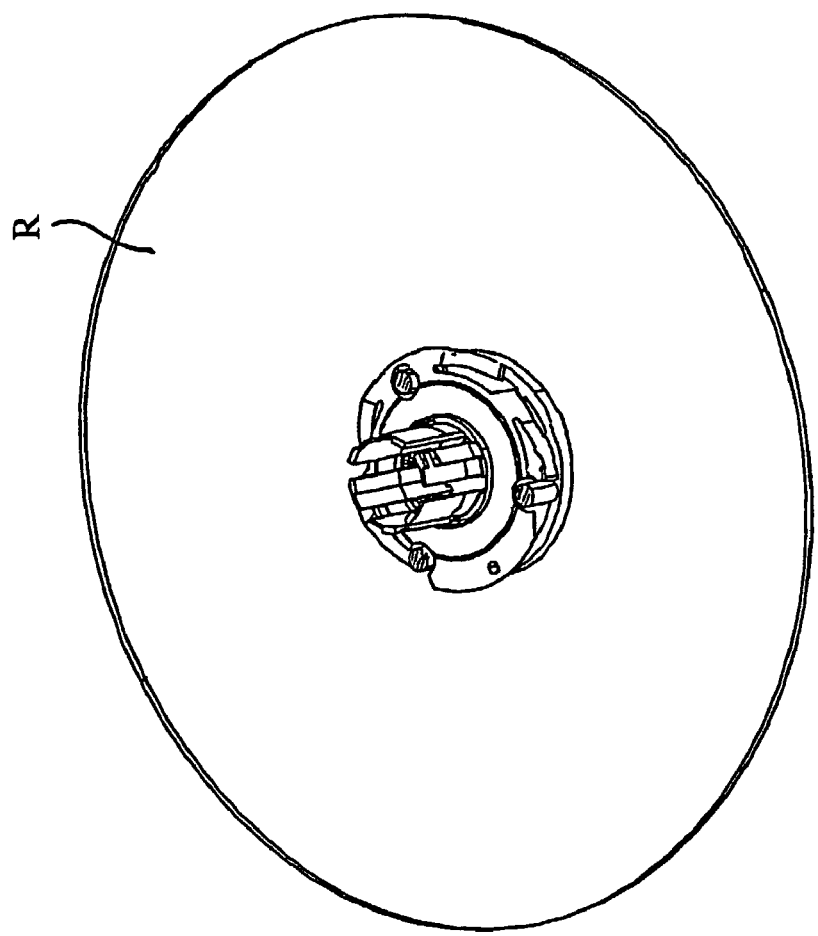
FIG. 113 is a structure diagram of a principal portion of the disk device shown in FIG. 1.

When the shaft member 4220 is received within the third guide member 4330, it is retained inside the third guide member 4330 and is thereby prevented from projecting upward. On the other hand, at the time of connecting the third guide member 4330 to the first guide member 4110, the shaft member 4220 rises while being disengaged from the third guide member, and with the biasing force of the spring 4240, the shaft member 4220 projects upward. Although the second guide member 4230 is screwed with a screw 4260, it is rotatable about the shaft member 4220 as a rotary shaft. The screw 4260 is formed with a retaining portion 4261 on the side opposite to the screwing side. The retaining portion 4261 engages the retaining portion of the disk reproducing mechanism 4000 when turned to the reproducing position. An upwardly projecting portion 4212 is formed on the bottom of the second holder 4210. The projecting portion 4212 includes three projecting portions 4212, the three projecting portions being formed near an outer peripheral portion of a cylindrical shape so as to define a regular triangle centered on an axis, as shown in FIG. 113. When a disk is supported at the lowest stage, as shown in FIG. 114, an inner peripheral portion of the disk is brought into abutment against the projecting portion 4212, thereby supporting the disk against tilting or rocking. For example at the time of replacing a disk, as shown in FIG. 114(1), the third guide member 4330 takes up its raised position, while when storing a disk, in order to support the disk more firmly, the third guide member 4330 is brought down, allowing the underside of the disk lying at the lowest stage to abut the upper surfaces of the projecting portions 4212.

The second guide member 4230 has a gear 4234 at an end portion located on the bottom side of the housing 50, the gear 4234 being interlocked with a transfer mechanism of the disk loading/unloading mechanism 100 (not shown). In the second holder 4210 are formed six slits 4211–4216 axially at equal intervals.

The third mandrel mechanism 4300 includes a third holder 4301. The third holder 4301 is formed in a hollow shape and three projecting portions 4302–4304 are formed at equal intervals on an inner peripheral edge portion of the third holder. On an outer peripheral edge portion of the third holder 4301 are formed three guide portions 4305–4307 axially at equal intervals and are further formed three slits 4308–4310 axially at equal intervals. The slits 4214–4216 of the second holder 4210 guide the guide portions 4305–4307 of the third holder 4301, causing the third holder 4301 to move in the rotary shaft direction.

The third holder 4301 has three projecting portions 4311–4313 formed at equal intervals on an end portion thereof located on the ceiling board side of the housing 50. When the third holder 4301 moves in the rotary shaft direction, the projecting portions 4311–4313 come into engagement in the recesses 4135–4137, respectively, of the first holder 4130. Further, pawl portions 4302–4304 are formed as cutout portions in part of the outer peripheral surface of the third holder 4301. The projecting portions 4301–4304 formed on the inner peripheral edge portion of the third holder 4301 are slidably engaged in the grooves 4231–4233 of the second guide member 4230, permitting the third holder 4301 to move in the rotary shaft direction in interlock with the rotational movement motion of the second guide member.

Further, there is provided a third guide member 4330 which is loosely fitted in the interior of the third holder 4301 and which has a concentric groove 4331 and spiral grooves 4332–4234 formed in an outer peripheral surface thereof. End portions of the spiral grooves 4332–4334 of the third guide member 4330, located on the ceiling side of the housing, are open so that these openings are connected to the openings of the spiral grooves 4112–4114 of the first guide member 4110 when the third mandrel mechanism 4300 and the first mandrel mechanism 4100 are coupled together. The third mandrel mechanism 4300 is formed in a hollow shape so that the second guide member 4230 is loosely fitted in the interior thereof and so that the third mandrel mechanism 4300 moves in the rotary shaft direction in accordance with rotational movement of the second guide member 4230.

The pawl portions 4314–4316 formed on the third holder 4301 partially extend toward the interior and their tips are abutted against, or engaged in, the concentric grooves 4331 formed in the third guide member 4330. With this structure, the third guide member 4330 is kept rotatable while being prevented from coming off the third holder 4301. Further, three projecting portions projecting toward the ceiling surface are formed on an end portion of the third holder 4330 located on the ceiling side of the housing 50.

When in accordance with rotational movement of the second guide member 4230 the third guide member 4330 moves to the ceiling side of the housing in the rotary shaft direction together with the third holder, the projecting portions 4335–4337 of the third guide member are fitted in and connected to the recesses 4135–4137 formed in the first guide member 4110. When the first and third guide members 4110, 4330 are coupled together, the rotational movement of the gear 4234 formed on the second guide member 4230 is stopped, while the gear 4111 fitted on the first guide member 4110 is allowed to rotate. In this case, the first and third guide members 4110, 4330 become integral with each other and rotate in this integral state, with no movement in the rotary shaft direction.

When the disk is to be stored in the disk storing mechanism 400, the third guide member is once brought down and the holding portion 211 and the holding arm 290 hold the disk at a position between the first and third guide members 4110, 4330. Thereafter, the holding portion 211 and the holding arm 290 rise and push the held disk so that the upper surface of the disk comes into abutment against a first support portion 4411 located at the top stage. In this pushed state of the disk the third guide member 4330 is raised for connection of the first and third guide members 4110, 4330 with each other, whereby the disk can be maintained in a firmly holding state.

The disk supporting mechanism 4400 has a flat, first support portion 4411 on the side thereof opposed to the disk to support a part of the inner peripheral portion of the disk in abutting manner. A portion of the first support portion 4411 located near an inner peripheral edge thereof is formed somewhat larger in wall thickness (second support portion 4412) and a first spacer 4410 for fitting thereon of the inside diameter of the disk is formed in the second support portion 4412. The first spacer 4410 is internally formed with three projecting portions 4413–4415 at equal intervals so that they can be slidably fitted in the grooves 4112–4114 of the first guide member 4110 and the grooves 4332–4334 of the third guide member. In accordance with rotational movement of the first and third guide members 4110, 4330 the first spacer 4410 moves in the rotary shaft direction in such a manner that a flat portion thereof becomes nearly perpendicular to the rotary shaft.

Reference numeral 4420 denotes a first plate spring which is fixed to the first support portion 4411 on the side opposite to the disk abutted and supported side. The first plate spring 4420 has a diameter larger than that of the first spacer 4410. Its outer peripheral edge portion is partially extended in the rotary shaft direction; in this embodiment four extending portions 4421–4424 extend downward of the disk device at equal intervals. The extending portions 4421–4424 possess a urging force downward of the disk device.

In FIG. 102 there are illustrated only the first spacer 4410 and the first plate spring 4420, but the structure of this embodiment permits six disks to be stored and six spacers and six plate springs are provided correspondingly to the six disks (the structure of the other spacers and plate springs are the same as those of the first spacer 4410 and the first plate spring 4420, and the first to sixth spacers and the first to sixth plate springs being respectively arranged in order from above to below of the disk device). That is, they are arranged as follows from above to below of the disk device:

① upper presser member (top stage), ② plate spring, ③ first spacer, ④ first plate spring, ⑤ second spacer, ⑥ second plate spring, ⑦ third spacer, ⑧ third plate spring, ⑨ fourth spacer, fourth plate spring, fifth spacer, fifth plate spring, sixth spacer, sixth plate spring (bottom stage)

The support mechanism 4400 includes a plate spring (not shown, but the same as the first plate spacer 4410) which is fixed thereto and disposed above the first spacer 4410. The plate spring presses down the disk in an abutting manner. This plate spring and the first support portion 4411 of the first spacer 4410 constitute an upper presser member 4430 for gripping the disk. Like the first spacer 4410 and the first plate spring 4420, the upper presser member 4430 is also formed with a hole nearly centrally, and three projecting portions 4432–4434 are formed at equal intervals on an inner peripheral edge portion of the nearly central hole. Also in the upper presser member 4430, like the first spacer 4410, the projecting portions 4432–4434 can slidably be fitted in the grooves 4112–4114 of the first guide member 4110 and the grooves 4332–4334 of the third guide member. In accordance with rotational movement of the first guide member and the third guide member the upper presser member 4430 move in the rotary shaft direction.

When a spacer supports a disk, the plate spring positioned just above the spacer pushes the disk to the spacer side (for example, if the disk is on the third spacer, the immediately overlying second plate spring urges the disk to the third spacer), so that the disk is supported (held) more firmly.

The extending portions 4421–4424 of the first plate spring 4420 all extend in the same direction. In FIG. 102, they extend from the right to the left side. Preferably, as shown in FIG. 112, the plate springs are formed so that an intersecting point of their diagonal lines opposed each other with respect to the shaft portion becomes an axis. Such a shape is desirable because the center of gravity becomes stable.

Figure 104:
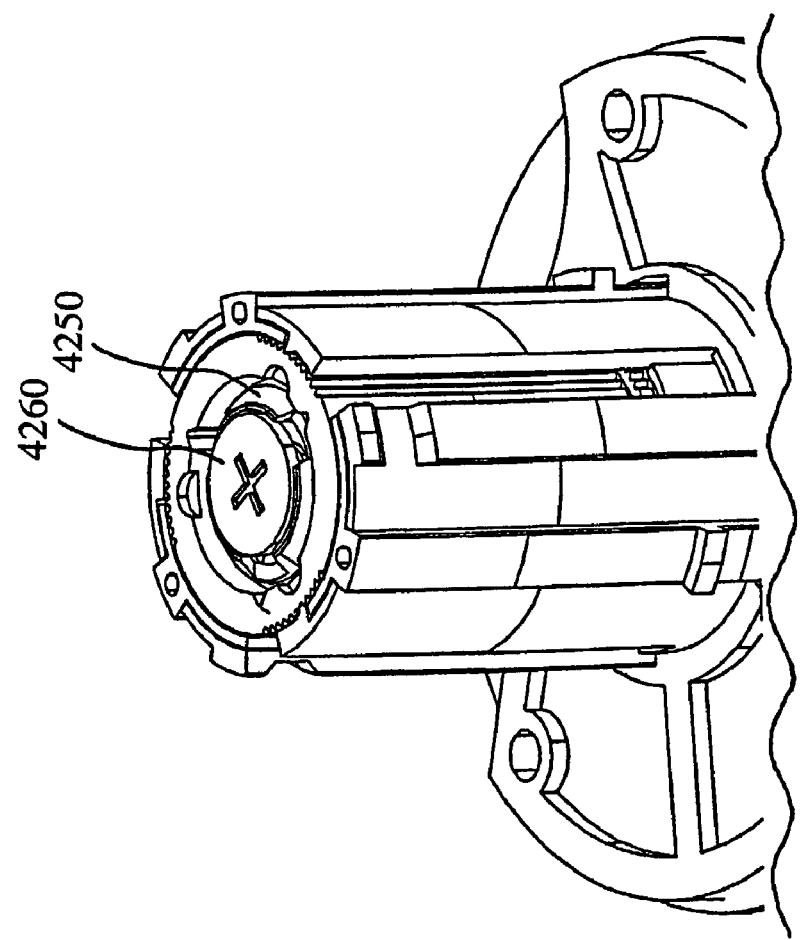
FIG. 104 is a detailed diagram of a principal portion of the disk device shown in FIG. 101.
Figure 105:
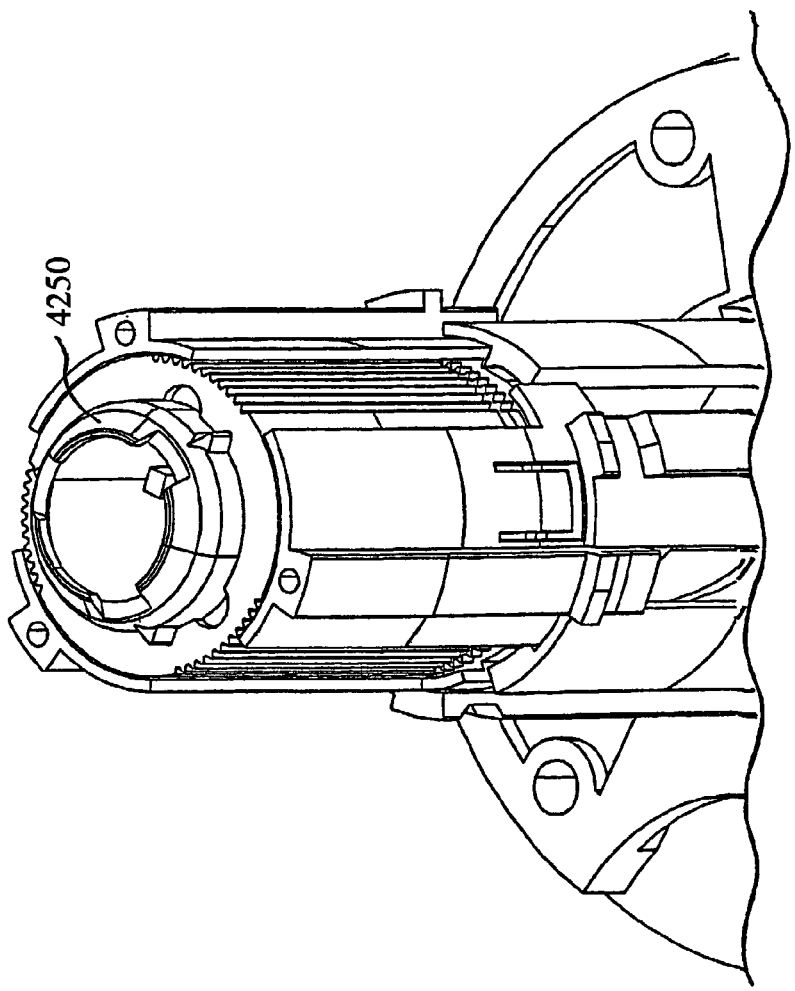
FIG. 105 is a detailed diagram of a principal portion of the disk device shown in FIG. 101.
Figure 106:
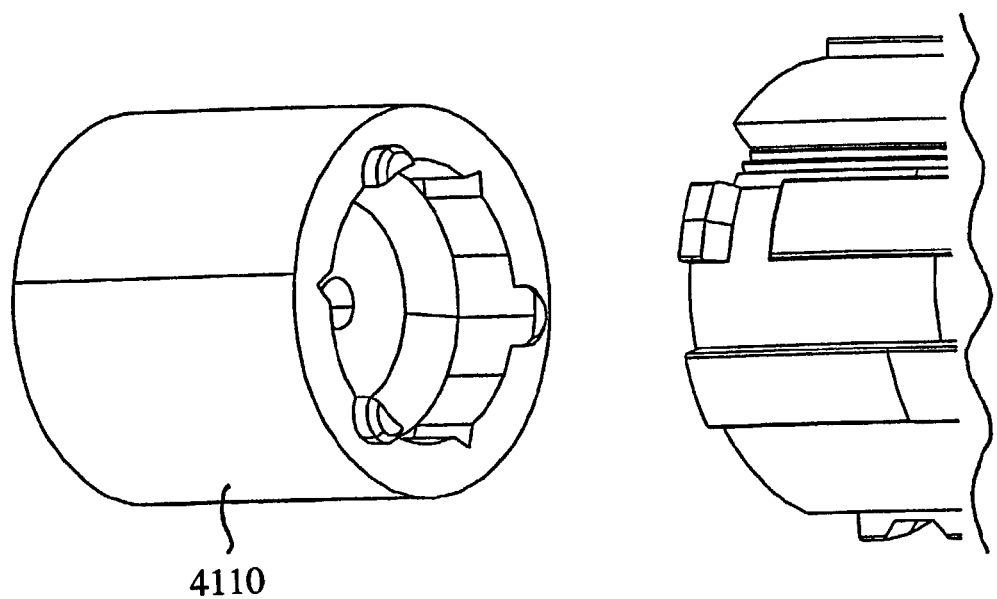
FIG. 106 is a detailed diagram of a principal portion of the disk device shown in FIG. 101.

An appearance of the mechanism disposed in the lower portion of the disk device is as shown in FIGS. 104 and 105. FIG. 104 shows a state in which the third guide member 4230 is received within the second holder 4210 and FIG. 105 shows a state in which the third guide member projects upward from the second holder 4210 and the projecting portion 4250 projects upward. FIG. 106 is an enlarged diagram of a principal portion in which the first mandrel mechanism 4100 is seen from the state shown in FIG. 105. FIG. 107 is a state transition diagram showing a state transition in which the projecting portion 4250 is connected to the first guide member 4110. More specifically, FIG. 107(1) shows a state in which the third guide member 4230 is received within the second holder 4210. Upon receipt of a command for storing or replacing a disk, a change is made to the state of FIG. 107(2), in which the shaft member 4220 rotates and the third guide member 4230 begins to rise, then in response to this motion the projecting portion 4250 becomes disengaged from the third guide member 4230 and projects upward under the biasing force of the spring 4240. Further, as shown in FIG. 107(3), the shaft member 4220 rotates, third guide member 4230 rises, and the projecting portion 4250 is fitted in the fitting portion formed in the underside of the first guide member 4110. Thereafter, as shown in FIG. 107(4), the third guide member 4230 further rises for connection with the first guide member 4110. As shown in FIG. 110(1), when the disk storing mechanism 400 is to store a conveyed disk, the disk is held by the disk holding mechanism 200. Next, as shown in FIG. 110(2), the disk holding mechanism is raised, causing the held disk to be urged upward and abutted against the support mechanism 4400 located at the top stage. Subsequently, as shown in FIG. 110(3), the third guide member 4330 is raised into abutment against the first guide member 4110. When the disk stored at the second stage from the top is to be taken out from the disk storing mechanism, as shown in FIG. 111(1) and (2), the disk concerned is raised up to a predetermined position by the disk storing mechanism, then, as shown in FIG. 111(3), the second disk is held by the disk holding mechanism 200, and thereafter, as shown in FIG. 111(4), the third guide member 433 is brought down while the disk remains held by the disk holding mechanism 200. Thus, in the disk storing mechanism 400, when the third guide member 4330 is to be connected to the first guide member 4110, the third guide member 4330 is raised while being pushed against the support mechanism located at the top stage and is brought into connection with the first guide member 4110. On the other hand, when taking out a disk from the disk storing mechanism 400, the disk storing mechanism 400 lifts the disk up to the height where the disk holding mechanism 200 is normally positioned, then the disk is taken out in a holding state.

Figure 115:
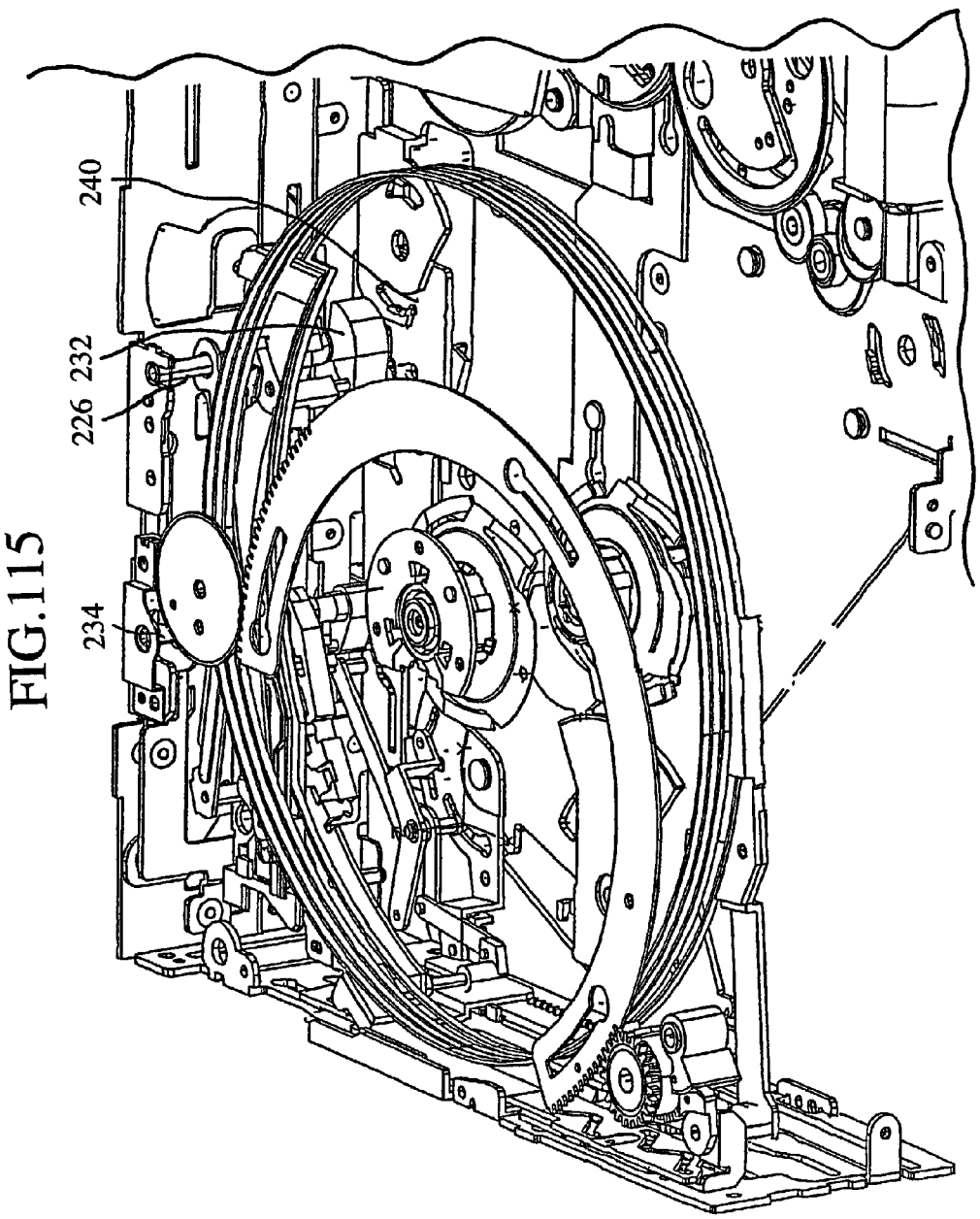
FIG. 115 is a structure diagram of a principal portion of the disk device shown in FIG. 1.
Figure 116:
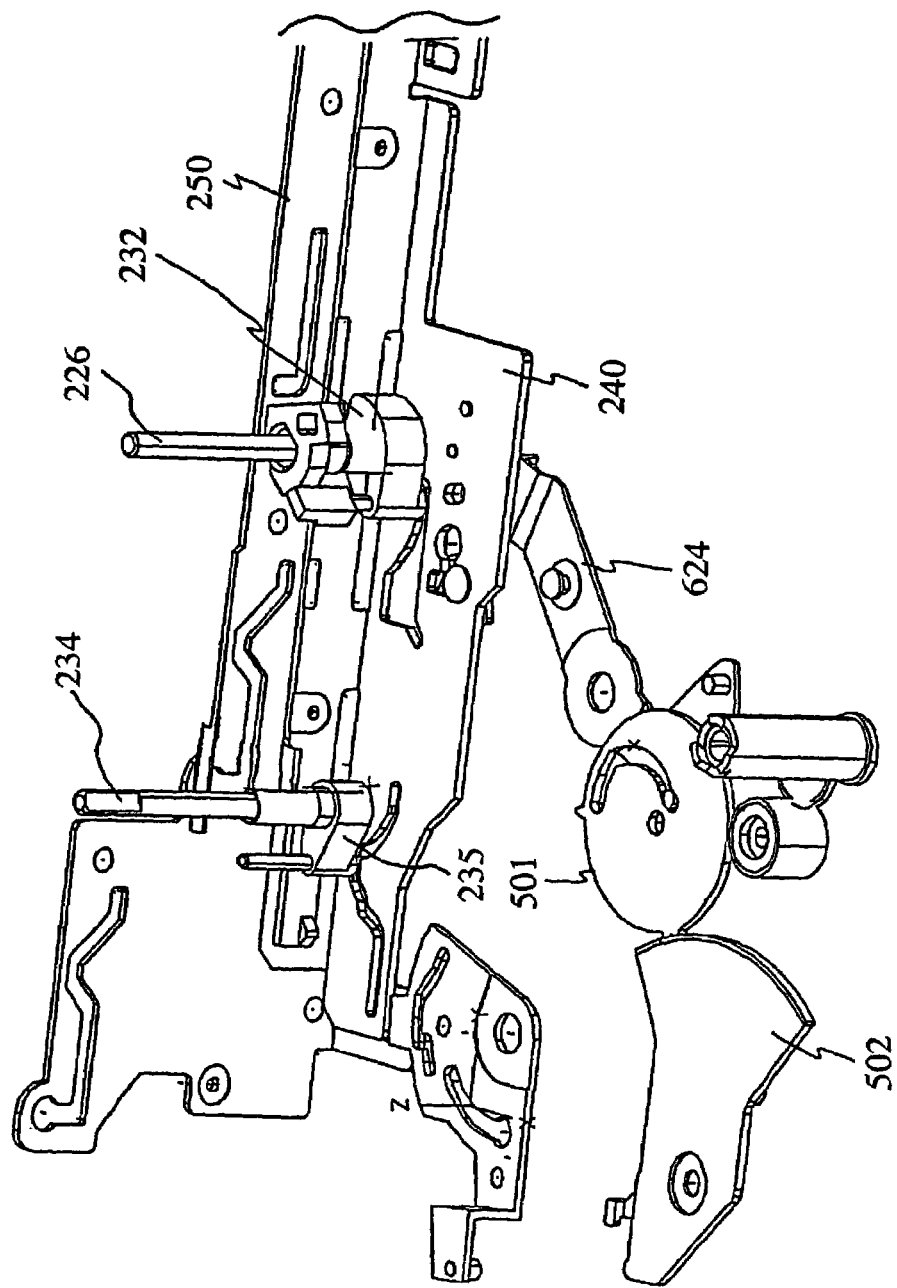
FIG. 116 is a detailed diagram of a principal portion of the disk device shown in FIG. 115.
Figure 117:
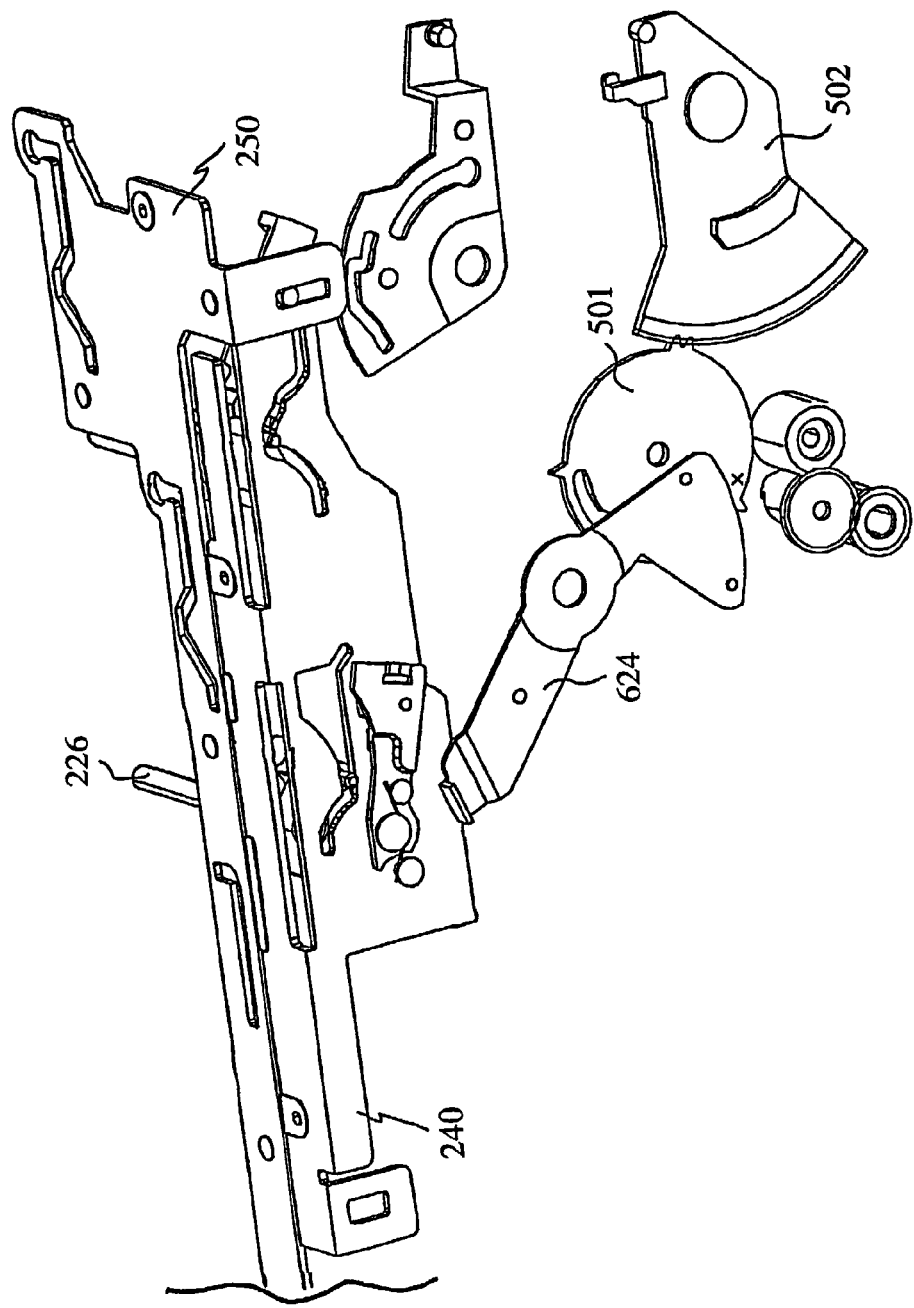
FIG. 117 is a detailed diagram of a principal portion of the disk device shown in FIG. 115.

The drive mechanism will now be described with reference to FIGS. 115 to 117. FIG. 115 illustrates the structure of a principal portion including the drive mechanism which actuates the disk storing mechanism, FIG. 116 illustrates the structure of a principal portion in FIG. 115, and FIG. 117 illustrates the structure of the back side of a principal portion shown in FIG. 115.

In these figures, reference numeral 245 denotes a switching plate attached to the back of the first cam plate 240. When an abutment portion 501a formed on a first lever 501 to be described later is not in abutment against the switching plate 245, the switching plate is set in a first operation mode as a normal mode (an operation mode in which the reproducing operation is performed after disk insertion). In a first operation mode, the disk holding mechanism 200 holds the conveyed disk and the height of the disk holding mechanism is maintained at its normal position in all of disk stand-by state, disk holding state and disk reproducing state for reproducing the held disk, that is, only the operation for stowing the disk holding mechanism is performed. On the other hand, upon abutment of the abutment portion 501a against the first lever 501, there is set either an operation mode in which the conveyed disk is stored in the disk storing mechanism 400 or an operation mode for replacing a disk which has been stored in the disk storing mechanism 400, that is, a second operation mode is set. In this second operation mode, when a disk is to be stored, the disk holding mechanism 200 is raised into abutment against the disk supporting mechanism 4400 while allowing the disk holding operation of the disk holding mechanism 200 to be continued. In this second operation mode, therefore, it is necessary to perform an operation for stowing the disk holding mechanism 200 while keeping high the position of the disk holding mechanism 200. In this setting, the disk storing mechanism 400 is structured so as to be divided up and down and a spacer for abutment against a disk is disposed at the lower end of the upper mandrel mechanism, i.e., at the portion of abutment against the lower mandrel mechanism. Therefore, if the height of the disk conveyance path is set at the height where the space is disposed, there occurs a problem with direct abutment and damage of the disk. For solving this problem it is necessary that the height of the disk conveyance path and the disk storing height be made different from each other.

The first lever 501 is formed at one end thereof with the abutment portion 501a for abutment against a part of the plate 245 attached to the back of the first cam plate 240 and is turnable about a shaft portion 501b, with a pin 501c being formed at an opposite end of the first lever 501. With a pivoting motion of the first lever 501, the disk holding mechanism 200 is operated in the first operation mode without abutment of the abutment portion 501a against the switching plate 245 or is operated in the second operation mode with abutment of the abutment portion 501a against the switching plate 245. Reference numeral 502 denotes a first gear formed with a groove 502a for slidable fitting therein of the pin 501c of the first lever 501, 503 denotes a second gear meshing with the first gear 502, and 504 denotes a third gear meshing with the second gear 503, the third gear 504 being engaged with the shaft member 4220 of the disk storing mechanism 400. Reference numeral 505 denotes a plate engaged with the first gear 502. The plate 505 is partially formed with an abutment portion for abutment against a switch. According to this structure, when the first cam plate 240 is moved in the direction of A, the plate 245 attached to the first cam plate 240 comes into abutment against the abutment portion 501a and rotates. With this rotational movement, the first, second and third gears 502, 503, 504 also rotate in an interlocking manner and the shaft member 4220 meshing with the third gear 504 rotates and actuates the disk storing mechanism. The plate 505 also rotates with the rotational movement of the first gear 502.

Reference numeral 510 denotes a fourth cam plate disposed on the left side face of the housing. The fourth cam plate is linked at one end thereof to the second cam plate 250 through a link portion (not shown) and holds at an opposite end thereof a part of the holding arm 290 so as to permit vertical movement of the holding arm. According to this structure, the fourth cam plate 510 also moves in interlock with the movement of the second cam plate 250, and with this moving force the holding arm 290 is moved so as to be set high or low.

Reference numeral 521 denotes a fourth gear meshing with the gear portion 237 mounted on the second shaft 234. The fourth gear 521 rotates in response to the movement of the second cam plate 250. Reference numeral 522 denotes a link plate meshing at one end thereof with the fourth gear 521. An opposite end of the link plate 522 is in mesh with a fifth gear 523, which in turn is in mesh with a sixth gear (not shown) abutted against the shaft portion 291 of the holding arm 290. According to this structure, the holding arm 290 rotates through the fourth gear 521 and the link portion 522 in synchronization with movement of the second cam plate 250. Therefore, the rotating motions and height restricting motions of the holding portion 211 and the holding arm 290 in the disk holding mechanism can be synchronized with each other, whereby the holding of a disk and the release of the holding state can be done accurately.

Figure 118:
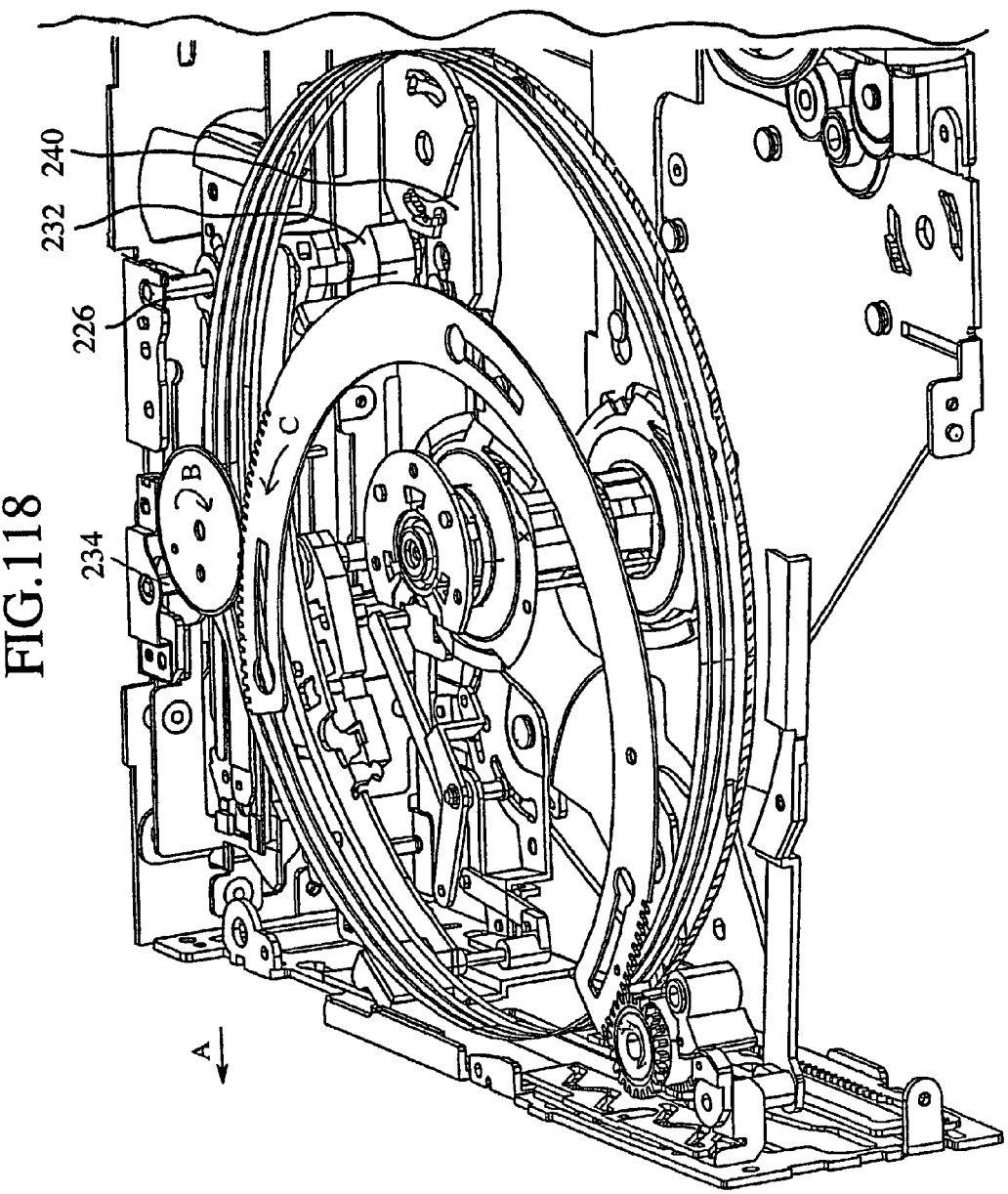
FIG. 118 is an operating state transition diagram explaining an operating state of the disk device shown in FIG. 117.
Figure 119:
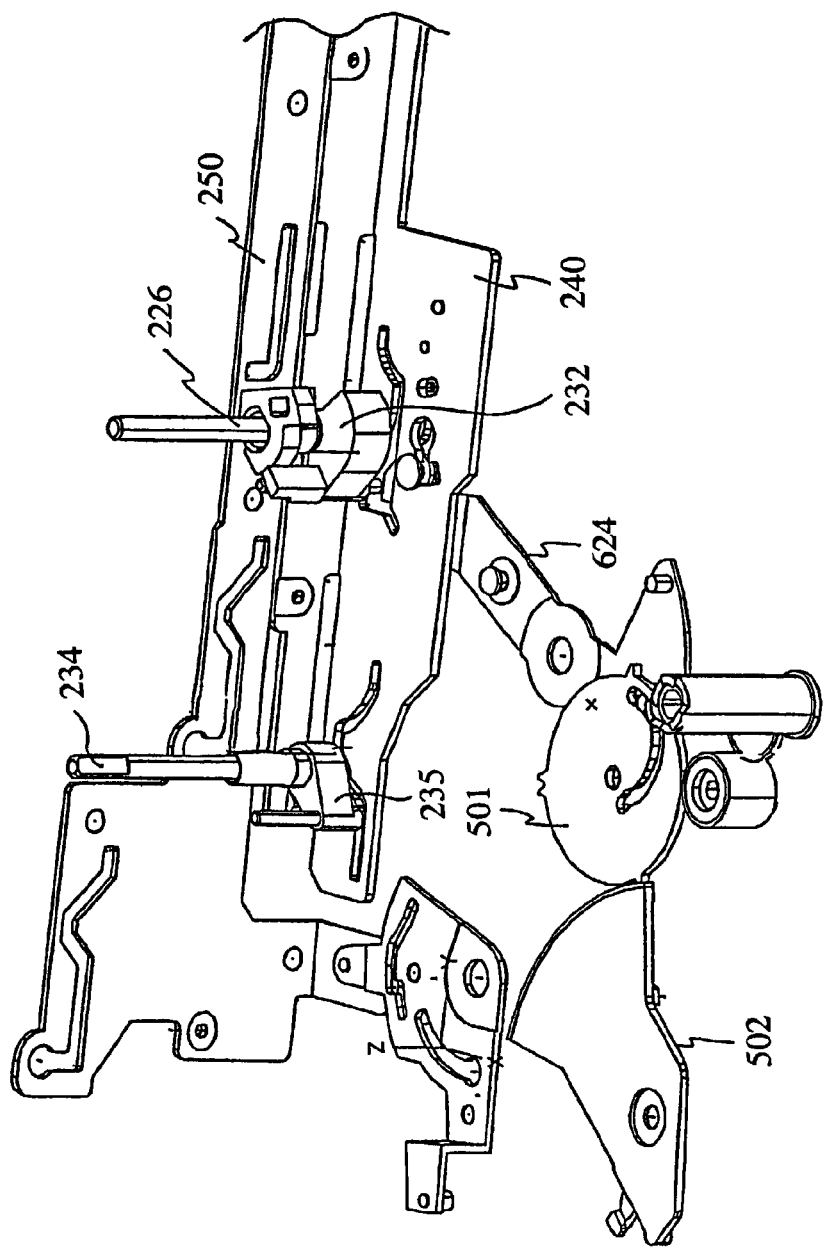
FIG. 119 is a detailed diagram of a principal portion of the disk device shown in FIG. 118.
Figure 120:
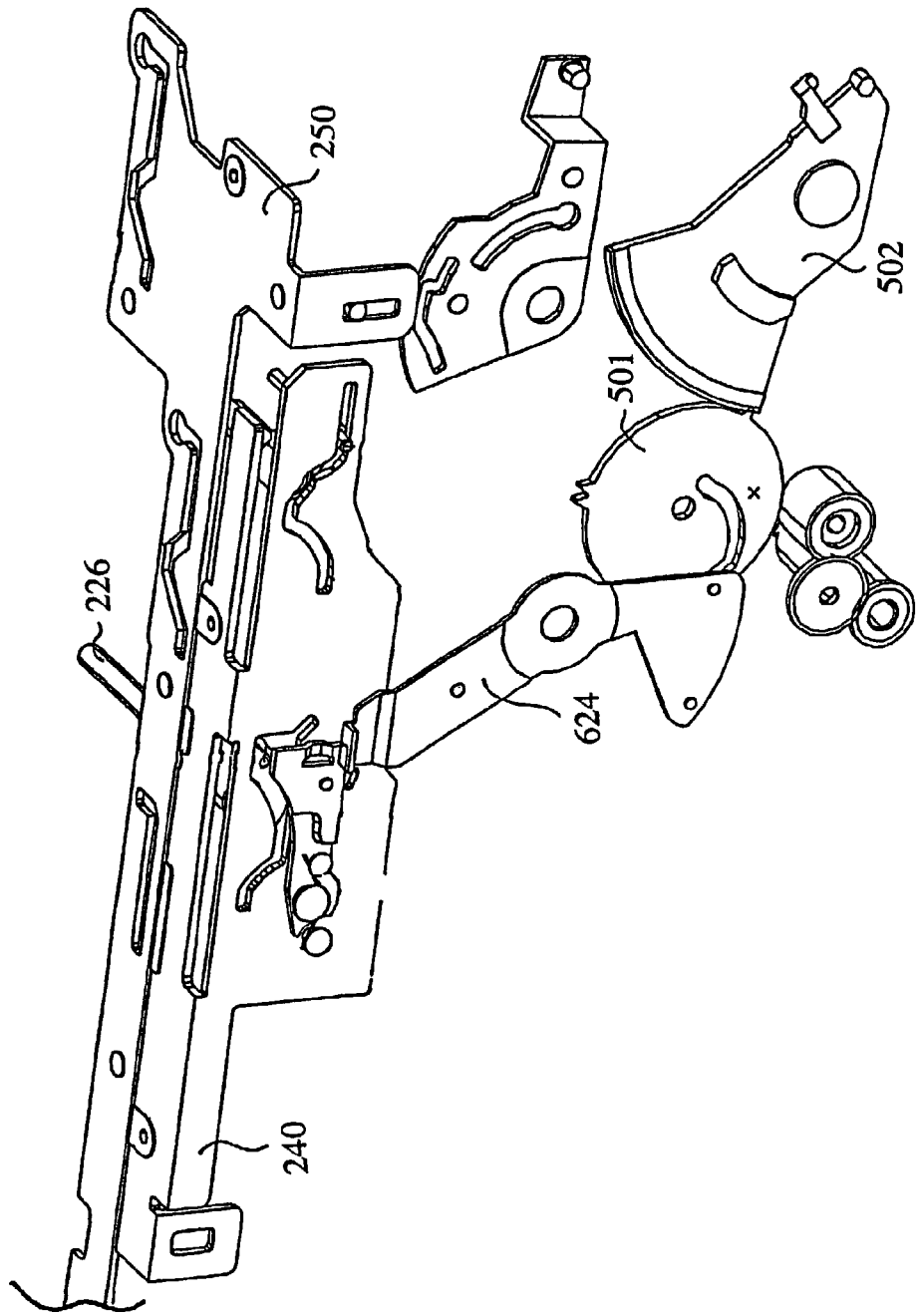
Figure 121:
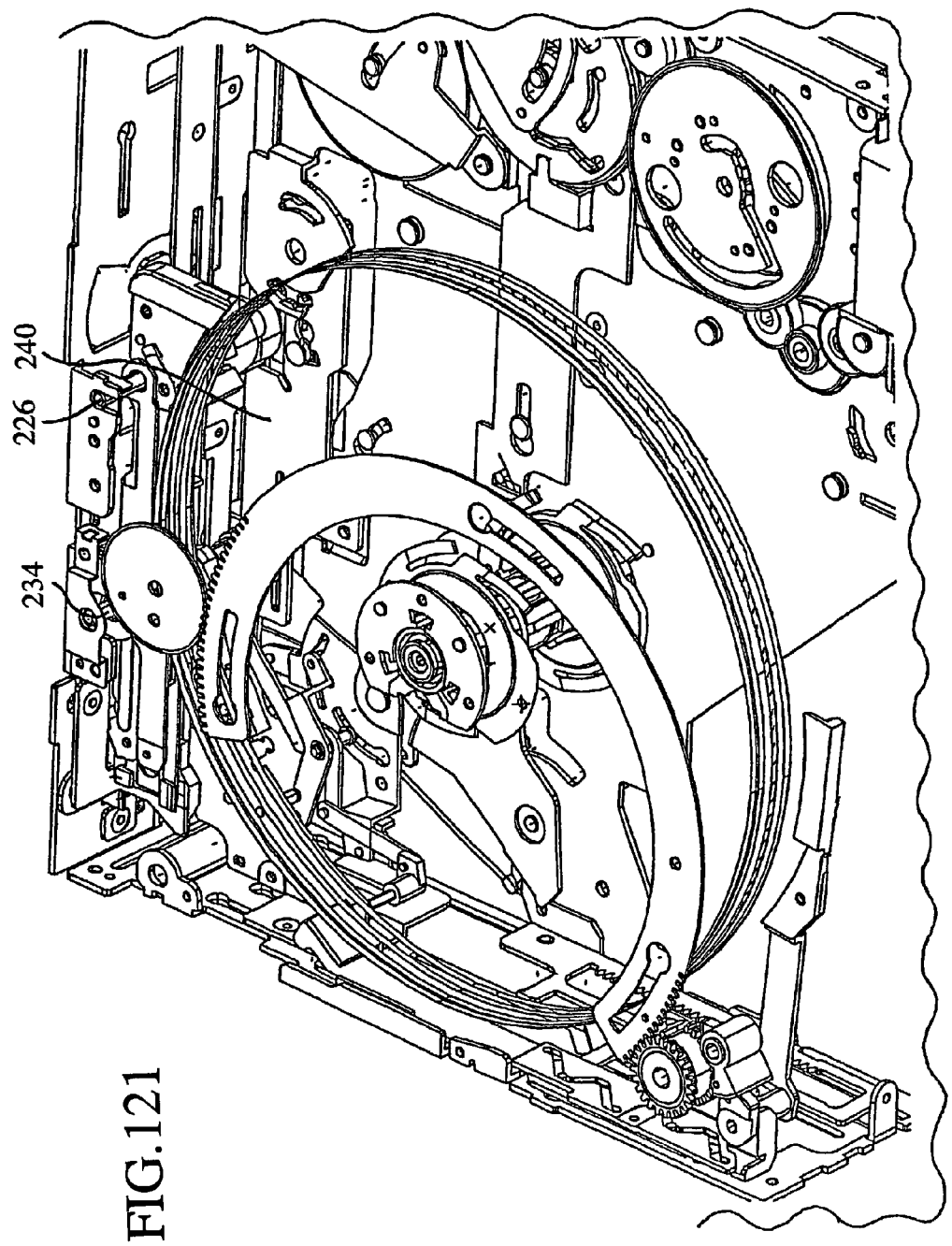
Figure 122:
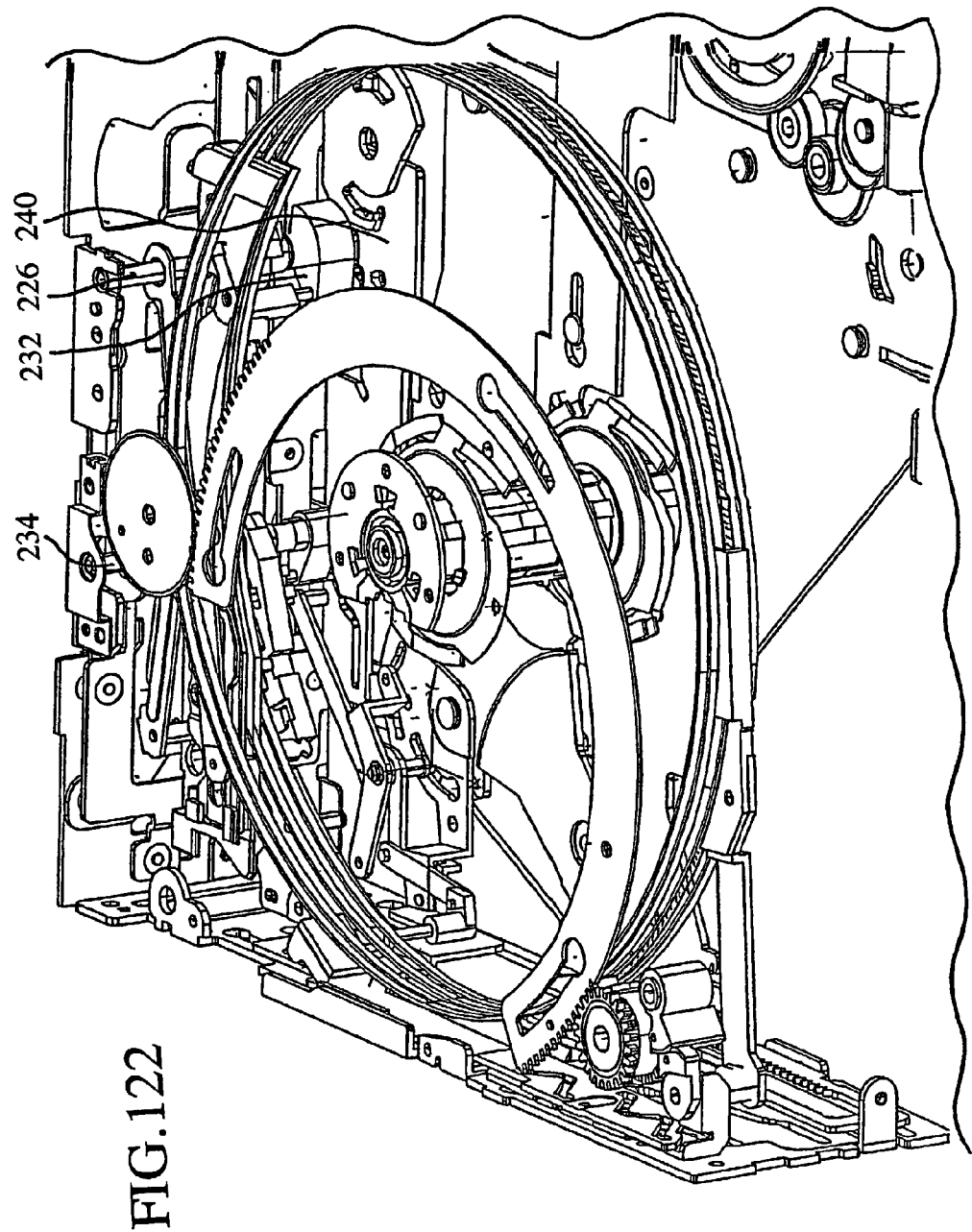
Figure 123:
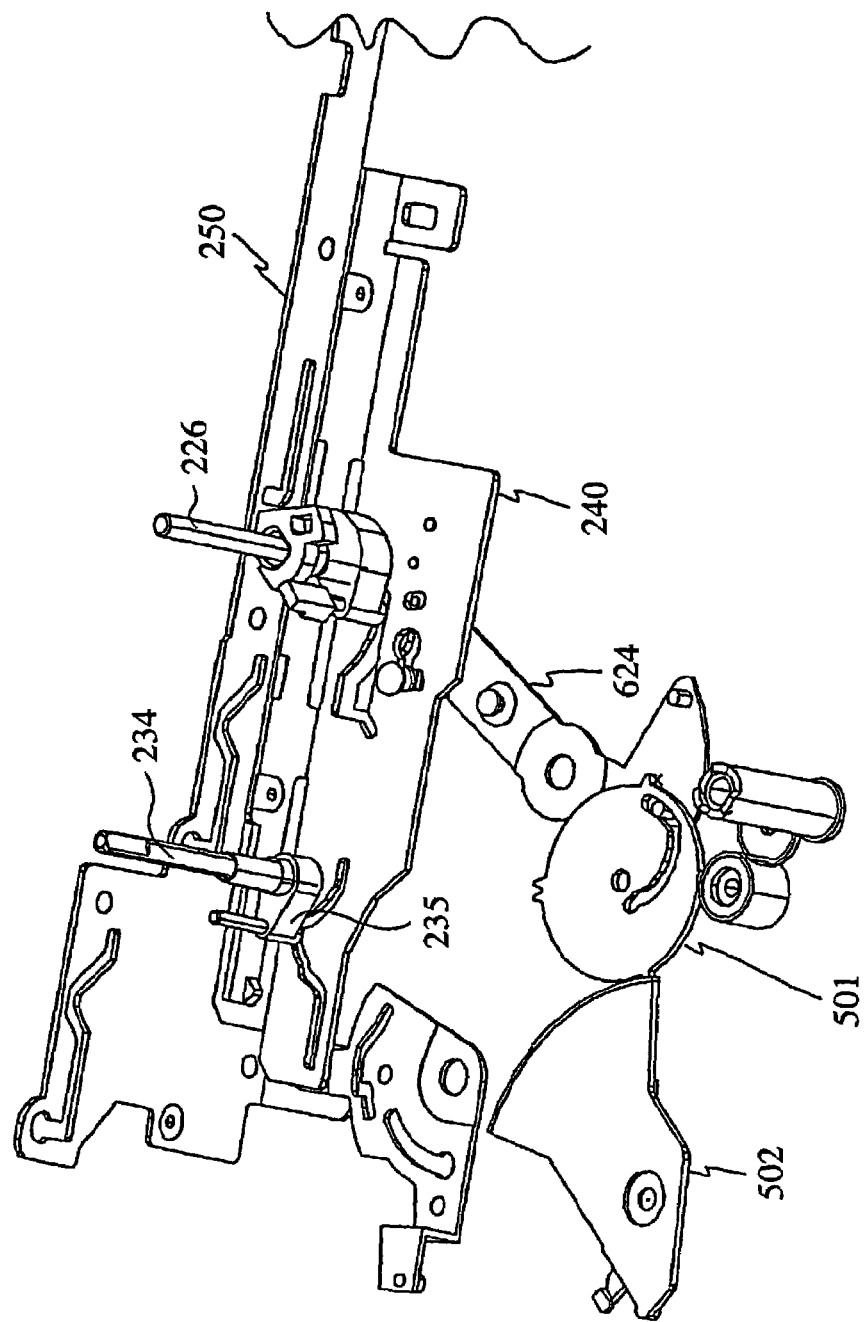
Figure 124:
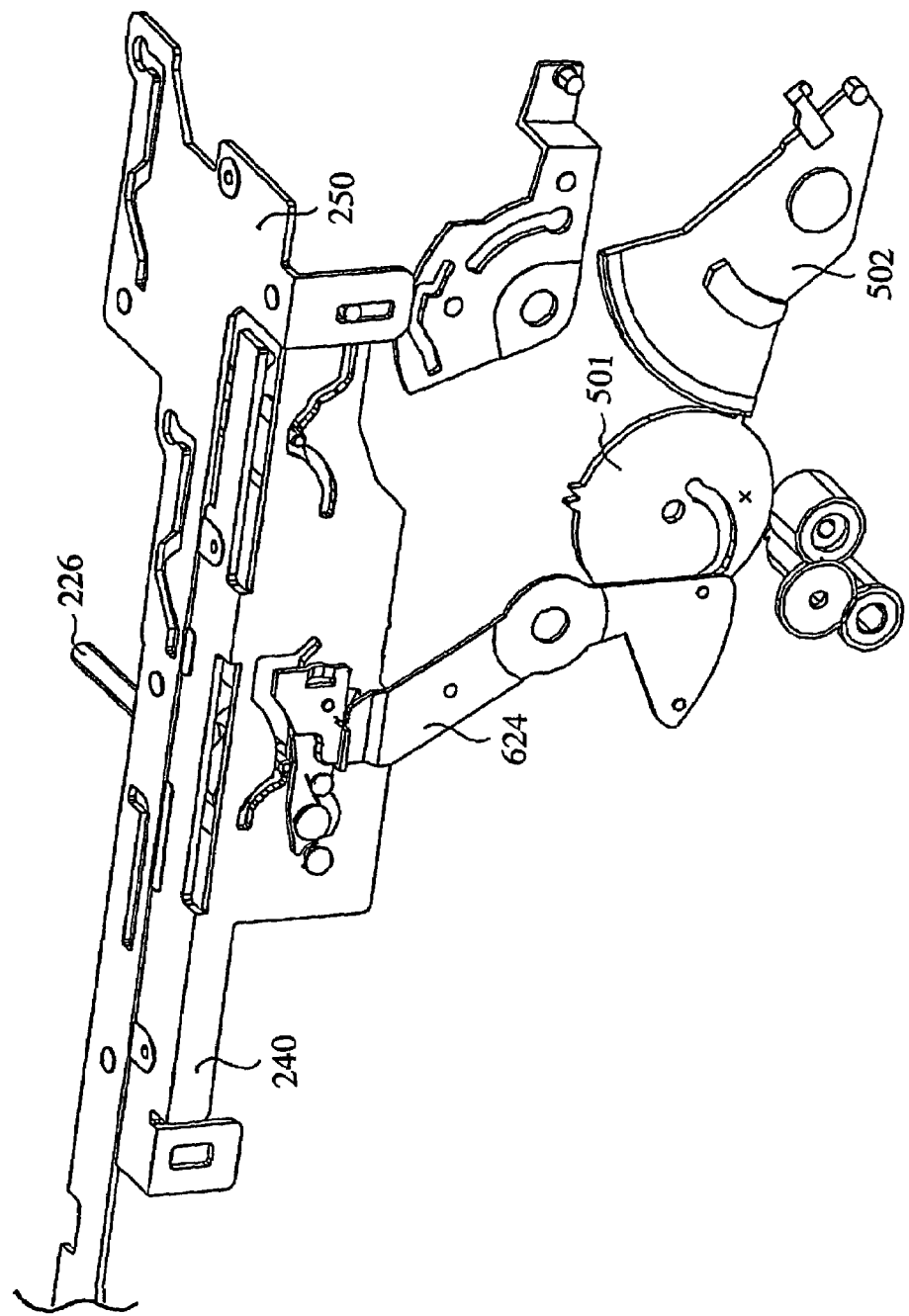
Figure 125:
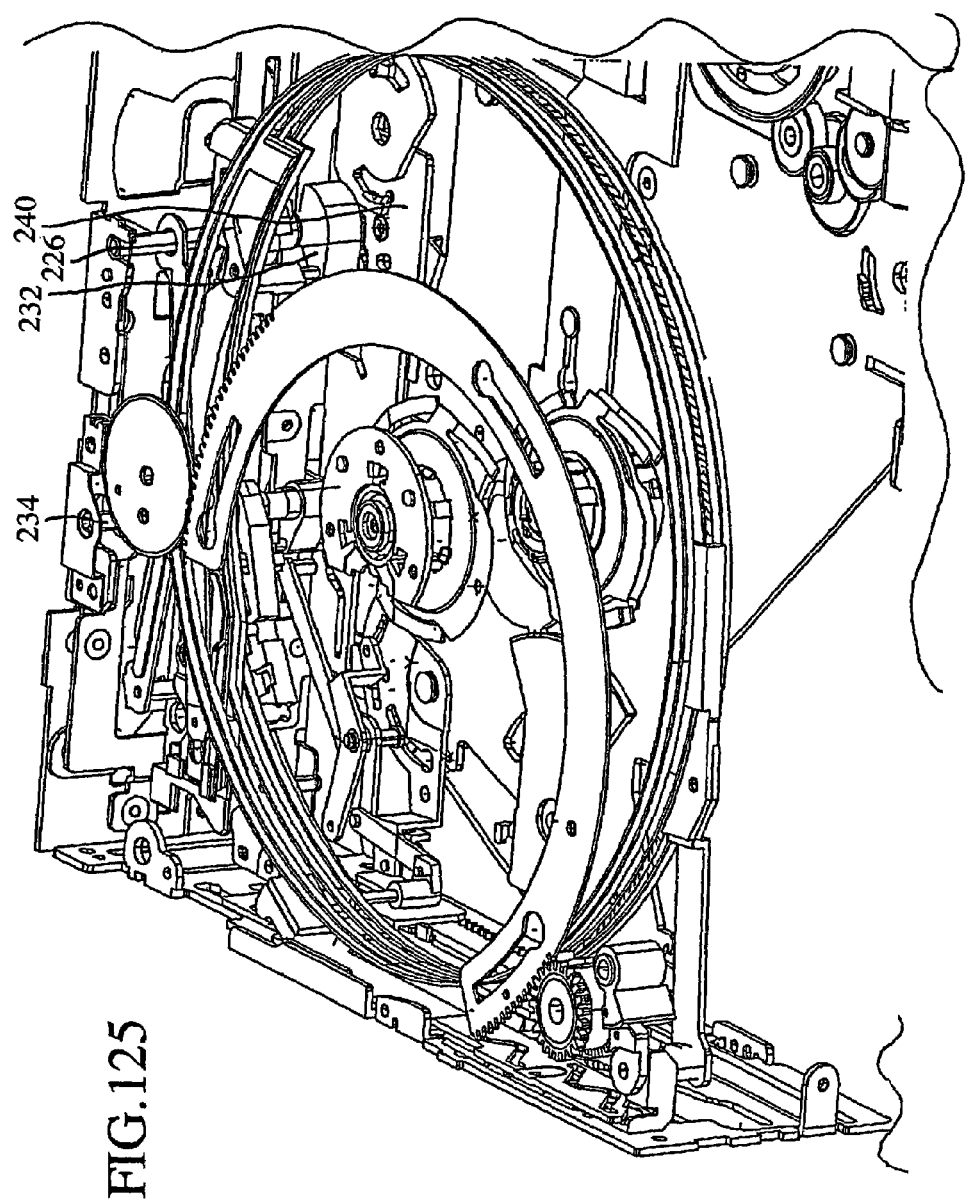
Figure 126:
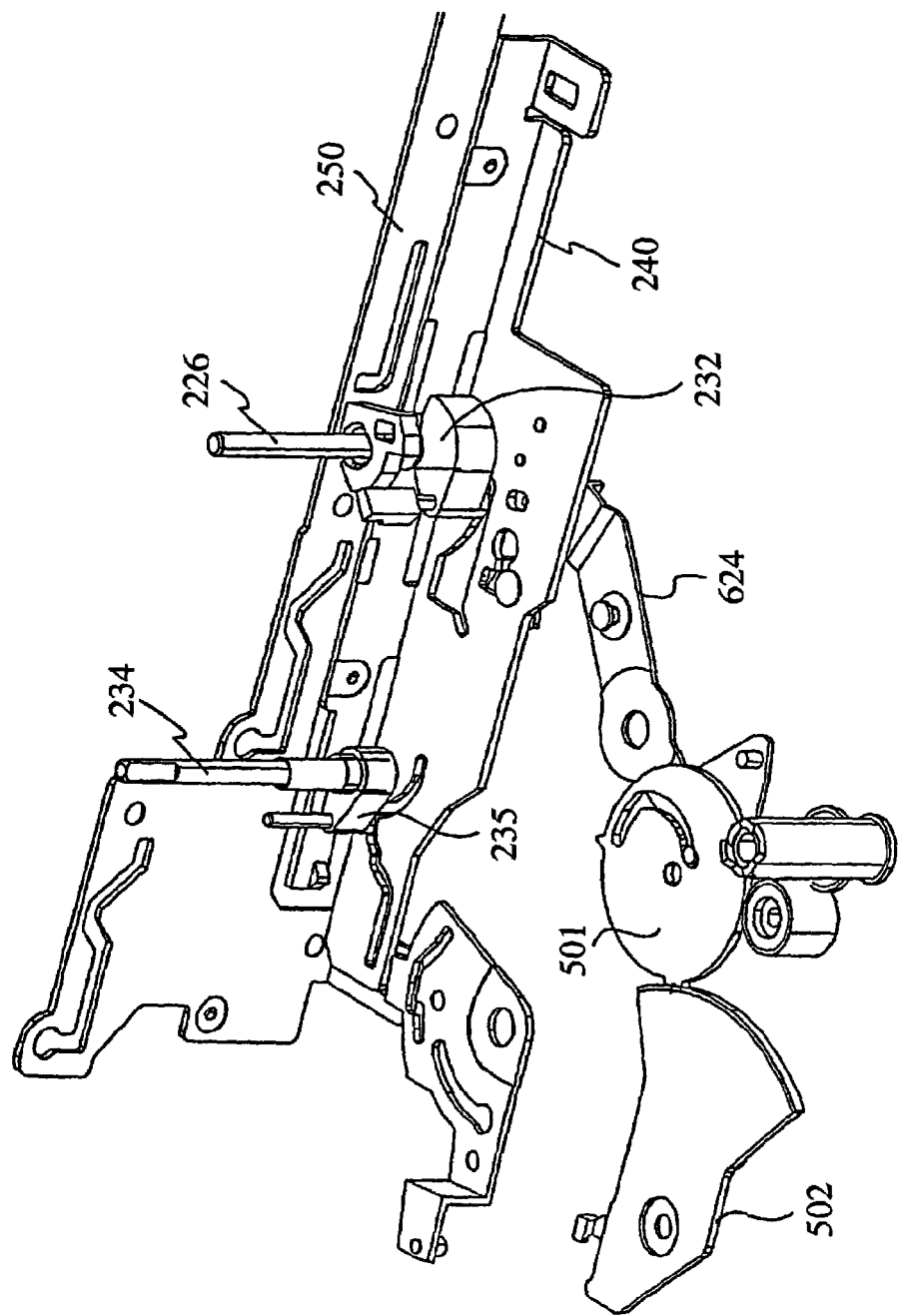
Figure 127:
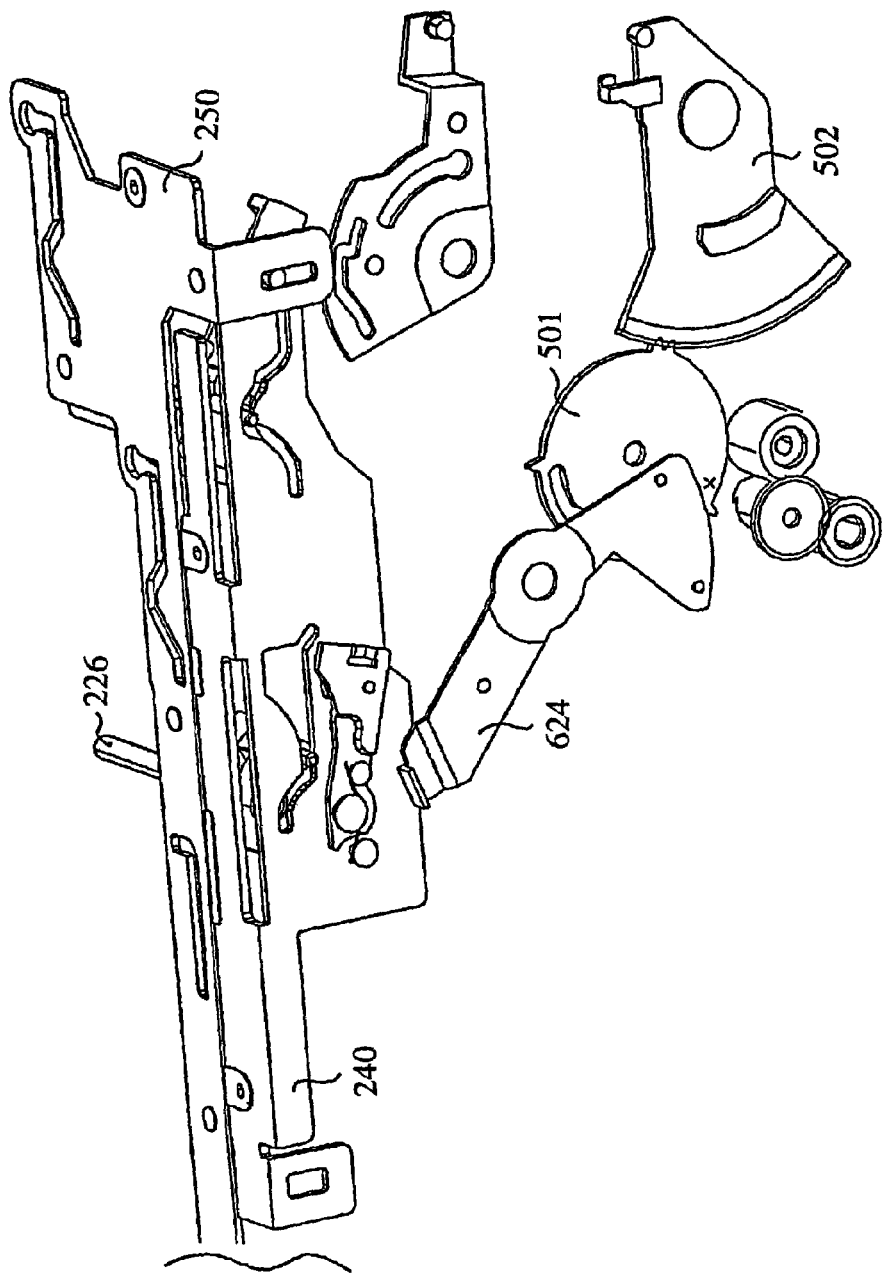
Figure 128:
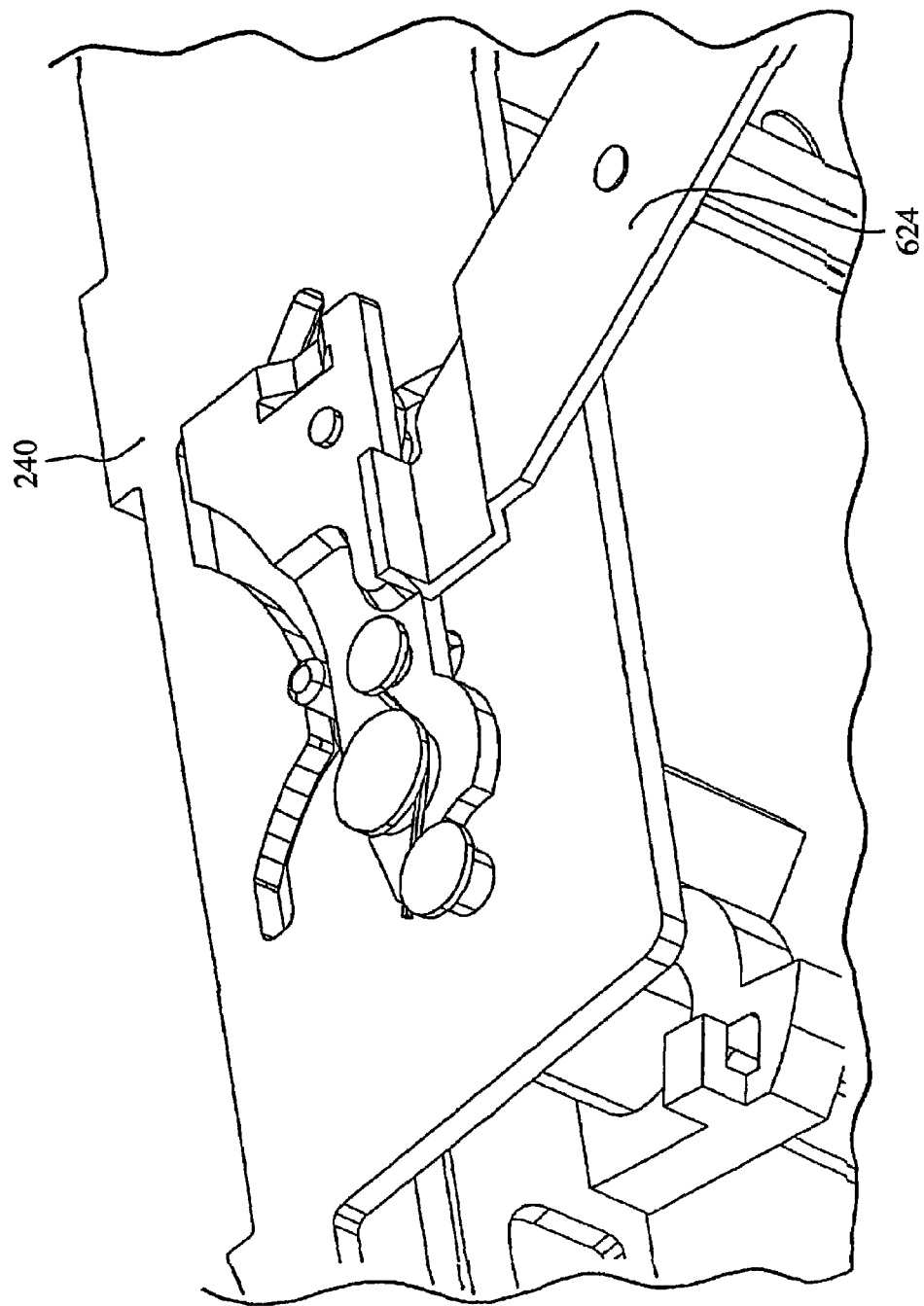

The operation of the drive mechanism 500 will now be described. First, the state in which a disk is set in the reproducing position (the state in which reproduction is not performed) is as shown in FIG. 115. In this state, the disk is held by both the holding portion 211 and holding arm 290. In this connection, the details of an upper surface of a principal portion and of a lower surface thereof are as shown in FIGS. 116 and 117, respectively. In the disk storing mechanism 400, the first guide member 4110 and the third guide member 4330 are in a divided state from each other. Next, as shown in FIG. 118, the disk holding mechanism 200 is raised and the third guide member 4330 is projected upward to move the second cam plate 250 in the direction of A for connection with the first guide member 4110, so that the fourth gear 521 rotates in the direction of B. With this rotational movement, the link plate 522 turns in the direction of C, causing the fifth gear 523 to rotate in the direction of D, with the result that the holding arm 290 rotates in the direction of E to release the disk from its holding state. Since the first cam plate 240 also moves in the direction of A together with the movement of the second cam plate 250, the holding portion 211 is stowed in the vertical base 280. In this case, the details of the upper surface of the principal portion and of the lower surface thereof are as shown in FIGS. 119 and 120, respectively. Next, as shown in FIG. 121, the height of the disk is set by a motion of the disk storing mechanism 400. Also in this case both the holding portion 211 and holding arm 290 continue to release the disk from its holding state. When the reproduction or replacement of a disk is to be performed, as shown in FIG. 122, in order to hold the disk concerned, both the holding portion 21 and holding arm 290 hold the peripheral edge portion of the disk at the height of the disk. In this case, the details of the upper surface of the principal portion and of the lower surface thereof are as shown in FIGS. 123 and 124, respectively. Next, as shown in FIG. 125, for disengaging the disk from the disk storing mechanism, the third guide member 4330 is brought down while allowing the peripheral edge portion of the disk to be held by both the holding portion 211 and holding arm 290, to release the disk from its holding state in the disk storing mechanism. In this case, the details of the upper surface of the principal portion and of the lower surface thereof are as shown in FIGS. 126 and 127, respectively. A principal portion of FIG. 127 is as shown in FIG. 128.

Next, in connection with the operation of the disk storing mechanism, the principle of changing the disk height will now be described with reference to FIGS. 129 to 135. These diagrams are developed diagrams in the rotary shaft direction and are explanatory of grooves formed in the first and third mandrel mechanisms 4100, 4300. An explanation will here be given with reference to FIGS. 131 and 134. FIG. 131 shows a state in which the first and third guide members 4110, 4330 are separated from each other and FIG. 134 shows a state in which the first and third guide members 4110, 4330 are connected to each other. The separated state of both the guide members 4110 and 4330 shown in FIG. 131 is set in the case of performing the disk loading/unloading operation or the disk reproducing operation (the disk is held by the disk holding mechanism). The connected state of both guide members 4110 and 4330 shown in FIG. 134 is set in case of changing the height of the disks stored in the disk storing mechanism. In the first guide member 4110, as shown in FIG. 131, projecting portions on the upper pressing portion and the first and second spacers are loosely fitted in grooves respectively (the ● mark indicates the position of each projecting portion). Likewise, in the third guide member 4330, projecting portions formed on the third, fourth, fifth and sixth spacers are loosely fitted in grooves respectively. As to the clearance between adjacent grooves, it is as shown in the figure. In FIG. 134 it is shown that the third disk R is the disk concerned, and there also are illustrated projecting portions 4551, 4552, and 4553 of the third spacer which supports the third disk R. This structure is for the following purpose, when the disk holding mechanism 200 holds an instructed disk from among the disks stored in the disk storing mechanism 400, it gets in between the disk R to be held and the disk adjacent thereto, so the disk holding mechanism 200 should be prevented from contacting the adjacent disk.

In the figure, three grooves are formed in each of the first and third guide members 4110, 4330. More specifically, grooves 4112, 4113, and 4114 are formed in the first guide member 4110, while grooves 4332, 4333, and 4334 are formed in the third guide member 4330. These grooves are all of the same shape and are formed with a phase difference of 120°. This means that upon 1200 rotational movement of the disk storing mechanism 400 there is performed either an operation of raising the disk height by one stage or an operation of lowering the disk height by one stage. In the grooves of the first guide member 4110, as shown in FIGS. 131 and 134, a right end of a first groove portion 4112a is connected to a left end of a first groove portion 4112b, while a right end of the first groove 4112b is connected to a left end of a first groove 4112c, forming a single groove. Also as to second groove portions 4313a–4313c and third groove portions 4314a–4314c, they are of the same structure as the first groove portions 4112a–4112c, so an explanation thereof will here be omitted. Also as to the grooves 4332, 4333, and 4334 of the third guide member 4330, an explanation thereof will here be omitted because they are of the same structure as the first groove portion 4112a of the first guide member 4110.

The state shown in FIG. 134 is set from the state shown in FIG. 131. That is, after the first and third guide members 4110, 4330 are brought into a connected state from a separated state, then are rotated a predetermined angle in a direction to raise the disk R concerned by one stage (it follows that the first and third guide members are rotated counterclockwise) and are set in the position shown in FIG. 134. In this case, the third guide member 4330 rises while the disk holding mechanism 200 presses the first and second spacers. The thus-raised state is the state shown in FIG. 134.

The projecting portions 4302, 4303, and 4304 of the third holder 4301 located within the grooves 4231, 4232, and 4233 of the second guide member 4230 possess the function of holding the third guide member in a rotatable manner, and with rotational movement of the second guide member 4230, they move from the position shown in FIG. 131 to the position shown in FIG. 134 (in the position shown in FIG. 131 the second guide member 4230 is loosely fitted completely in the interior of the third guide member 4330).

As noted above, the loosely fitted positions of the projecting portions formed on the spacers in separating the first and third guide members 4110, 4330 from each other is as shown in FIG. 131, while the loosely fitted position of the projecting portions in coupling both guide members and allowing the to-be-operated disk to be held and retracted by the disk holding mechanism 200 is as shown in FIG. 134.

That is, in coupling the first and third guide members 4110, 4330 and making the to-be-operated disk selectable, first the operation is performed to take the position shown in FIG. 134 and thereafter the to-be-operated disk is set to the position of disk R. With this operation, the plate spring attached to the spacer on which the disk immediately overlying the disk R as the disk to be operated pushes the disk R downward, whereby the disk R held firmly without shaking, thus facilitating the holding operation of the holding mechanism 200 for the disk R.

On the other hand, in separating the first and third guide members 4110, 4330 from each other, the disk immediately overlying the disk R in the coupled state is moved from the groove portions in the third guide member 4330 to the groove portions in the first guide member 4110.

FIG. 129 shows a state in which the first disk has been inserted and conveyed up to the disk storing position. In this state, the disk storing mechanism is divided into upper and lower mechanisms. FIG. 130 shows a state in which the third disk has been inserted and conveyed up to the disk storing position. Also in this state, like FIG. 129, the disk storing mechanism is divided into upper and lower mechanisms. In FIG. 131, the disk holding mechanism 200 holds the third disk and brings it into abutment under pressure against an upper support member. In this example, the third disk is lifted upward into abutment against the second support member. In FIG. 132, for storing the third disk, the third guide member 4330 is raised while the disk holding mechanism 200 pushes the third disk to an upper portion, i.e., the second spacer. At this instant, the projecting portion 4250 projects upward. In FIG. 133, when connecting the third guide member 4330 to the first guide member 4110, first the projecting portion 4250 is abutted in the fitting portion of the first guide member 4110, whereby a guide is made to connect the third guide member 4330 with the first guide member 4110. Next, as shown in FIG. 134, the third guide member 4330 is connected to the first guide member 4110. Now, the disk storing operation is completed. FIG. 135 shows a state in which the sixth disk is selected and is lifted up to a predetermined height where the disk is held by the disk holding mechanism 200. The following description is now provided about structure and operations of the other mechanisms referred to above.

<7-1. Operation Mode Setting Mechanism for Disk Stock Mechanism>

FIG. 136 is a structure diagram showing the structure of a drive mechanism 600 which generates a drive force for moving the second cam plate 250 in the disk holding mechanism 200 (shown in FIG. 47) in the direction of A or B, FIG. 137 is a structure diagram showing the structure of a principal portion of the drive mechanism 600 illustrated in FIG. 136, and FIG. 138 is a structure diagram showing the structure of a principal portion of the drive mechanism 600 illustrated in FIG. 136.

In these figures, reference numeral 601 denotes a drive motor which generates a drive force for moving the second cam plate 250, in the direction of A or B, in the disk holding mechanism 200 shown in FIG. 47, 602 denotes a gear train composed of a plurality of gears of different diameters, the gear train 601 meshing with a gear 601a mounted to the drive motor 601 to transmit the drive force of the drive motor as a rotational movement motion, and 610 denotes a cam gear mechanism meshing with the gear train 602 and adapted to rotate in accordance with the rotational movement of the gear train 602. The cam gear mechanism 610 is structured as shown in FIG. 137. Reference numeral 611 denotes a cam gear, the cam gear 611 having a meshing portion formed on its outer peripheral edge portion for mesh with a meshing portion of the gear train 602. The cam gear 611 rotates in interlock with the rotational movement of the gear train 602. The cam gear 611 includes a first hole 6111 serving as a rotational movement center in which is fitted a shaft portion 6214, the shaft portion 6214 being slidably fitted in a groove 6213 formed in a lever 621, a cam groove 6112 in which is slidably fitted a fourth pin 6212 provided on the lever 621, a second hole 6113 in which is slidably fitted a second pin 6132 provided on a cam lever 613, a third hole 6114 in which a first pin 6131 provided on the cam lever 613 is fixedly fitted and which serves as an axis of a pivotal motion of the cam lever 613, and a spring retaining portion 6115 for anchoring one end of a spring 614 an opposite end of which is anchored to a tip end of the cam lever 613. Reference numeral 612 denotes a cam plate. The cam plate 612 includes a fifth hole 6121 serving as a rotational movement center in which is fitted the shaft portion 6214, the shaft portion 6213 being slidably fitted in the groove 6213 formed in the lever 621, a cam groove 6122 in which is slidably fitted the fourth pin 6212 provided on the lever 621, a groove 6123 in which is slidably fitted the second pin 6132 provided on the cam lever 613, and a recess 6124 in which is fitted and retained a first bent portion 6221 formed on a lock plate 622. Reference numeral 613 denotes a cam lever. The cam lever 613 is provided with a first pin 6131 which is fitted and fixed into the third hole 6114 formed in the cam gear 611, a second pin 6132 which is slidably fitted in the second hole 6113 formed in the cam gear 611 and which is also slidably fitted, above the second hole 6113, into the groove 6123 formed in the cam plate 612, a third pin 6133 against which an upper surface of a second bent portion 6222 formed on the lock plate comes into abutment with movement of the lock plate 622 to move the cam lever, and a retaining portion 6134 to which one end of a spring 614 is anchored, an opposite end of the spring 614 being anchored to the retaining portion 6115 formed on the cam gear 611. With the biasing force of the spring 614, the second pin 6132 provided on the cam lever 613 is urged constantly toward an outer periphery side of the second hole 6113 formed in the cam gear 611, i.e., toward an outer periphery side of the cam gear 611.

Reference numeral 621 denotes a lever which rotates about a pivot shaft 6211. The lever 621 is provided with the pivot shaft 6211, the fourth pin 6212 which is slidably fitted in the second cam groove 6112 formed in the cam gear 611 and which is also slidably fitted, above the first cam groove 6112, into the second cam groove 6122 formed in the cam plate 612, the shaft portion 6214 which is disposed slidably within the groove 6213 and which is fitted in the first hole 6111 formed in the cam gear 611 and further fitted, above the first hole 6111, into the fifth hole 6121 formed in the cam plate 612, and a link pin 6215 provided at an opposite end of the lever 621, the link pin 6215 being fitted in the hole 251 formed in the second cam plate 250.

The lock plate 622 makes the disk reproducing mechanism 300 float in the disk reproducing operation, while it locks the disk reproducing mechanism 300 in operations other than the disk reproducing operation. The lock plate 622 is provided with the first bent portion 6221 which comes into abutment against the upper surface of the third pin 6133 provided on the cam lever 613, the second bent portion 6222 which is fitted into the recess 6124 formed in the cam plate 612 to fix the rotating motion of the cam plate 612, that is, make the cam plate 612 non-rotatable, and the groove 6223 for slidable fitting therein of the first pin 6231 provided on the first lever 623. The lever 623 is provided with a second pin 6232 which is slidably fitted in a groove 6242 formed in the lock plate 6223 and a pivot shaft 6233. Reference numeral 624 denotes a gear portion. The gear portion 624 is formed with a hole 6241 in which the pivot shaft is fitted and a groove 6242 in which the second pin 6232 formed on the lever 623 is fitted slidably. FIG. 138(*a*) is a rear side view of the cam lever 613, cam gear 611 and cam plate 612 as assembled and FIG. 138(*b*) is a structure diagram showing a mechanism which is linked to the lock plate 622.

Reference will now be made to the operation. FIG. 136 shows a disk insertion stand-by state, FIG. 139(*a*) illustrates the state of a principal portion as seen from the cam plate 612 side which is in the state of FIG. 136, and FIG. 139(*b*) illustrates the state of the principal portion as seen from the cam lever 613 side which is in the state of FIG. 136, i.e., from the back side. In this state, both first and second bent portions 6221, 6222 of the lock plate 622 are unlocked from the cam plate 612 and cam lever 613. Consequently, the fourth pin 6212 formed on the lever 621 urges the outer periphery side of the groove 6123 formed in the cam plate 612, so that the cam plate 612 rotates simultaneously with the cam gear 611. Next, in the first operation mode (a disk conveyance stand-by state, with the disk storing mechanism 400 being in a divided state), as shown in FIG. 140, the state shown in FIG. 136 remains intact, that is, both first and second bent portions 6221, 6222 of the lock plate 622 are unlocked from the cam plate 612 and the cam lever 613, so that the fourth pin 6212 provided on the lever 621 urges against the outer periphery side of the groove 6123 formed in the cam plate 612. Therefore, with the cam plate 612 rotating simultaneously with the cam gear 611, the drive motor 601 operates in accordance with disk conveyance, causing the gear train 602 and the cam gear 611 to rotate. Accordingly, the cam plate 612 rotates simultaneously with the cam gear 611. Further, in interlock with the rotational movement motions of the cam gear 611 and cam plate 612 the lever 621 moves in the direction of A. With this movement, the second cam plate 250 is moved in the direction of B. Next, in the second operation mode (the disk reproducing or holding operation mode, with the disk storing mechanism 400 being in a divided state), as shown in FIG. 141, the first bent portion 6221 of the lock plate 622 locks the recess formed in the cam plate 612 and a slant face of the second bent portion 6222 of the lock plate 622 comes into abutment against the third pin 6133 provided on the cam gear 611, causing the cam lever 613 to turn clockwise. With this rotational movement of the cam lever 613, the second pin 6132 is urged to the inside of the second hole 6113 formed in the cam gear 611, i.e., to the central side of the cam gear 611, and in the cam plate 612, is urged to the inside of the groove 6123, i.e., to the central side of the cam plate 612, and is put in abutment against their inner wall surfaces. As a result, the second pin 6132 moves along the central-side wall surface of the groove 6123 formed in the cam plate 612 and thus an operation mode different from the first operation mode is carried out. FIG. 142(*a*) illustrates the state of a principal portion as seen from the cam plate 612 side which is in the state of FIG. 141 and FIG. 142(*b*) illustrates the state of the principal portion as seen from the cam lever 613 side which is in the state shown in FIG. 141, i.e., from the back side. Next, in the third operation mode (a mode of changing from one disk to another stored in the disk storing mechanism 400, with the disk storing mechanism being connected), as shown in FIG. 143, the first bent portion 6221 of the lock plate 622 locks the recess formed in the cam plate 612, but the abutment between the slant face of the second bent portion 6222 of the lock plate 622 and the third pin 6133 formed on the cam gear 611 is cancelled. Thus, since only the cam plate 612 is locked, only the cam gear 611 is rotated without rotational movement of the cam plate 612. Further, in this state, since the cam plate 612 is locked, the fourth pin 6212 formed on the lever 621 does not move and hence the lever 621 remains fixed. FIG. 144(*a*) illustrates the state of a principal portion as seen from the cam plate 612 side which is in the state shown in FIG. 143 and FIG. 144(*b*) illustrates the state of the principal portion as seen from the cam lever 613 side which is in the state shown in FIG. 143, i.e., from the back side.

Such a structure permits a plurality of operation modes to be set using existing mechanisms.

<Operation Mode Detecting Mechanism utilizing Lock Mechanism for Disk Reproducing Mechanism>

FIG. 145 is a structure diagram showing a relation between the locking mechanism 330 for locking or unlocking the disk reproducing mechanism 300 and a switch mechanism 700 which turns a switch ON or OFF in accordance with movement of the locking mechanism 330, and FIG. 146 is a structure diagram of a principal portion with the floating deck section 350 removed from the mechanism shown in FIG. 145. Structure and operation will now be described with reference to these figures. As to the same mechanisms as in FIG. 136, they will be identified by like reference numerals and explanations thereof will here be omitted. Reference numeral 701 denotes a cam which performs a rotational movement motion with the drive force of the drive motor 601 transmitted thereto through the gear train 602 and the cam gear portion 610. The cam 701 is formed with a groove 7011, for slidable fit therein, of a first pin 7021 formed on a first lock plate 702. The first lock plate 702 is provided with the first pin 7021 which is slidably fitted in the groove 7011 formed in the cam 701 in accordance with a rotational movement motion of the cam 701 and is partially provided with a meshing portion 7022 for mesh with the gear link 703. The gear link 703, which meshes with the meshing portion 7022 formed on the first lock plate 702, is also in mesh with a meshing portion 7041 formed on a second lock plate 704. According to this structure, when the first lock plate 702 moves through the gear link 703, the second lock plate 704 also moves. Reference numeral 705 denotes a first lock portion formed at part of the first lock plate 702 to lock the disk reproducing mechanism 300. Reference numeral 706 denotes a second lock portion formed at part of the second lock plate 704 to lock the disk reproducing mechanism. Reference numeral 707 denotes a third lock portion formed at part of the first lock plate 702 to lock the disk reproducing mechanism 300. Reference numeral 708 denotes a third lock plate which is partially engaged in a recess formed in part of the first lock plate 702. When the first lock plate 702 moves, the third lock plate 708 moves simultaneously with and in the same direction as the movement of the first lock plate. Reference numeral 709 denotes a lock link provided at part of the third lock plate 708. Reference numeral 710 denotes a fourth lock portion formed at part of the third lock plate 708 to lock the disk reproducing mechanism 300. Reference numerals 711 and 712 denote first and second switches, respectively, which are provided for judging an operating state of the disk device. Upon abutment against a retaining portion 7024 formed on the first lock plate 702 the first and second switches 711, 712 turn ON, while upon cancellation of the abutted state both switches turn OFF. Likewise, upon movement of the first lock plate 702 in the direction of A the first switch 711 turns ON, while upon movement of the first lock plate 702 in the direction of B the first switch 711 turns OFF.

A description will now be given of the operation. FIGS. 145 and 146 illustrate a state in which the floating deck section 350 is locked by the first to fourth lock portions 705–710. That is, both figures illustrate an operation other than the disk reproducing operation, e.g., a disk stand-by state or a disk replacing state. At this time, both first and second switches 711, 712 are OFF because they are not in abutment against the retaining portion 7124 of the first lock plate 702. FIG. 147 is a detailed diagram of a principal portion, showing the first lock plate 702 which is in this state and FIG. 148 is a right-hand side view. Next, for reproducing the disk, the floating deck section 350 is released from its locked state. More specifically, the cam 701 is rotated by the drive motor 601 through the gear train 602 and cam gear portion 610, and interlocking with this rotational movement the first lock plate 705 moves in the direction of A, the gear link 703 rotates, the second lock plate 704 moves in the direction of B to unlock the second lock portion 706, further, the third lock plate 708, which is interlocked with the movement of the first lock plate 702, also moves in the direction of A and the lock link 709 rotates, whereby the floating deck section 350 is unlocked. This state is reached through the state shown in FIG. 149. In FIG. 149, the first lock plate is in a slightly moved state in the direction of A. In this state, the first switch 711 is ON, while the second switch 712 remains OFF. In connection with the locked state of the floating deck section 350, the first, second and third lock portions 705, 706, 707 continue to lock in directions other than the directions of A and B and are unlocked in only the directions of A and B. That is, the floating deck section 350 swings in only the directions of A and B. However, since the fourth lock portion 710 locks in the directions of A and B, a locked state is continued in all directions. FIG. 150 is a right-hand side view in this state. Next, when the drive motor 601 turns ON and the first lock plate further moves in the direction of A, as shown in FIG. 151, the spacing between the first and second lock portions 705, 706 becomes shorter and the floating deck section 350 is unlocked and is assumed in a floating state. In this case, since the unlocking operation has not been completed yet, the first switch 711 is turned ON, but the second switch 712 remains OFF. FIG. 152 shows a state in which the first lock plate 702 has completed its movement in the direction of A, that is, the floating deck section 350 has completely been released from its locked state. In this state, the first switch 711 remains ON, while the second switch 712 comes into abutment against the retaining portion 7124 of the first lock plate 702 and turns ON. That is, when the floating deck section 350 is assumed in a completely floating state (unlocked state), both the first and second switches 711, 712 turn ON, while in a locked state of the floating deck section 350 both the switches turn OFF. FIG. 153 is a structure diagram showing a principal portion in this state and FIG. 154 is a right-hand side view of FIG. 152.

FIG. 155 is a structure diagram showing a relation between the cam 701 and the first lock plate 702, FIG. 156 illustrates an entire structure in more detail than FIG. 1, and FIG. 157 is a structure diagram showing a mechanism attached to the ceiling surface of the housing 50.

Next, a description will be given below about the operation of the entire disk device.

[7. Operation of the Entire Disk Device]

FIG. 158 illustrates operating states of principal structure in various operation modes of the entire disk device.

In FIG. 158, the left-hand column represents the names of mechanisms to be operated, the top row represents sequence numbers corresponding to transition states of operation modes, the row immediately underlying the top row indicates representative diagrams corresponding to operation modes, and the names and numbers of principal portions represent diagram numbers indicating states of principal portions correspondingly to the sequence of transition states in the operation modes.

Representative diagrams of the operation mechanisms are as follows:

① The disk loading/unloading mechanism (the first position delimiting portion) is FIG. 4.

② The disk loading/unloading mechanism (the second position delimiting portion and the link portion) is FIG. 15.

Figure 33:
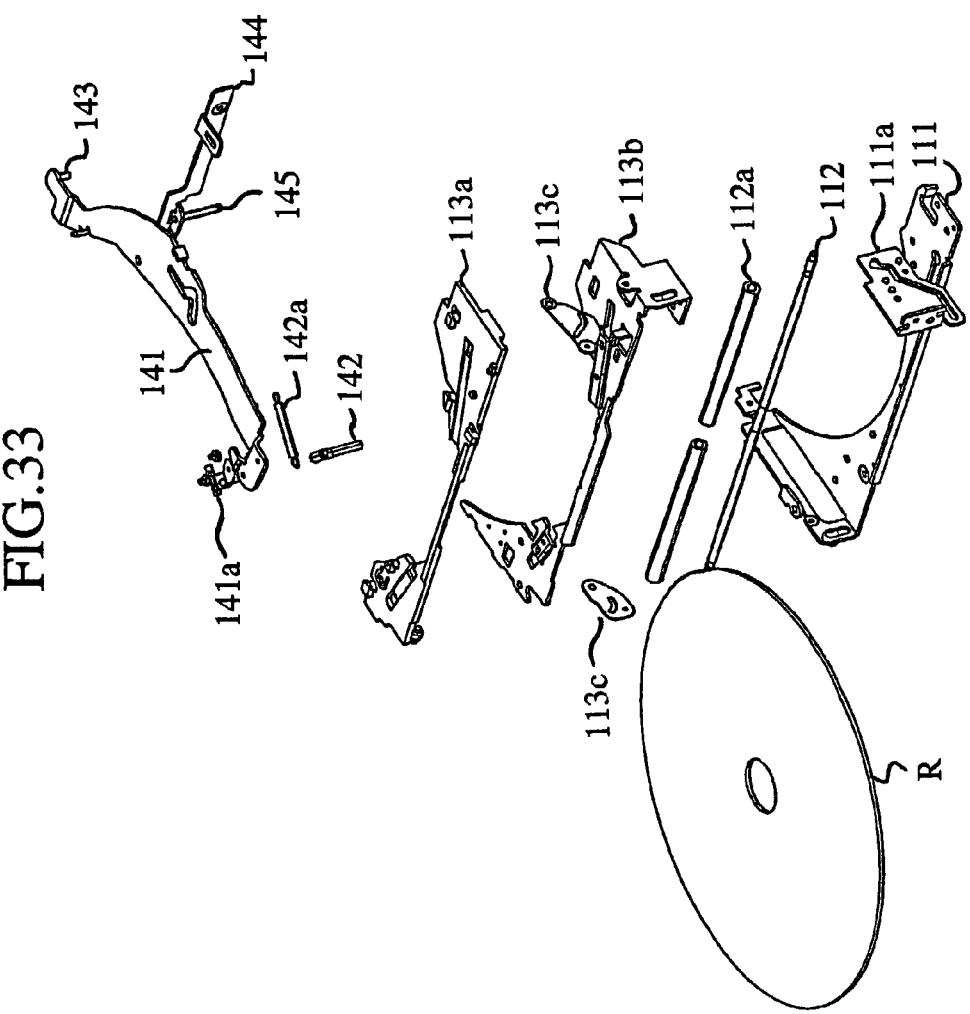
FIG. 33 is an exploded perspective view of the disk device shown in FIG. 32.

③ The disk loading/unloading mechanism (the third position delimiting portion) is FIG. 33.

④ The roller base movement restricting mechanism is FIG. 43.

⑤ The disk holding mechanism (whole) is represented by FIGS. 47 and 48.

⑥ The disk holding mechanism (disk detecting portion) is FIG. 75.

⑦ The disk holding mechanism (auxiliary holding portion) is FIG. 87.

⑧ The disk reproducing mechanism (lock mechanism) is FIG. 146.

⑨ The operation mode setting mechanism (vertical movement) in the disk holding mechanism is FIG. 137.

The operation mode setting mechanism (rotational movement) in the disk holding mechanism is FIG. 128.

The disk storing mechanism is FIG. 113.

Various operating states (position states) will be described below step (process) by step (process) with reference to FIG. 158.

First, in the disk insertion stand-by state in which for example retrieval of a disk stored in the disk storing mechanism is being conducted (step 1), this state is as illustrated in FIG. 159 which is an entire structure diagram). In this state:

① The first position delimiting portion (hereinafter, refer to as the first position delimiting portion), in the disk loading/unloading mechanism 100 is set to the position (state) shown in FIG. 3.

② The second position delimiting portion and the ink portion (hereinafter, refer to as the second position delimiting portion) in the disk loading/unloading mechanism 100 is set to the position (state) shown in FIG. 19.

③ The third position delimiting portion (hereinafter, refer to as the third position delimiting portion) in the disk loading/unloading mechanism 100 is set to the position (state) shown in FIG. 32.

④ The roller base movement restricting mechanism is set to the position (state) shown in FIG. 43.

⑤ The disk holding mechanism (whole) is set to the position (state) shown in FIG. 55.

⑥ The disk holding mechanism (disk detecting portion) is set to the position (state) shown in FIG. 73.

⑦ The disk holding mechanism (auxiliary holding portion) is set to the position (state) shown in FIG. 87.

⑧ The disk reproducing mechanism (lock mechanism) is set to the position (state) shown in FIG. 145.

⑨ The operation mode setting mechanism (vertical movement) in the disk holding mechanism is set to the position (state) shown in FIG. 136.

The operation mode setting mechanism (rotational movement) in the disk holding mechanism is set to the position (state) shown in FIG. 115.

The disk storing mechanism is set to the position (state) shown in FIG. 129.

Next, the disk insertion stand-by state in which a disk can be conveyed upon insertion thereof (step 2) is as shown in FIG. 161 which is an entire structure diagram. In this state:

① The first position delimiting portion remains set to the position shown in FIG. 3 and does not operate.

② The second position delimiting portion remains set to the position shown in FIG. 19 and does not operate.

③ The third position delimiting portion remains set to the position shown in FIG. 32 and does not operate.

④ The roller base movement restricting mechanism remains set to the position shown in FIG. 43 and does not operate.

⑤ The disk holding mechanism (whole) remains set to the position shown in FIG. 55 and does not operate.

⑥ The disk holding mechanism (disk detecting portion) remains set to the position shown in FIG. 73 and does not operate.

⑦ The disk holding mechanism (auxiliary holding portion) remains set to the position shown in FIG. 87 and does not operate.

⑧ The disk reproducing mechanism (lock mechanism) remains set to the position shown in FIG. 145 and does not operate.

⑨ The operation mode setting mechanism (vertical movement) in the disk holding mechanism remains set to the position shown in FIG. 136 and does not operate.

The operation mode setting mechanism (rotational movement) in the disk holding mechanism remains set to the position shown in FIG. 115 and does not operate.

The disk storing mechanism moves from the position shown in FIG. 129 and is set to the position shown in FIG. 130.

Next, the state in which a disk is conveyed and both left and right holding arms 121, 122 as holding arms are in operation (step 3) is as shown in FIG. 162 which is an entire structure diagram. In this state:

① The first position delimiting portion moves from the position shown in FIG. 3 and is set to the position shown in FIG. 9.

② The second position delimiting portion moves from the position shown in FIG. 19 and is set to the position shown in FIG. 20.

③ The third position delimiting portion moves from the position shown in FIG. 32 and is set to the position shown in FIGS. 35 and 37.

④ The roller base movement restricting mechanism remains set to the position shown in FIG. 43 and does not operate.

⑤ The disk holding mechanism (whole) remains set to the position shown in FIG. 55 and does not operate.

⑥ The disk holding mechanism (disk detecting portion) moves from the position shown in FIG. 73 and is set to the position shown in FIGS. 75 and 77.

⑦ The disk holding mechanism remains set to the position shown in FIG. 87 and does not operate.

⑧ The disk reproducing mechanism remains set to the position shown in FIG. 145 and does not operate.

⑨ The operation mode setting mechanism (vertical movement) in the disk holding mechanism remains set to the position shown in FIG. 136 and does not operate.

The operation mode setting mechanism (rotational movement) in the disk holding mechanism remains set to the position shown in FIG. 115 and does not operate.

The disk storing mechanism remains set to the position shown in FIG. 130 and does not operate.

Next, a completed state of disk conveyance (step 4) is as shown in FIG. 163. In this state:

① The first position delimiting portion remains set to the position shown in FIG. 9 and does not operate.

Figure 21:
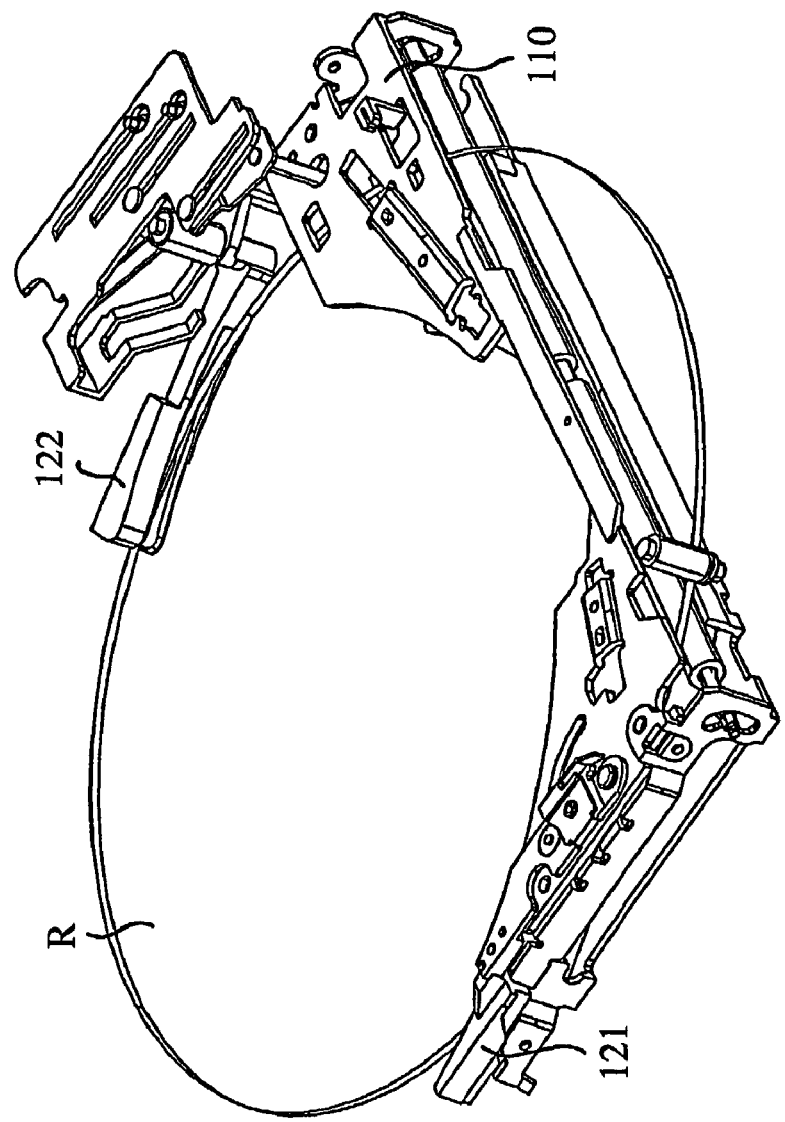
FIG. 21 is an operating state transition diagram explaining an operating state of the disk device shown in FIG. 15.
Figure 22:
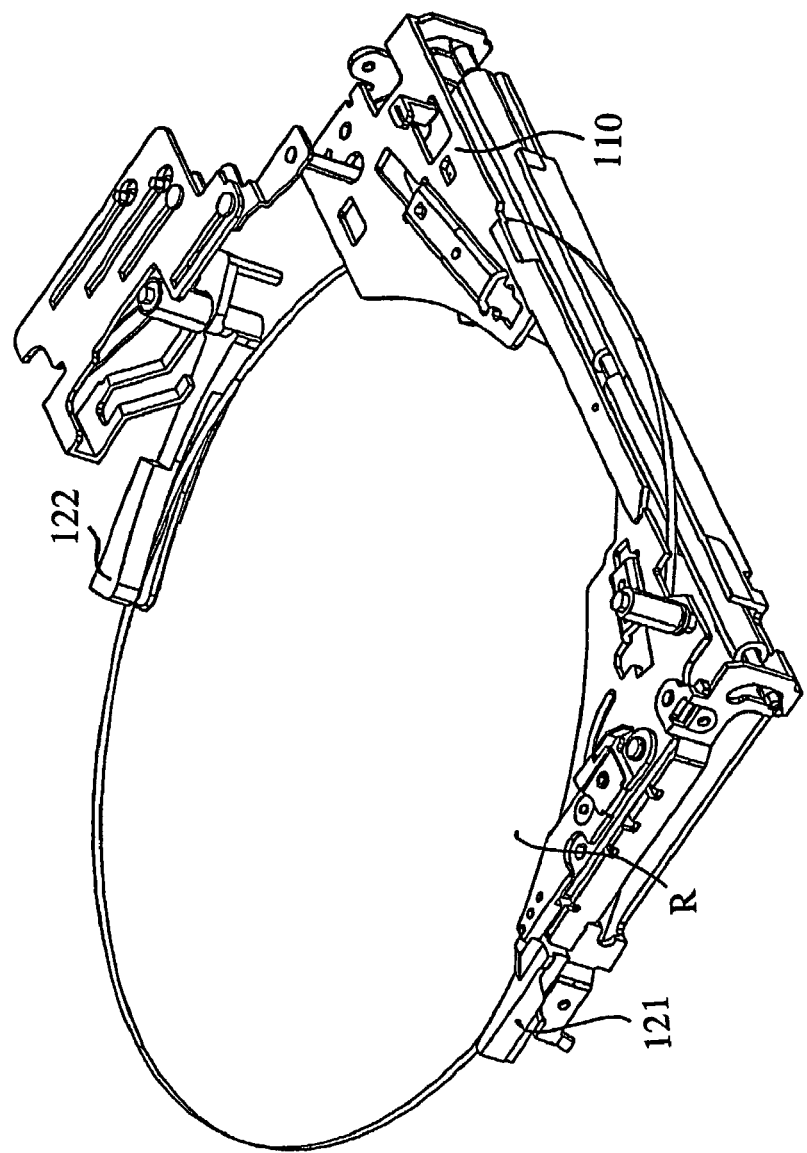
FIG. 22 is an operating state transition diagram explaining an operating state of the disk device shown in FIG. 15.

② The second position delimiting portion moves from the position shown in FIG. 20 and is set to the position shown in FIG. 21.

③ The third position delimiting portion moves from the position shown in FIG. 35 and is set to the position shown in FIGS. 38 and 39.

④ The roller base movement restricting mechanism remains set to the position shown in FIG. 43 and does not operate.

⑤ The disk holding mechanism (whole) moves from the position shown in FIG. 55 and is set to the position shown in FIG. 57.

⑥ The disk holding mechanism (disk detecting portion) moves from the position shown in FIGS. 75 and 77 and is set to the position shown in FIG. 79.

⑦ The disk holding mechanism (auxiliary holding portion) remains set to the position shown in FIG. 87 and does not operate.

⑧ The disk reproducing mechanism (lock mechanism) remains set to the position shown in FIG. 145 and does not operate.

⑨ The operation mode setting mechanism (vertical movement) in the disk holding mechanism remains set to the position shown in FIG. 136 and does not operate.

The operation mode setting mechanism (rotational movement) in the disk holding mechanism remains set to the position shown in FIG. 115 and does not operate.

The disk storing mechanism remains set to the position shown in FIG. 130 and does not operate.

Next, a completed state of disk conveyance (step 5) is as shown in FIG. 164 which is an entire structure diagram. In this state:

① The first position delimiting portion remains set to the position shown in FIG. 9 and does not operate.

② The second position delimiting portion remains set to the position shown in FIG. 21 and does not operate.
③ The third position delimiting portion remains set to the position shown in FIGS. 38 and 39 and does not operate.
④ The roller base movement restricting mechanism remains set to the position shown in FIG. 43 and does not operate.
⑤ The disk holding mechanism (whole) moves from the position shown in FIG. 57 and is set to the position shown in FIG. 58.
⑥ The disk holding mechanism (disk detecting portion) remains set to the position shown in FIG. 79 and does not operate.
⑦ The disk holding mechanism (auxiliary holding portion) remains set to the position shown in FIG. 87 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state before holding the disk in the normal position by the disk holding mechanism (step 6) is as shown in FIG. 166 which is an entire structure diagram. In this state:
① The first position delimiting portion remains set to the position shown in FIG. 9 and does not operate.
② The second position delimiting portion remains set to the position shown in FIG. 21 and does not operate.
③ The third position delimiting portion remains set to the position shown in FIGS. 38 and 39 and does not operate.
④ The roller base movement restricting mechanism moves from the position shown in FIG. 43 and is set to the position shown in FIG. 45.
⑤ The disk holding mechanism (whole) moves from the position shown in FIG. 58 and is set to the position shown in FIG. 63.
⑥ The disk holding mechanism (disk detecting portion) remains set to the position shown in FIG. 79 and does not operate.
⑦ The disk holding mechanism (auxiliary holding portion) moves from the position shown in FIG. 87 and is set to the position shown in FIG. 89.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk holding mechanism has held the disk in the normal position (step 7) is as shown in FIG. 167 which is an entire structure diagram. In this state:
① The first position delimiting portion remains set to the position shown in FIG. 9 and does not operate.
② The second position delimiting portion remains set to the position shown in FIG. 21 and does not operate.
③ The third position delimiting portion remains set to the position shown in FIGS. 38 and 39 and does not operate.
④ The roller base movement restricting mechanism moves from the position shown in FIG. 43 and is set to the position shown in FIG. 45.
⑤ The disk holding mechanism (whole) moves from the position shown in FIG. 63 and is set to the position shown in FIGS. 59 and 61.
⑥ The disk holding mechanism (disk detecting portion) remains set to the position shown in FIG. 79 and does not operate.
⑦ The disk holding mechanism (auxiliary holding portion) moves from the position shown in FIG. 89 and is set to the position shown in FIG. 91.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk loading/unloading mechanism has retracted to the disk inlet side (step 8) is as shown in FIG. 168 which is an entire structure diagram. In this state:
① The first position delimiting portion moves from the position shown in FIG. 9 and is set to the position shown in FIG. 13.
② The second position delimiting portion moves from the position shown in FIG. 21 and is set to the position shown in FIGS. 22, 23, 26, and 29.
③ The third position delimiting portion moves from the position shown in FIGS. 38 and 39 and is set to the position shown in FIGS. 40 and 41.
④ The roller base movement restricting mechanism moves from the position shown in FIG. 45 and is set to the position shown in FIG. 46.
⑤ The disk holding mechanism (whole) remains set to the position shown in FIGS. 59 and 61 and does not operate.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Figure 40:
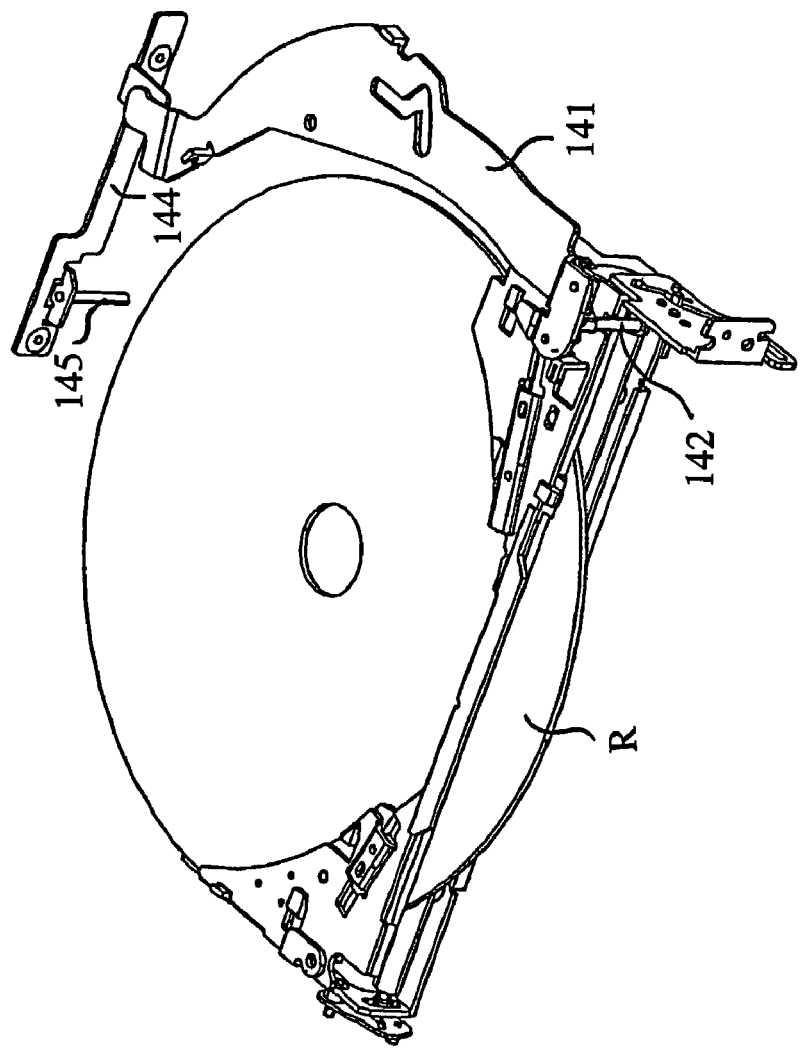
FIG. 40 is an operating state transition diagram explaining an operating state of the disk device shown in FIG. 32.
Figure 41:
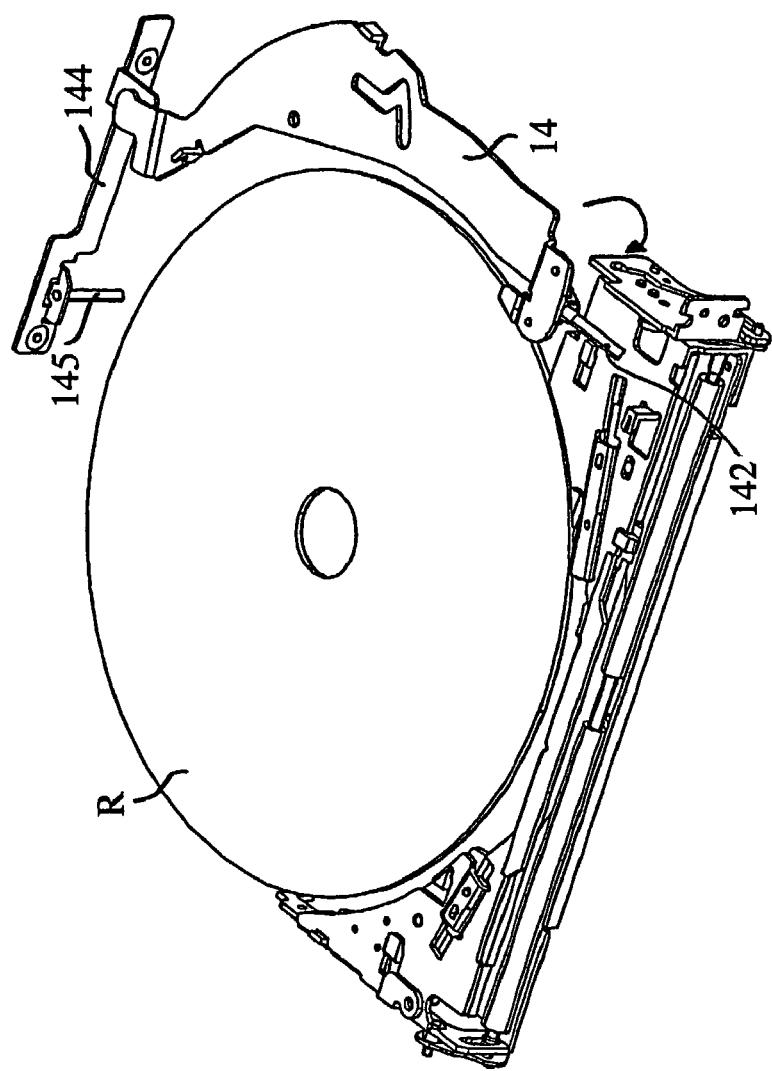
FIG. 41 is an operating state transition diagram explaining an operating state of the disk device shown in FIG. 32.
Figure 42:
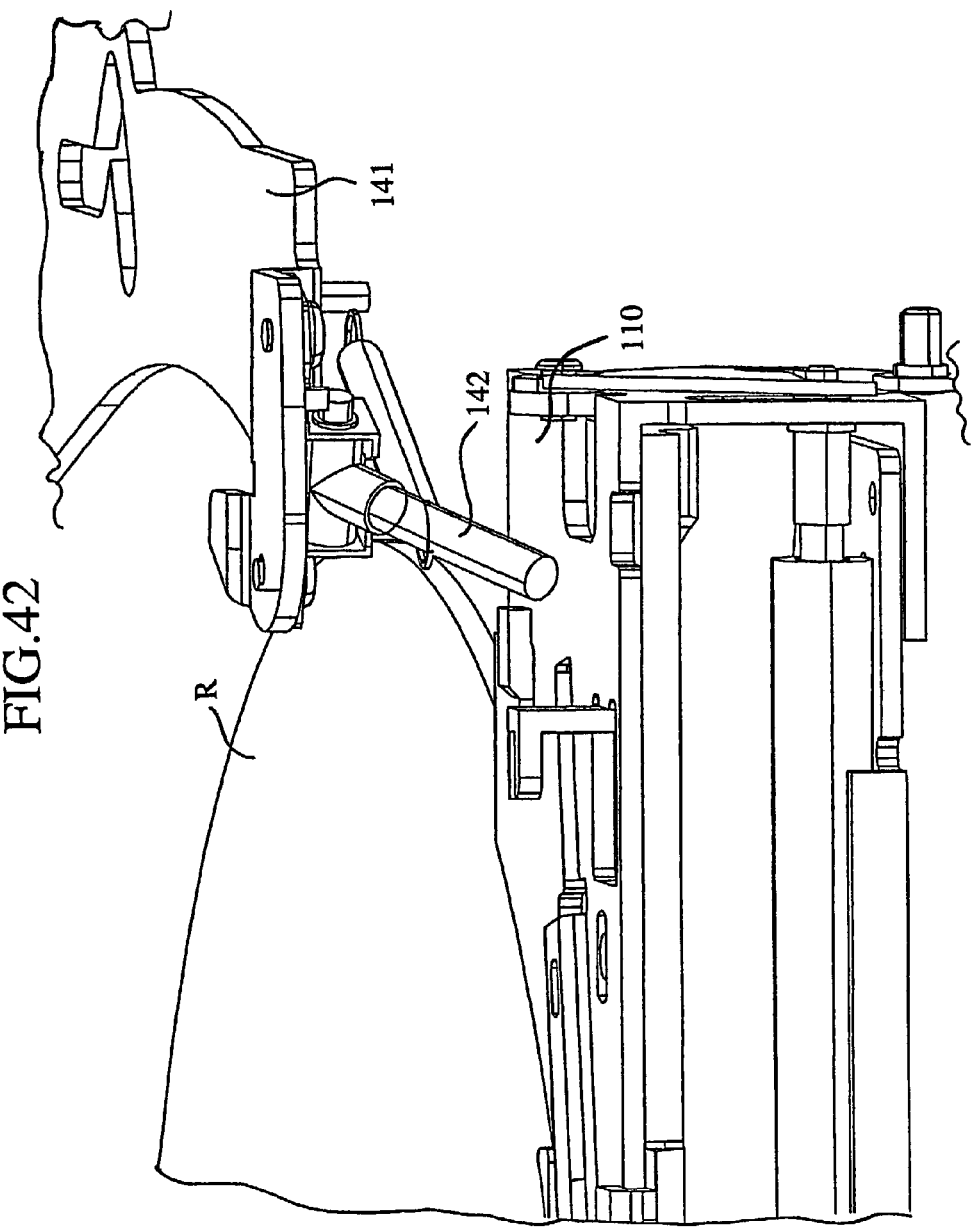
FIG. 42 is a detailed diagram of a principal portion of the disk device shown in FIG. 41.

Next, the state in which the disk holding mechanism has risen (step 9) is as shown in FIG. 92. In this state:

① The first position delimiting portion remains set to the position shown in FIG. 13 and does not operate.
② The second position delimiting portion moves from the position shown in FIGS. 22, 23, 26, and 29 and is set to the position shown in FIG. 26.
③ The third position delimiting portion moves from the position shown in FIGS. 40 and 41 and is set to the position shown in FIG. 41.
④ The roller base movement restricting mechanism remains set to the position shown in FIG. 46 and does not operate.
⑤ The disk holding mechanism (whole) remains set to the position shown in FIGS. 59 and 61 and does not operate.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism moves from the position shown in FIG. 136 and is set to the position shown in FIG. 140.
The operation mode setting mechanism (rotational movement) in the disk holding mechanism remains set to the position shown in FIG. 115 and does not operate.
The disk storing mechanism remains set to the position shown in FIG. 130 and does not operate.

Next, a rotated state of the disk reproducing mechanism (step 10) is as shown in FIG. 93. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) remains set to the position shown in FIGS. 59 and 61 and does not operate.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism moves from the position shown in FIG. 140 and is set to the position shown in FIG. 136.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk reproducing mechanism has been moved laterally of the disk device (step 11) is as shown in FIG. 94. In this state:

① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) remains set to the position shown in FIGS. 59 and 61 and does not operate.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk holding mechanism has moved down to hold the disk at the disk reproducing position in order for the disk reproducing mechanism to start the reproducing operation (step 12), is as shown in FIG. 95. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) moves from the position shown in FIGS. 59 and 61 and is set to the position shown in FIG. 66.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and doe not operate.
The disk storing mechanism remains set to the position shown in FIG. 130 and does not operate.

Next, the state in which the clamp portion in the disk reproducing mechanism moves to the disk reproducing position (step 13) is as shown in FIG. 96 which is an entire structure diagram. In this state:

① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) remains set to the position shown in FIG. 66 and does not operate.
⑥ The disk holding mechanism remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The storing mechanism remains set to the position shown in FIG. 130 and does not operate.

Next, the state in which the disk reproducing mechanism has moved to the disk reproducing position and clamped the disk (step 14) is as shown in FIG. 97. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) remains set to the position shown in FIG. 66 and does not operate.
⑥ The disk holding mechanism (disk detecting portion) remains set to the position shown in FIG. 79 and does not operate.
⑦ The disk holding mechanism (auxiliary holding portion) remains set to the position shown in FIG. 91 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, since the disk has been completely held by the disk reproducing mechanism, the state in which the disk holding mechanism has released the disk (step 15) is as shown in FIG. 98. In this state:
① The first position delimiting portion remains set to the position shown in FIG. 13 and does not change.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) moves from the position shown in FIG. 66 and is set to the position shown in FIG. 67.
⑥ The disk holding mechanism (disk detecting portion) moves from the position shown in FIG. 79 and is set to the position shown in FIG. 98.
⑦ The disk holding mechanism (auxiliary holding portion) moves from the position shown in FIG. 91 and is set to the position shown in FIG. 87.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk reproducing operation is over and the disk reproducing mechanism is to be stowed (step 16), is as shown in FIG. 99. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) remains set to the position shown in FIG. 67 and does not operate.
⑥ The disk holding mechanism (disk detecting portion) moves from the position shown in FIG. 98 and is set to the position shown in FIG. 99.
⑦ The disk holding mechanism (auxiliary holding portion) remains set to the position shown in FIG. 87 and does not operate.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, the state in which the disk reproducing mechanism is unlocked, i.e., in a floating state (step 17), is as shown in FIG. 100. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.

Figure 67:
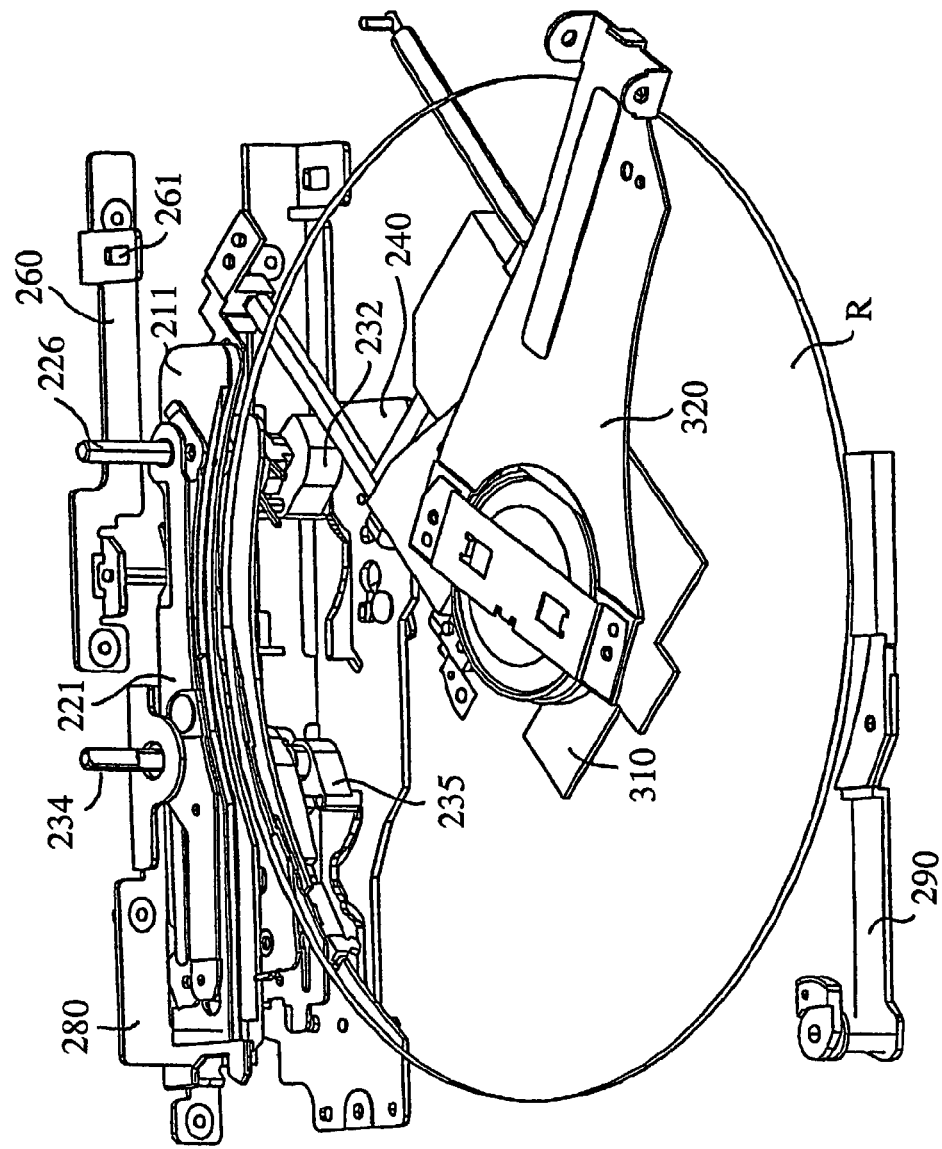
FIG. 67 is an operating state transition diagram explaining an operating state of the disk device shown in FIG. 47.

④ The roller base movement restricting mechanism remains set to the position shown in FIG. 46 and does not operate.
⑤ The disk holding mechanism (whole) remains set to the position shown in FIG. 67 and does not operate.
⑥ The disk holding mechanism (disk detecting portion) moves from the position shown in FIG. 99 and is set to the position shown in FIG. 100.
⑦ The disk holding mechanism (auxiliary holding portion) remains set to the position shown in FIG. 87 and does not operate.
⑧ The disk reproducing mechanism (lock mechanism) moves from the position shown in FIG. 145 and is set to the position shown in FIG. 152.
⑨ The operation mode setting mechanism (vertical movement) in the disk holding mechanism remains set to the position shown in FIG. 136 and does not operate.
The operation mode setting mechanism (rotational movement) in the disk holding mechanism remains set to the position shown in FIG. 115 and does not operate.
The disk storing mechanism remains set to the position shown in FIG. 130 and does not operate.

Next, an operating state of the disk storing mechanism (step 18) is as shown in FIG. 169 which is an entire structure diagram. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) moves from the position shown in FIG. 67 and is set to the position shown in FIG. 66.
⑥ The disk holding mechanism (disk detecting portion) moves from the position shown in FIG. 100 and is set to the position shown in FIG. 169.
⑦ The disk holding mechanism (auxiliary holding portion) moves from the position shown in FIG. 87 and is set to the position shown in FIG. 91.
⑧ The disk reproducing mechanism (lock mechanism) moves from the position shown in FIG. 152 and is set to the position shown in FIG. 145.
⑨ The operation mode setting mechanism (vertical movement) in the disk holding mechanism moves from the position shown in FIG. 136 and is set to the position shown in FIG. 141.
The operation mode setting mechanism (rotational movement) in the disk holding mechanism moves from the position shown in FIG. 115 and is set to the position shown in FIG. 118.
The disk storing mechanism moves from the position shown in FIG. 130 to the position shown in FIG. 131. In the operation mode of this step 18, the disk storing mechanism performs the movement operation as follows: it moves from the position shown in FIG. 131 to the position shown in FIG. 132, then moves to the position shown in FIG. 133, thereafter moves and is set to the position shown in FIG. 134.

Next, a released state (step 19) from the disk holding state by the disk holding mechanism is as shown in FIG. 170 as an entire structure diagram. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) moves from the position shown in FIG. 66 and is set to the position shown in FIG. 67.
⑥ The disk holding mechanism (disk detecting portion) moves from the position shown in FIG. 169 and is set to the position shown in FIG. 170.
⑦ The disk holding mechanism (auxiliary holding portion) moves from the position shown in FIG. 91 and is set to the position shown in FIG. 89.
⑧ The disk reproducing mechanism (lock mechanism) remains set to the position shown in FIG. 145 and does not operate.
⑨ The operation mode setting mechanism (vertical movement) in the disk holding mechanism moves from the position shown in FIG. 141 and is set to the position shown in FIG. 143.
The operation mode setting mechanism (rotational movement) in the disk holding mechanism remains set to the position shown in FIG. 118 and does not operate.
The disk storing mechanism moves from the position shown in FIG. 134 and is set to the position shown in FIG. 135.

Next, a state of exchange between a disk stored in the disk storing mechanism and another disk (step 20) is as shown in FIG. 171. In this state:
① The first position delimiting portion remains set to the position shown in FIG. 13 and does not operate.
② The second position delimiting portion remains set to the position shown in FIG. 26 and does not operate.
③ The third position delimiting portion remains set to the position shown in FIG. 41 and does not operate.
④ The roller base movement restricting mechanism remains set to the position shown in FIG. 46 and does not operate.
⑤ The disk holding mechanism (whole) moves from the position shown in FIG. 67 and is set to the position shown in FIG. 63.
⑥ The disk holding mechanism (disk detecting portion) moves from the position shown in FIG. 170 and is set to the position shown in FIG. 171.
⑦ The disk holding mechanism (auxiliary holding portion) moves from the position shown in FIG. 89 and is set to the position shown in FIG. 87.
⑧ The disk reproducing mechanism (lock mechanism) remains set to the position shown in FIG. 145 and does not operate.
⑨ The operation mode setting mechanism (vertical movement) in the disk holding mechanism remains set to the position shown in FIG. 143 and does not operate.
The operation mode setting mechanism (rotational movement) in the disk holding mechanism moves from the position shown in FIG. 118 and is set to the position shown in FIGS. 121, 122, and 125.
The disk storing mechanism remains set to the position shown in FIG. 135 and does not operate.

Now, a series of operations of the disk device is completed.

As described above, since the disk device is structured so as to store a disk by the use of an inside diameter of the disk, an abutting operation of the disk against a recording surface can be omitted at the time of storing the disk, whereby any damage to the disk, especially its recording surface, can be suppressed and the reliability of the disk unit is improved.

With the above structure, the disk device can handle any type of disk (e.g., 12 cm CD and 8 cm CD) irrespective of disk diameter and therefore the disk device becomes more convenient.

Moreover, since the disk device is structured so that the axis in the disk storing position and the axis in the disk reproducing position coincide with each other, there occurs no axis deviation, that is, it is not necessary to perform an operation for axis alignment in disk change for example, whereby it is possible to shorten the working time.

Further, since the disk reproducing mechanism is structured as a rotary type mechanism, it is possible to handle any type of disk irrespectively of disk diameter, thus making the disk device more convenient.

Further, since plate springs are attached to spacers in the disk storing mechanism, wobbling can be suppressed with the pressing force of the plate springs even if there are variations in disk thickness, whereby the reliability of the disk device is improved.

Besides, since plate springs are attached to spacers in the disk storing mechanism, wobbling can be suppressed with the pressing force of the plate springs even at a spacer portion where a disk is not stored, with consequent improvement in reliability of the disk device.

Further, by providing a retaining portion for engagement with a portion other than the rotary shaft of the disk reproducing mechanism, a disk can be supported at two points of the rotary shaft and the retaining portion when it is to be reproduced, so that it is possible to improve the performance of a vibration isolating mechanism provided in the disk reproducing mechanism and stabilize the disk reproducing operation. Consequently, the reliability of the disk device is improved.

Further, the disk loading/unloading mechanism is structured movably in the disk loading/unloading directions, so in a stand-by state for disk loading the disk loading/unloading mechanism can be moved up to near a predetermined disk setting position, thus permitting a disk of a small diameter to be loaded stably into the disk device, whereby the reliability of the disk device is improved.

Further, since disks can be inserted and discharged each independently one by one, the disk device becomes more convenient for an operator.

Further, since the disk device is structured so that a plurality of switches can be operated with existing components, it is possible to set a plurality of operation modes without increase in the number of components and thus the disk device can be obtained as a less expensive disk device of multiple functions.

Second Embodiment

A description will now be given of a disk device according to a second embodiment of the present invention. Although in the above first embodiment reference has been made to a set position moving state of each component (principal portion) in each operation mode, a structure may be made such that the operations of components set in the same mode are synchronized, or interlocked. With this structure, since the components are synchronized, it is possible to effect a moving motion rapidly, whereby not only the reliability of the disk device is improved, but also the working time can be shortened.

Third Embodiment

A description will now be given of a disk device according to a third embodiment of the present invention. In the above first embodiment, when a moving motion is performed with progress of an operation mode, switching from one operation mode to another is performed in a gradual manner; however, the switching may be done at a time. Even in this case there can be obtained the same effect as in the first embodiment.

Fourth Embodiment

A disk device according to a fourth embodiment of the present invention will now be described. Although in the first embodiment a disk gripping structure in the disk loading/unloading mechanism 100 includes the roller portion 101 adapted to rotate and the pressing portion 102 not having any rotating member, the pressing portion may be replaced with a roller member. With this structure, it is possible to prevent any damage to the disk surface.

Fifth Embodiment

A disk device according to a fifth embodiment of the present invention will now be described. In the above first embodiment, when a disk is inserted into the disk device, the disk loading/unloading mechanism 100 conveys the disk, the disk holding mechanism 200 holds the disk, and the disk reproducing mechanism 300 reproduces the disk. Thus, when a disk is merely inserted into the disk device, the disk is subjected to reproduction as it is. According to this structure, the user's convenience is improved.

Sixth Embodiment

A disk device according to a sixth embodiment of the present invention will now be described. Although in the above first embodiment a plate spring is attached to each spacer portion, a compression spring may be used in place of the plate spring. Even in this case there is obtained the same effect as in the first embodiment.

Seventh Embodiment

A disk device according to a seventh embodiment of the present invention will now be described. In the above first embodiment there may be adopted a structure wherein a holding means superior in a space saving characteristic to the plate spring which holds the inside diameter of the disk may be provided in the spacer fit portion. With this structure, the disk can be supported firmly and shaking of the disk caused by an external force or the like can be diminished, so that it is possible to omit the plate spring and attain the reduction in size of the disk device.

Eighth Embodiment

A disk device according to an eighth embodiment of the present invention will now be described. In the structure of the first embodiment, grooves formed in each of the first and third guide members, in which the projections formed on each spacer are fitted, may be formed in a plurality of number larger than two, whereby wobbling of the spacer can be prevented and the reliability of the disk device can be further improved.

<Definitions of Main Components in the Embodiments>

The following are definitions of main different terms used in the same mechanisms or structure in the embodiments correspondingly to terms used in the appended claims.

The disk roller corresponds to the roller portion 112, the disk roller mechanism corresponds to the disk roller mechanism 110, the first disk movement restricting means corresponds to the upper position delimiting portion 115, the second disk movement restricting means corresponds to the lower position delimiting means 116, the disk guide/holding means corresponds to the left arm 121 and the right arm 122 as arm portions, the first disk holding means corresponds to the holding portion 211, the second disk holding means corresponds to the holding arm 290, the support means for supporting the first disk holding means corresponds to the left arm 221 and the right arm 222 which support the holding portion 211, the disk reproducing means corresponds to the reproducing section 310, the disk clamp section corresponds to the clamp section 320, the loose fit means corresponds to the mandrel mechanism 4000, the a plurality of support means adapted to move in the rotational movement axis of a disk corresponds to the support means 5400, the operation setting means corresponds to the groove 242, and the operation mode setting means corresponds to the switching plate 245.

INDUSTRIAL APPLICABILITY

As set forth above, the disk device according to the present invention is suitable for use as a vehicular disk device capable of being reduced in size and structured such that plurality of disks are stored without using a removable magazine and can be inserted, discharged, and reproduced each independently and selectively.

What is claimed is:

1. A disk device capable of storing a plurality of disks therein comprising:
   a disk storing mechanism to store said plurality of disks loosely fitted and supported at its inner diameter;
   a disk holding means capable of changing its vertical position to hold outer peripheral portion of the disk located on the axis of said disk storing mechanism;
   an operation setting means to actuate said disk holding means according to an operation mode of the disk; and
   an operation mode switching means to switch the operation mode of said operation setting means based on contents of disk operation.

2. A disk device according to claim 1, wherein said operation setting means makes said disk holding means keeping in a normal height to hold the disk and performs an operation stowing the disk holding means in a first operation mode, and makes said disk holding means keeping in a higher height said normal height to hold the disk and performs an operation stowing the disk holding means in a second operation mode.

3. A disk device according to claim 2, wherein said operation mode switching means switches the operation mode set by said operation setting means from said first operation mode to said second operation mode when said operation setting means continues to set the first operation mode and said disk storing mechanism performs a stowing operation for a disk or performs a changing operation of a stowed disk.

* * * * *